US012328689B2

(12) United States Patent
Abedini et al.

(10) Patent No.: US 12,328,689 B2
(45) Date of Patent: Jun. 10, 2025

(54) INFORMATION FOR WIRELESS COMMUNICATION REPEATER DEVICE

(71) Applicant: QUALCOMM Incorporated, San Diego, CA (US)

(72) Inventors: Navid Abedini, Basking Ridge, NJ (US); Jianghong Luo, Skillman, NJ (US); Tao Luo, San Diego, CA (US); Ashwin Sampath, Skillman, NJ (US); Junyi Li, Fairless Hills, PA (US); Valentin Alexandru Gheorghiu, Yokohama (JP); Philip David Coan, Fitchburg, WI (US); Ozcan Ozturk, San Diego, CA (US); Naeem Akl, Somerville, NJ (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/402,375

(22) Filed: Aug. 13, 2021

(65) Prior Publication Data

US 2022/0053433 A1 Feb. 17, 2022

Related U.S. Application Data

(60) Provisional application No. 63/138,046, filed on Jan. 15, 2021, provisional application No. 63/070,194, (Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04W 16/28* (2013.01); *H04W 74/0833* (2013.01)

(58) Field of Classification Search
CPC .............. H04W 56/001; H04W 16/28; H04W 74/0833; H04L 5/0051; H04L 5/0023; (Continued)

(56) References Cited

U.S. PATENT DOCUMENTS 10,608,729 B1 * 3/2020 Youtz .................... H04W 24/02
11,356,943 B2 6/2022 Sampath et al.
(Continued)

FOREIGN PATENT DOCUMENTS

| CN | 110167107 A | 8/2019 |
|---|---|---|
| CN | 110574447 A | 12/2019 |
| WO | 2020092261 A1 | 5/2020 |

OTHER PUBLICATIONS

International Search Report and Written Opinion—PCT/US2021/046046—ISA/EPO—Dec. 3, 2021.

*Primary Examiner* — Noel R Beharry
*Assistant Examiner* — Wilfred Thomas
(74) *Attorney, Agent, or Firm* — QUALCOMM Incorporated

(57) ABSTRACT

Aspects relate to exchanging beam-related information for a repeater device. A network access node may configure a repeater device to transmit multiple synchronization signal blocks using different beams. The network access node may determine the number of beams that the repeater device can use for its operations. A repeater device may indicate how many beams the repeater device supports, how many antenna arrays it has, and a mapping of beam indices to antenna array indices. A repeater device may indicate which beam pairs cannot be used for simultaneous transmission and/or reception and/or which beam groups can be used for (Continued)

simultaneous transmission and/or reception. A network access node may determine which beam pairs the repeater device cannot use for simultaneous transmission and/or reception and/or which beam groups the repeater device can use for simultaneous transmission and/or reception based on signal measurements and/or beam configuration feedback from the repeater device.

30 Claims, 55 Drawing Sheets

Related U.S. Application Data filed on Aug. 25, 2020, provisional application No. 63/067,790, filed on Aug. 19, 2020, provisional application No. 63/065,915, filed on Aug. 14, 2020.

(51) Int. Cl.
*H04W 16/28* (2009.01)
*H04W 74/0833* (2024.01)

(58) Field of Classification Search
CPC . H04L 5/0048; H04L 5/0091; H04B 7/15528; H04B 7/0695
See application file for complete search history.

(56) References Cited

U.S. PATENT DOCUMENTS

| | | | |
|---|---|---|---|
| 11,368,927 B2* | 6/2022 | Radulescu | H04W 56/0015 |
| 11,611,421 B2 | 3/2023 | Li et al. | |
| 11,743,743 B2 | 8/2023 | Luo et al. | |
| 12,107,661 B2 | 10/2024 | Li et al. | |
| 2018/0102828 A1* | 4/2018 | Ashworth | H04B 7/15507 |
| 2018/0124718 A1 | 5/2018 | Ng et al. | |
| 2018/0139742 A1* | 5/2018 | Sun | H04W 72/046 |
| 2018/0279364 A1* | 9/2018 | Hui | H04W 74/085 |
| 2019/0215123 A1* | 7/2019 | Zhou | H04W 72/30 |
| 2019/0380099 A1* | 12/2019 | Hakola | H04B 7/0695 |
| 2020/0052775 A1 | 2/2020 | Nam et al. | |
| 2020/0177432 A1* | 6/2020 | Kwon | H04L 27/2675 |
| 2021/0184750 A1* | 6/2021 | Gao | H04W 76/11 |
| 2021/0297142 A1 | 9/2021 | Li et al. | |
| 2022/0174509 A1* | 6/2022 | Noh | H04W 72/51 |
| 2022/0174743 A1* | 6/2022 | Wu | H04W 74/0808 |
| 2022/0190883 A1* | 6/2022 | Kaya | H04B 7/0695 |
| 2022/0408275 A1* | 12/2022 | Awada | H04W 16/28 |
| 2022/0408491 A1* | 12/2022 | Liu | H04L 5/0091 |
| 2023/0050703 A1* | 2/2023 | Harada | H04W 72/30 |
| 2023/0269790 A1* | 8/2023 | Müller | H04W 74/0833 370/329 |

\* cited by examiner

INFORMATION FOR WIRELESS COMMUNICATION REPEATER DEVICE

CLAIM OF PRIORITY UNDER 35 U.S.C. § 119

The present application for patent claims priority to United States Provisional Patent Application No. 63/065,915 titled BEAM INFORMATION FOR WIRELESS COMMUNICATION REPEATER filed in the United States Patent and Trademark Office on Aug. 14, 2020, and U.S. Provisional Patent Application No. 63/067,790 titled IDENTIFICATION OF WIRELESS COMMUNICATION REPEATER filed in the United States Patent and Trademark Office on Aug. 19, 2020, 2020, and U.S. Provisional Patent Application Nos. 63/070,194 and 63/138,046 both titled OPEN LOOP CONFIGURATION OF RADIO FREQUENCY (RF) REPEATERS and both filed in the United States Patent and Trademark Office on Aug. 25, 2020 and Jan. 15, 2021, respectively, all of said applications being assigned to the assignee hereof and hereby expressly incorporated by reference herein as if fully set forth below and for all applicable purposes.

TECHNICAL FIELD

The technology discussed below relates generally to wireless communication and, more particularly, to exchanging beam information, open loop configuration, and identification for a wireless communication repeater device.

INTRODUCTION

Next-generation wireless communication systems (e.g., 5GS) may include a 5G core (e.g., 5GC) network and a 5G radio access network (RAN), such as a New Radio (NR)-RAN. The NR-RAN supports communication via one or more cells. For example, a wireless communication device such as a user equipment (UE) may access a first cell of a first network access node such as a gNB and/or access a second cell of a second network access node. In some instances, a repeater device may be located between the UE and a network access node. The repeater device may relay traffic and control between the UE and network access node in both the uplink and downlink directions.

A network access node may schedule access to a cell to support access by multiple UEs. For example, a network access node may allocate different resources (e.g., time domain and frequency domain resources) for different UEs operating within a cell of the network access node.

In 5G New Radio wireless communication networks, resources may be shared between access networks and backhaul networks. For example, the wireless spectrum may be used for both access links (e.g., links between network access nodes and UEs) and backhaul links (e.g., links between network access nodes and the core network). In such integrated access backhaul (IAB) networks, the shared wireless carrier may be time-divided into a plurality of frames, subframes, and slots. In some IAB network configurations, one or more slots may be allocated for access communication, while other slots may be allocated for backhaul communication.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a repeater device in a wireless communication network, is described. The method includes receiving a first configuration specifying a first quantity of synchronization signal blocks (SSBs) to be transmitted by the repeater device, electing to use a second quantity of beams to transmit SSBs, wherein the second quantity of beams is less than or equal to the first quantity of SSBs, receiving at least one SSB transmission, and transmitting the at least one SSB transmission via the second quantity of beams.

In another example a repeater device is described. The repeater device includes a relay unit, a memory, and a processor communicatively coupled to the relay unit and the memory. The processor and the memory are configured to receive a first configuration specifying a first quantity of synchronization signal blocks (SSBs) to be transmitted by the relay unit of the repeater device, select to use a second quantity of beams to transmit SSBs, wherein the second quantity of beams is less than or equal to the first quantity of SSBs, receive at least one SSB transmission, and transmit the at least one SSB transmission via the second quantity of beams.

According to another example, a method of wireless communication at a network access node in a wireless communication network is described. The method includes generating a first configuration indicating a first quantity of synchronization signal blocks (SSBs) to be transmitted by a repeater device, transmitting the first configuration to the repeater device, determining that the repeater device is transmitting less than all of the first quantity of SSBs, generating a second configuration after determining that the repeater device is transmitting less than all of the first quantity of SSBs, the second configuration indicating a second quantity of SSBs to be transmitted by the repeater device, and transmitting the second configuration to the repeater device.

In still another example, a network access node is described. The network access node includes a transceiver, a memory, and a processor communicatively coupled to the transceiver and the memory. The processor and the memory are configured to generate a first configuration indicating a first quantity of synchronization signal blocks (SSBs) to be transmitted by a repeater device, transmit the first configuration to the repeater device via the transceiver, determine that the repeater device is transmitting less than all of the first quantity of SSBs, generate a second configuration after determining that the repeater device is transmitting less than all of the first quantity of SSBs, the second configuration indicating a second quantity of SSBs to be transmitted by the repeater device, and transmit the second configuration to the repeater device via the transceiver.

These and other aspects of the disclosure will become more fully understood upon a review of the detailed description, which follows. Other aspects, features, and examples of the present disclosure will become apparent to those of ordinary skill in the art, upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples it should be understood that such examples can be implemented in various devices, systems, and methods.

DETAILED DESCRIPTION

Figure 1:
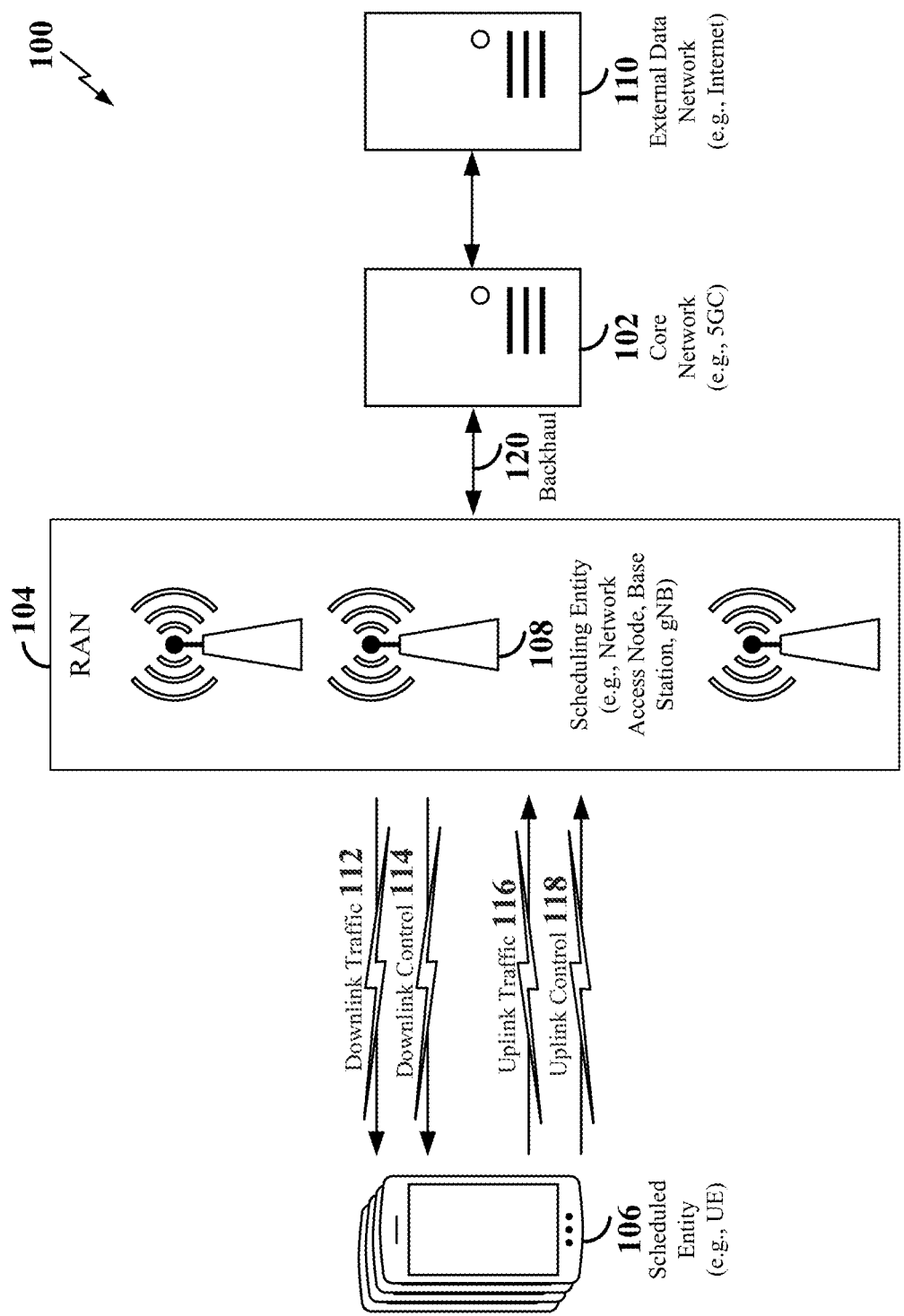
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, features and/or uses may come about via integrated chip examples and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, nonchip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

Various aspects of the disclosure relate to repeater devices. Radio Frequency (RF) repeater devices may be non-regenerative types of relay nodes that amplify-and-forward all RF signals that they receive. Various configurations of RF repeater devices exist. For example, an RF repeater device may be configured based on power characteristics and spectrum that the RF repeater device is designed amplify. Other configurations, which may include single band and multi-band RF repeater devices may be established based on a specific requirement that the RF repeater device is specified to provide. For example, one RF repeater device may be mounted on a tower with no obstacles on any side of the RF repeater device, while a second RF repeater device may be mounted to an exterior wall or exterior corner of an office building. The former RF repeater device may function satisfactorily with an omnidirectional beam, while the latter RF repeater device may need a fixed sector beam for satisfactory operation. In most examples, RF repeater devices are always on, and always amplifying and forwarding received RF signals. Additionally, full-duplex capable RF repeater devices do not differentiate between resources scheduled for uplink or downlink. Accordingly, the main advantages of RF repeater devices are their low-cost, their relative simplicity, their ease of deployment, and the fact that they do not increase latency, as they are basically pass-through devices. RF repeater devices (as distinguished from smart repeater devices referenced herein) have been the simplest and most cost-effective way to improve network coverage. However, RF repeater devices amplify both signal and noise equally, and therefore, contribute to an increase of interference (pollution) in a wireless communication network.

Smart repeater devices can acquire side control information via a control-interface to a network access node (e.g., scheduling entity, an eNode B (eNB), a gNode B (gNB), a base station). However, this requires the smart repeater device to establish a communication link (e.g., a radio resource control (RRC) connection) with the network access node. The establishment of the RRC connection may be similar to the way a user equipment (UE) establishes an RRC connection with a network access node. Such an establishment has at least two implications. First, the smart repeater device's implementation becomes more complex in comparison to an implementation of an RF repeater device. In practice, the implementation of a smart repeater device may require a user equipment (UE) modem. Second, operation of the smart repeater device is managed/configured by a network access node, which results in an increase in processing and control signaling overhead of the network access node.

The disclosure relates to an enhancement to an RF repeater device (e.g., a Layer-1 repeater device) that acquires the pertinent and useful side control information without a need to establish a link (e.g., an RRC connection) with a network access node. Aspects and features of the disclosure may provide for performance benefits the same as or similar to those enjoyed with smart repeater devices, but without the implications describe above. Nevertheless, according to some aspects, a network access node may recognize the presence of a nearby open loop repeater device and may provide the open loop repeater device with some information. The amount and/or detail of the information may, however, be minimal in comparison to the amount and/or detail of information that the same network access node would give to a smart repeater device (to control the smart repeater device).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a network access node (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network access nodes 108. Broadly, a network access node is a network element in a radio access network responsible for radio transmission and reception in one or more cells to or from a UE. In different technologies, standards, or contexts, a network access node may variously be referred to by those skilled in the art as a base transceiver station (BTS), a radio network access node, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a network access node may include two or more TRPs that may be collocated or non-collocated. Each TRP may communicate on the same or different carrier frequency within the same or different frequency band. In examples where the RAN 104 operates according to both the LTE and 5G NR standards, one of the network access nodes may be an LTE network access node, while another network access node may be a 5G NR network access node.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication, such components can include antennas, antenna arrays, RF chains, TX chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a network access node (e.g., network access node 108) to one or more UEs (e.g., similar to UE 106) may be referred to as downlink (DL) transmission. In accordance with certain aspects of the present disclosure, the term downlink may refer to a point-to-multipoint transmission originating at a network access node (e.g., network access node 108). Another way to describe this scheme may be to use the term broadcast channel multiplexing. Transmissions from a UE (e.g., UE 106) to a network access node (e.g., network access node 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a network access node 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Network access nodes 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., UE 106) is a node or device that receives downlink control information 114, including but not limited to scheduling information (e.g., a grant), synchronization or timing information, or other control information from another entity in the wireless communication network such as the scheduling entity 108. The scheduled entity (e.g., UE 106) may transmit uplink control 118 information including one or more uplink control channels to the scheduling entity 108. Uplink control 118 information may include a variety of packet types and categories, including pilots, reference signals, and information configured to enable or assist in decoding uplink data transmissions.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, network access nodes 108 may include a backhaul interface for communication with a backhaul portion 120 of the wireless communication system 100. The backhaul portion 120 may provide a link between a network access node 108 and the core network 102. Further, in some examples, a backhaul network may provide interconnection between the respective network access nodes 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
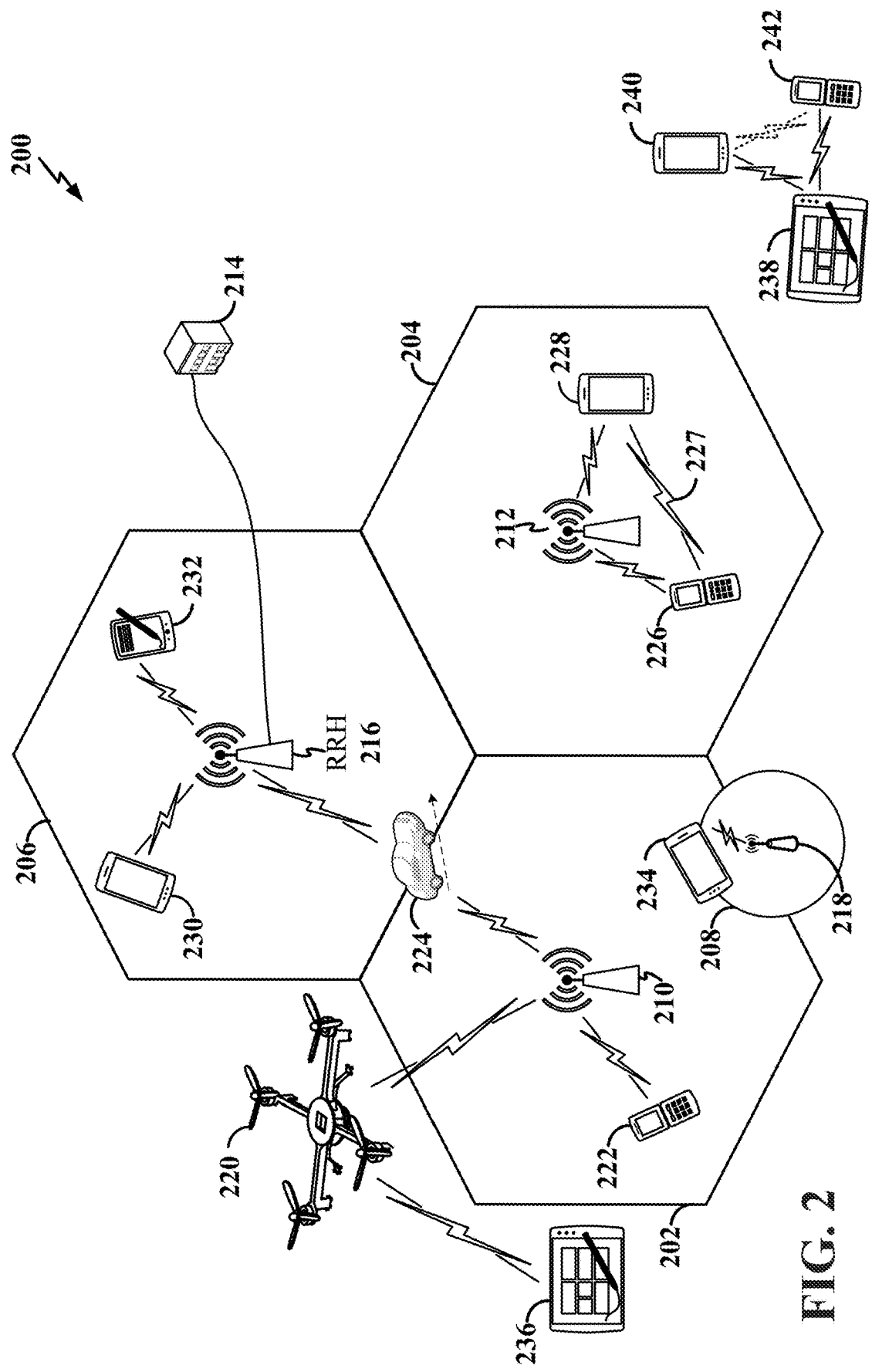
FIG. 2 is a schematic illustration of an example of a radio access (RAN) network according to some aspects of the disclosure.

Referring now to FIG. 2, as an illustrative example without limitation, a schematic illustration of an example of a radio access network (RAN) 200 according to some aspects of the disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or network access node. FIG. 2 illustrates cells 202, 204, 206, and 208, each of which may include one or more sectors (not shown). A sector is a sub-area of a cell. All sectors within one cell are served by the same network access node. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various network access node arrangements can be utilized. For example, in FIG. 2, two network access nodes, network access node 210 and network access node 212 are shown in cells 202 and 204. A third network access node, network access node 214 is shown controlling a remote radio head (RRH) 216 in cell 206. That is, a network access node can have an integrated antenna or can be connected to an antenna or RRH 216 by feeder cables. In the illustrated example, cells 202, 204, and 206 may be referred to as macrocells, as the network access nodes 210, 212, and 214 support cells having a large size. Further, a network access node 218 is shown in the cell 208, which may overlap with one or more macrocells. In this example, the cell 208 may be referred to as a small cell (e.g., a microcell, picocell, femtocell, home network access node, home Node B, home eNode B, etc.), as the network access node 218 supports a cell having a relatively small size. Cell sizing can be done according to system design as well as component constraints.

It is to be understood that the RAN 200 may include any number of wireless network access nodes and cells. Further, a relay node may be deployed to extend the size or coverage area of a given cell. The network access nodes 210, 212, 214, 218 provide wireless access points to a core network for any number of mobile apparatuses. In some examples, the network access nodes 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a network access node, or more specifically as a mobile network access node. That is, in some examples, a cell may not necessarily be stationary, and the geographic area of the cell may move according to the location of a mobile network access node, such as the UAV 220.

Within the RAN 200, the cells may include UEs that may be in communication with one or more sectors of each cell. Further, each network access node 210, 212, 214, 218, and 220 may be configured to provide an access point to a core network 102 (see FIG. 1) for all the UEs in the respective cells. For example, UEs 222 and 224 may be in communication with network access node 210; UEs 226 and 228 may be in communication with network access node 212; UEs 230 and 232 may be in communication with network access node 214 by way of RRH 216; UE 234 may be in communication with network access node 218; and UE 236 may be in communication with mobile network access node 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with network access node 210.

In a further aspect of the RAN 200, sidelink signals may be used between UEs without necessarily relying on scheduling or control information from a network access node. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a network access node. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a network access node. In other examples, two or more UEs (e.g., UEs 226 and 228) within the coverage area of a network access node (e.g., network access node 212) may also communicate sidelink signals 227 over a direct link (sidelink) without conveying that communication through the network access node 212. In this example, the network access node 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of network access nodes and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving network access node 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the network access nodes 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., network access nodes 210 and 214/216) within the RAN 200. Each of the cells may measure a strength of the pilot signal, and the radio access network (e.g., one or more of the network access nodes 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the network access nodes 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

Devices communicating in the RAN 200 may utilize one or more multiplexing techniques and multiple access algorithms to enable simultaneous communication of the various devices. For example, 5G NR specifications provide multiple access for UL transmissions from UEs 222 and 224 to network access node 210, and for multiplexing for DL transmissions from network access node 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network access node 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the RAN 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an orthogonal frequency divisional multiplexing (OFDM) waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
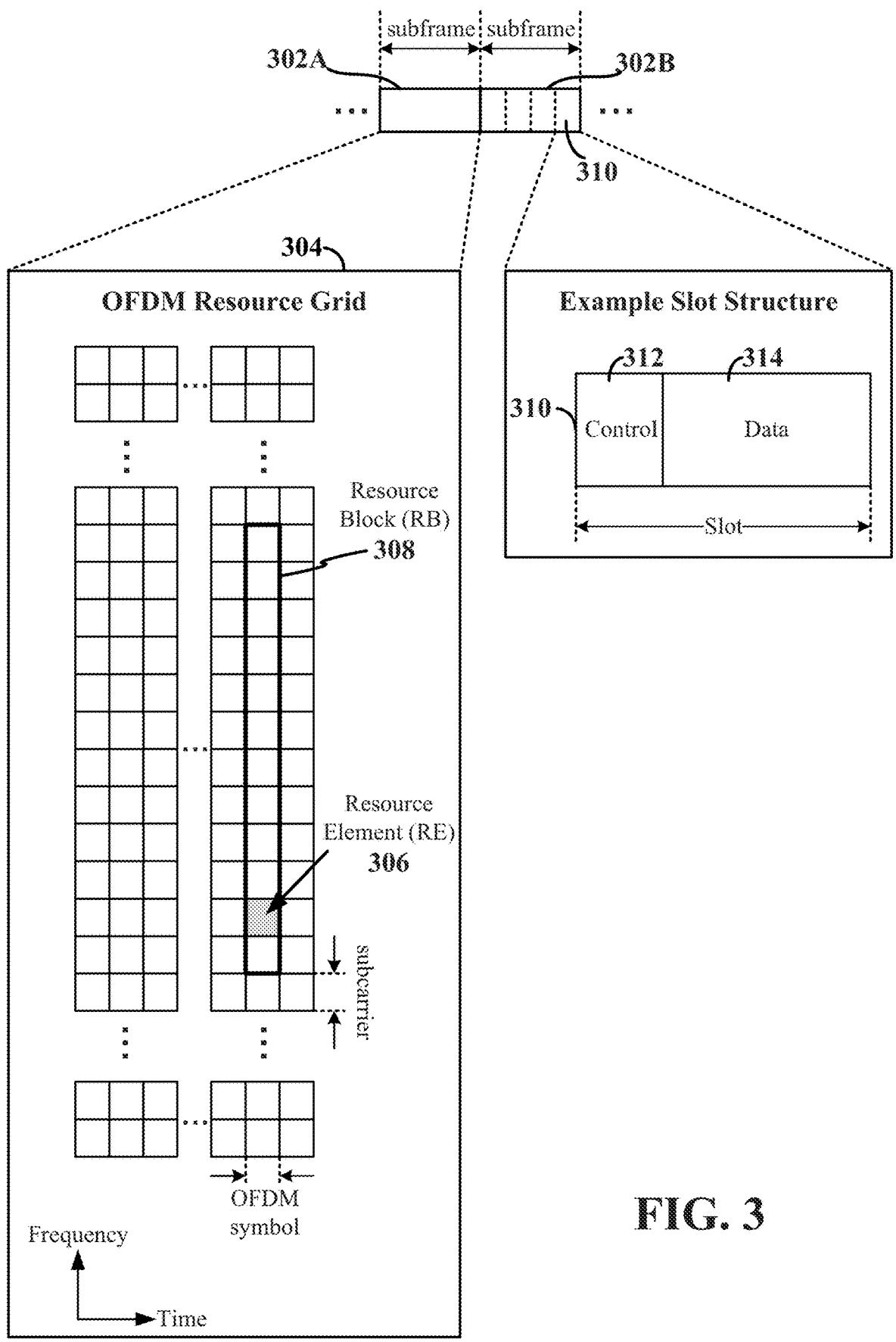
FIG. 3 is a schematic illustration of wireless resources in an air interface utilizing orthogonal frequency divisional multiplexing (OFDM) according to some aspects of the disclosure.

Referring now to FIG. 3, an expanded view of an exemplary subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network access node (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a network access node, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a network access node) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network access node may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A network access node may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
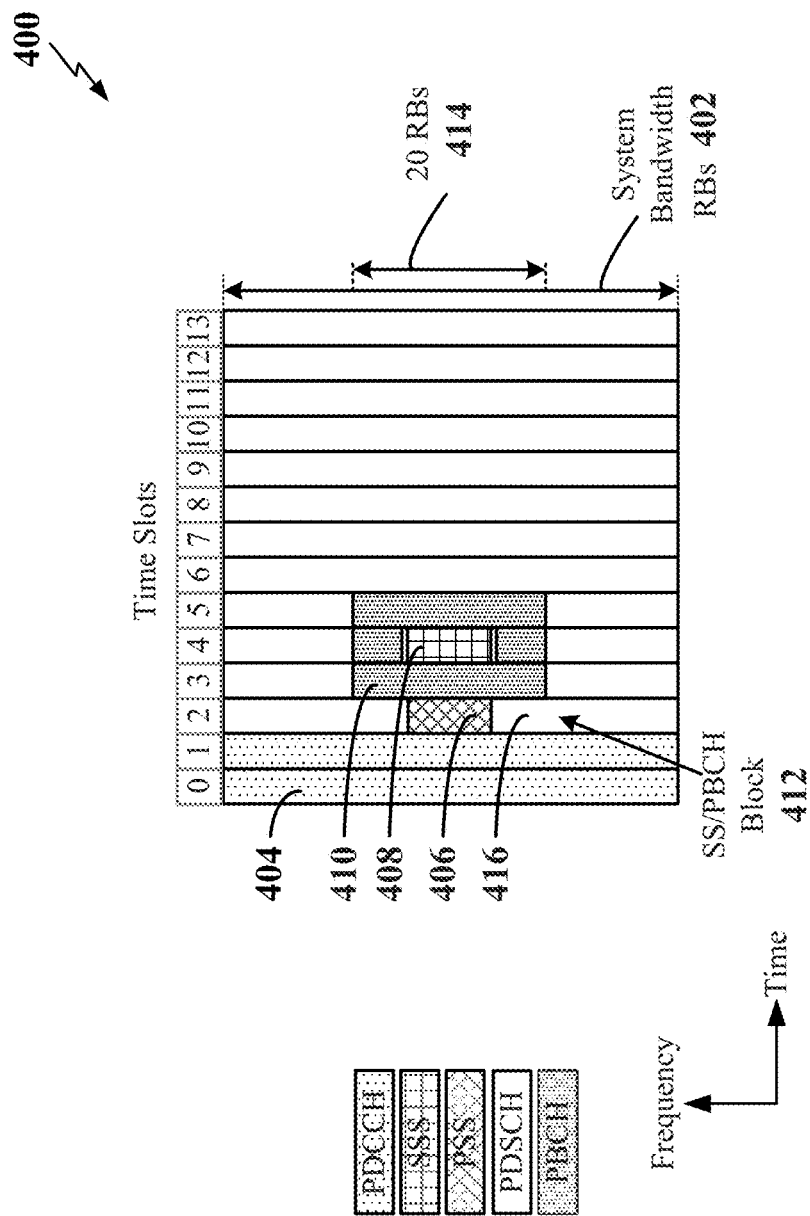
FIG. 4 is a diagram illustrating an example of downlink channels within a 5G new radio (NR) subframe according to some aspects of the disclosure.

FIG. 4 is a diagram 400 illustrating an example of downlink (DL) channels within a 5G new radio (NR) subframe according to some aspects of the disclosure. In this example (e.g., for a slot configuration 0), each slot may include 14 symbols. A first arrowed line indicates a subset of the system bandwidth RBs 402 (e.g., a subset of the resource grid 304 of FIG. 3). The symbols on the DL may be cyclic prefix (CP) OFDM (CP-OFDM) symbols in some examples.

A physical downlink control channel (PDCCH) 404 may carry a DCI within one or more control channel elements (CCEs). Each CCE may include nine resource element (RE) groups (REGs), where each REG may include four consecutive REs in an OFDM symbol.

A primary synchronization signal (PSS) 406 is shown in symbol 2 of the subframe. The PSS 406 may be used by a UE to determine subframe and symbol timing and a physical layer identity. A secondary synchronization signal (SSS) 408 is shown in symbol 4 of the subframe. The SSS 408 may be used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. A physical broadcast channel (PBCH) 410, which carries a master information block (MIB) as discussed herein, may be logically grouped with the PSS 406 and the SSS 408 to form an SS/PBCH block 412. The MIB may indicate the number of RBs in the system bandwidth, a system frame number (SFN), and other information. As indicated by a second arrowed line, the length of the SS/PBCH block 412 is 20 RBs 414 in this example.

A physical downlink shared channel (PDSCH) 416 carries user data, broadcast system information not transmitted through the PBCH such as system information blocks (SIBs), and paging messages. In addition, the PDSCH 416 may carry a DCI (e.g., control-related information) in some examples.

The MIB in the PBCH may include system information (SI), along with parameters for decoding a system information block (SIB). In some examples, this SIB is a SystemInformationType 1 SIB (referred to as SIB1) that includes additional SI. Examples of SI transmitted in the MIB may include, but are not limited to, a subcarrier spacing, system frame number, a configuration of a PDCCH control resource set (CORESET) (e.g., PDCCH CORESET0), and a search space for SIB1. Examples of SI transmitted in the SIB1 may include, but are not limited to, a random access search space, downlink configuration information, and uplink configuration information. The MIB and SIB1 together provide the minimum SI for initial access.

A brief discussion of an initial access procedure for a UE using the above information follows. As discussed above, a network access node may transmit synchronization signals (e.g., including PSS and SSS) in the network to enable UEs to synchronize with the network access node, as well as SI (e.g., including a MIB, RMSI, and OSI) to facilitate initial network access. The network access node may transmit the PSS, the SSS, and/or the MIB via SSBs over the PBCH and may broadcast the RMSI and/or the OSI over the PDSCH.

A UE attempting to access a RAN may perform an initial cell search by detecting a PSS from a network access node (e.g., the PSS of a cell of the network access node) of the RAM. The PSS may enable the UE to synchronize to period timing of the network access node and may indicate a physical layer identity value assigned to the cell. The UE may also receive an SSS from the network access node that enables the UE to synchronize on the radio frame level with the cell. The SSS may also provide a cell identity value, which the UE may combine with the physical layer identity value to identify the cell.

After receiving the PSS and SSS, the UE may receive the SI from the network access node. The system information may take the form of the MIB and SIBs discussed above. The system information includes essential or critical information for a UE to access the network such as downlink (DL) channel configuration information, uplink (UL) channel configuration information, access class information, and cell barring information, as well as other less critical information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN (e.g., the RAN 200 of FIG. 2). In some examples, SIB 2 includes random access configuration information (e.g., a RACH configuration) that indicates the resources that the UE is to use to communicate with the RAN during initial access. The random access configuration information may indicate, for example, the resources allocated by the RAN for a PRACH procedure. For example, the RACH configuration may indicate the resources allocated by the network for the UE to transmit a PRACH preamble and to a receive random access response. In some examples, the RACH configuration identifies monitoring occasions (MOs) that specify a set of symbols (e.g., in a PRACH slot) that are scheduled by a network access node for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

FIG. 4 is a diagram 400 illustrating an example of DL channels within a 5G NR subframe. In this example (e.g., for a slot configuration 0), each slot may include 14 symbols. A first arrowed line indicates a subset of the system bandwidth RBs 402 (e.g., a subset of the resource grid 304 of FIG. 3). The symbols on the DL may be cyclic prefix (CP) OFDM (CP-OFDM) symbols in some examples.

A physical downlink control channel (PDCCH) 404 may carry a DCI within one or more control channel elements (CCEs). Each CCE may include nine resource element (RE) groups (REGs), where each REG may include four consecutive REs in an OFDM symbol.

A primary synchronization signal (PSS) 406 is shown in symbol 2 of the subframe. The PSS 406 may be used by a UE to determine subframe and symbol timing and a physical layer identity. A secondary synchronization signal (SSS) 408 is shown in symbol 4 of the subframe. The SSS 408 may be used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. A physical broadcast channel (PBCH) 410, which carries a master information block (MIB) as discussed herein, may be logically grouped with the PSS 406 and the SSS 408 to form an SS/PBCH block 412. The MIB may indicate the number of RBs in the system bandwidth, a system frame number (SFN), and other information. As indicated by a second arrowed line, the length of the SS/PBCH block 412 is 20 RBs 414 in this example.

A physical downlink shared channel (PDSCH) 416 carries user data, broadcast system information not transmitted through the PBCH such as system information blocks (SIBs), and paging messages. In addition, the PDSCH 416 may carry a DCI (e.g., control-related information) in some examples.

Figure 5:
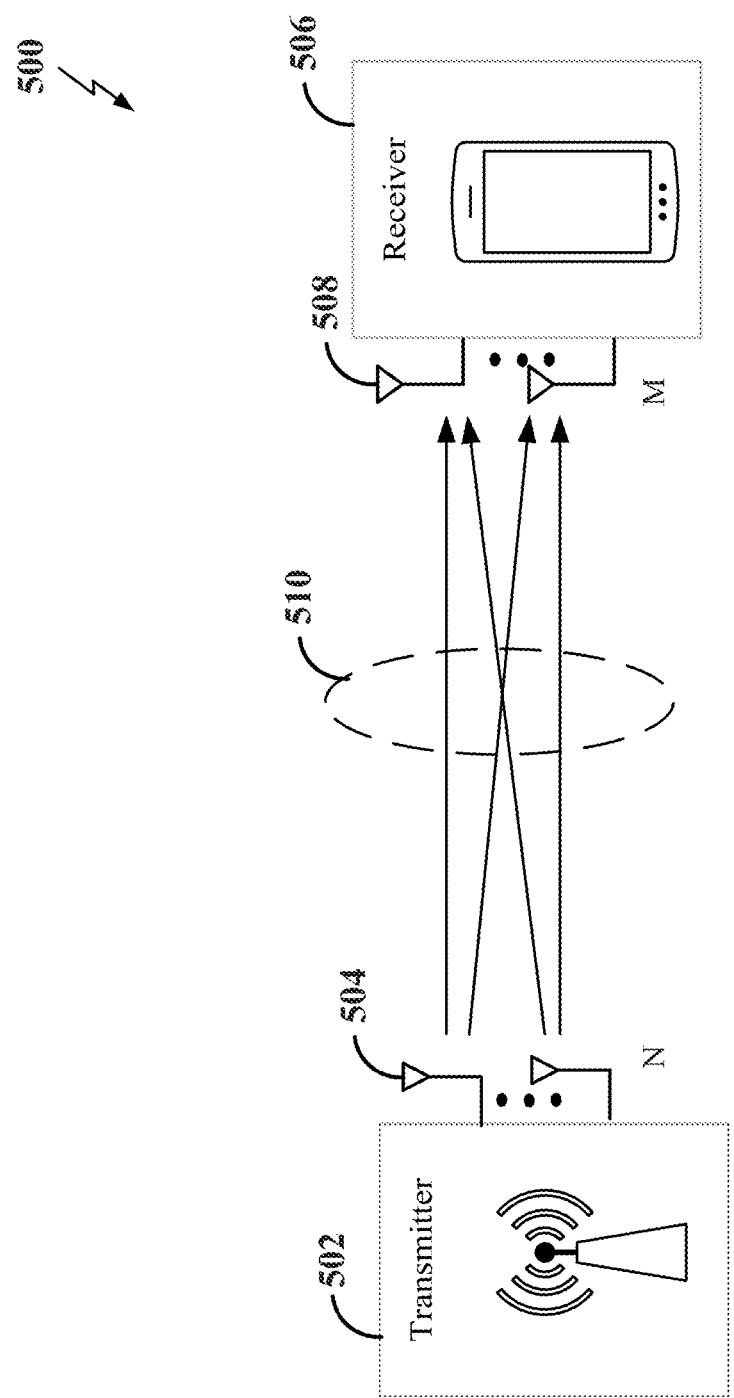
FIG. 5 is a block diagram illustrating an example of a wireless communication system supporting beamforming and/or multiple-input multiple-output (MIMO) communication according to some aspects of the disclosure.

FIG. 5 is a block diagram illustrating an example of a wireless communication system supporting beamforming and/or multiple-input multiple-output (MIMO) communication according to some aspects of the disclosure. In some aspects of the disclosure, the scheduling entity and/or scheduled entity may be configured for beamforming and/or MIMO technology. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a scheduling entity, a scheduled entity, or any other suitable wireless communication device.

The use of such multiple antenna technology enables the wireless communication system 500 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the network access node to identify the source of each spatially precoded data stream.

The number of data streams or layers corresponds to the rank of the transmission. In general, the rank of the MIMO system (e.g., the wireless communication system 500 supporting MIMO) is limited by the number of transmit or receive antennas 504 or 508, whichever is lower. In addition, the channel conditions at the UE, as well as other considerations, such as the available resources at the network access node, may also affect the transmission rank. For example, the rank (and therefore, the number of data streams) assigned to a particular UE on the downlink may be determined based on the rank indicator (RI) transmitted from the UE to the network access node. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The network access node may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the network access node may assign the rank for DL MIMO transmissions based on UL SINR measurements (e.g., based on a sounding reference signal (SRS) transmitted from the UE or other pilot signal). Based on the assigned rank, the network access node may then transmit a channel state information-reference signal (CSI-RS) with separate CSI-RS sequences for each layer to provide for multi-layer channel estimation. From the CSI-RS, the UE may measure the channel quality across layers and resource blocks and feed back channel quality indicator (CQI) and rank indicator (RI) values to the network access node for use in updating the rank and assigning REs for future downlink transmissions.

In one example, as shown in FIG. 5, a rank-2 spatial multiplexing transmission on a 2×2 MIMO antenna configuration will transmit one data stream from each of the transmit antennas 504. Each data stream reaches each to the receive antenna 508 along a different one of the signal paths 510. The receiver 506 may then reconstruct the data streams using the received signals from each of the receive antennas 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A network access node (e.g., gNB) may generally be capable of communicating with UEs using transmit beams (e.g., downlink transmit beams) of varying beam widths. For example, a network access node may be configured to utilize a wider beam when communicating with a UE that is in motion and a narrower beam when communicating with a UE that is stationary. The UE may further be configured to utilize one or more downlink receive beams to receive signals from the network access node.

In some examples, to select one or more serving beams (e.g., one or more downlink transmit beams and one or more downlink receive beams) for communication with a UE, the network access node may transmit a reference signal, such as a synchronization signal block (SSB), a tracking reference signal (TRS), or a channel state information reference signal (CSI-RS), on each of a plurality of beams (e.g., on each of a plurality of downlink transmit beams) in a beam-sweeping manner. The UE may measure the reference signal received power (RSRP) on each of the beams (e.g., measure RSRP on each of the plurality of downlink transmit beams) and transmit a beam measurement report to the network access node indicating the Layer-1 RSRP (L-1 RSRP) of each of the measured beams. The network access node may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the network access node may derive the particular beam(s) (e.g., the particular downlink beam(s)) to communicate with the UE based on uplink measurements of one or more uplink reference signals, such as sounding reference signals (SRSs).

Similarly, uplink beams (e.g., uplink transmit beam(s) at the UE and uplink receive beam(s) at the network access node) may be selected by measuring the RSRP of received uplink reference signals (e.g., SRSs) or downlink reference signals (e.g., SSBs or CSI-RSs) during an uplink or downlink beam sweep. For example, the network access node may determine the uplink beams either by uplink beam management via an SRS beam sweep with measurement at the network access node or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 6:
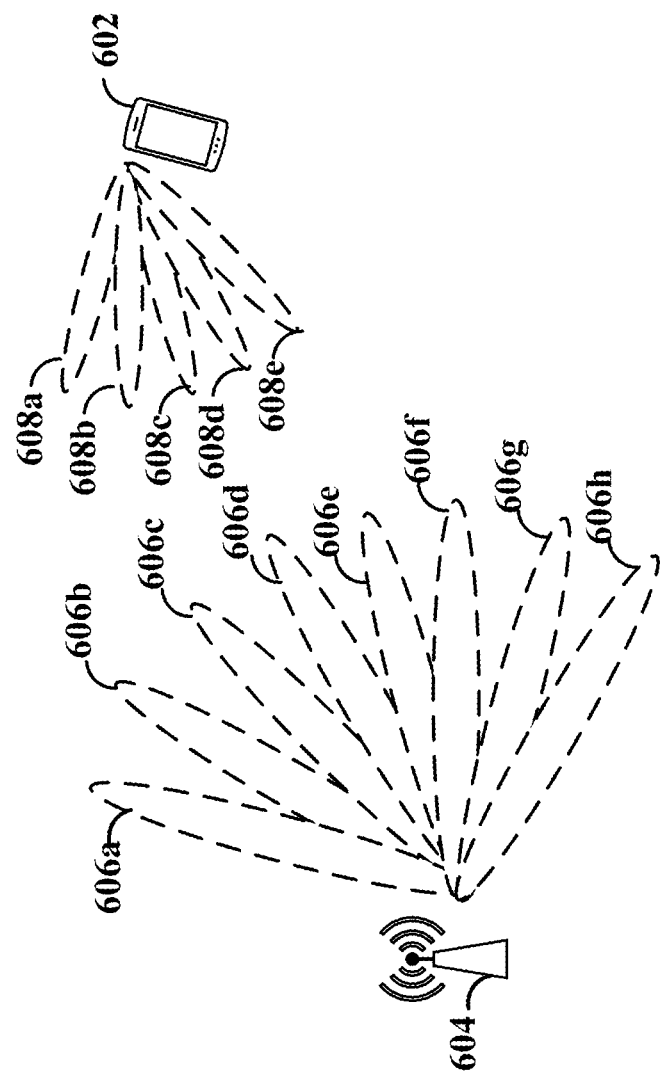
FIG. 6 is a diagram illustrating an example of communication between a radio access network (RAN) node and a wireless communication device using beamformed signals according to some aspects of the disclosure.

FIG. 6 is a diagram illustrating an example of communication between a radio access network (RAN) node (e.g., network access node 604) and a wireless communication device (e.g., UE 602) using beamformed signals according to some aspects of the disclosure. The network access node 604 may correspond to any of the network access nodes (e.g., scheduling entities, gNBs, base stations) shown in any of FIGS. 1, 2, 5-12, 14-17, 25, 29, 31, 37, and/or 39-44. The UE 602 may correspond to any of the UEs (e.g., scheduled entities, wireless communication devices) shown in any of FIGS. 1, 2, 5-12, 14-17, 29, 31, and/or 44.

In the example shown in FIG. 6, the network access node 604 is configured to generate a plurality of beams 606a-606h, each associated with a different beam direction. In addition, the UE 602 is configured to generate a plurality of beams 608a-608e, each associated with a different beam direction. The network access node 604 and UE 602 may select one or more beams 606a-606h on the network access node 604 and one or more beams 608a-608e on the UE 602 for communication of uplink and downlink signals therebetween using a downlink beam management scheme and/or an uplink beam management scheme.

In an example of a downlink beam management scheme for selection of downlink beams, the network access node 604 may be configured to sweep or transmit on each of a plurality of downlink transmit beams 606a-606h during one or more synchronization slots. For example, the network access node 604 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 606a-606h transmitted during a same symbol may not be adjacent to one another. In some examples, the network access node 604 may transmit more or less beams distributed in all directions (e.g., 360 degrees).

In addition, the UE 602 is configured to receive the downlink beam reference signals on a plurality of downlink receive beams 608a-608e. In some examples, the UE 602 searches for and identifies each of the downlink transmit beams 606a-606h based on the beam reference signals. The UE 602 then performs beam measurements (e.g., RSRP, SINR, reference signal received quality (RSRQ), etc.) on the beam reference signals on each of the downlink receive beams 608a-608e to determine the respective beam quality of each of the downlink transmit beams 606a-606h as measured on each of the downlink receive beams 608a-608e.

The UE 602 can generate and transmit a beam measurement report, including the respective beam index and beam measurement of each downlink transmit beam 606a-606h on each downlink receive beam 608a-608e to the network access node 604. The network access node 604 may then select one or more downlink transmit beams on which to transmit unicast downlink control information and/or user data traffic to the UE 602. In some examples, the selected downlink transmit beam(s) have the highest gain from the beam measurement report. In some examples, the UE 602 can further identify the downlink transmit beams selected by the network access node from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The network access node 604 or the UE 602 may further select a corresponding downlink receive beam on the UE 602 for each selected serving downlink transmit beam to form a respective downlink beam pair link (BPL) for each selected serving downlink transmit beam. For example, the UE 602 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 606d) on the network access node 604 and a single downlink receive beam (e.g., beam 608c) on the UE may form a single downlink BPL used for communication between the network access node 604 and the UE 602. In another example, multiple downlink transmit beams (e.g., beams 606c, 606d, and 606e) on the network access node 604 and a single downlink receive beam (e.g., beam 608c) on the UE 602 may form respective downlink BPLs used for communication between the network access node 604 and the UE 602. In another example, multiple downlink transmit beams (e.g., beams 606c, 606d, and 606e) on the network access node 604 and multiple downlink receive beams (e.g., beams 608c and 608d) on the UE 602 may form multiple downlink BPLs used for communication between the network access node 604 and the UE 602. In this example, a first downlink BPL may include downlink transmit beam 606c and downlink receive beam 608c, a second downlink BPL may include downlink transmit beam 608d and downlink receive beam 608c, and a third downlink BPL may include downlink transmit beam 608e and downlink receive beam 608d.

When the channel is reciprocal, the above-described downlink beam management scheme may also be used to select one or more uplink BPLs for uplink communication from the UE 602 to the network access node 604. For example, the downlink BPL formed of beams 606d and 608e may also serve as an uplink BPL. Here, beam 608c is utilized as an uplink transmit beam, while beam 606d is utilized as an uplink receive beam.

In an example of an uplink beam management scheme, the UE 602 may be configured to sweep or transmit on each of a plurality of uplink transmit beams 608a-608e. For example, the UE 602 may transmit an SRS on each beam in the different beam directions. In addition, the network access node 604 may be configured to receive the uplink beam reference signals on a plurality of uplink receive beams 606a-606h. In some examples, the network access node 604 searches for and identifies each of the uplink transmit beams 608a-608e based on the beam reference signals. The network access node 604 then performs beam measurements (e.g., RSRP, SINR, RSRQ, etc.) on the beam reference signals on each of the uplink receive beams 606a-606h to determine the respective beam quality of each of the uplink transmit beams 608a-608e as measured on each of the uplink receive beams 606a-606h.

The network access node 604 may then select one or more uplink transmit beams on which the UE 602 will transmit unicast downlink control information and/or user data traffic to the network access node 604. In some examples, the selected uplink transmit beam(s) have the highest gain. The network access node 604 may further select a corresponding uplink receive beam on the network access node 604 for each selected serving uplink transmit beam to form a respective uplink beam pair link (BPL) for each selected serving uplink transmit beam. For example, the network access node 604 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The network access node 604 may then notify the UE 602 of the selected uplink transmit beams. For example, the network access node 604 may provide the SRS resource identifiers (IDs) identifying the SRSs transmitted on the selected uplink transmit beams. In some examples, the network access node 604 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 602. When the channel is reciprocal, the above-described uplink beam management scheme may also be used to select one or more downlink BPLs for downlink communication from the network access node 604 to the UE 602. For example, the uplink BPLs may also be utilized as downlink BPLs.

The channels or carriers described above with reference to FIGS. 1-6 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 7:
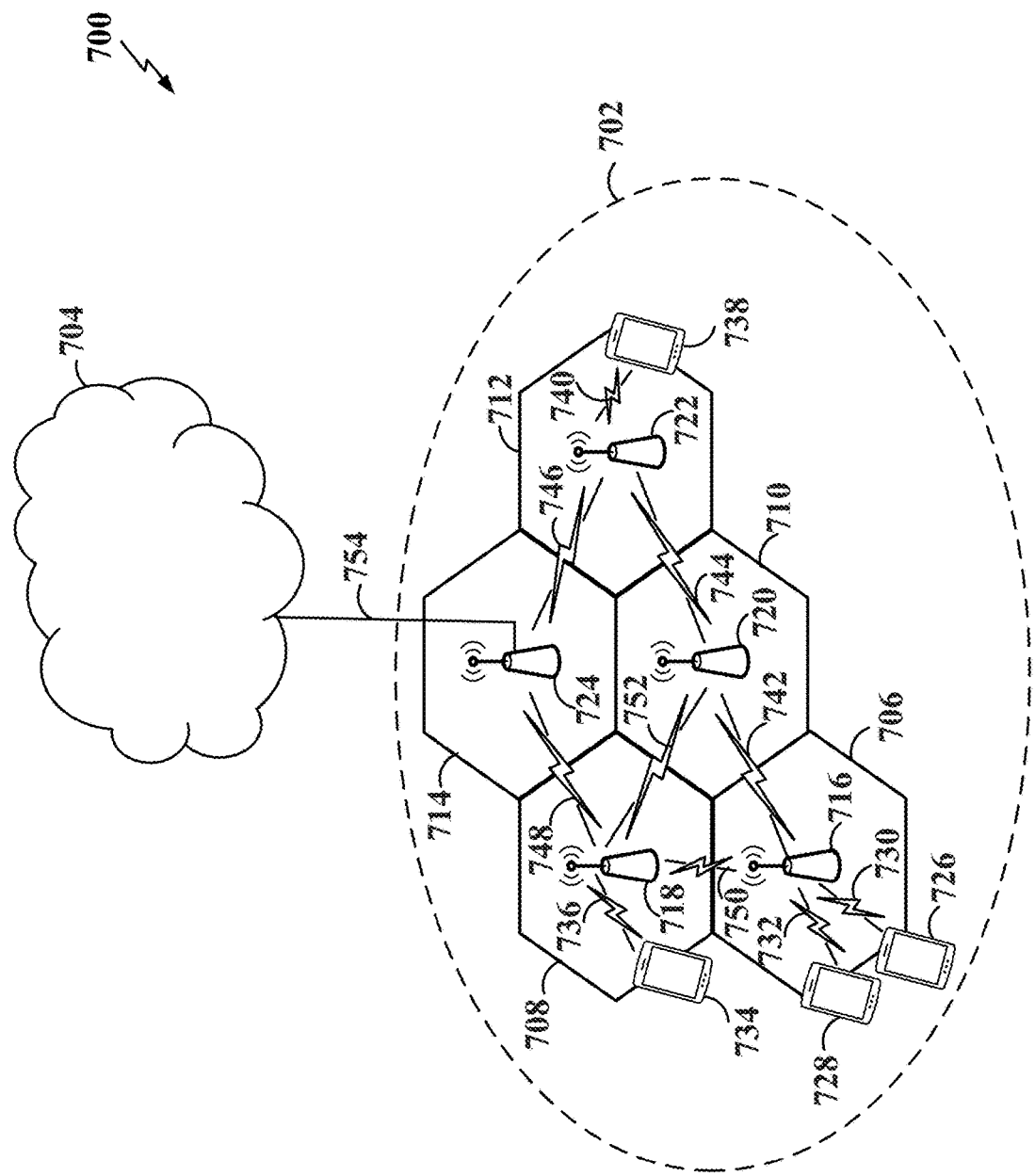
FIG. 7 is a schematic diagram providing a high-level illustration of one example of a network configuration including an integrated access backhaul (IAB) network according to some aspects of the disclosure.

In some wireless communication networks, the functionality of the network access nodes and/or other components of the network may be distributed across multiple entities. FIG. 7 is a schematic diagram providing a high-level illustration of one example of an integrated access backhaul (IAB) network 702 according to some aspects of the disclosure. In this illustration, a wireless communication network 700, including the IAB network 702, is coupled to a remote network 704, such as a main backhaul network or mobile core network. In such an IAB network 702, the wireless spectrum may be used for both access links and backhaul links. In some examples, the wireless spectrum may utilize millimeter-wave (mmWave) or sub-6 GHz carrier frequencies.

The IAB network 702 may be similar to the RAN 200 shown in FIG. 2, in that the IAB network 702 may be divided into a number of cells 706, 708, 710, 712, and 714, each of which may be served by a respective IAB node 716, 718, 720, 722, and 724. Each of the IAB nodes 716-724 may be an access point, a network access node, a base station (BS), an eNB, a gNB, or other node that utilizes wireless spectrum (e.g., the radio frequency (RF) spectrum) to support access for one or more UEs located within the cells 706-714 served by the IAB nodes 716-724.

In the example shown in FIG. 7, IAB node 716 communicates with UEs 726 and 728 via wireless access links 730 and 732, IAB node 718 communicates with UE 734 via wireless access link 736, and IAB node 722 communicates with UE 738 via wireless access link 740. The IAB nodes 716-724 are further interconnected via one or more wireless backhaul links 742, 744, 746, 748, 750, and 752. Each of the wireless backhaul links 742-752 may utilize the same wireless spectrum (e.g., the radio frequency (RF) spectrum) as the access links 730, 732, 736, 740 to backhaul access traffic to/from the remote network 704. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 702.

In the example shown in FIG. 7, IAB node 716 communicates with IAB node 720 via wireless backhaul link 742, IAB node 720 communicates with IAB node 722 via wireless backhaul link 744, IAB node 722 communicates with IAB node 724 via wireless backhaul link 746, IAB node 724 communicates with IAB node 718 via wireless backhaul link 748, IAB node 718 communicates with IAB node 716 via wireless backhaul link 750, and IAB node 718 communicates with IAB node 720 via wireless backhaul link 752. As shown in FIG. 7, each of the IAB nodes 716-724 may be connected via respective wireless backhaul links 742-752 to two or more other IAB nodes for robustness.

Some or all of the IAB nodes 716-724 may also be connected via wired backhaul links (e.g., fiber, coaxial cable, Ethernet, copper wires, etc.) and/or microwave backhaul links Thus, the IAB network 702 may support both wired/microwave and wireless backhaul traffic. At least one of the IAB nodes may be a border IAB node, also referred to herein as an IAB donor node, that also provides a communication link 754 to the remote network 704. IAB node 724 is an example of an IAB donor node. For example, the IAB node 724 may include a wired (e.g., fiber, coaxial cable, Ethernet, copper wires), microwave, or other suitable communication link 754 to the remote network 704.

To facilitate wireless communication between the IAB nodes 716-724 and between the IAB nodes 716-724 and the UEs served by the IAB nodes 716-724, each of the IAB nodes 716-724 may be configured to operate as both a scheduling entity and a scheduled entity. Thus, an IAB node (e.g., IAB node 716) may utilize the same wireless spectrum to transmit access traffic to/from UEs and to then backhaul that access traffic to/from the remote network 704. For example, to backhaul access traffic to/from IAB node 718, IAB node 718 may communicate with IAB node 720 to transmit backhaul access traffic via wireless backhaul link 742, IAB node 720 may communicate with IAB node 722 to transmit the backhaul access traffic via wireless backhaul link 744, and IAB node 722 may communicate with IAB node 724 to transmit the backhaul access traffic via wireless backhaul link 746. In this example, IAB nodes 720 and 722 may each operate as both a scheduling entity and a scheduled entity to backhaul access traffic to/from IAB node 716.

As such, communication between a pair of IAB nodes may be individually scheduled by one of the IAB nodes within the pair.

In other examples, an IAB node may schedule wireless backhaul communications between other pairs of IAB nodes. For example, IAB node 724 may operate as the scheduling entity for the IAB network 702, while IAB nodes 716, 720, and 722 each operate as a scheduled entity to backhaul access traffic to/from IAB node 716. In this example, IAB node 724 may schedule wireless backhaul communications between each of the pairs of IAB nodes (e.g., between IAB node 716 and IAB node 720, between IAB node 720 and IAB node 722, and between IAB node 722 and IAB node 724). As another example, IAB node 722 may operate as a scheduling entity to schedule wireless backhaul communications between IAB nodes 716 and 720 and also between IAB node 720 and IAB node 722. IAB node 722 may then operate as a scheduled entity to allow IAB node 724 to schedule wireless backhaul communications therebetween.

Figure 8:
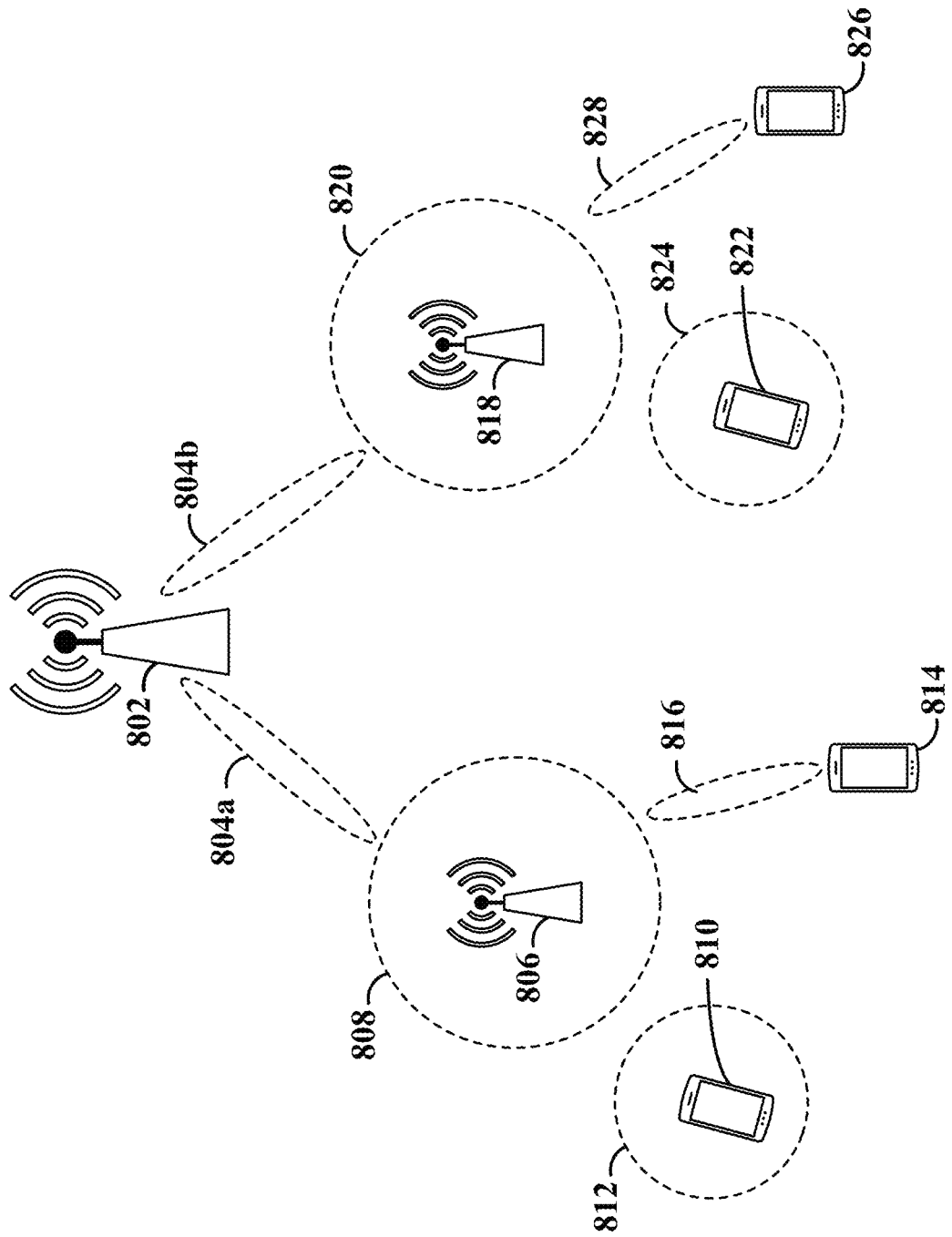
FIG. 8 is a diagram illustrating an example of a wireless communication network with communication between a network access node and four UEs using beamformed signals according to some aspects of the disclosure.

FIG. 8 is a diagram illustrating an example of a wireless communication network 800 with communication between a network access node 802 and four UEs (first UE 810, second UE 814, third UE 822, fourth UE 826) using beamformed signals according to some aspects of the disclosure. The network access node 802 may correspond to any of the network access nodes (e.g., scheduling entities, gNBs, base stations) shown in any of FIGS. 1, 2, 5-12, 14-17, 25, 29, 31, 37, and/or 39-44. The four UEs (first UE 810, second UE 814, third UE 822, fourth UE 826) may correspond to any of the UEs (e.g., scheduled entities, wireless communication devices) shown in any of FIGS. 1, 2, 5-12, 14-17, 29, 31, and/or 44. A first RF repeater device 806 and a second RF repeater device 818 may correspond to any of the RF repeater devices of FIGS. 7-21, 29, 31, 32, 37, 39, and/or 40.

In the example shown in FIG. 8, the network access node 802 may configured to generate a plurality of beams 804*a*, 804*b*, each associated with a different beam direction. Only two beams in two directions are shown to avoid cluttering the drawing. The network access node 802 may transmit and/or receive on either or both the plurality of beams 804*a*, 804*b*. Respective beams of the plurality of beams 804*a*, 804*b* may be steered to various angles (e.g., in azimuth). The first UE 810 and/or the second UE 814 may each be at some distance from the network access node 802. Additionally, or alternatively, a structure or obstacle (not shown) may exist between a direct line of sight between the network access node 802 and the first UE 810 and/or between the network access node 802 and the second UE 814.

The first RF repeater device 806 may be located between the network access node 802 and the first UE 810 and/or between the network access node 802 and the second UE 814. The first RF repeater device 806 may have an omnidirectional beam 808 or may be custom configured to point a wide beam (not shown) in one direction without an ability to steer the beam.

The first UE 810 may have an omnidirectional beam 812. The second UE 814 may have an antenna array (not shown) that allows the second UE 814 to perform beamforming and to steer beams in various directions (e.g., in azimuth). The beam forming may allow the second UE 814 to form narrow directional beams 816 (one of a plurality shown to avoid cluttering the drawing) in a plurality of directions and/or to form broad directional beams (not shown) in a plurality of directions and/or to form an omnidirectional beam (not shown).

The first RF repeater device 806 may amplify and forward (e.g., convey) RF signals exchanged between the first UE 810, the second UE 814, and the network access node 802. The amplification and forwarding may be bidirectional. A bidirectional link between the network access node 802 and the first RF repeater device 806 may be referred to as a fronthaul-link. The bidirectional links between the first RF repeater device 806 and the first UE 810, and between the first RF repeater device 806 and the second UE 814 may be each be referred to as an access-link.

The second RF repeater device 818 may be located between the network access node 802 and the third UE 822 and/or between the network access node 802 and the fourth UE 826. The second RF repeater device 818 may have an omnidirectional beam or may be custom configured to point a wide beam in one direction (not shown) without an ability to steer the beam.

The third UE 822 may have an omnidirectional beam 824. The fourth UE 826 may have an antenna array (not shown) that allows the fourth UE 826 to perform beamforming and to steer beams in various directions (e.g., in azimuth). The beam forming may allow the fourth UE 826 to form narrow directional beams 828 (one of a plurality shown to avoid cluttering the drawing) in a plurality of directions and/or to form broad directional beams (not shown) in a plurality of directions and/or to form an omnidirectional beam (not shown).

The second RF repeater device 818 may amplify and forward (e.g., convey) RF signals exchanged between the third UE 822, the fourth UE 826, and the network access node 802. The amplification and forwarding may be bidirectional. A bidirectional link between the network access node 802 and the second RF repeater device 818 may be referred to as a fronthaul-link. The bidirectional links between the second RF repeater device 818 and the third UE 822, and between the second RF repeater device 818 and the fourth UE 826 may be each be referred to as an access-link.

As described, the first RF repeater device 806 and the second RF repeater device 818 may each amplify and forward RF signals (e.g., analog signals in the physical (PHY) layer). The first RF repeater device 806 and the second RF repeater device 818 may be referred to as RF repeater devices, analog repeater devices, and/or Layer-1 repeater devices herein. They may operate in an analog domain, receiving RF signals via their respective omnidirectional beams 808, 820, pass the RF signals through their RF amplifier chains (not shown), and transmit (e.g., forward) the amplified RF signal via their respective omnidirectional beams 808, 820. One benefit of an RF repeater device (such as first RF repeater device 806 and second RF repeater device 818) may be low cost. RF repeater devices possess analog RF chains and components and typically do not possess a digital processing chain. They may not possess an ability to steer antenna beams. These RF repeater devices may be useful, for example, in 5G millimeter wave (mmWave) deployment for coverage/capacity enhancement. mmWave communication systems are, however, vulnerable to blockages due to higher penetration loss and reduced diffraction. Densification for coverage may be useful in mmWave systems, which may have large numbers of nodes. Therefore, RF repeater devices, such as the first RF repeater device 806 and the second RF repeater device 818 may provide cost-effective solutions for densification in mmWave systems.

Figure 9:
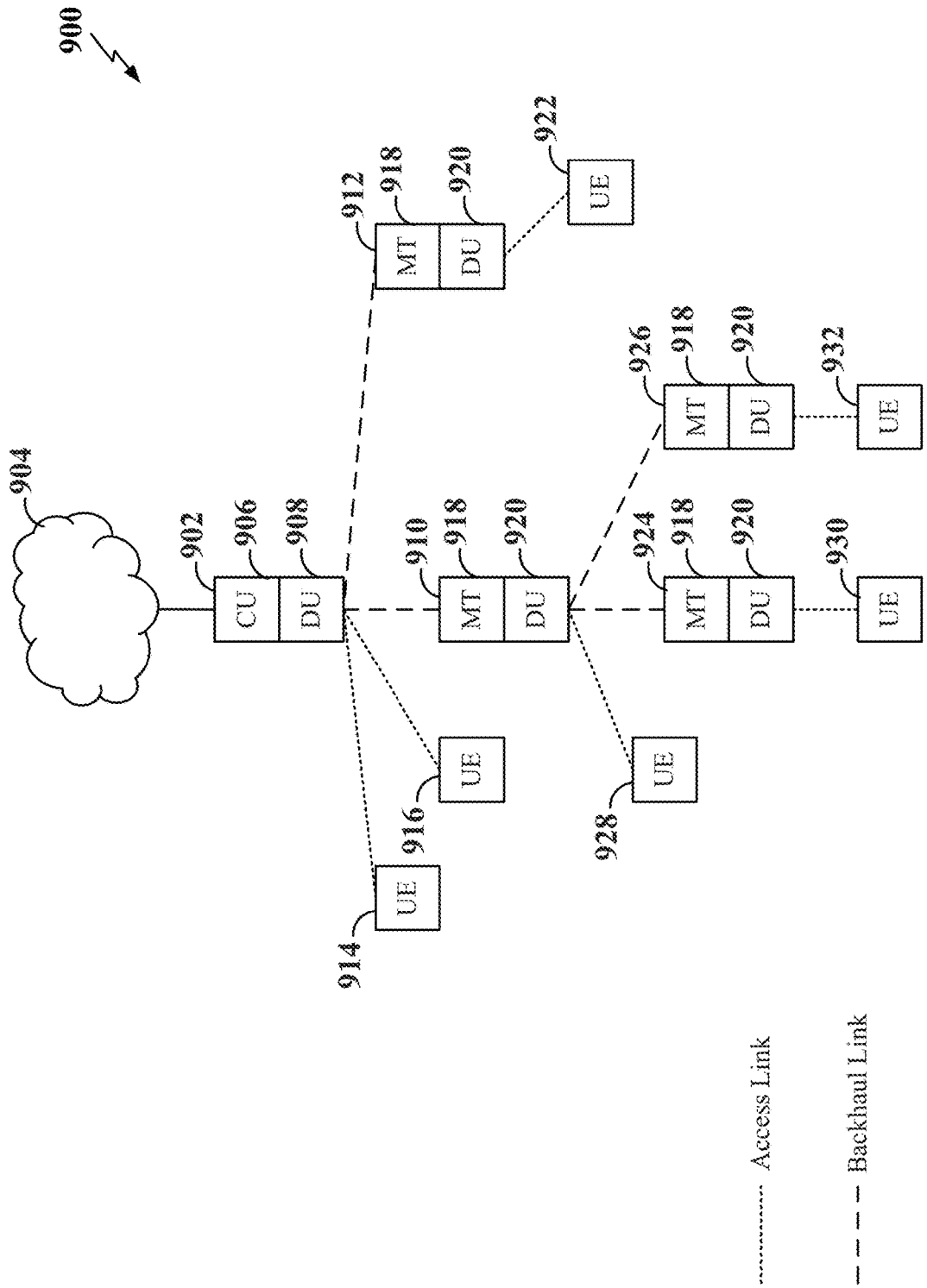
FIG. 9 is a schematic diagram illustrating an example of IAB node functionality within an IAB network according to some aspects of the disclosure.

FIG. 9 is a schematic diagram illustrating an example of IAB node functionality within an IAB network 900 according to some aspects of the disclosure. In the example shown in FIG. 9, an IAB node is shown coupled to a core network 904 via a wireline connection. This IAB node may be referred to herein as an IAB donor node 902, which may be, for example, an enhanced gNB including functionality for controlling the IAB network 900. In some examples, the IAB donor node 902 may include a central unit (CU) 906 and a distributed unit (DU) 908. The CU 906 may be configured to operate as a centralized network node (or central entity) within the IAB network 900. For example, the CU 906 may include radio resource control (RRC) layer functionality and packet data convergence protocol (PDCP) layer functionality to control/configure the other nodes (e.g., IAB nodes and UEs) within the IAB network 900. In some aspects, RRC signaling may be used for various functions including, as one example, setting up and releasing user data bears. In some examples, RRC signaling messages may be transported over signaling bearers (e.g., SRB 1 and SRB 2).

The DU 908 may be configured to operate as a scheduling entity to schedule scheduled entities (e.g., other IAB nodes and UEs) of the IAB donor node 902. For example, the DU 908 of the IAB donor node 902 may operate as a scheduling entity to schedule IAB nodes 910 and 912 and UEs 914 and 916. Thus, the DU 908 of the IAB donor node 902 may schedule communication with IAB nodes 910 and 912 via respective backhaul links and schedule communication with UEs 914 and 916 via respective access links. In some examples, the DU 908 may include the radio link control (RLC), medium access control (MAC), and physical (PHY) layer functionality to enable operation as a scheduling entity.

Each of the IAB nodes 910 and 912 may be configured as a Layer-2 (L2) relay node including a respective DU 920 and a mobile termination (MT) unit 918 to enable each L2 relay IAB node 910 and 912 to operate as a scheduling entity and a scheduled entity. For example, the MT unit 918 within each of the L2 relay IAB nodes 910 and 912 is configured to operate as a scheduled entity that may be scheduled by the IAB donor node 902. Each MT unit 918 within the L2 relay IAB nodes 910 and 912 may facilitate communication with the IAB donor node 902 via respective backhaul links. In addition, the DU 920 within each of the L2 relay IAB nodes 910 and 912 may operate similar to the DU 908 within the IAB donor node 902 to function as a scheduling entity to schedule one or more respective scheduled entities (e.g., other IAB nodes and/or UEs) of the L2 relay IAB nodes 910 and 912.

For example, the DU 920 of L2 relay IAB node 912 may function as a scheduling entity to schedule communication with a UE 922 via an access link, while the DU 920 of L2 relay IAB node 910 may function as a scheduling entity to schedule communication with the MT units 918 of L2 relay IAB nodes 926 and 926 via respective backhaul links and a UE 928 via an access link Each of the L2 relay IAB nodes 924 and 926 may further include a respective DU 920 that may function as a scheduling entity to communicate with respective UEs 930 and 932. Thus, in the network topology illustrated in FIG. 9, since IAB donor node 902 may be configured to control each of the other nodes in the IAB network, the IAB donor node 902 is a parent IAB node of child IAB nodes 910, 912, 924 and 926. In addition, IAB node 910 may further be a parent IAB node of child IAB nodes 924 and 926. For example, the CU 906 and DU 908 within IAB donor node 902 may function as the parent IAB node of child IAB nodes 910, 912, 924, and 926 and the DU 920 within IAB node 910 may function as the parent IAB node of child IAB nodes 924 and 926. The MT unit 918 within IAB nodes 910, 912, 924, and 926 may further function as child IAB nodes.

In a mobile IAB network, one or more of the L2 relay IAB nodes 910, 912, 924, and/or 926 may be moving within the IAB network 900. For example, an L2 relay IAB node (e.g., IAB node 924) may be a mobile IAB node installed on a bus, train, taxi, platooned vehicle, or other moveable object.

In some examples, an IAB node may operate in Evolved-Universal Terrestrial Radio Access Network-New Radio dual connectivity (EN-DC) mode to simultaneously connect to an LTE network access node and an NR network access node to receive data packets from both the LTE network access node and the NR network access node.

Figure 10:
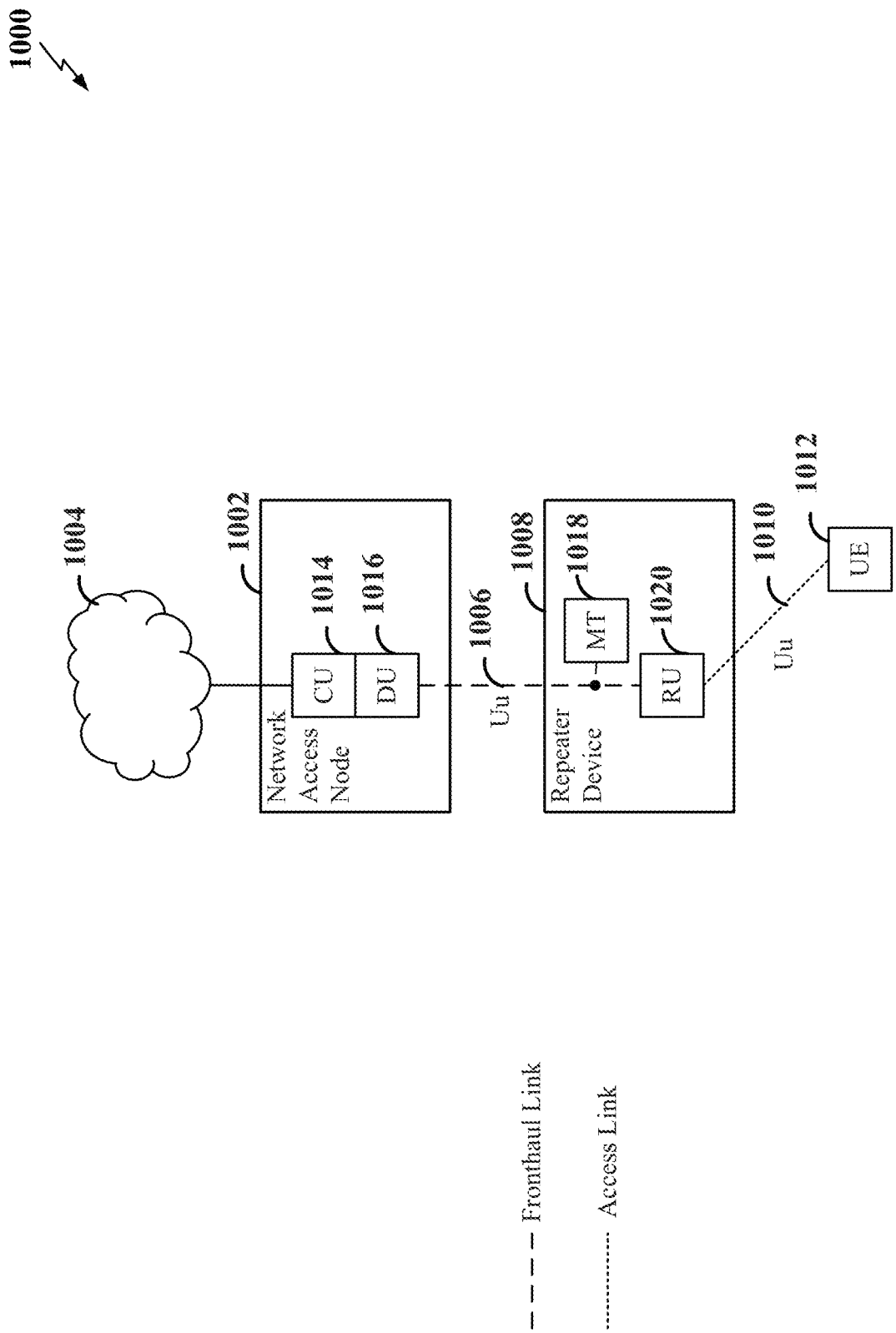
FIG. 10 is a diagram providing a high-level illustration of one example of a network configuration including an integrated access backhaul (IAB) network according to some aspects of the disclosure.

As mentioned above, in some wireless communication networks, the functionality of the network access nodes and/or other components of a network may be distributed across multiple entities. FIG. 10 is a diagram providing a high-level illustration of one example of a network configuration including an integrated access backhaul (IAB) network according to some aspects of the disclosure. In this illustration, a network entity such as a network access node 1002 (e.g., a BS, an eNB, a gNB) may be coupled to a remote network 1004, such as a main backhaul network or mobile core network. In the wireless communication network 1000, wireless spectrum may be used for a fronthaul link 1006 between the network access node 1002 and a repeater device 1008 and for an access link 1010 between the repeater device 1008 and a UE 1012. As described in the examples herein, a repeater device, such as repeater device 1008, may also be referred to as a relay, a relay device, and the like. The fronthaul link 1006 and the access link 1010 may each be conducted over a Uu radio interface or some other suitable wireless communication interface. In some examples, the wireless spectrum may utilize millimeter-wave (mmWave) frequencies and/or sub-6 GHz carrier frequencies.

The wireless communication network 1000 may include other network access nodes, UEs, and repeater devices (not shown). The network access node 1002 and other network access nodes may correspond to any of the network access nodes (e.g., scheduling entities, gNBs, base stations) shown in any of FIGS. 1, 2, 5-12, 14-17, 25, 29, 31, 37, and/or 39-44. The repeater device 1008 and other repeater devices may be similar to any repeater device described herein, such as, for example, any of the repeater devices of FIGS. 7-21, 29, 31, 32, 37, 39, and/or 40. The UE 1012 and other UEs may be similar to, for example, any of the any of the UEs (e.g., scheduled entities, wireless communication devices) shown in any of FIGS. 1, 2, 5-12, 14-17, 29, 31, and/or 44.

In the example of FIG. 10, the network access node 1002 (e.g., a network access node) may be referred to as a donor node because the network access node 1002 provides a communication link to the remote network 1004. A donor node may include, for example, a wired (e.g., fiber, coaxial cable, Ethernet, copper wires), microwave, or another suitable link to the remote network 1004. The donor node may broadcast (e.g., send, transmit, broadcast, unicast, multicast) different sets of repeater-device-specific control information (e.g., configurations, configuration settings, configuration information) (hereinafter referred to as "repeater device control information") toward respective different angular directions. Respective repeater devices arranged at the respective different angular directions relative to the donor node may receive respective sets of repeater device control information broadcast toward the respective different angular directions occupied by the respective repeater devices. According to some aspects, the donor node may broadcast different respective sets of repeater device control information (e.g., configurations, configuration settings, configuration information) in two or more different respective directions relative to the network access node.

The network access node 1002 may be an enhanced gNB including functionality for controlling the wireless communication network 1000. In some examples (e.g., as shown in FIG. 10), the network access node 1002 may include a central unit (CU) 1014 and a distributed unit (DU) 1016. The CU 1014 may be configured to operate as a centralized network node (or central entity) within the wireless communication network 1000. For example, the CU 1014 may include radio resource control (RRC) layer functionality and packet data convergence protocol (PDCP) layer functionality to control/configure the other nodes (e.g., repeater devices and UEs) within the wireless communication network 1000. In some aspects, RRC signaling may be used for various functions including, as one example, setting up and releasing user data bears. In some examples, RRC signaling messages may be transported over signaling bearers (e.g., SRB 1 and SRB 2).

The DU 1016 may be configured to operate as a scheduling entity to schedule scheduled entities (e.g., repeater devices and/or UEs) of the network access node 1002. For example, the DU 1016 may operate as a scheduling entity to schedule the repeater device 1008 and the UE 1012. In some examples, the DU 1016 may include radio link control (RLC), medium access control (MAC), and physical (PHY) layer functionality to enable operation as a scheduling entity.

An F1 interface (not shown) provides a mechanism to interconnect the CU 1014 (e.g., PDCP layer and higher layers) and the DU 1016 (e.g., RLC layer and lower layers). In some aspects, the F1 interface may provide control plane and user plane functions (e.g., interface management, system information management, UE context management, RRC message transfer, etc.). F1AP is an application protocol for the F1 interface that defines signaling procedures for the F1 interface in some examples. The F1 interface supports F1-C on the control plane and F1-U on the user plane.

To facilitate wireless communication between the network access node 1002 and UEs (e.g., the UE 1012) served by the network access node 1002, the repeater device 1008 may be configured to operate as a scheduled entity. The repeater device 1008 may include a mobile termination (MT) unit 1018 to enable scheduled entity functionality. For example, the MT unit 1018 may include UE functionality to connect to the network access node 1002 and to be scheduled by the network access node 1002.

The repeater device 1008 also may include a repeating unit 1020 (RU) that relays signals between the network access node 1002 and the UE 1012. A repeating unit, such as repeating unit 1020, may also be referred to as a relay unit, a remote unit, and the like. The functionality of the repeating unit 1020 and other repeater device functionality will be described in more detail below in conjunction with FIGS. 2-21, 29, 31, 32, 37, 39, and/or 40.

Figure 11:
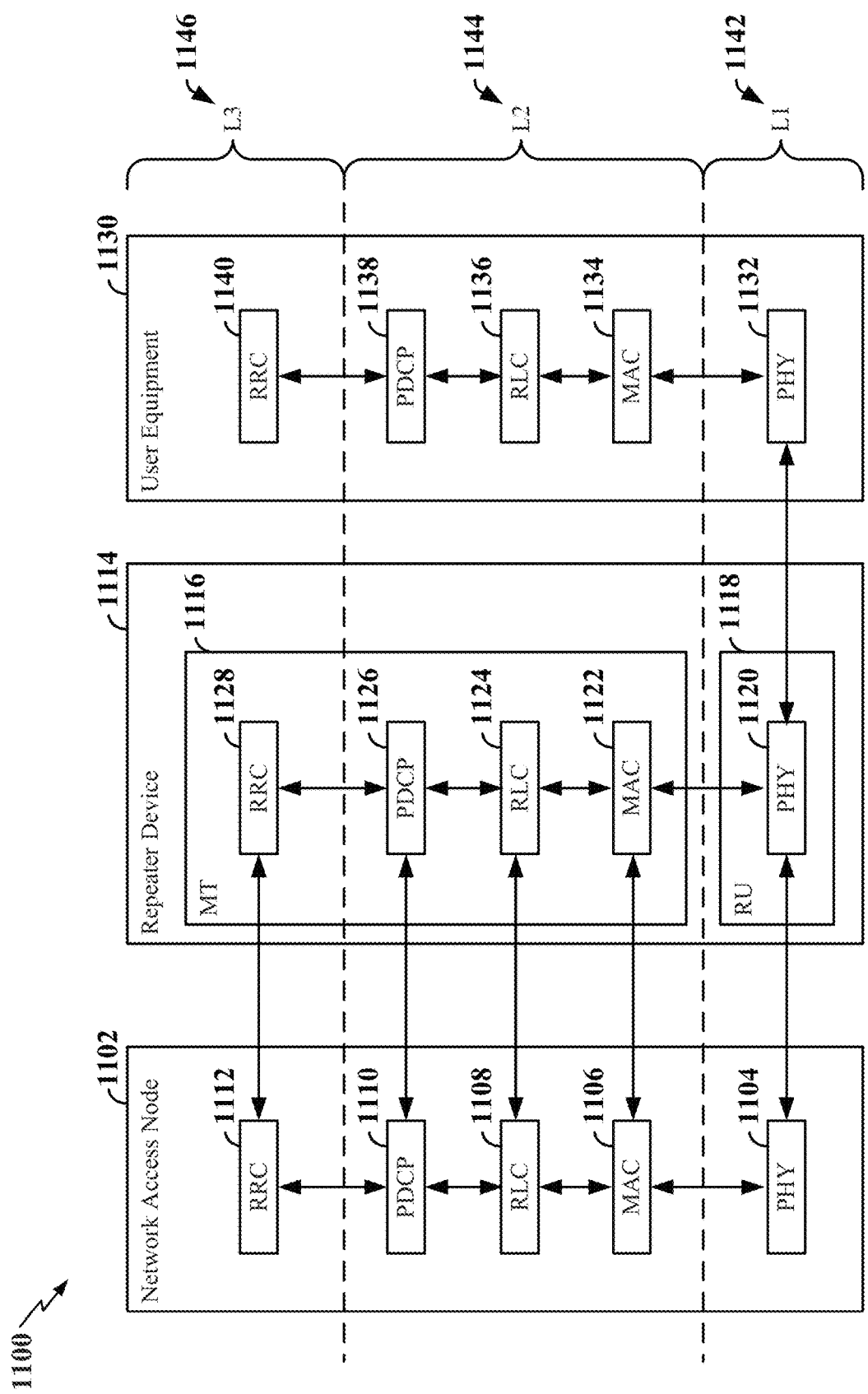
FIG. 11 is a diagram illustrating an example of a radio protocol architecture in a control plane according to some aspects of the disclosure.

FIG. 11 is a diagram illustrating an example of a radio protocol architecture 1100 in a control plane according to some aspects of the disclosure. The radio protocol architecture 1100 may be that of a 5G wireless system. The radio protocol stacks may be implemented in devices operating in a 5G wireless network. FIG. 11 depicts a control plane protocol stack of a network access node 1102, a repeater device 1114, and a UE 1130. The network access node 1102 may correspond to any of the network access nodes (e.g., scheduling entities, gNBs, base stations) shown in any of FIGS. 1, 2, 5-12, 14-17, 25, 29, 31, 37, and/or 39-44. The UE 1130 may correspond to any of the UEs (e.g., scheduled entities, wireless communication devices) shown in any of FIGS. 1, 2, 5-12, 14-17, 29, 31, and/or 44. The repeater device 1114 may correspond to any of the RF repeater devices of FIGS. 7-21, 29, 31, 32, 37, 39, and/or 40. As illustrated in FIG. 11, the radio protocol architecture 1100 includes three layers: Layer-1 (L1), Layer-2 (L2), and Layer-3 (L3). L1 1142 is the lowest layer, L2 1144 is above L1 1142, and L3 1146 is above L2 1144.

With respect to the repeater device 1114, an implementation of the protocol stack may be divided between a relay unit (RU) 1118 in L1 1142 and a mobile termination (MT) 1116 in L2 1144 and L3 1146. In L1 1142, the PHY layer 1120 of the RU 1118 may operate as a relay, relaying modulated RF analog signals (e.g., digital content on analog carriers) in the uplink and downlink directions between the physical (PHY) layer 1104 of the network access node 1102 and the PHY layer 1132 of the UE 1130.

There are at least two types of relay procedures that may be used by the repeater device 1114 to relay traffic (e.g., user data signals and control signals) through the repeater device 1114 between the network access node 1102 and the UE 1130. A first relay procedure may be referred to as a Layer-1 relay procedure, which may be implemented by a Layer-1 relay. A second relay procedure may be referred to as a Layer-2 relay procedure. The referenced layers are indications of the layers of protocol stacks that are used to organize the flow of data within and between devices. An example of a protocol stack may be a 5G protocol stack, which has as its lowest layer a physical layer, also referred to as Layer-1.

According to aspects described herein, the repeater device 1114 may be configured as a Layer-1 relay operating according to a Layer-1 relay procedure. When operating as a Layer-1 relay, the repeater device 1114 may receive a signal as a modulated RF waveform at a receiver coupled to a receive antenna array, amplify the signal, and retransmit the signal from a transmitter coupled to a transmit antenna array. Therefore, a Layer-1 relay may be referred to as an amplify and forward relay. In general, a Layer-1 relay may not require a great amount of upper level functionality to perform the amplify and forward type function and may be less complex and less costly than a Layer-2 relay.

A repeater device, such as repeater device 1114, may be configured to operate as a Layer-2 relay. When operating as a Layer-2 relay, the repeater device 1114 may receive a signal as a modulated RF waveform at receiver coupled to a receive antenna array, demodulate and decode the signal to obtain a digital representation of the signal, re-encode and re-modulate the signal, amplify, and then forward the signal from a transmitter coupled to a transmit antenna array. Therefore, a Layer-2 relay may be referred to as a decode and forward type of relay. In general, a Layer-2 relay is more complex than a Layer-1 relay and may require a greater amount of upper level functionality (in comparison to a Layer-1 relay) to perform the decode and forward type of operation. Therefore, the Layer-2 relay may be more complex and more costly than a Layer-1 relay.

According to some aspects of the disclosure, the repeater device 1114 may be configured as, and referred to as, a smart repeater device. The smart repeater device may apply some upper level functionality to a Layer-1 relay but may not provide the level of functionality that would be required to operate as a Layer-2 relay. For example, while the smart repeater device may not use higher level functionality to demodulate, decode, encode, and re-modulate a signal, the smart repeater device may use higher level functionality to sense channels, implement MIMO functionality, select various beams in conjunction with a use of various synchronization signal block (SSB) information and transmission configuration indicator (TCI) states, and may adjust transmit power of a modulated RF waveform being amplified and forwarded by the relay unit 1118 of the smart repeater device.

In the control plane, the various layers for each of the network access node 1102, the repeater device 1114, and the UE 1130 are similar and will be described once to avoid repetition. The layers include the PHY layer 1104, 1120, 1132 at the L1 layer 1142, the medium access control (MAC) layer 1106, 1122, 1134, radio link control (RLC) layer 1108, 1124, 1136, and packet data convergence protocol (PDCP) layer 1110, 1126, 1138 at the L2 layer 1144, and the RRC layer 1112, 1128, 1140 at the L3 layer 1146.

The PHY layer 1104, 1120, 1132 may be responsible for transmitting and receiving data on physical channels (e.g., within slots). MAC SDUs may be placed in MAC PDUs for transport over transport channels to the PHY layer 1104, 1120, 1132. A PHY context may indicate a transmission format and a radio resource configuration (e.g., bandwidth part (BWP), numerology, etc.). Functions of the PHY layer 1104, 1120, 1132 may include, for example, error detection on transport channels and indications to higher layers, forward error correction encoding/decoding of the transport channels, hybrid automatic repeat request (HARQ) soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, transmit diversity, digital and analog beamforming, and RF processing The MAC layer 1106, 1122, 1134 may provide services to upper layers and obtains services from the PHY layer 1104, 1120, 1132. The PHY layer 1104, 1120, 1132 offers transport channels to the MAC layer 1106, 1122, 1134 to support transport services for data transfer over the radio interface. The MAC layer 1106, 1122, 1134 offers logical channels to the RLC layer 1108, 1124, 1136. The logical channels exist between the MAC and PHY layers, while transport channels exist between the PHY and radio layer. Therefore, the MAC layer 1106, 1122, 1134 may be an interface between higher layer logical channels and PHY layer transport channels. The functions of the MAC layer 1106, 1122, 1134 may include, for example, beam management random access procedure, mapping between logical and transport channels, and concatenation of multiple MAC SDUs belonging to one logical channel into a transport block (TB).

The RLC layer 1108, 1124, 1136 may provide segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 1108, 1124, 1136.

The PDCP layer 1110, 1126, 1138 may provide packet sequence numbering, in-order delivery of packets, retransmission of PDCP protocol data units (PDU), and transfer of upper layer data packets to lower layers. PDUs may include, for example, Internet Protocol (IP) packets, Ethernet frames and other unstructured data (i.e., machine-type communication (MTC), hereinafter collectively referred to as "packets"). The PDCP layer 1110, 1126, 1138 may also provide header compression for upper layer data packets to reduce radio transmission overhead, security by ciphering the data packets, and integrity protection of data packets. A PDCP context may indicate whether PDCP duplication is utilized for a unicast connection, for example.

The RRC layer 1112, 1128, 1140 of the L3 layer 1146 may be responsible for establishing and configuring signaling radio bearers (SRBs) and data radio bearers (DRBs) between the network access node 1102 and the UE 1130 and/or between the network access node 1102 and the repeater device 1114, paging initiated by the 5G Core Network (5GC) or next-generation RAN (NG-RAN), and broadcast of system information related to Access Stratum (AS) and Non Access Stratum (NAS). The RRC layer 1112, 1128, 1140 may further be responsible for QoS management, mobility management (e.g., handover, cell selection, inter-RAT mobility), UE 1130 measurement and reporting, and security functions.

In the user plane (not shown), the radio protocol architecture for the network access node 1102, the repeater device 1114, and the UE 1130 are substantially similar for the L1 layer 1142 and the L2 layer 1144 and will not be repeated to avoid repetition. The user plane protocol stack does not include an RRC layer 1112, 1128, 1140. The user plane protocol stack does include, for example, a service data adaptation protocol (SDAP) layer (not shown) in the L3 layer 1146. The SDAP layer (not shown) may provide a mapping between a 5G core (5GC) quality of service (QoS) flow and a data radio bearer and performs QoS flow ID marking in both downlink and uplink packets.

Figure 12:
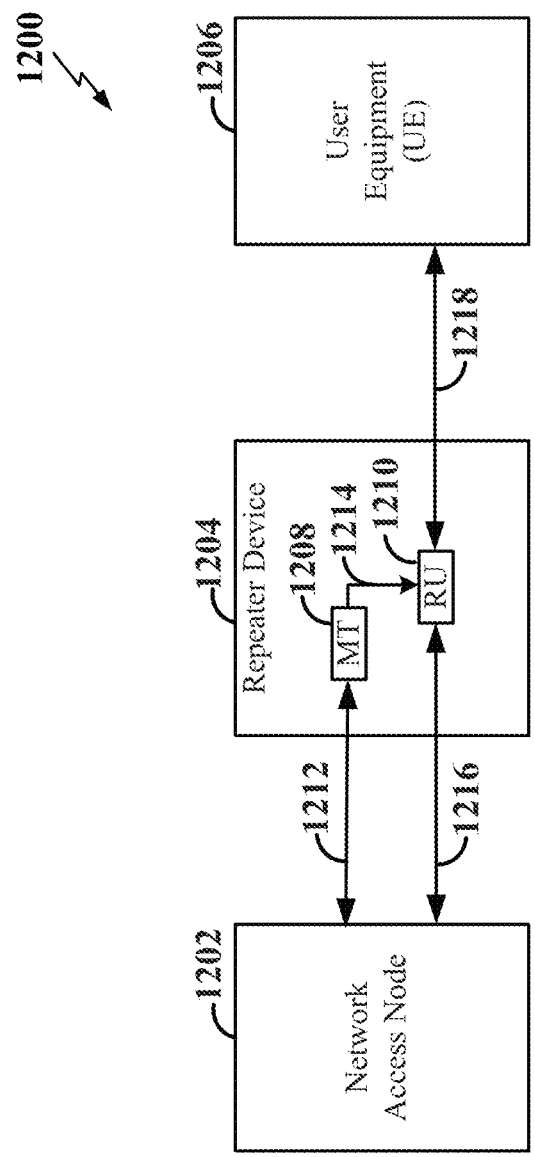
FIG. 12 is a block diagram illustrating an example of a wireless communication network including a network access node, a repeater device, and a UE according to some aspects of the disclosure.

FIG. 12 is a block diagram illustrating an example of a wireless communication network 1200 including a network access node 1202, a repeater device 1204, and a UE 1206 according to some aspects of the disclosure. The network access node 1202 may correspond to any of the network access nodes (e.g., scheduling entities, gNBs, base stations) shown in any of FIGS. 1, 2, 5-12, 14-17, 25, 29, 31, 37, and/or 39-44. The repeater device 1204 may correspond to any of the RF repeater devices of FIGS. 7-21, 29, 31, 32, 37, 39, and/or 40. The UE 1206 may correspond to any of the UEs (e.g., scheduled entities, wireless communication devices) shown in any of FIGS. 1, 2, 5-12, 14-17, 29, 31, and/or 44.

Millimeter wave communications have a higher frequency and shorter wavelength than other types of radio waves used for communications (e.g., sub-6 GHz communications). Consequently, millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a network access node that communicates using the sub-6 GHz radio waves. However, a millimeter wave might not be capable of penetrating the same wall (e.g., depending on a thickness of the wall, a material from which the wall is constructed, and/or the like). Thus, a repeater device may be used to increase the coverage area of a network access node, to extend coverage to UEs without line of sight to the network access node (e.g., due to an obstruction), and/or the like.

For example, an obstruction between a UE and a network access node may block or otherwise reduce the quality of a link between the network access node and the UE. However, a repeater device may be placed so that there are no obstructions or fewer obstructions between the repeater device and the UE and between the repeater device and the network access node. Thus, communications between the network access node and the UE via the repeater device may have a higher quality than communications directly between the network access node the UE.

In some examples, a repeater device may perform directional communication by using beamforming to communicate with the network access node via a first beam pair (e.g., a fronthaul link beam pair) and to communicate with a UE via a second beam pair (e.g., an access link beam pair). The term "beam pair" may refer to a transmit (Tx) beam used by a first device for transmission and a receive (Rx) beam used by a second device for reception of information transmitted by the first device via the Tx beam.

Referring to FIG. 12, the repeater device 1204 includes an MT unit 1208 and an RU 1210 as discussed above in conjunction with FIGS. 10 and 11. The MT unit 1208 may communicate with the network access node 1202 via a fronthaul link. In some examples, the fronthaul link may implement a reduced functionality Uu interface that may be modified to support repeater device functionality. The fronthaul link may provide a control path 1212 between the MT unit 1208 and the network access node 1202 (e.g., a DU in the network access node 1202, not shown). In some examples, the control path 1212 may carry UL and DL signals to configure the repeater device 1204. The control path 1212 may be implemented using a relatively small bandwidth part (BWP) that is in-band with the BWPs allocated for UL transmission and/or DL transmission between the network access node 1202 and the UE 1206. In some examples, the fronthaul link may operate within the FR2 frequency range.

The RU 1210 may provide relay (e.g., reception, amplification, and transmission) functionality to enable signals from the network access node 1202 to reach the UE 1206 and/or to enable signals from the UE 1206 to reach the network access node 1202. In some examples, the RU 1210 may be an analog pass-through device (e.g., without store and forward capability). In other examples, the RU 1210 may include store and forward functionality. Signals to and from the network access node 1202 may be carried as data over a fronthaul link 1216 and an access link 1218. The access link 1218 provides a data path that carries analog UL signals and DL signals to and from the UE 1206. In some examples, the access link 1218 may operate at the FR2 frequency range.

The RU 1210 and the access link 1218 may be controlled by the network access node 1202 (e.g., by a DU in the network access node 1202, not shown). For example, the network access node 1202 may schedule UL transmissions and DL transmissions on the access link 1218 (e.g., by transmitting control information to the UE 1206). In addition, the network access node 1202 may control the operation of the RU 1210 through the MT unit 1208. For example, the network access node 1202 may configure the MT unit 1208 via a control path 1212 described above to cause the MT unit 1208 to configure the RU 1210. To this end, the MT unit 1208 may generate control signaling carried by a control signaling path 1214 for controlling the operation of the RU 1210.

Figure 13:
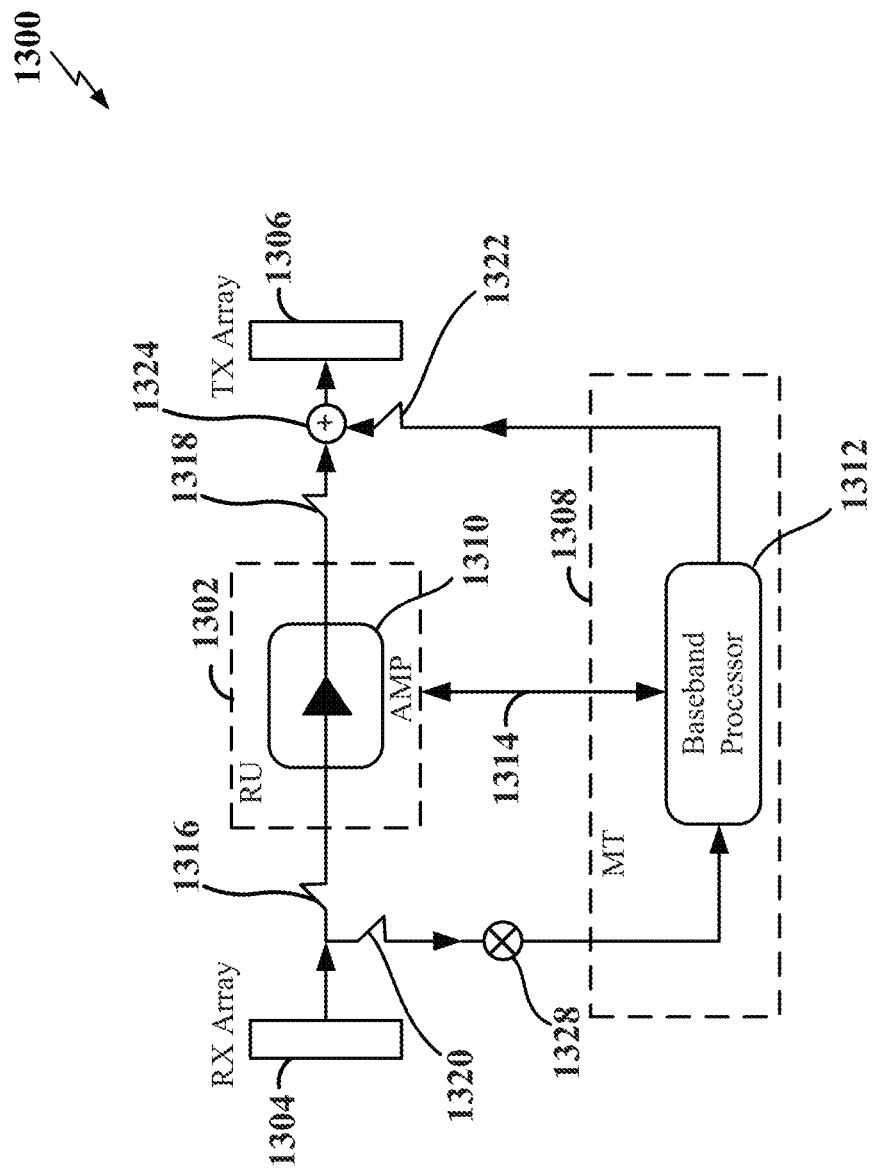
FIG. 13 is a schematic diagram illustrating example components of a repeater device according to some aspects of the disclosure.

FIG. 13 is a schematic diagram illustrating example components of a repeater device 1300 according to some aspects of the disclosure. The repeater device 1300 may correspond to any of the repeater devices of FIGS. 7-21, 29, 31, 32, 37, 39, and/or 40. In some examples, the repeater device 1300 may be a millimeter wave repeater device that communicates via millimeter wave transmissions (e.g., as opposed to sub-6 GHz transmissions).

The repeater device 1300 may include a relay unit (RU) 1302, one or more antenna arrays (or antennas, antenna panels, and/or the like) such as a receive (Rx) array 1304 and a transmit (Tx) array 1306, and an MT unit 1308 as discussed herein. The RU 1302 may include an amplifier 1310 for amplifying signals received via the Rx array 1304 and transmitting the amplified signals via the Tx array 1306. The MT unit 1308 may include a baseband processor 1312 for processing signals received from a network access node (not shown) over a control path as discussed above, controlling the operation of the RU 1302 as necessary (e.g., via control signaling over a control signaling path 1314), and transmitting signals to the network access node via the control path.

An antenna array (e.g., Rx array 1304, Tx array 1306) may include multiple antenna elements capable of being configured for beamforming. An antenna array may be referred to as a phased array because phase values and/or phase offsets of the antenna elements may be configured to form a beam, with different phase values and/or phase offsets being used for different beams (e.g., in different directions). In some aspects, an antenna array may be a fixed receive (Rx) antenna array capable of only receiving communications while not transmitting communications. In some aspects, an antenna array may be a fixed transmit (Tx) antenna array capable of only transmitting communications while not receiving communications. In some aspects, an antenna array may be configured to act as an Rx antenna array and/or a Tx antenna array (e.g., via a Tx/Rx switch, a MUX/DEMUX, and/or the like). An antenna array may be capable of communicating using millimeter waves and/or other types of RF analog signals.

The amplifier 1310 may include one or more components capable of amplifying an input signal and outputting an amplified signal. For example, the amplifier 1310 may include a power amplifier, a variable gain component, and/or the like. In some aspects, the amplifier 1310 may have variable gain control. In some examples, the level of amplification of the amplifier 1310 may be controlled by the baseband processor 1312 (e.g., under the direction of the network access node).

The baseband processor 1312 may include one or more components capable of controlling one or more other components of repeater device 1300. For example, the baseband processor 1312 may include a controller, a microcontroller, a processor, and/or the like. In some aspects, the baseband processor 1312 may control a level of amplification or gain applied by the amplifier 1310 to an input signal. Additionally, or alternatively, the baseband processor 1312 may control an antenna array by controlling a beamforming configuration for the antenna array (e.g., one or more phase values for the antenna array, one or more phase offsets for the antenna array, one or more power parameters for the antenna array, one or more beamforming parameters for the antenna array, a Tx beamforming configuration, an Rx beamforming configuration, and/or the like), by controlling whether the antenna array acts as a receive antenna array or a transmit antenna array (e.g., by configuring interaction and/or connections between the antenna array and switches), and/or the like. Additionally, or alternatively, the baseband processor 1312 may power on or power off one or more components of repeater device 1300 (e.g., when a network access node does not need to use the repeater device to serve UEs). In some aspects, the baseband processor 1312 may control timing of one or more of the above configurations.

The baseband processor 1312 may include a component capable of communicating with a network access node via the control path. In some aspects, the baseband processor 1312 may communicate with the network access node using one or more in-band radio frequencies (e.g., radio frequencies that are included within an operating frequency bandwidth of the antenna arrays). In this case, the network access node may configure a BWP within the operating frequency bandwidth of the antenna arrays (e.g., an in-band BWP) such that the BWP carries the control interface associated with the repeater device 1300.

In some examples, the baseband processor 1312 may include one or more components for digital signal processing (e.g., digital signal processor, a baseband processor, a digital-to-analog converter (DAC), an analog-to-digital converter (ADC), and/or the like). In this way, the baseband processor 1312 may demodulate, decode, and/or perform other types of processing on the control information received from a network access node.

Switches 1316, 1318, 1320, and 1322 may each include one or more components capable of enabling the repeater device 1300 to either relay a signal received via a receive antenna array or to transmit an RF analog signal generated by the repeater device 1300 (e.g., generated by the MT unit 1308). For example, in one configuration, the switches 1316, 1318, 1320, and 1322 may be configured to couple the RU 1302 to the receive array 1304 and the transmit array 1306. In another configuration, the switches 1316, 1318, 1320, and 1322 may be configured to couple the MT unit 1308 to the receive array 1304 and the transmit array 1306. In some examples, the position of each of the switches 1316, 1318, 1320, and 1322 may be controlled by the MT unit 1308.

A summer 1324 (e.g., a multiplexer) may include functionality to combine signals from the amplifier 1310 with signals from the MT unit 1308. For example, signals for the data path may be provided on the frequency bands for the BWPs allocated for data transmission, while signals for the control path may be provided on the frequency band(s) for the BWP allocated for control transmission. A demultiplexer 1328 could be used in some examples (e.g., to demultiplex the control path from an incoming signal).

Figure 14:
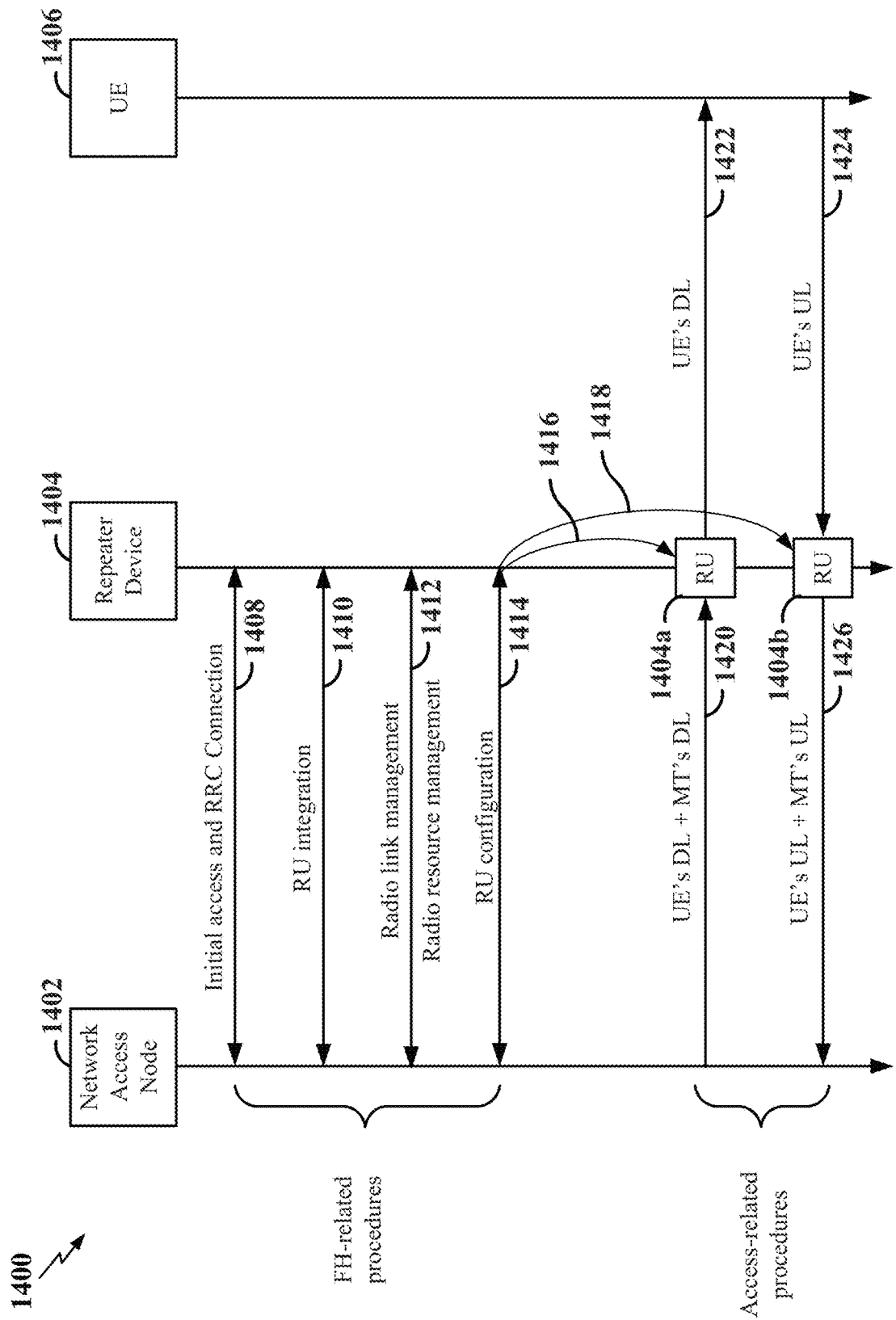
FIG. 14 is a signaling diagram illustrating an example of repeater device signaling according to some aspects of the disclosure.

FIG. 14 is a signaling diagram illustrating an example of repeater device signaling 1400 according to some aspects of the disclosure. In some examples, the network access node 1402 may correspond to any of the network access nodes (e.g., scheduling entities, gNBs, base stations) shown in any of FIGS. 1, 2, 5-12, 14-17, 25, 29, 31, 37, and/or 39-44. In some examples, the repeater device 1404 may correspond to any of the RF repeater devices of FIGS. 7-21, 29, 31, 32, 37, 39, and/or 40. In some examples, the UE 1406 may correspond to any of the UEs (e.g., scheduled entities, wireless communication devices) shown in any of FIGS. 1, 2, 5-12, 14-17, 29, 31, and/or 44.

At 1408, the network access node 1402 and the repeater device 1404 may perform an initial access procedure and establish an RRC connection. This communication may be over a Uu link as discussed above using a specified (e.g., configurable) BWP. An initial BWP may be used as a default. The Uu link may use a single component carrier (CC) in some examples. An MT unit of the repeater device 1404 may perform similar procedures as a UE (e.g., access, radio link management (RLM), and beam management (BM)). The procedures may be simplified and/or modified versions of RF and radio resource management (RRM) procedures known to those of skill in the art.

The network access node 1402 and the repeater device 1404 may identify the beams they will use to communicate with each other. In addition, the network access node 1402 and the repeater device 1404 may exchange configuration information, capability information, and other information in some examples.

At 1410, the network access node 1402 and the repeater device 1404 may perform an RU integration procedure. For example, the network access node 1402 may learn the capabilities of an RU (not shown) of the repeater device 1404. Here, the repeater device 1404 (e.g., an MT (not shown) of the repeater device 1404) may identify itself as a repeater device and share its capabilities. The shared information may include, for example, beam-related information and a required latency for implementing a configuration.

At 1412, the network access node 1402 and the repeater device 1404 may perform radio link management and radio resource management procedures. For example, the network access node 1402 may specify beam information and allocate resources.

At 1414, the network access node 1402 and the repeater device 1404 may perform an RU configuration procedure. Here, the network access node 1402 may send control messages to configure the operation of an RU. For example, the network access node 1402 may send configuration information for an RU of the repeater device 1404 to an MT of the repeater device 1404. Thus, in some examples, the RU configuration procedure may control (as represented by a line 1416) the operation of a first RU 1404a for DL traffic and control (as represented by a line 1418) the operation of a second RU 1404b for UL traffic. The configuration may include, for example, beamforming configurations and TDD configurations (e.g., Rx & Tx (forwarding) beamforming) and/or time-domain resource allocation (e.g., the resources used to adopt the indicated configuration). An RU-specific DCI format (scrambled by RU-RNTI) may be defined to provide the required configurations. In addition to a dynamic configuration (e.g., a default mode), semi-persistent and periodic configurations may also be supported. Configuration via MAC-CE or RRC (e.g., for semi-persistent/periodic modes) also may be supported.

At 1420, the network access node 1402 may transmit DL traffic for the UE 1406 and DL traffic for the MT (of the repeater device 1404) to the repeater device 1404. Then, at 1422, the first RU 1404a may forward (e.g., relay) the DL traffic for the UE 1406 to the UE 1406. Here, the repeater device 1404 may demultiplex the DL traffic for the MT from the DL traffic from the network access node 1402. The DL traffic for the MT may or may not be multiplexed with the DL traffic for the UE 1406 on the same resources.

At 1424, the UE 1406 may transmit UL traffic to the repeater device 1404. At 1426, the second RU 1404b may forwards (e.g., relay) the UL traffic from the UE 1406 to the network access node 1402 along with UL traffic from the MT (of the repeater device 1404). Here, the repeater device 1404 may multiplex the UL traffic from the MT with the UL traffic transmitted to the network access node 1402. The UL traffic from the MT may or may not be multiplexed with the UL traffic from the UE 1406 on the same resources. The repeater device 1404 may relay signals to and from multiple UEs (e.g., including UE 1406 and other UEs (not shown)).

Figure 15:
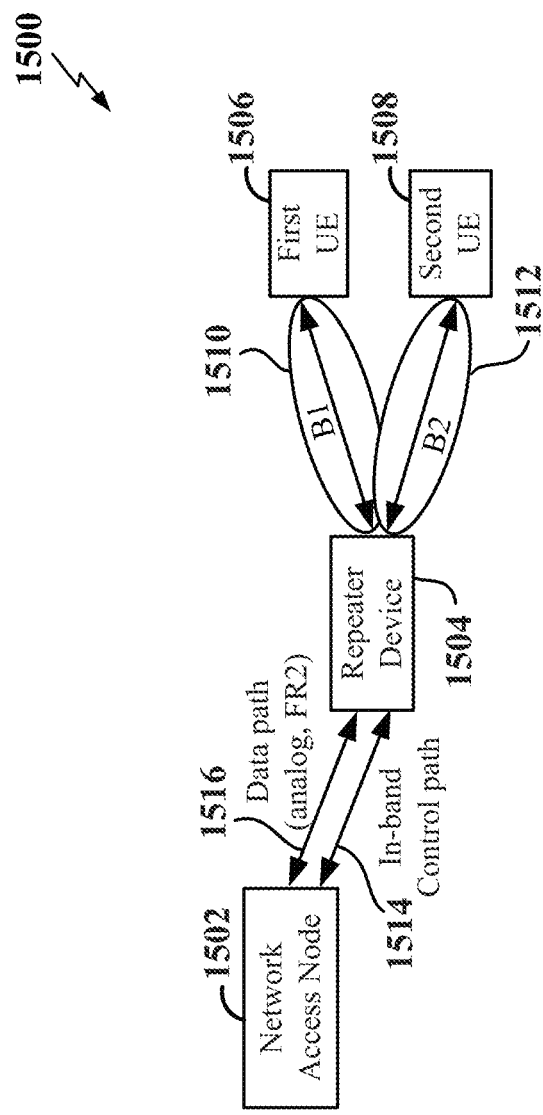
FIG. 15 is a schematic illustration of an example of signaling paths for a repeater device according to some aspects of the disclosure.

FIG. 15 is a schematic illustration of an example of signaling paths in a wireless communication network 1500 between a network access node 1502, a repeater device 1504, a first UE 1506, and a second UE 1508 according to some aspects of the disclosure. In some examples, the network access node 1502 may correspond to any of the network access nodes (e.g., scheduling entities, gNBs, base stations) shown in any of FIGS. 1, 2, 5-12, 14-17, 25, 29, 31, 37, and/or 39-44. In some examples, the repeater device 1504 may correspond to any of the RF repeater devices of FIGS. 7-21, 29, 31, 32, 37, 39, and/or 40. In some examples, the first UE 1506 and the second UE 1508 may correspond to any of the UEs (e.g., scheduled entities, wireless communication devices) shown in any of FIGS. 1, 2, 5-12, 14-17, 29, 31, and/or 44.

In the example of FIG. 15, the repeater device 1504 has established a first beam pair 1510 (B1) to the first UE 1506 and a second beam pair 1512 (B2) to the second UE 1508. The network access node 1502 and the repeater device 1504 (e.g., an MT unit of the repeater device) may communicate via an in-band control path 1514 as discussed herein. Data sent to and/or received from the first UE 1506 via the first beam pair 1510 and data sent to and/or received from the second UE 1508 via the second beam pair 1512 may be sent over a data path 1516. In some examples, the data may be sent as analog RF communications in the FR2 spectrum.

Figure 16:
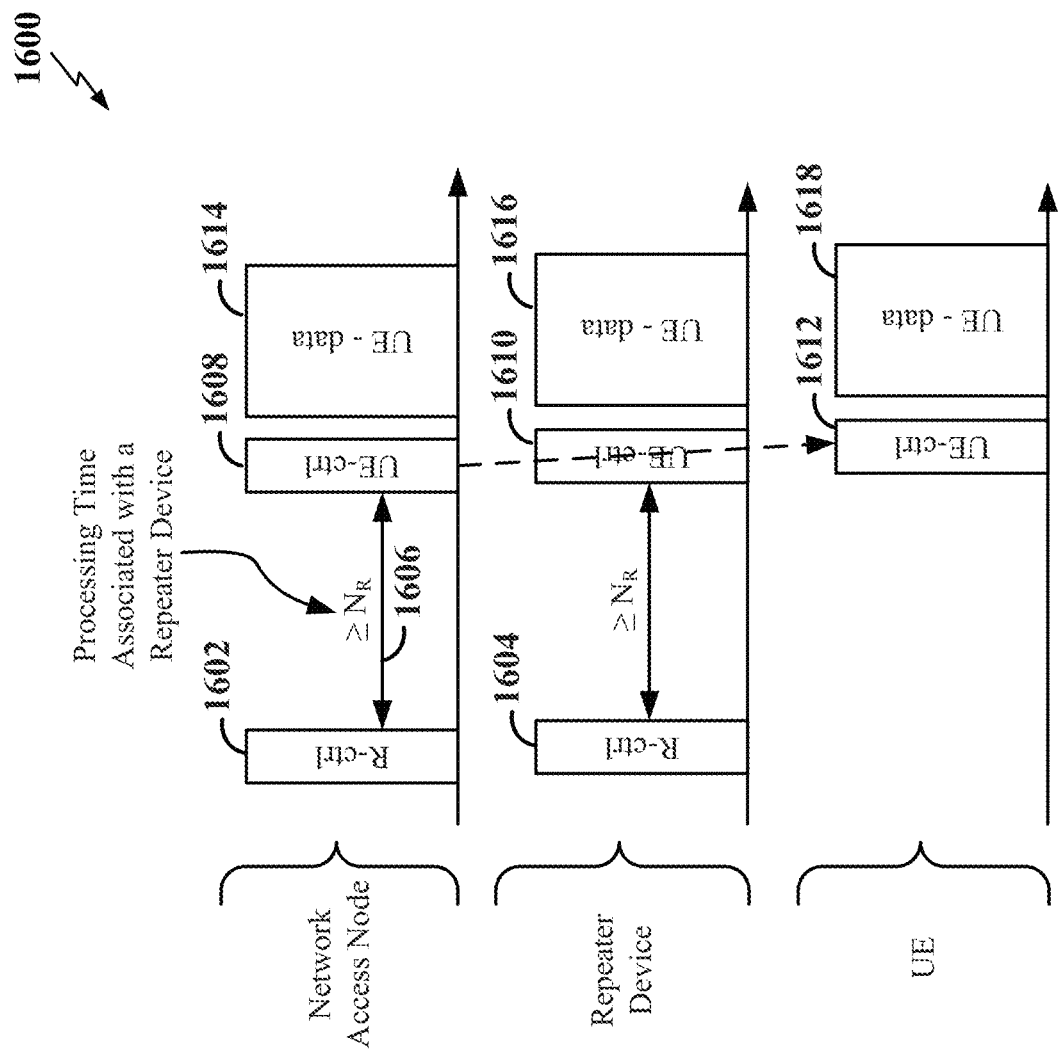
FIG. 16 is a schematic example of propagation of control and data associated with a DL transmission from a network access node to a UE via a repeater device according to some aspects of the disclosure.

FIG. 16 is a schematic example of propagation of control and data associated with a DL transmission from a network access node to a UE via a repeater device according to some aspects of the disclosure. Similar timing may be applicable to an UL transmission from the UE to the network access node via the repeater device according to some aspects of the disclosure. In some examples, the network access node 802 may correspond to any of the network access nodes (e.g., scheduling entities, gNBs, base stations) shown in any of FIGS. 1, 2, 5-12, 14-17, 25, 29, 31, 37, and/or 39-44. In some examples, the repeater device may correspond to any of the RF repeater devices of FIGS. 7-21, 29, 31, 32, 37, 39, and/or 40. In some examples, the UE may correspond to any of the UEs (e.g., scheduled entities, wireless communication devices) shown in any of FIGS. 1, 2, 5-12, 14-17, 29, 31, and/or 44.

The network access node may transmit repeater device control information (R-ctrl) 1602 that may be received by the repeater device a time later (as represented by R-ctrl 1604). The lateral shift to the right along the time axis of the objects associated with the network access node, the repeater device, and the UE may be due to propagation delay (e.g., the time it takes for an RF signal to propagate through the air medium from its source to its destination). As discussed herein, this repeater device control information may configure the repeater device for an upcoming DL transmission to the UE.

After waiting for a period of time 1606 that is equal to or greater than an amount of time NR it takes the repeater device to process the repeater device control information (e.g., to configure a DL RU of the repeater device), the network access node may transmit UE-control information (UE-ctrl) 1608. This UE-control information may be received by the repeater device a time later (as represented by UE-ctrl 1610). The repeater device may forward the UE-control information to the UE and the information is received at UE a time later (as represented by UE-ctrl 1612).

Subsequently, the network access node may transmit UE-data 1614 that is received by the repeater device a time later (as represented by UE-data 1616). The repeater device may forward the UE-data to the UE and the UE-data may be received at UE a short time later (as represented by UE-data 1618).

The channels, carriers, traffic, control, and protocol layers described above and illustrated in FIGS. 1-16 are not necessarily all the channels, carriers, traffic, control, and protocol layers that may be utilized between network access nodes, repeater devices, and UEs, and those of ordinary skill in the art will recognize that other channels, carriers, traffic, control, and protocol layers, as well as other aspects illustrated and described above, may be utilized in addition to those illustrated and described above, such as other traffic, control, and feedback channels.

Figure 17:
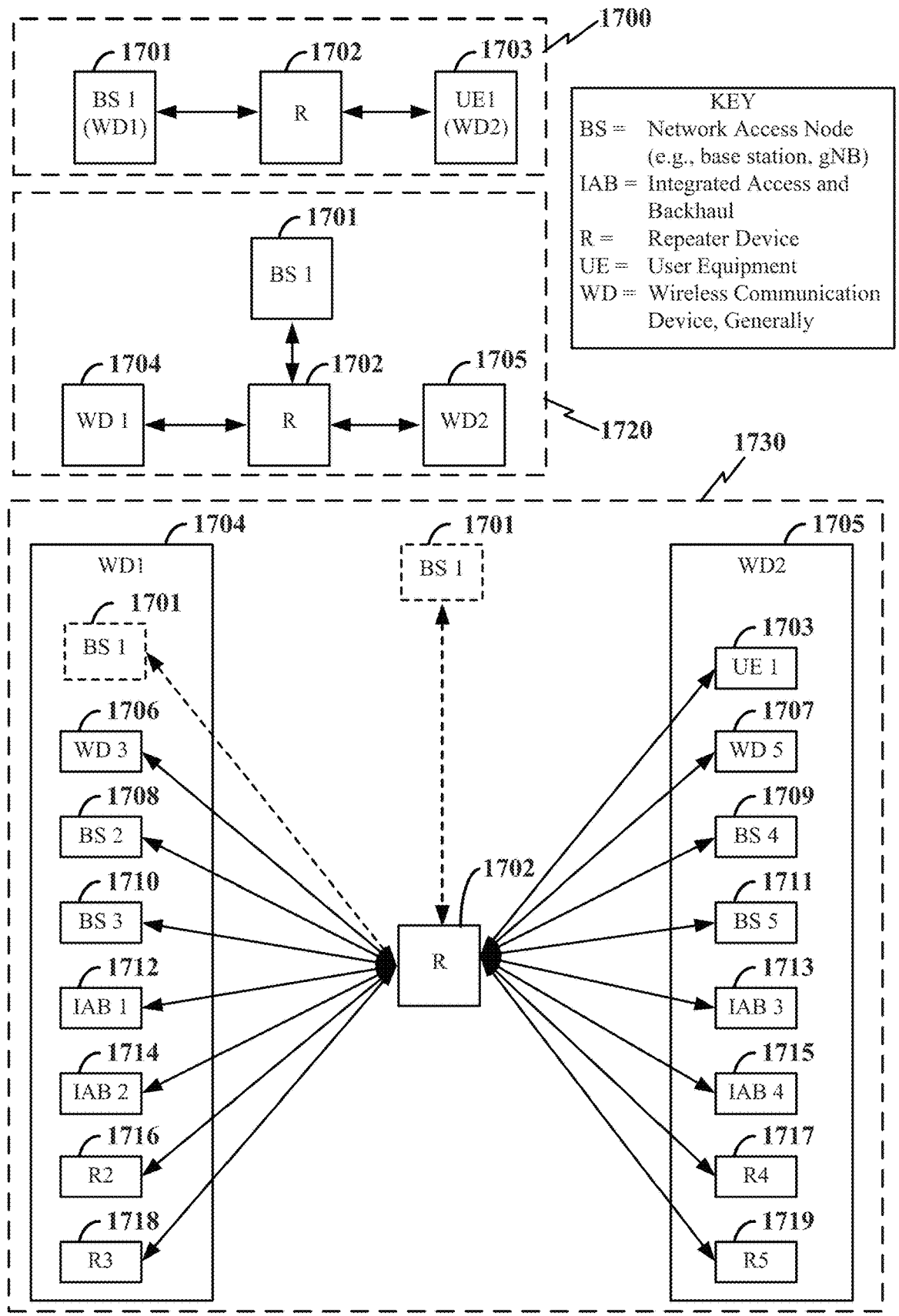
FIG. 17 is a block diagram illustrating exemplary couplings between various nodes of a wireless communication network including a repeater device according to some aspects of the disclosure.

FIG. 17 is a block diagram illustrating exemplary couplings between various nodes of a wireless communication network including a repeater device 1702 according to some aspects of the disclosure. As depicted, the repeater device 1702 may be used for repeating signals between different types of devices in different examples. The devices include, but are not limited to network access nodes, integrated access and backhaul devices, other repeater devices, user equipment, and wireless devices in general. Three configurations of a network access node 1701 (identified in FIG. 17 as BS 1) and a repeater device 1702 (identified in FIG. 17 as R) are presented. The repeater device 1702 may be a smart repeater device as described herein. The repeater device 1702 may correspond to any of the RF repeater devices of FIGS. 7-21, 29, 31, 32, 37, 39, and/or 40. The network access node 1701 may correspond to any of the network access nodes (e.g., scheduling entities, gNBs, base stations) shown in any of FIGS. 1, 2, 5-12, 14-17, 25, 29, 31, 37, and/or 39-44.

In a first configuration 1700, the repeater device 1702 may be controlled by the network access node 1701. The repeater device 1702 may receive, from the network access node 1701, control signaling including control information, in association with traffic relayed through the repeater device 1702 between the network access node 1701 (BS1) and a user equipment 1703 (UE1). In the first configuration 1700, network access node 1701 may be considered a first wireless communication device (WD1) and the user equipment 1703 may be considered a second wireless communication device (WD2). The name "wireless communication device" as used herein may generally refer to a network access node, an integrated access and backhaul device, a repeater device, a user equipment, an IoT device, a V2X device, or generally any device that utilizes wireless spectrum to communicate with another device.

In a second configuration 1720, the repeater device 1702 may be controlled by the network access node 1701 (BS1). The repeater device 1702 may receive from the network access node 1701, control signaling including control information, in association with traffic relayed through the repeater device 1702 between a first wireless communication device 1704 (WD1) and a second wireless communication device 1705 (WD2). In the second configuration 1720, the first wireless communication device 1704 may be something other than a network access node (e.g., network access node 1701) and the second wireless communication device 1705 (WD2) may be something other than a UE (e.g., user equipment 1703) for example. In the second configuration, traffic (including user signaling and control signaling) may be relayed through the repeater device 1702, between the first wireless communication device 1704 and the second wireless communication device 1705. The network access node 1701 and the repeater device 1702 may exchange control information over control signaling. Traffic between the first wireless communication device 1704 and the second wireless communication device 1705 may, or may not, be passed (copied, bicast, groupcast) to the network access node 1701.

In a third configuration 1730, the repeater device 1702 may be controlled by the network access node 1701 (BS1). The network access node 1701 may be the first wireless communication device 1704 (WD1) or may not be the first wireless communication device 1704. The alternative identities/locations of the network access node 1701 are shown in dashed line for ease of reference. The repeater device 1702 may receive from the network access node 1701, control signaling including control information, in association with traffic relayed through the repeater device 1702 between the first wireless communication device 1704 and the second wireless communication device 1705. In the third configuration 1730, the first wireless communication device 1704 may be represented as being at least one or more of: the network access node 1701, one or more wireless communication devices 1706, one or more network access nodes 1708, 1710, one or more integrated access and backhaul (IAB) nodes 1712, 1714, or one or more repeater devices 1716, 1718. The second wireless communication device 1705 may be represented as being at least one or more of: one or more UEs 1703, one or more wireless communication devices 1707, one or more network access nodes 1709, 1711, one or more IAB nodes 1713, 1715, or one or more repeater devices 1717, 1719.

I. Beam Information for a Wireless Communication Repeater Device

Aspects described herein may relate to an exchange of beam-related information between a network access node and a repeater device. In some examples, beam information might not initially be communicated between a network access node and a repeater device (e.g., to simplify repeater device-related operations and/or reduce repeater device-related signaling). In some examples, a repeater device may send beam information to a network access node (e.g., to enable the network access node to better configure the repeater device). In some examples, a network access node may determine (e.g., estimate) beam information relating to a repeater device (e.g., by monitoring signals associated with communication between the network access node and a UE via the repeater device).

According to some aspects, a network access node may select a number of synchronization signal blocks (SSBs) that a repeater device may transmit prior to (e.g., without first) receiving an indication from the repeater device regarding how many beams the repeater device can support (e.g., transmit). By not requiring the repeater device to indicate how may beams it can support, less signaling may be needed between the network access node and the repeater device. In addition, the network access node and the repeater device may not need to perform operations associated with transmitting and receiving certain signaling (as an RRC connection may not be established). Thus, power savings may be achieved at the network access node and the repeater device, and overall system throughput may be increased.

Figure 18:
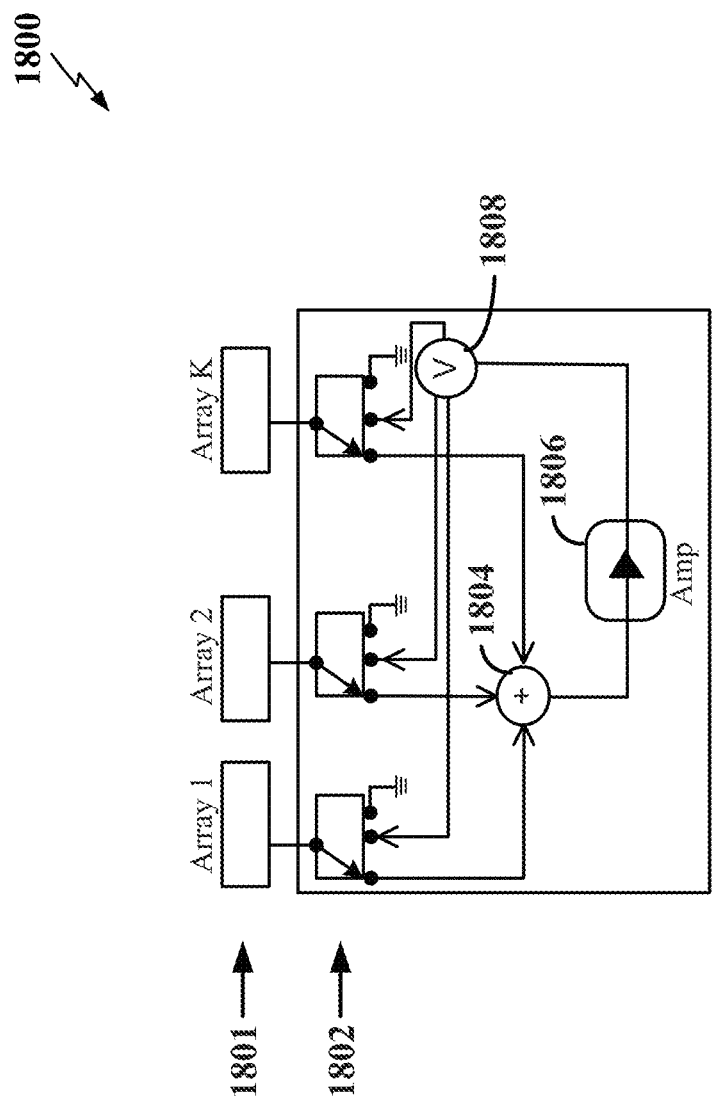
FIG. 18 is a schematic diagram of a MIMO repeater device according to some aspects of the disclosure.

FIG. 18 is a schematic diagram of a MIMO repeater device 1800 according to some aspects of the disclosure. The MIMO repeater device 1800 may have a single input or multiple inputs. Input signals from one or more sub-arrays 1801 (e.g., a set of sub-arrays) selected by a set of switches 1802 may be combined (e.g., by an adder or multiplexer 1804), amplified (e.g., by an amplifier 1806) and then divided (e.g., by a demultiplexer 1808) for transmission via a single output or multiple outputs (e.g., via the set of sub-arrays 1801) as selected by the set of switches 1802. The MIMO repeater device 1800 may correspond to any of the RF repeater devices of FIGS. 7-21, 29, 31, 32, 37, 39, and/or 40.

Figure 19:
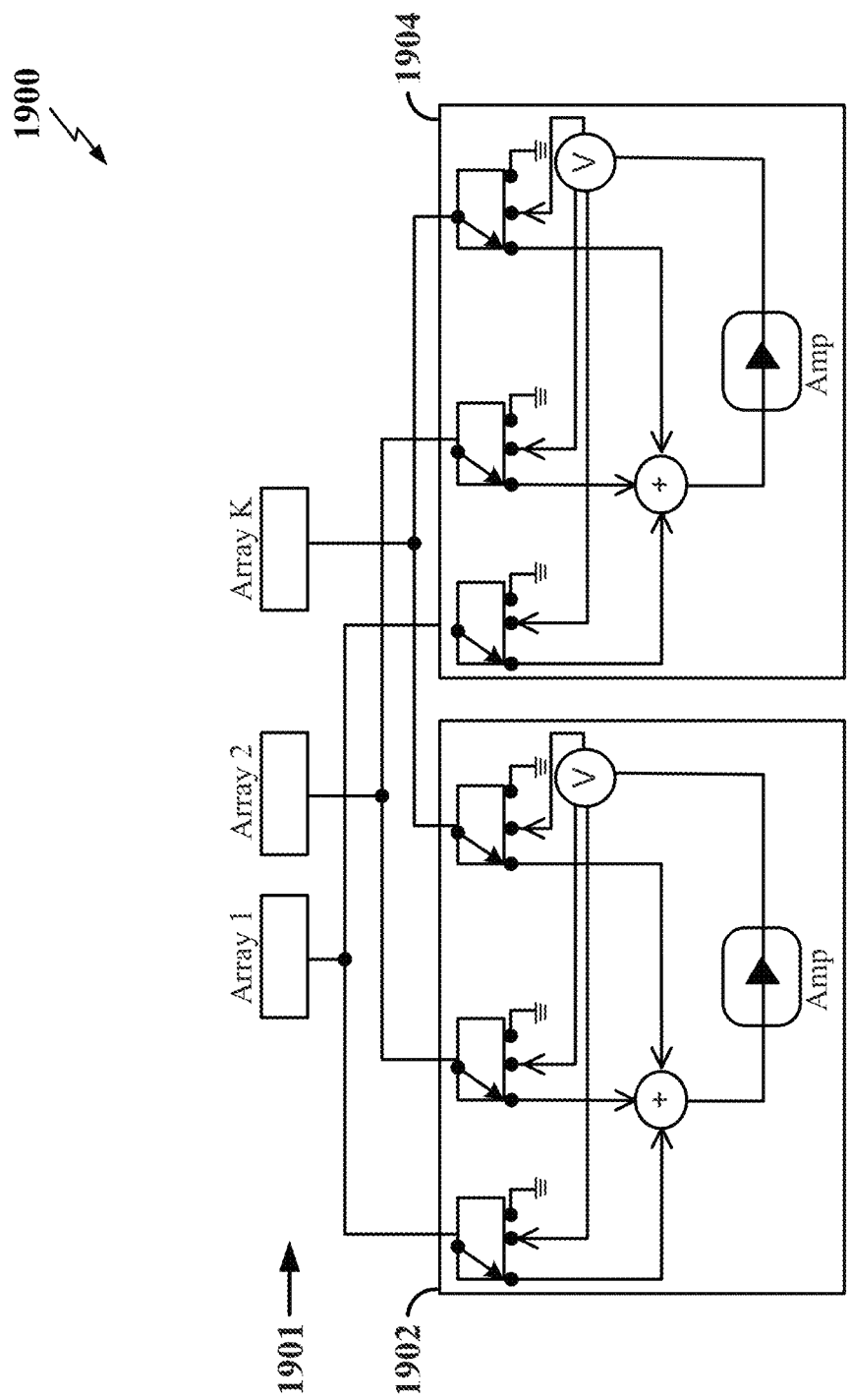
FIG. 19 is a schematic diagram of a bidirectional MIMO repeater device according to some aspects of the disclosure.

FIG. 19 is a schematic diagram of a bidirectional MIMO repeater device 1900 according to some aspects of the disclosure. The bidirectional MIMO repeater device 1900 includes two repeater device circuits (referred to as a first switch 1902 and a second switch 1904) (e.g., independent RF chains) that may be similar to the MIMO repeater device 1800 of FIG. 18. The bidirectional MIMO repeater device 1900 may have, in a first direction, multiple inputs where the input signals are combined, amplified, and then divided for transmission via multiple outputs (e.g., as discussed above in conjunction with FIG. 18). The bidirectional MIMO repeater device 1900 may have, in a second direction, multiple inputs where the input signals are combined, amplified, and then divided for transmission via multiple outputs (e.g., as discussed above in conjunction with FIG. 18).

In the above examples, different input and/or output means may be employed by configuring corresponding sub-arrays 1901 of one or more antenna arrays. In some examples, the first switch 1902 may be used to configure a particular set of sub-arrays for transmission and the second switch 1904 may be used to configure a particular set of sub-arrays for reception. By sending connectivity information of the arrays to the network access node, the network access node may be able to configure the arrays (e.g., configure an RU via an MT) for transmission and/or reception. The bidirectional MIMO repeater device 1900 may correspond to any of the RF repeater devices of FIGS. 7-21, 29, 31, 32, 37, 39, and/or 40.

Figure 20:
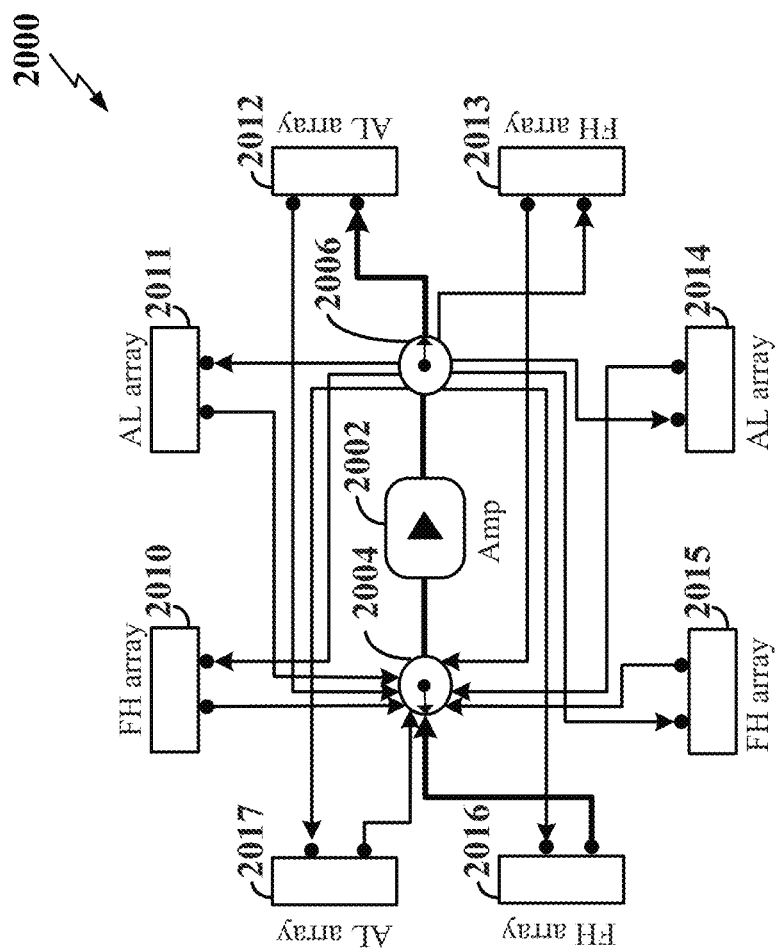
FIG. 20 is a schematic diagram of a single-input single-output (SISO) repeater device according to some aspects of the disclosure.

FIG. 20 is a schematic diagram of a single-input single-output (SISO) repeater device 2000 according to some aspects of the disclosure. The SISO repeater device 2000 may have a single input (e.g., a first port) that is amplified by an amplifier 2002 and then transmitted via a single output (e.g., a second port). In other examples, the SISO repeater device 2000 may have multiple inputs and multiple outputs (e.g., where only one input/output pair may be selected at any given time). In the example of FIG. 20, a single input and single output are coupled to a plurality of antenna arrays. In the example of FIG. 20, some of the arrays (FH arrays) 2010, 2013, 2015, 2016 may be designated for fronthaul link communication and other arrays (AL arrays) 2011, 2012, 2014, 2017 may be designated for access link communication. In the example of FIG. 20, the plurality of antenna arrays may be divided into four fronthaul arrays (FH arrays) 2010, 2013, 2015, 2016 and four access link arrays (AL arrays) 2011, 2012, 2014, 2017; however, the number of antenna arrays and the ratio between FH arrays and AL arrays is provided for illustration and not limitation. The single input may be fed from a first switch 2004 that may be coupled between the amplifier 2002 and the plurality of antenna arrays 2010-2017 (e.g., in the example of FIG. 20, the first switch 2004 may be a single pole eight throw switch). The single output may feed a second switch 2006 that may be coupled between the amplifier 2002 and the plurality of antenna arrays 2010-2017 (e.g., in the example of FIG. 20, the second switch 2006 may be a single pole eight throw switch). The first switch 2004 and the second switch 2006 may be, or be replaced by, multiplexor/demultiplexer circuits or other distribution circuits as known to those of skill in the art. Here, different array pairs may be selected at a given time for communication on the fronthaul link and communication on the access link. In the example of FIG. 20, an output of a first FH array 2016 is selected by the first switch 2004, amplified by the amplifier 2002, and output to a second AL array 2012 via the second switch 2006. The configuration shown is exemplary and not limiting. The SISO repeater device 2000 may correspond to any of the RF repeater devices of FIGS. 7-21, 29, 31, 32, 37, 39, and/or 40.

Figure 21:
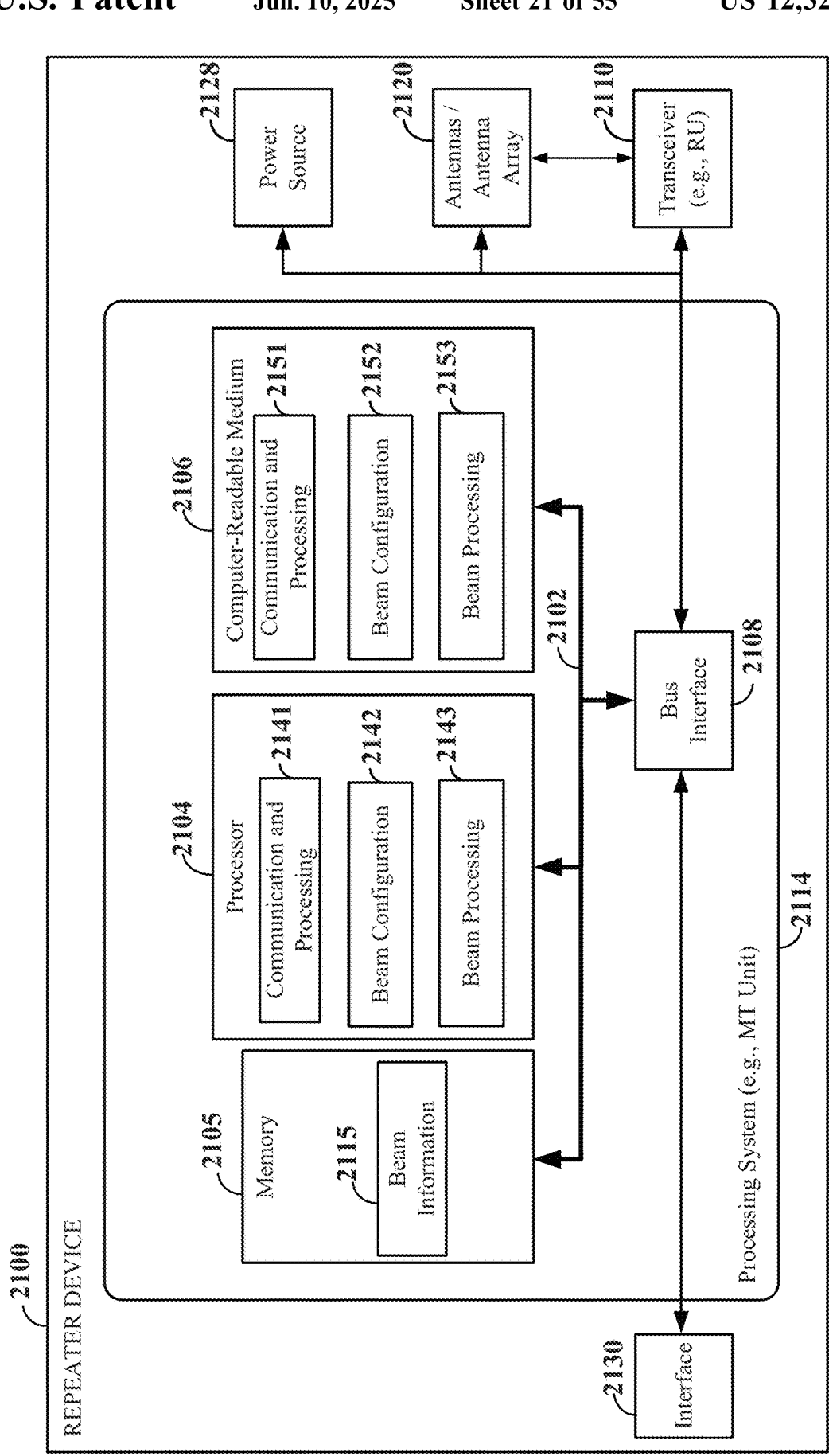
FIG. 21 is a schematic diagram illustrating an example of a hardware implementation for a repeater device employing a processing system according to some aspects of the disclosure.

FIG. 21 is a schematic diagram illustrating an example of a hardware implementation of a repeater device 2100 employing a processing system 2114 according to some aspects of the disclosure. For example, the repeater device 2100 may be a device configured to wirelessly communicate with a network access node (e.g., a scheduling entity, a gNB, a base station), a user equipment (e.g., a UE, a scheduled entity, a wireless communication device), and/or a core network node, all as discussed in any one or more of FIGS. 1-55. In some implementations, the processing system 2114 may provide some or all of the functionality of an MT unit. In some implementations, the repeater device 2100 may correspond to any of the repeater devices or scheduled entities of FIGS. 1-55.

In accordance with various aspects of the disclosure, an element, or any portion of an element, or any combination of elements may be implemented with the processing system 2114. The processing system 2114 may include one or more processors 2104. Examples of processors 2104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the repeater device 2100 may be configured to perform any one or more of the functions described herein. That is, the processor 2104, as utilized in the repeater device 2100, may be used to implement any one or more of the processes and procedures described herein, for example, in FIGS. 22-24, 33-34, and/or 46-47.

The processor 2104 may in some instances be implemented via a baseband or modem chip and in other implementations, the processor 2104 may include a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2114 may be implemented with a bus architecture, represented generally by the bus 2102. The bus 2102 may include any number of interconnecting buses and bridges depending on the specific application of the processing system 2114 and the overall design constraints. The bus 2102 communicatively couples together various circuits including one or more processors (represented generally by the processor 2104), a memory 2105, and computer-readable media (represented generally by the computer-readable medium 2106). The bus 2102 may also link various other circuits such as timing sources, peripherals, voltage regulators, and power management circuits, which are well known in the art, and therefore, will not be described any further.

A bus interface 2108 may provide an interface between the bus 2102 and a transceiver 2110 (e.g., which may be alternatively implemented as an RU) and between the bus 2102 and an interface 2130. If implemented as an RU, the transceiver 2110 may represent transmit functionality and/or receive functionality. The transceiver 2110 may further be coupled to one or more antennas/antenna array 2120. The transceiver 2110, in connection with the one or more antennas/antenna array 2120, may provide a communication interface or means for communicating with various other apparatus over a wireless transmission medium. In some examples, the repeater device 2100 may include two or more transceivers 2110, each configured to communicate with a respective network type (e.g., terrestrial, or non-terrestrial). The interface 2130 may provide a communication interface or means of communicating with various other apparatuses and devices (e.g., other devices housed within the same apparatus as the repeater device 2100 or other external apparatuses) over an internal bus or external transmission medium, such as an Ethernet cable. Depending upon the nature of the apparatus, the interface 2130 may include a user interface (e.g., keypad, display, speaker, microphone, joystick, control features, etc.). Of course, such a user interface is optional, and may be omitted in some examples, such as an IoT device. In addition, the bus interface 2108 may further provide an interface between the bus 2102 and a power source 2128.

The processor 2104 is responsible for managing the bus 2102 and general processing, including the execution of software stored on the computer-readable medium 2106. The software, when executed by the processor 2104, causes the processing system 2114 to perform the various functions described below for any particular apparatus. The computer-readable medium 2106 and/or the memory 2105 may also be used for storing data that is manipulated by the processor 2104 when executing software.

One or more processors 2104 in the processing system 2114 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 2106.

The computer-readable medium 2106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2106 may reside in the processing system 2114, external to the processing system 2114, or distributed across multiple entities including the processing system 2114. The computer-readable medium 2106 may be embodied in a computer program product or article of manufacture. By way of example, a computer program product or article of manufacture may include a computer-readable medium in packaging materials. In some examples, the computer-readable medium 2106 may be part of the memory 2105. Those skilled in the art will recognize how best to implement the described functionality presented throughout this disclosure depending on the particular application and the overall design constraints imposed on the overall system.

The repeater device 2100 may be configured to perform any one or more of the operations described herein, for example, in conjunction with FIGS. 22-24, 33-34, and/or 46-47. In some aspects of the disclosure, the processor 2104, as utilized in the repeater device 2100, may include circuitry configured for various functions.

For example, the processor 2104 may include communication and processing circuitry 2141. The communication and processing circuitry 2141 may be configured for various functions, including, for example, communicating with a network access node (e.g., a scheduling entity, a gNB, a base station), a user equipment (e.g., a UE, a scheduled entity, a wireless communication device), a core network node (e.g., a 5G core network node), and/or or any other entity, such as, for example, local infrastructure or an entity communicating with the repeater device 2100 via the Internet, such as a network provider. The communication and processing circuitry 2141 may include one or more hardware components that provide the physical structure that performs various processes related to wireless communication (e.g., signal reception and/or signal transmission) as described herein. The communication and processing circuitry 2141 may further include one or more hardware components that provide the physical structure that performs various processes related to signal processing (e.g., processing a received signal and/or processing a signal for transmission) as described herein. In some examples, the communication and processing circuitry 2141 may be configured to relay uplink traffic and uplink control messages (e.g., similar to uplink traffic 116 and uplink control 118 of FIG. 1) and relay downlink traffic and downlink control messages (e.g., similar to downlink traffic 112 and downlink control 114) via the antennas/antenna array 2120 and the transceiver 2110. In some examples, the communication and processing circuitry 2141 may include two or more transmit/receive chains. The two or more transmit/receive chains may each be configured to process signals of a different RAT (or RAN) type. The communication and processing circuitry 2141 may further be configured to execute communication and processing software 2151 stored on the computer-readable medium 2106 to implement one or more functions described herein.

In some examples, the communication and processing circuitry 2141 may be configured to receive and process downlink beamformed signals at a mmWave frequency or a sub-6 GHz frequency via the transceiver 2110 and the antenna array 2120. For example, the communication and processing circuitry 2141 may be configured to receive a respective reference signal (e.g., SSB or CSI-RS) on each of a plurality of downlink beams from a network access node during a downlink beam sweep via at least one first antenna panel of the antenna array 2120. The communication and processing circuitry 2141 may further be configured to transmit a beam measurement report to the network access node.

In some examples, the communication and processing circuitry 2141 may further be configured to generate and transmit uplink beamformed signals at a mmWave frequency or a sub-6 GHz frequency via the transceiver 2110 and the antenna array 2120. For example, the communication and processing circuitry 2141 may be configured to transmit a respective reference signal (e.g., SRS or DMRS) on each of a plurality of uplink beams to the network access node during an uplink beam sweep via at least one second antenna panel of the antenna array 2120.

The communication and processing circuitry 2141 may further be configured to control the antenna array 2120 and the transceiver 2110 to search for and identify a plurality of downlink transmit beams during a downlink beam sweep. The communication and processing circuitry 2141 may further be configured to obtain a plurality of beam measurements on each of a plurality of downlink receive beams via the antenna array 2120 for each of the identified downlink transmit beams. The communication and processing circuitry 2141 may further be configured to generate a beam measurement report for transmission to the network access node using the communication and processing circuitry 2141.

The communication and processing circuitry 2141 may further be configured to identify one or more selected uplink beam(s) based on the beam measurements obtained from the downlink beam reference signals. In some examples, the communication and processing circuitry 2141 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 2141 may be configured to generate one or more uplink transmit beams for transmission in an uplink beam sweep. Each uplink transmit beam may carry an uplink reference signal (e.g., an SRS) for measurement by the network access node. The communication and processing circuitry 2141 may further be configured to identify the selected uplink transmit beam(s) selected by the network access node based on the uplink beam measurements. For example, the communication and processing circuitry 2141 may be configured to receive an indication of the selected uplink transmit beam(s) from the network access node.

In some examples, the communication and processing circuitry 2141 may be configured to generate and transmit a scheduling request (e.g., via UCI in a PUCCH) to the network access node to receive an uplink grant for the PUSCH. The communication and processing circuitry 2141 may further be configured to generate an uplink signal and interact with the transceiver 2110 to transmit the uplink signal. The uplink signal may include, for example, a PUCCH, a PUSCH, an SRS, a DMRS, or a PRACH. The communication and processing circuitry 2141 may further be configured to interact with the transceiver 2110 to monitor for a downlink signal and decode a downlink signal. The downlink signal may include, for example, a PDCCH, a PDSCH, a CSI-RS, or a DMRS.

In some implementations where the communication involves receiving information, the communication and processing circuitry 2141 may obtain information from a component of the repeater device 2100 (e.g., from the transceiver 2110 that receives the information via radio frequency signaling or some other type of signaling suitable for the applicable communication medium), process (e.g., decode) the information, and output the processed information. For example, the communication and processing circuitry 2141 may output the information to another component of the processor 2104, to the memory 2105, or to the bus interface 2108. The information may include beam information 2115 that may be stored in the memory 2105, for example. In some examples, the communication and processing circuitry 2141 may receive one or more of signals, messages, other information, or any combination thereof. In some examples, the communication and processing circuitry 2141 may receive information via one or more channels. In some examples, the communication and processing circuitry 2141 may include functionality for a means for receiving.

In some implementations where the communication involves sending (e.g., transmitting) information, the communication and processing circuitry 2141 may obtain information (e.g., from another component of the processor 2104, the memory 2105, or the bus interface 2108), process (e.g., encode) the information, and output the processed information. For example, the communication and processing circuitry 2141 may output the information to the transceiver 2110 (e.g., that transmits the information via radio frequency signaling or some other type of signaling suitable for the applicable communication medium). In some examples, the communication and processing circuitry 2141 may send one or more of signals, messages, other information, or any combination thereof. In some examples, the communication and processing circuitry 2141 may send information via one or more channels. In some examples, the communication and processing circuitry 2141 may include functionality for a means for sending (e.g., means for transmitting).

The processor 2104 may include beam configuration circuitry 2142 configured to perform beam configuration-related operations as discussed herein. The beam configuration circuitry 2142 may further be configured to provide the functionality of a means for receiving a configuration. The beam configuration circuitry 2142 may further be configured to provide the functionality of a means for electing to use a quantity of beams. The beam configuration circuitry 2142 may further be configured to provide the functionality of a means for determining a quantity of antenna arrays. The beam configuration circuitry 2142 may further be configured to provide the functionality of a means for determining a mapping. The beam configuration circuitry 2142 may further be configured to provide the functionality of a means for transmitting a mapping. The beam configuration circuitry 2142 may further be configured to provide the functionality of a means for generating an indication. The beam configuration circuitry 2142 may further be configured to provide the functionality of a means for transmitting an indication. The beam configuration circuitry 2142 may further be configured to execute beam configuration software 2152 included on the computer-readable medium 2106 to implement one or more functions described herein.

The processor 2104 may include beam processing circuitry 2143 configured to perform beam processing-related operations as discussed herein. The beam processing circuitry 2143 may further be configured to provide the functionality of a means for receiving an SSB transmission. The beam processing circuitry 2143 may further be configured to provide the functionality of a means for transmitting an SSB transmission. The beam processing circuitry 2143 may further be configured to execute beam processing software 2153 included on the computer-readable medium 2106 to implement one or more functions described herein.

Figure 22:
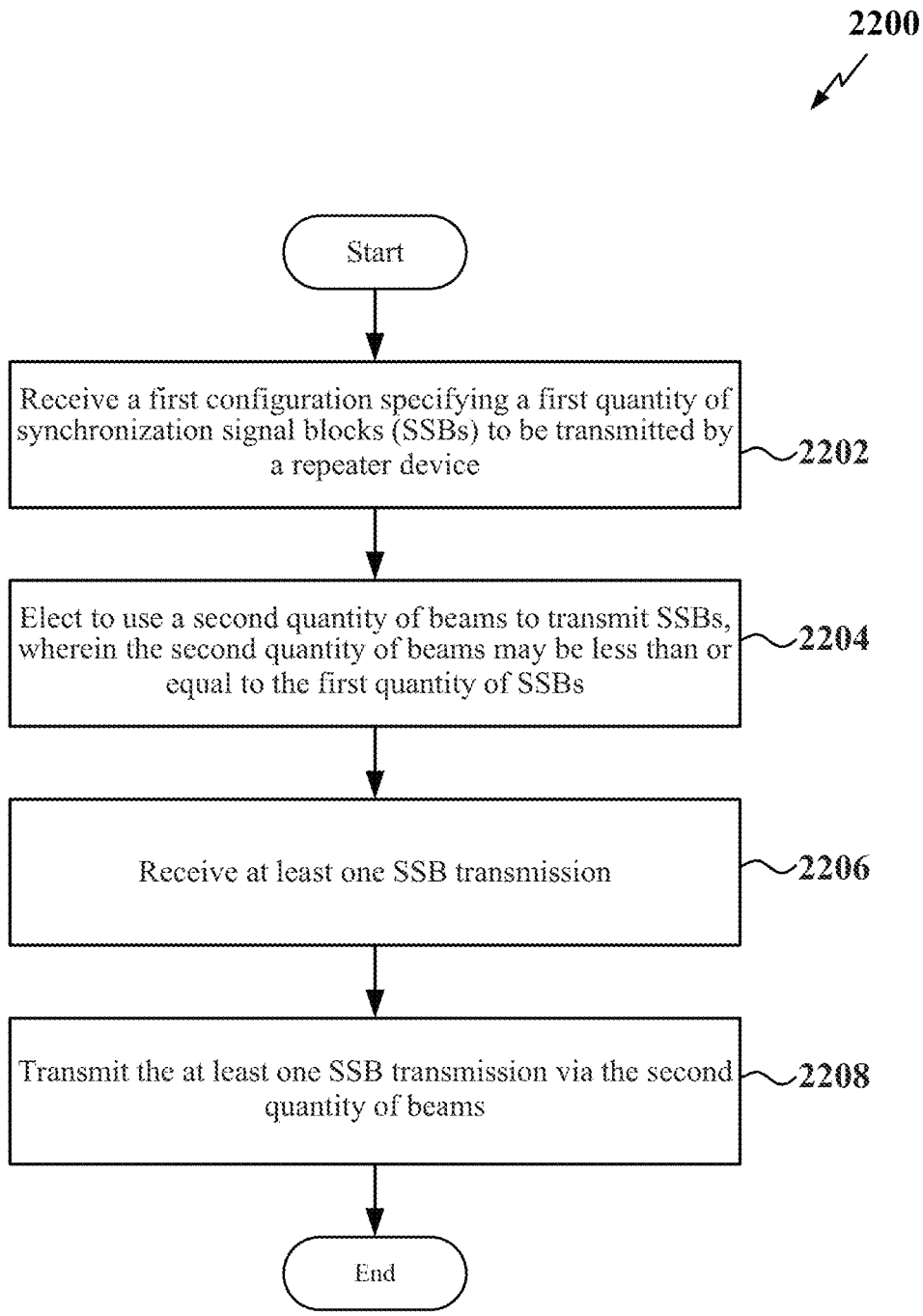
FIG. 22 is a flow chart illustrating an example process at a repeater device for communicating beam information in a wireless communication network according to some aspects of the disclosure.

FIG. 22 is a flow chart illustrating an example process 2200 (e.g., a method) at a repeater device for communicating beam information in a wireless communication network according to some aspects of the disclosure. As described below, some or all illustrated features may be omitted in a particular implementation within the scope of the present disclosure, and some illustrated features may not be required for implementation of all embodiments. In some examples, the process 2200 may be carried out by the repeater device 2100 illustrated in FIG. 21. In some examples, the process 2200 may be carried out by any suitable apparatus or means for carrying out the functions or algorithm described below.

At block 2202, a repeater device may receive a first configuration specifying a first quantity of synchronization signal blocks (SSBs) to be transmitted by the repeater device. For example, the beam configuration circuitry 2142 together with the communication and processing circuitry 2141 and the transceiver 2110, shown and described above in connection with FIG. 21, may receive an SSB configuration from a gNB and may provide a means for receiving a first configuration specifying a first quantity of synchronization signal blocks (SSBs) to be transmitted by the repeater device.

In some examples, the first configuration may include SSB indices. In some examples, the SSB indices may map to the resources to be used by the repeater device for SSB transmissions. In some examples, the SSB indices may map to beam information to be used by the repeater device for subsequent transmissions. In some examples, the beam information may include spatial quasi co-location information for the first quantity of SSBs.

At block 2204, the repeater device may elect to use a second quantity of beams to transmit SSBs, wherein the second quantity of beams may be less than or equal to the first quantity of SSBs. For example, the beam configuration circuitry 2142, shown and described above in connection with FIG. 21, may determine that it cannot support K SSBs. According to another example, the beam configuration circuitry 2142, shown and described above in connection with FIG. 21, may provide a means for electing to use the second quantity of beams to transmit SSBs, wherein the second quantity of beams may be less than or equal to the first quantity of SSBs.

In some examples, the electing to use the second quantity of beams to transmit SSBs may include determining the second quantity of beams based on how many beams the repeater device can generate. In some examples, the electing to use the second quantity of beams to transmit SSBs may include identifying beams that can be used by the repeater device to relay SSBs and determining the second quantity of beams based on the beams that can be used by the repeater device to relay SSBs. In some examples, the electing to use the second quantity of beams to transmit SSBs may include identifying beams that have been successfully used by the repeater device to communicate with at least one user equipment and determining the second quantity of beams based on the beams that have been successfully used by the repeater device to communicate with the at least one user equipment.

At block 2206, the wireless communication device may receive at least one SSB transmission. For example, the beam processing circuitry 2143 together with the communication and processing circuitry 2141 and the transceiver (e.g., RU) 2110, shown and described above in connection with FIG. 21, may receive an SSB on a fronthaul link. Furthermore, the beam processing circuitry 2143 together with the communication and processing circuitry 2141 and the transceiver (e.g., RU) 2110, shown and described above in connection with FIG. 21, may provide a means for receiving at least one SSB transmission.

At block 2208, the repeater device may transmit the at least one SSB transmission via the second quantity of beams. The repeater device may transmit the at least one SSB transmission via a relay unit (RU) of the repeater device. For example, the beam processing circuitry 2143 together with the communication and processing circuitry 2141 and the transceiver 2110, shown and described above in connection with FIG. 21, may forward an SSB on an access link or generate an SSB and transmit the SSB on the access link. Furthermore, the beam processing circuitry 2143 together with the communication and processing circuitry 2141 and the transceiver 2110, shown and described above in connection with FIG. 21, may provide a means for transmitting the at least one SSB transmission via the second quantity of beams.

In some examples, the at least one SSB transmission may include a plurality of SSB transmissions and transmitting the at least one SSB transmission may include sequentially relaying the plurality of SSB transmissions via the second quantity of beams. In some examples, at least one SSB transmission may include SSB information, and transmitting the at least one SSB transmission may include generating a plurality of SSB transmissions from the SSB information and transmitting the plurality of SSB transmissions via the second quantity of beams.

In some examples, the process 2200 may further include generating an indication that the repeater device will use the second quantity of beams to transmit SSBs and transmitting the indication to a network access node. In some examples, the process 2200 may further include receiving a second configuration after transmitting the indication, wherein the second configuration specifies a second quantity of SSBs to be used by the repeater device.

Figure 23:
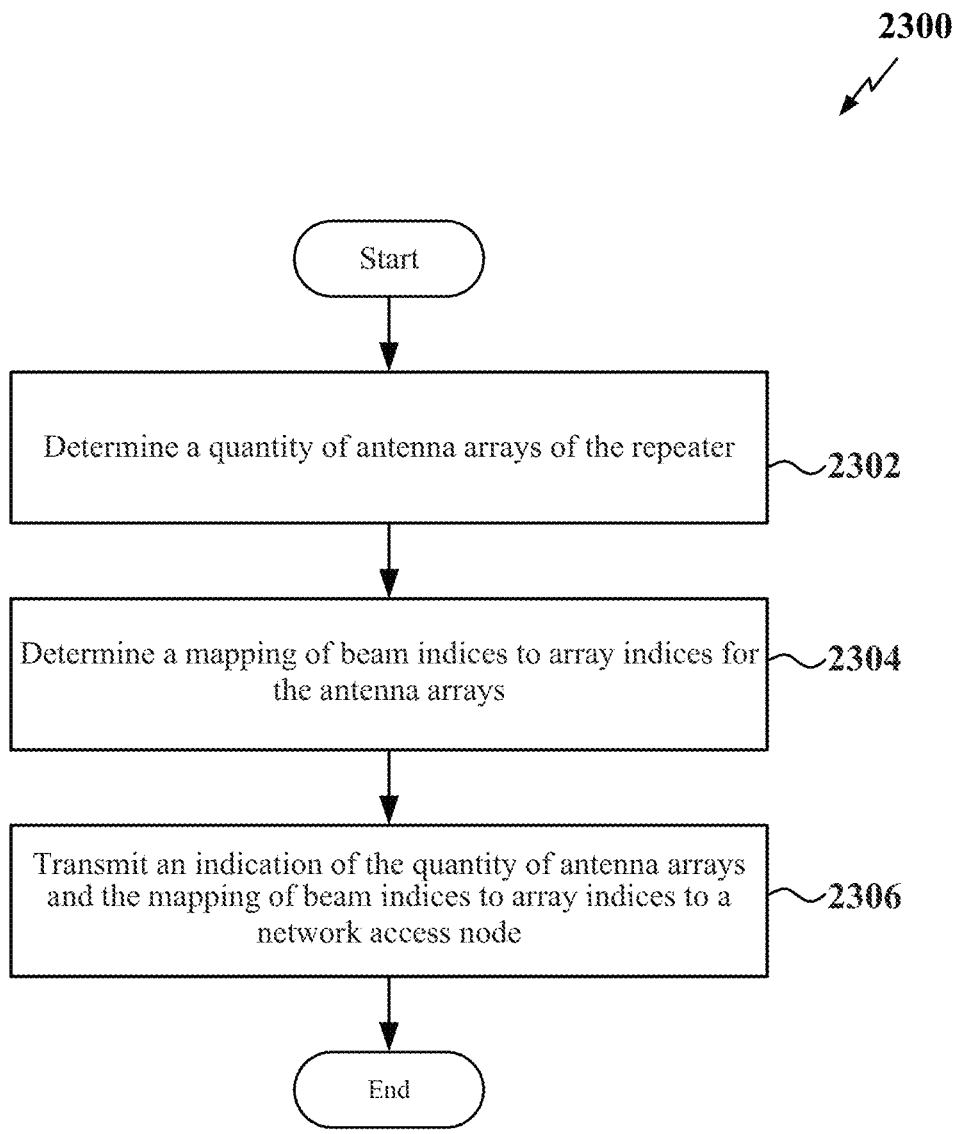
FIG. 23 is a flow chart illustrating an example process at a repeater device for communicating beam information in a wireless communication network according to some aspects of the disclosure.

FIG. 23 is a flow chart illustrating an example process 2300 (e.g., a method) at a repeater device for communicating beam information in a wireless communication network according to some aspects of the disclosure. As described below, some or all illustrated features may be omitted in a particular implementation within the scope of the present disclosure, and some illustrated features may not be required for implementation of all embodiments. In some examples, the process 2300 may be carried out by the repeater device 2100 illustrated in FIG. 21. In some examples, the process 2300 may be carried out by any suitable apparatus or means for carrying out the functions or algorithm described below.

At block 2302, a repeater device may determine a quantity of antenna arrays of the repeater device. For example, the beam configuration circuitry 2142, shown and described above in connection with FIG. 21, may access capability information for the repeater device. Furthermore, the beam configuration circuitry 2142, shown and described above in connection with FIG. 21, may provide a means for determining a quantity of antenna arrays of the repeater device.

At block 2304, the repeater device may determine a mapping of beam indices to array indices for the antenna arrays. For example, the beam configuration circuitry 2142, shown and described above in connection with FIG. 21, may access capability information and/or a current antenna array configuration for the repeater device. Furthermore, the beam configuration circuitry 2142, shown and described above in connection with FIG. 21, may provide a means for determining a mapping of beam indices to array indices for the antenna arrays.

At block 2306, the repeater device may transmit an indication of the quantity of antenna arrays and the mapping of beam indices to array indices to a network access node. For example, the beam configuration circuitry 2142 together with the communication and processing circuitry 2141 and the transceiver 2110, shown and described above in connection with FIG. 21, may transmit the indication via a fronthaul link to a gNB. Furthermore, the beam configuration circuitry 2142 together with the communication and processing circuitry 2141 and the transceiver 2110, shown and described above in connection with FIG. 21, may provide a means for transmitting an indication of the quantity of antenna arrays and the mapping of beam indices to array indices to a network access node.

In some examples, the process 2300 may further include identifying at least one pair of beams that cannot be used for relaying a transmission between the network access node and a user equipment and transmitting an indication of the at least one pair of beams to the network access node. In some examples, the relaying the transmission between the network access node and the user equipment may include concurrently receiving a first transmission from the network access node and transmitting the first transmission to the user equipment, or concurrently receiving a second transmission from the user equipment and transmitting the second transmission to the network access node.

In some examples, the identifying the at least one pair of beams may include identifying beams from a common antenna array of the antenna arrays. In some examples, the identifying the at least one pair of beams may include determining that the repeater device cannot transmit from a first antenna array of the antenna arrays while concurrently receiving from a second antenna array of the antenna arrays. In some examples, the process 2300 may further include conducting signal measurements while concurrently transmitting from the first antenna array and receiving from the second antenna array, wherein the determining that the repeater device cannot transmit from the first antenna array of the antenna arrays while concurrently receiving from the second antenna array of the antenna arrays is based on the signal measurements.

In some examples, the process 2300 may further include receiving a beam configuration from the network access node, determining whether all beam pairs from the beam configuration can be used for relaying a transmission between the network access node and a user equipment, generating an acknowledgement based on the determining whether all beam pairs from the beam configuration can be used for relaying the transmission, the acknowledgement indicating whether the beam configuration is supported by the repeater device, and transmitting the acknowledgment to the network access node.

In some examples, the process 2300 may further include receiving a first beam configuration from the network access node, determining that at least one pair of beams from the first beam configuration cannot be used for relaying a transmission between the network access node and a user equipment, and transmitting a negative acknowledgment to the network access node indicating that the first beam configuration is not supported by the repeater device. In some examples, the process 2300 may further include receiving a second beam configuration from the network access node after transmitting the negative acknowledgment.

Figure 24:
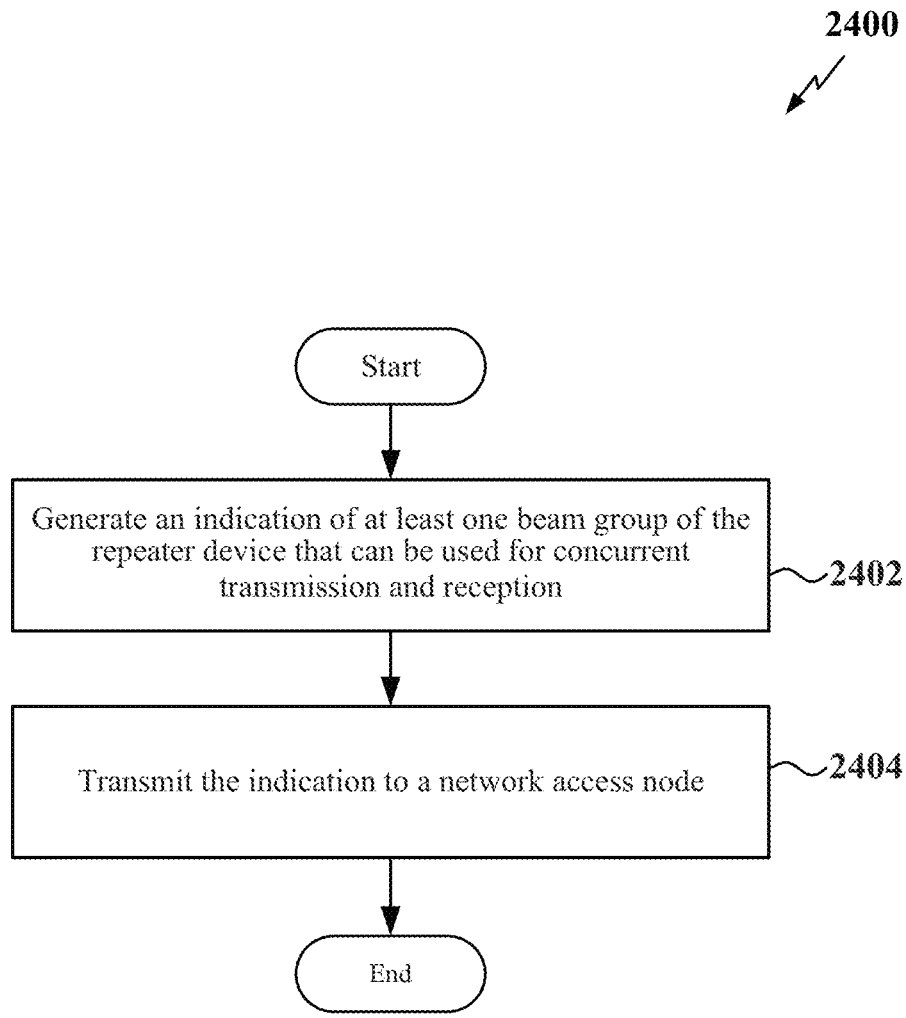
FIG. 24 is a flow chart illustrating an example process at a repeater device for communicating beam information in a wireless communication network according to some aspects of the disclosure.

FIG. 24 is a flow chart illustrating an example process 2400 (e.g., a method) at a repeater device for communicating beam information in a wireless communication network according to some aspects of the disclosure. As described below, some or all illustrated features may be omitted in a particular implementation within the scope of the present disclosure, and some illustrated features may not be required for implementation of all embodiments. In some examples, the process 2400 may be carried out by the repeater device 2100 illustrated in FIG. 21. In some examples, the process 2400 may be carried out by any suitable apparatus or means for carrying out the functions or algorithm described below.

At block 2402, a repeater device may generate an indication of at least one beam group of the repeater device that can be used for concurrent transmission and reception (or concurrent transmission or reception). For example, the beam configuration circuitry 2142, shown and described above in connection with FIG. 21, may determine which beam groups can be used for concurrent transmission and reception (or concurrent transmission or reception). Furthermore, the beam configuration circuitry 2142, shown and described above in connection with FIG. 21, may provide a means for generating the indication of at least one beam group of the repeater device that can be used for concurrent transmission and reception (or concurrent transmission or reception). In some examples, the indication may specify that a first beam group of the at least one beam group can be used for concurrent transmission and reception (or concurrent transmission or reception).

At block 2404, the repeater device may transmit the indication to a network access node. For example, the beam configuration circuitry 2142 together with the communication and processing circuitry 2141 and the transceiver 2110, shown and described above in connection with FIG. 21, may transmit the indication via a fronthaul link to a gNB. Furthermore, the beam configuration circuitry 2142 together with the communication and processing circuitry 2141 and the transceiver 2110, shown and described above in connection with FIG. 21, may provide a means for transmitting the indication to a network access node.

In some examples, the process 2400 may further include identifying the at least one beam group by identifying beams from different antenna arrays. In some examples, the process 2400 may further include conducting signal measurements while concurrently transmitting and receiving via the at least one beam group and identifying the at least one beam group based on the signal measurements.

In some examples, the process 2400 may further include receiving a beam configuration from the network access node, determining whether all beam groups from the beam configuration can be used for concurrently transmitting and receiving, generating an acknowledgement based on the determining whether all beam groups from the beam configuration can be used for concurrently transmitting and receiving, the acknowledgement indicating whether the beam configuration is supported by the repeater device, and transmitting the acknowledgment to the network access node.

In some examples, the process 2400 may further include receiving a first beam configuration from the network access node, determining that at least one beam group from the first beam configuration cannot be used for concurrently transmitting and receiving, and transmitting a negative acknowledgment to the network access node indicating that the first beam configuration is not supported by the repeater device. In some examples, the process 2400 may further include receiving a second beam configuration from the network access node after transmitting the negative acknowledgment.

In some examples, the process 2400 may further include transmitting connectivity information of at least one antenna array that supports the concurrent transmission and reception. In some examples, the connectivity information may include a MIMO repeater device configuration, a bi-directional MIMO repeater device configuration, or a single-input single-output (SISO) repeater device configuration. In some examples, the connectivity information may include at least one of: an indication of a quantity of antenna arrays at the repeater device, an indication of how the antenna arrays may be combined for beamforming, an indication of which of the antenna arrays can be combined for beamforming, an indication of which of the antenna arrays can be used for transmission, an indication of which of the antenna arrays can be used for reception, or a combination thereof.

Figure 25:
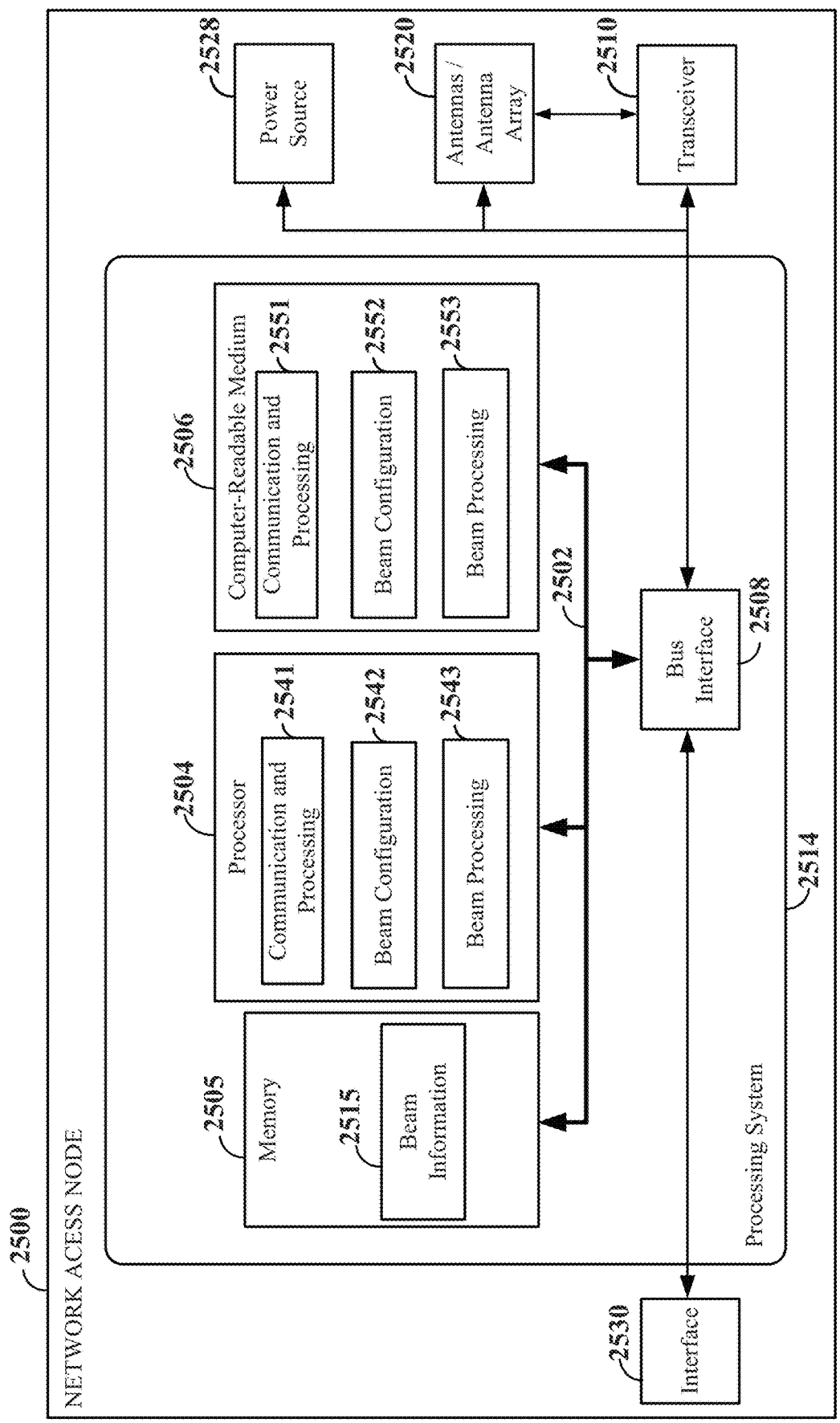
FIG. 25 is a schematic diagram illustrating an example of a hardware implementation of network access node employing a processing system according to some aspects of the disclosure.

FIG. 25 is a schematic diagram illustrating an example of a hardware implementation of network access node 2500 (e.g., a scheduling entity, a gNB, a base station) employing a processing system 2514 according to some aspects of the disclosure. For example, the network access node 2500 may be a device configured to wirelessly communicate with a scheduled entity (e.g., a UE, a wireless communication devices) as well as repeater devices and/or IAB nodes and may also be configured to communication with one or more core network nodes (e.g., a 5G core network node), as discussed in any one or more of FIGS. 1-55. In some implementations, the network access node 2500 may correspond to any of the network access nodes (e.g., scheduling entities, gNBs, base stations) shown in any of FIGS. 1, 2, 5-12, 14-17, 25, 29, 31, 37, and/or 39-44.

In accordance with various aspects of the disclosure, an element, or any portion of an element, or any combination of elements may be implemented with the processing system 2514. The processing system 2514 may include one or more processors 2504. The processing system 2514 may be substantially the same as the processing system 2114 illustrated in FIG. 21, including a bus interface 2508, a bus 2502, memory 2505, a processor 2504, and a computer-readable medium 2506. Furthermore, the network access node 2500 may include an interface 2530 (e.g., a network interface) that may provide a means for communicating with at least one other apparatus within a core network, with at least one radio access network, with at least one UE, with at least another network access node, with at least one repeater device, and/or with at least one IAB node.

The bus interface 2508 may provide an interface between the bus 2502 and a transceiver 2510 and between the bus 2502 and the interface 2530. The transceiver 2510 may further be coupled to one or more antennas/antenna array 2520. The transceiver 2510, in connection with the one or more antennas/antenna array 2520, may provide a communication interface 2530 or means for communicating with various other apparatus over a wireless transmission medium. The interface 2530 may provide a communication interface or means of communicating with various other apparatuses and devices (e.g., other devices housed within the same apparatus as the network access node or other external apparatuses) over an internal bus or external transmission medium, such as an Ethernet cable. Depending upon the nature of the apparatus, the interface 2530 may include a user interface (e.g., keypad, display, speaker, microphone, joystick, control features, etc.). Of course, such a user interface is optional, and may be omitted in some examples. In addition, the bus interface 2508 may further provide an interface between the bus 2502 and a power source 2528.

The network access node 2500 may be configured to perform any one or more of the operations described herein, for example, in conjunction with FIGS. 26-28, 36, 38, and/or 49-52. In some aspects of the disclosure, the processor 2504, as utilized in the network access node 2500, may include circuitry configured for various functions. The processor 2504 is responsible for managing the bus 2502 and general processing, including the execution of software stored on the computer-readable medium 2506. The software, when executed by the processor 2504, causes the processing system 2514 to perform the various functions described below for any particular apparatus. The computer-readable medium 2506 and the memory 2505 may also be used for storing data that is manipulated by the processor 2504 when executing software.

The processor 2504 may be configured to generate, schedule, and modify a resource assignment or grant of time-frequency resources (e.g., a set of one or more resource elements). For example, the processor 2504 may schedule time-frequency resources within a plurality of time division duplex (TDD) and/or frequency division duplex (FDD) subframes, slots, and/or mini-slots to carry user data traffic and/or control information to and/or from multiple repeater devices.

The processor 2504 may be configured to schedule resources for the transmission of a downlink signal. The downlink signal may include, for example, a PDCCH, a PDSCH, a CSI-RS, or a DMRS. The processor 2504 may further be configured to schedule resources that may be utilized by a repeater device to transmit an uplink signal. The uplink signal may include, for example, a PUCCH, a PUSCH, an SRS, a DMRS, or a PRACH. The processor 2504 may further be configured to schedule resources that may be utilized by a repeater device to transmit and/or receive a sidelink signal.

In some aspects of the disclosure, the processor 2504 may include communication and processing circuitry 2541. The communication and processing circuitry 2544 may be configured for various functions, including, for example, communicating with a user equipment (UE), a repeater device, or other wireless communication device, a network core (e.g., a 5G core network), other network access nodes or scheduling entities, or any other entity, such as, for example, local infrastructure or an entity communicating with the network access node 3500 via the Internet, such as a network provider. The communication and processing circuitry 2541 may include one or more hardware components that provide the physical structure that performs various processes related to wireless communication (e.g., signal reception and/or signal transmission) as described herein. The communication and processing circuitry 2541 may further include one or more hardware components that provide the physical structure that performs various processes related to signal processing (e.g., processing a received signal and/or processing a signal for transmission) as described herein. In addition, the communication and processing circuitry 2541 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 2541 may further be configured to interact with the transceiver 2510 to encode and transmit a downlink signal. The communication and processing circuitry 2541 may further be configured to interact with the transceiver 2510 to monitor for and decode an uplink signal. The communication and processing circuitry 2541 may further be configured to execute communication and processing software 2551 included on the computer-readable medium 2506 to implement one or more functions described herein.

In some examples, the communication and processing circuitry 2541 may be configured to receive and process uplink beamformed signals at a mmWave frequency or a sub-6 GHz frequency via the transceiver 2510 and an antenna array 2520. For example, the communication and processing circuitry 2541 may be configured to receive a respective reference signal (e.g., SRS or DMRS) on each of a plurality of uplink beams from the repeater device during an uplink beam sweep.

In some examples, the communication and processing circuitry 2541 may further be configured to generate and transmit downlink beamformed signals at a mmWave frequency or a sub-6 GHz frequency via the transceiver 2510 and the antenna array 2520. For example, the communication and processing circuitry 2541 may be configured to transmit a respective downlink reference signal (e.g., SSB or CSI-RS) on each of a plurality of downlink beams to the repeater device during a downlink beam sweep via at least one first antenna panel of the antenna array 2520. The communication and processing circuitry 2541 may further be configured to receive a beam measurement report from the repeater device.

The communication and processing circuitry 2541 may further be configured to receive an uplink signal on one or more uplink receive beams via one or more uplink transmit beams applied to the uplink signal. For example, the communication and processing circuitry 2541 may be configured to receive the uplink signal on one or more uplink receive beams via at least one second antenna panel of the antenna array 2520. The uplink signal may include, for example, a PUCCH, PUSCH, SRS, DMRS, or PRACH.

The communication and processing circuitry 2541 may further be configured to control the antenna array 2520 and transceiver 2510 to generate a plurality of downlink transmit beams during a downlink beam sweep. The communication and processing circuitry 2541 may further be configured to receive a beam measurement report from the repeater device using the communication and processing circuitry 2544. The communication and processing circuitry 2541 may further be configured to identify one or more selected uplink beam(s) based on the beam measurements. In some examples, the communication and processing circuitry 2541 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 2541 may be configured to receive one or more uplink transmit beams in an uplink beam sweep. Each uplink transmit beam may carry an uplink reference signal (e.g., an SRS) for measurement by the communication and processing circuitry 2541. The communication and processing circuitry 2541 may further be configured to obtain a plurality of beam measurements on each of a plurality of uplink receive beams of the antenna array 2520 for each of the uplink transmit beams. The communication and processing circuitry 2541 may further be configured to select the selected uplink transmit beam(s) and corresponding uplink receive beams forming respective uplink BPLs based on the uplink beam measurements.

In some implementations where the communication involves receiving information, the communication and processing circuitry 2541 may obtain information from a component of the network access node 2500 (e.g., from the transceiver 2510 that receives the information via radio frequency signaling or some other type of signaling suitable for the applicable communication medium), process (e.g., decode) the information, and output the processed information. For example, the communication and processing circuitry 2541 may output the information to another component of the processor 2504, to the memory 2505, or to the bus interface 2508. The information may include beam information 2515 that may be stored in the memory 2505, for example. In some examples, the communication and processing circuitry 2541 may receive one or more of signals, messages, other information, or any combination thereof. In some examples, the communication and processing circuitry 2541 may receive information via one or more channels. In some examples, the communication and processing circuitry 2541 may include functionality for a means for receiving.

In some implementations where the communication involves sending (e.g., transmitting) information, the communication and processing circuitry 2541 may obtain information (e.g., from another component of the processor 2504, the memory 2505, or the bus interface 2508), process (e.g., encode) the information, and output the processed information. For example, the communication and processing circuitry 2541 may output the information to the transceiver 2510 (e.g., that transmits the information via radio frequency signaling or some other type of signaling suitable for the applicable communication medium). In some examples, the communication and processing circuitry 2541 may send one or more of signals, messages, other information, or any combination thereof. In some examples, the communication and processing circuitry 2541 may send information via one or more channels. In some examples, the communication and processing circuitry 2541 may include functionality for a means for sending (e.g., means for transmitting).

The processor 2504 may include beam configuration circuitry 2542 configured to perform beam configuration-related operations as discussed herein. The beam configuration circuitry 2542 may further be configured to provide the functionality of a means for generating a configuration. The beam configuration circuitry 2542 may further be configured to provide the functionality of a means for transmitting a configuration. The beam configuration circuitry 2542 may further be configured to provide the functionality of a means for determining that a repeater device is transmitting on less than all of a quantity of SSBs. The beam configuration circuitry 2542 may further be configured to provide the functionality of a means for receiving an indication. The beam configuration circuitry 2542 may further be configured to provide the functionality of a means for selecting a beam configuration. The beam configuration circuitry 2542 may further be configured to provide the functionality of a means for identifying a beam group. The beam configuration circuitry 2542 may further be configured to provide the functionality of a means for transmitting an indication. The beam configuration circuitry 2542 may further be configured to execute beam configuration software 2552 included on the computer-readable medium 2506 to implement one or more functions described herein.

The processor 2504 may include beam processing circuitry 2543 configured to perform beam processing-related operations as discussed herein. The beam processing circuitry 2543 may further be configured to provide the functionality of a means for transmitting an SSB transmission. The beam processing circuitry 2543 may further be configured to provide the functionality of a means for transmitting a beam configuration. The beam processing circuitry 2543 may further be configured to execute beam processing software 2553 included on the computer-readable medium 2506 to implement one or more functions described herein.

Figure 26:
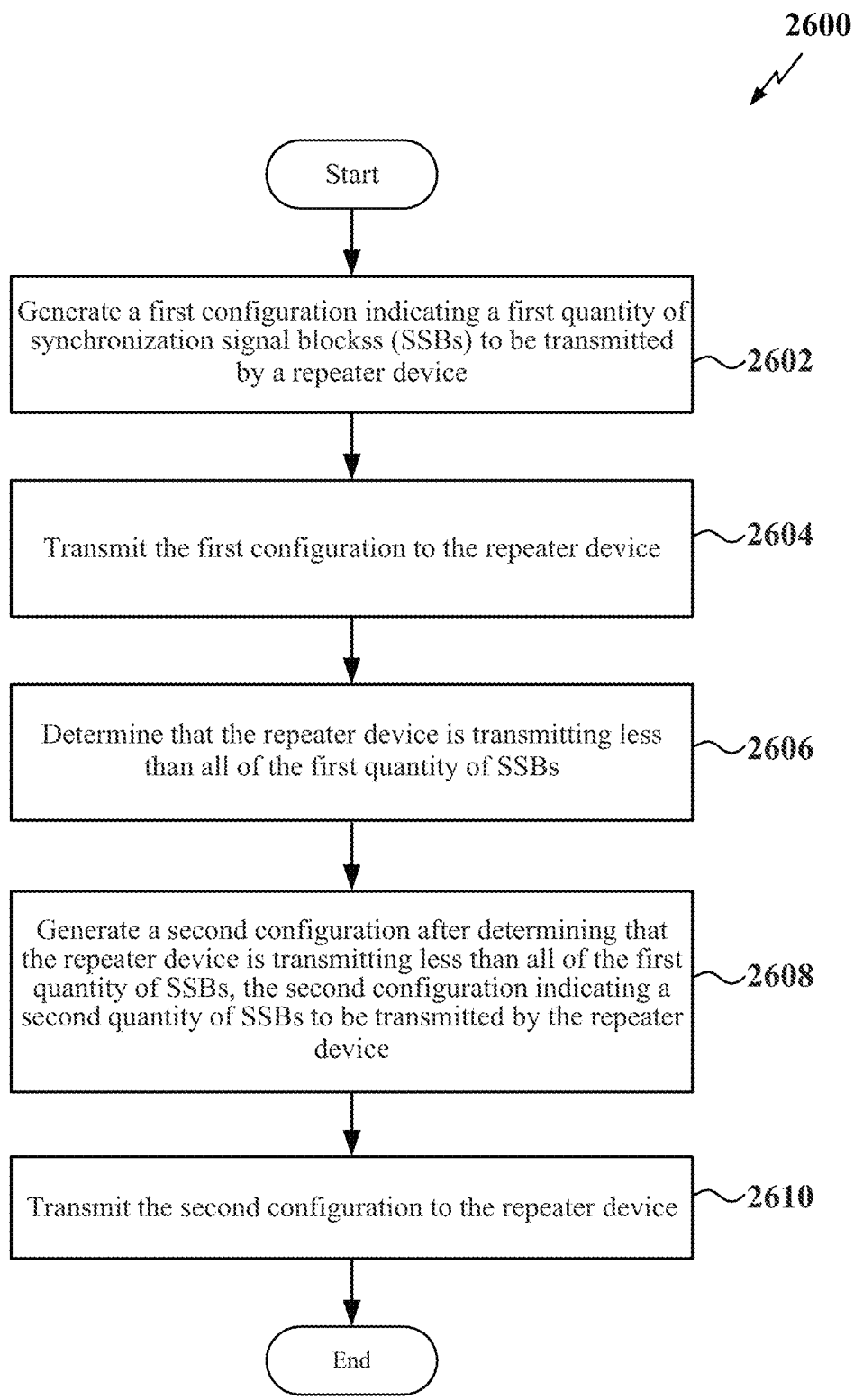
FIG. 26 is a flow chart illustrating an example process at a network access node for communicating beam information in a wireless communication network according to some aspects of the disclosure.

FIG. 26 is a flow chart illustrating an example process 2600 (e.g., a method) at a network access node for communicating beam information in a wireless communication network according to some aspects of the disclosure. As described below, some or all illustrated features may be omitted in a particular implementation within the scope of the present disclosure, and some illustrated features may not be required for implementation of all embodiments. In some examples, the process 2600 may be carried out by the network access node 2500 illustrated in FIG. 25. In some examples, the process 2600 may be carried out by any suitable apparatus or means for carrying out the functions or algorithm described below.

At block 2602, a network access node may generate a first configuration indicating a first quantity of synchronization signal blocks (SSBs) to be transmitted by a repeater device. For example, the beam configuration circuitry 2542, shown and described above in connection with FIG. 25, may select a set of SSBs to be transmitted by the repeater device. Furthermore, the beam configuration circuitry 2542, shown and described above in connection with FIG. 25, may provide a means for generating the first configuration indicating the first quantity of synchronization signal blocks (SSBs) to be transmitted by the repeater device.

In some examples, the first configuration may include SSB indices. In some examples, the SSB indices may map to beam information that may be used by the repeater device for subsequent transmissions. In some examples, the beam information may include spatial quasi co-location information for the first quantity of SSBs.

At block 2604, the network access node may transmit the first configuration to the repeater device. For example, the beam configuration circuitry 2542 together with the communication and processing circuitry 2541 and the transceiver 2510, shown and described above in connection with FIG. 25, may transmit the configuration to an MT of the repeater device via a fronthaul link. Furthermore, the beam configuration circuitry 2542 together with the communication and processing circuitry 2541 and the transceiver 2510, shown and described above in connection with FIG. 25, may provide a means for transmitting the first configuration to the repeater device.

In some examples, the process 2600 may further include transmitting at least one SSB transmission to the repeater device after transmitting the first configuration.

At block 2606, the network access node may determine that the repeater device is transmitting less than all of the first quantity of SSBs. For example, the beam configuration circuitry 2542, shown and described above in connection with FIG. 25, may determine that a received K'<K, that Msg1s are not being received on some beams, etc. Furthermore, the beam configuration circuitry 2542, shown and described above in connection with FIG. 25, may provide a means for determining that the repeater device is transmitting less than all of the first quantity of SSBs.

In some examples, the determining that the repeater device is transmitting less than all of the first quantity of SSBs may include receiving an indication that the repeater device is using a second quantity of beams to transmit SSBs. In some examples, determining that the repeater device is transmitting less than all of the first quantity of SSBs may include determining that there is no communication with a user equipment on at least one beam associated with the first quantity of SSBs. In some examples, the determining that the repeater device is transmitting less than all of the first quantity of SSBs may include determining that random access messages are not being received on at least one random access channel (RACH) occasion with the first quantity of SSBs.

At block 2608, the network access node may generate a second configuration after determining that the repeater device is transmitting less than all of the first quantity of SSBs, the second configuration indicating a second quantity of SSBs to be transmitted by the repeater device. For example, the beam configuration circuitry 2542, shown and described above in connection with FIG. 25, may select a second set of SSBs (e.g., a smaller set of SSBs) to be transmitted by the repeater device. Furthermore, the beam configuration circuitry 2542, shown and described above in connection with FIG. 25, may provide a means for generating the second configuration after determining that the repeater device is transmitting less than all of the first quantity of SSBs, the second configuration indicating the second quantity of SSBs to be transmitted by the repeater device.

At block 2610, the network access node may transmit the second configuration to the repeater device. For example, the beam configuration circuitry 2542 together with the communication and processing circuitry 2541 and the transceiver 2510, shown and described above in connection with FIG. 25, may transmit the configuration to an MT of the repeater device via a fronthaul link. Furthermore, the beam configuration circuitry 2542 together with the communication and processing circuitry 2541 and the transceiver 2510, shown and described above in connection with FIG. 25, may provide a means for transmitting the second configuration to the repeater device.

In some examples, the process 2600 may further include receiving capability information from the repeater device, estimating a quantity of beams supported by the repeater device based on the capability information, and determining the first quantity of SSBs based on the quantity of beams supported by the repeater device. In some examples, the capability information may include at least one of: a maximum number of configured transmission configuration indicator (TCI) states per component carrier, a maximum number of configured spatial relations, a maximum number of sounding reference signal (SRS) resource sets, a maximum number of SRS resources per set, or a combination thereof.

Figure 27:
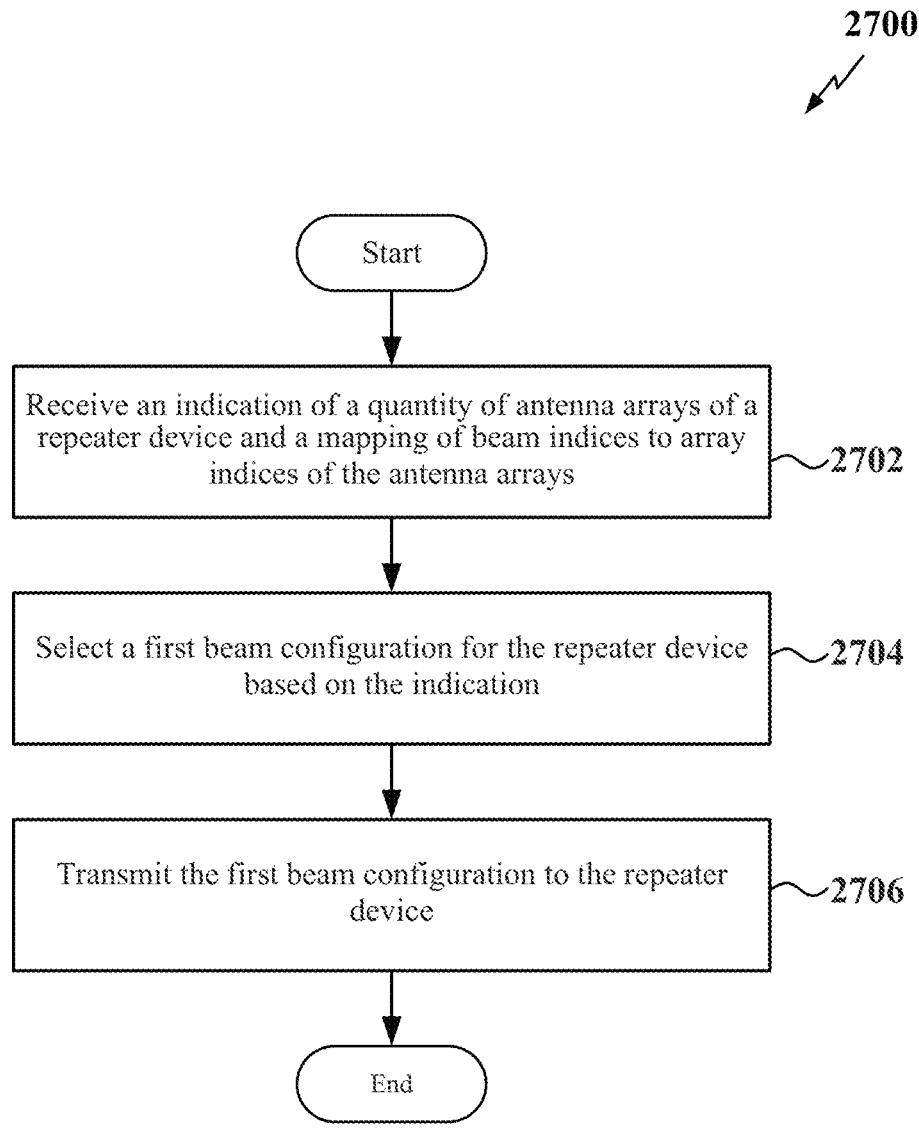
FIG. 27 is a flow chart illustrating an example process at a network access node for communicating beam information in a wireless communication network according to some aspects of the disclosure.

FIG. 27 is a flow chart illustrating an example process 2700 (e.g., a method) at a network access node for communicating beam information in a wireless communication network according to some aspects of the disclosure. As described below, some or all illustrated features may be omitted in a particular implementation within the scope of the present disclosure, and some illustrated features may not be required for implementation of all embodiments. In some examples, the process 2700 may be carried out by the network access node 2500 illustrated in FIG. 25. In some examples, the process 2700 may be carried out by any suitable apparatus or means for carrying out the functions or algorithm described below.

At block 2702, a network access node may receive an indication of a quantity of antenna arrays of a repeater device and a mapping of beam indices to array indices of the antenna arrays. For example, the beam configuration circuitry 2542 together with the communication and processing circuitry 2541 and the transceiver 2510, shown and described above in connection with FIG. 25, may receive capability information or configuration information from an MT of the repeater device via a fronthaul link. Furthermore, the beam configuration circuitry 2542 together with the communication and processing circuitry 2541 and the transceiver 2510, shown and described above in connection with FIG. 25, may provide a means for receiving an indication of the quantity of antenna arrays of the repeater device and the mapping of beam indices to array indices of the antenna arrays.

At block 2704, the network access node may select a first beam configuration for the repeater device based on the indication. For example, the beam configuration circuitry 2542, shown and described above in connection with FIG. 25, may select a set of SSBs to be transmitted by the repeater device. Furthermore, the beam configuration circuitry 2542, shown and described above in connection with FIG. 25, may provide a means for selecting the first beam configuration for the repeater device based on the indication.

At block 2706, the network access node may transmit the first beam configuration to the repeater device. For example, the beam configuration circuitry 2542 together with the communication and processing circuitry 2541 and the transceiver 2510, shown and described above in connection with FIG. 25, may transmit the configuration to an MT of the repeater device via a fronthaul link. Furthermore, the beam configuration circuitry 2542 together with the communication and processing circuitry 2541 and the transceiver 2510, shown and described above in connection with FIG. 25, may provide a means for transmitting the first beam configuration to the repeater device.

In some examples, the process 2700 may further include identifying at least one pair of beams that cannot be used by the repeater device for relaying a transmission between the network access node and a user equipment, wherein the identifying the at least one pair of beams is based on the indication, wherein selecting the first beam configuration may include abstaining from including the at least one pair of beams in the first beam configuration. In some examples, the identifying the at least one pair of beams may include identifying beams from a common antenna array of the antenna arrays based on the indication.

In some examples, the identifying the at least one pair of beams may include determining that the repeater device cannot transmit from a first antenna array of the antenna arrays while concurrently receiving from a second antenna array of the antenna arrays. In some examples, the process 2700 may further include conducting a signal measurement while the repeater device is concurrently transmitting from the first antenna array and receiving from the second antenna array, wherein the determining that the repeater device cannot transmit from the first antenna array of the antenna arrays while concurrently receiving from the second antenna array of the antenna arrays may be based on the signal measurement.

In some examples, the process 2700 may further include receiving a measurement report from a user equipment based on a signal measurement by the user equipment while the repeater device is concurrently transmitting from the first antenna array and receiving from the second antenna array, wherein the determining that the repeater device cannot transmit from the first antenna array of the antenna arrays while concurrently receiving from the second antenna array of the antenna arrays is based on the measurement report.

In some examples, the process 2700 may further include receiving an acknowledgment from the repeater device indicating whether the first beam configuration is supported by the repeater device. In some examples, the process 2700 may further include receiving a negative acknowledgment from the repeater device indicating that the first beam configuration is not supported by the repeater device. In some examples, the process 2700 may further include selecting a second beam configuration for the repeater device after receiving the negative acknowledgment and transmitting the second beam configuration to the repeater device.

Figure 28:
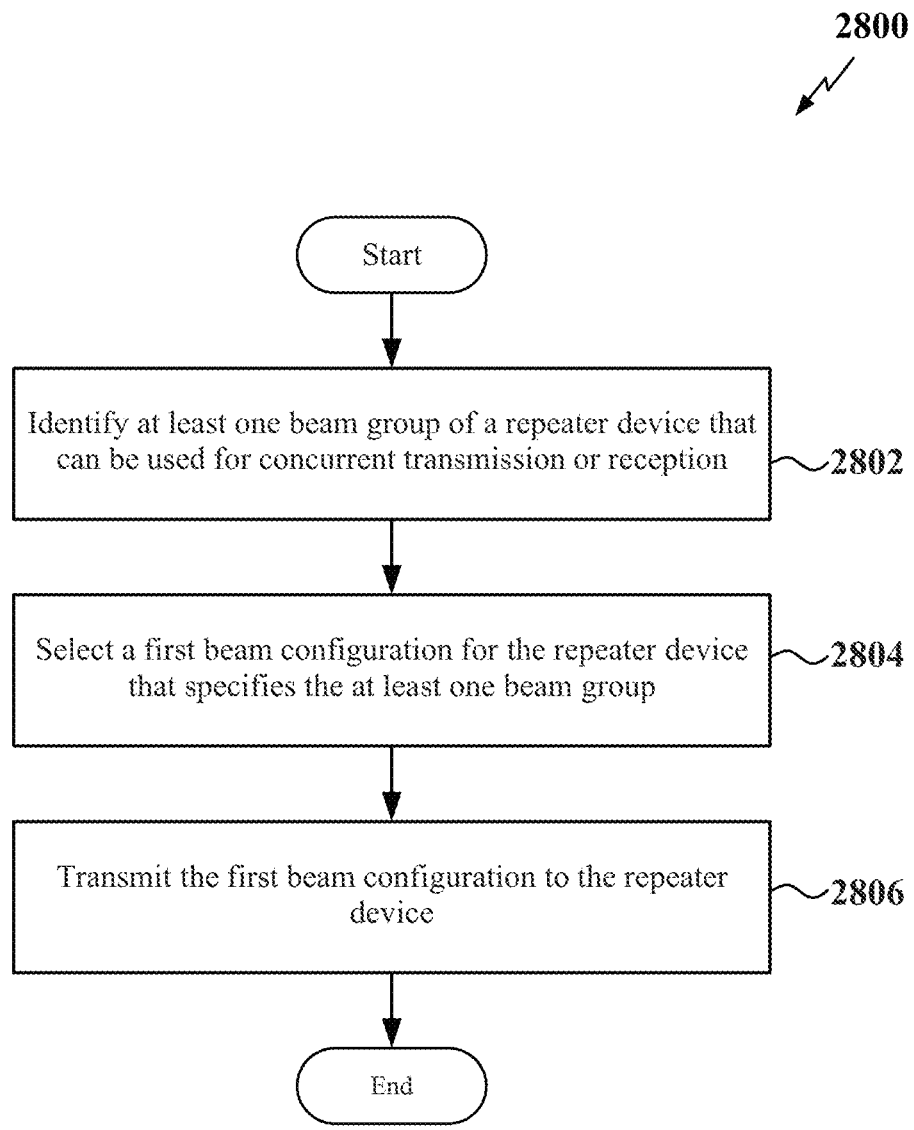
FIG. 28 is a flow chart illustrating an example process at a network access node for communicating beam information in a wireless communication network according to some aspects of the disclosure.

FIG. 28 is a flow chart illustrating an example process 2800 (e.g., a method) at a network access node for communicating beam information in a wireless communication network according to some aspects of the disclosure. As described below, some or all illustrated features may be omitted in a particular implementation within the scope of the present disclosure, and some illustrated features may not be required for implementation of all embodiments. In some examples, the process 2800 may be carried out by the network access node 2500 illustrated in FIG. 25. In some examples, the process 2800 may be carried out by any suitable apparatus or means for carrying out the functions or algorithm described below.

At block 2802, a network access node may identify at least one beam group of a repeater device that can be used for concurrent transmission or reception. For example, the beam configuration circuitry 2542, shown and described above in connection with FIG. 25, may receive an indication of the at least one beam group from the repeater device, identify the at least one beam group based on configuration information received from the repeater device, or identify the at least one beam group based on signal measurements or measurement reports. Furthermore, the beam configuration circuitry 2542, shown and described above in connection with FIG. 25, may provide a means for identifying at least one beam group of a repeater device that can be used for concurrent transmission or reception.

In some examples, the identifying the at least one beam group may include receiving an indication of the at least one beam group from the repeater device. In some examples, the indication may specify that a first beam group of the at least one beam group can be used for concurrent transmission and reception. In some examples, the identifying the at least one beam group may include identifying beams from different antenna arrays of the repeater device.

At block 2804, the network access node may select a first beam configuration for the repeater device that specifies the at least one beam group. For example, the beam configuration circuitry 2542, shown and described above in connection with FIG. 25, may select a set of SSBs to be transmitted by the repeater device. Furthermore, the beam configuration circuitry 2542, shown and described above in connection with FIG. 25, may provide a means for selecting the first beam configuration for the repeater device that specifies the at least one beam group.

At block 2806, the network access node may transmit the first beam configuration to the repeater device. For example, the beam configuration circuitry 2542 together with the communication and processing circuitry 2541 and the transceiver 2510, shown and described above in connection with FIG. 25, may transmit the configuration to an MT of the repeater device via a fronthaul link. Furthermore, the beam configuration circuitry 2542 together with the communication and processing circuitry 2541 and the transceiver 2510, shown and described above in connection with FIG. 25, may provide a means for transmitting the first beam configuration to the repeater device.

In some examples, the process 2800 may further include conducting signal measurements while the repeater device is concurrently transmitting and receiving via the at least one beam group, wherein the identifying the at least one beam group is based on the signal measurements.

In some examples, the process 2800 may further include receiving an acknowledgment from the repeater device indicating whether the first beam configuration is supported by the repeater device. In some examples, the process 2800 may further include receiving a negative acknowledgment from the repeater device indicating that the first beam configuration is not supported by the repeater device. In some examples, the process 2800 may further include selecting a second beam configuration for the repeater device after receiving the negative acknowledgment and transmitting the second beam configuration to the repeater device.

In some examples, the process 2800 may further include receiving connectivity information of at least one antenna array that supports the concurrent transmission and reception, wherein the selecting the first beam configuration for the repeater device is based on the connectivity information. In some examples, the connectivity information may include a multiple-input multiple-output (MIMO) repeater device configuration, a bi-directional MIMO repeater device configuration, or a single-input single-output (SISO) repeater device configuration. In some examples, the connectivity information may include at least one of: an indication of a quantity of antenna arrays at the repeater device, an indication of how the antenna arrays may be combined for beamforming, an indication of which of the antenna arrays can be combined for beamforming, an indication of which of the antenna arrays can be used for transmission, an indication of which of the antenna arrays can be used for reception, or a combination thereof.

Accordingly, and by way of summary, Initially, a DU of a network access node (e.g., a gNB) may configure an RU of a repeater device to send or repeat K SSBs. For example, the DU may send an SSB index to the repeater device that indicates which SSBs the DU is to transmit. Here, each SSB index is associated with corresponding spatial quasi co-location (QCL) information indicative of the beam to be used for transmitting the corresponding SSB.

In implementations where the repeater device does not include store and forward functionality, the network access node may transmit each SSB to the repeater device. As each SSB is received, the repeater device relays the SSB using a corresponding designated beam.

In implementations where the repeater device includes store and forward functionality, the network access node may transmit one set of SSB information to the repeater device. The repeater device may then successively transmit SSBs (based on the SSB information) using a corresponding designated beam for each transmission.

In some examples, these K SSBs may be used as (spatial QCL) references for other communication by the RU. For example, the network access node may indicate a particular SSB index for a subsequent transmission (e.g., a data transmission). In this case, the RU will be configured to use the same beam for the transmission as was used for the corresponding SSB.

The network access node may select the initial quantity K in different ways in different examples. As one example, the network access node may select the K parameter based on expected traffic in the area of the repeater device (e.g., based on current or historical scheduling). As another example, the network access node may select the K parameter based on historical information about repeater devices (e.g., a typical number of beams supported). Other techniques for selecting the initial parameter K may be used in other examples.

In some scenarios, upon receiving the parameter K, the repeater device may determine that it can only support K' beams for transmitting SSBs where K'<=K. For example, the repeater device might not have sufficient resources (e.g., an insufficient number of antenna arrays, an insufficient number of antenna elements, an insufficient number of transmit chains and/or receive chains, insufficient processing capability, etc.) to transmit K SSBs. As another example, the repeater device may determine that not all of the beams may be used for a relaying function. For example, cross beam interference or other interference may limit the number of beams the repeater device can currently use. As another example, a beam used for a fronthaul link may be unusable for relaying SSBs. In any of these cases, the repeater device may select K' of the K SSBs (where K'<K) and transmit those K' SSBs.

In some examples where K'<K, the repeater device may inform the network access node that the repeater device has elected to used K' beams. For example, the repeater device may send an indication of the parameter K' to the network access node (e.g., via a UCI, an RRC message, a medium access control element (MAC-CE), or some other suitable signaling). The network access node may then reconfigure the repeater device with a smaller number of SSBs.

In other examples, the repeater device might not inform the network access node that the repeater device has elected to used K'<K beams. In this case, the network access node may determine that some of the assigned SSBs are not being used and/or are not helping communication performance. The network access node may then reconfigure the repeater device with a smaller number of SSBs.

The network access node may determine that some of the assigned SSBs are not being used by the repeater device and/or are not helping communication performance in different ways in different examples.

In some examples, a network access node may monitor RACH occasions associated with the beams to determine whether a beam is not being used by the repeater device or to determine whether the signal quality associated with the beam is relatively poor. For example, if the network access node has not received any random access preambles (e.g., Msg1) on a beam (e.g., over a period of time), the network access node may infer that the repeater device is not using that beam. As another example, if the network access node has received relatively few (e.g., less than a threshold quantity) random access preambles (e.g., Msg1) on a beam (e.g., over a period of time), the network access node may infer that the signal quality associated with the beam is poor. In either case, the network access node may drop the corresponding SSB from the beam configuration for the repeater device.

In some examples, a network access node may measure signals associated with transmissions by the repeater device and/or transmissions by UEs being served through the repeater device. If these measurements indicate that the signal quality associated with certain beams is relatively poor (e.g., below a threshold quality), the network access node may drop the corresponding SSBs from the beam configuration for the repeater device.

In some examples, a network access node may monitor measurement reports from UEs being served through the repeater device. If these measurement reports indicate that the signal quality associated with certain beams is relatively poor (e.g., below a threshold quality), the network access node may drop the corresponding SSBs from the beam configuration for the repeater device.

In some examples (e.g., if the MT and RU share fronthaul resources), a network access node may estimate beam information of a repeater device based on the MT's capability signaling. For example, to infer how many beams an RU can generate/support, a network access node may monitor one or more of a maxNumberConfiguredTCIstatesPerCC parameter, a maxNumberConfiguredSpatialRelations parameter, a maxNumberSRS-ResourceSet parameter, a maxNumberSRS-ResourcePerSet-BM parameter, or a combination of two or more of these or other suitable parameters. Here, in general, the parameters to be monitored may include those where there is a relationship between the magnitude of the parameter and the number of beams supported by the repeater device.

The disclosure relates in some aspect to a repeater device indicating to a network access node the number of arrays at the repeater device and/or a mapping of beam indices to the array indices. For example, the repeater device may send this information in a capabilities message or dynamically (e.g., in a UCI, an RRC message, a MA-CE, etc.). This information may be sent with other information such as the number of beams the repeater device can generate on the service side, the number of layers (e.g., coarse, fine, finer, etc.) supported by the repeater device, a mapping of beam indices to layer indices, and spatial QCL information among beams.

The disclosure relates in some aspect to a repeater device indicating to a network access node the pairs of beams that cannot be used for a repeating operation. For example, the repeater device may send this information in a capabilities message or dynamically (e.g., in a UCI, an RRC message, a MAC-CE, etc.).

The repeater device may identify the beam pairs that cannot be used for a repeating operation in different ways in different examples. In some examples, a default assumption may be that beams on the same array may not be used for simultaneous transmission and reception (e.g., full duplex operation). As another example, there may restrictions for multi-array antennas (e.g., the repeater device cannot receive from array X and forward on array Y). As yet another example, the repeater device may conduct measurements to determine which beam combinations do not work or are not reliable (e.g., due to interference, a permanent beam blocking obstacle, a transitory obstacle, and so on).

In some examples, (e.g., if the repeater device does not provide the above information), the network access node (e.g., DU) may determine this information based on repeater device configuration information, signal measurements, or feedback from a repeater device. For example, the network access node may determine based on antenna array information for the repeater device that the base has obtained that a pair of beams are on the same array. As another example, based on RACH messaging, signal measurements, or measurement reports (e.g., as discussed above), a network access node may determine that a particular beam combination is not working or provides poor communication quality (e.g., below a threshold quality). As yet another example, upon receiving a beam configuration from the network access node, the repeater device may send back an acknowledgement indicating whether the configuration is supported (e.g., currently supported) by the repeater device. For example, if the configuration specifies a beam pair for simultaneous transmission and reception that the repeater device has determined is unsuitable for simultaneous transmission and reception, the repeater device may send a negative acknowledgment (NAK) to the network access node. Otherwise, the repeater device may send a positive acknowledgment (ACK) to the network access node. In any of the above cases, upon determining that a beam pair of the repeater device cannot be used for an intended purpose, the network access node may refrain from including that beam pair in a beam configuration for the repeater device.

The disclosure relates in some aspect to a repeater device indicating to a network access node the groups of beams that can be used for simultaneous transmission and/or simultaneous reception (e.g., including carrier aggregation and/or full duplex operation). For example, the repeater device may send this information in a capabilities message or dynamically (e.g., in a UCI, an RRC message, a MAC-CE, etc.).

The repeater device may identify the groups of beams that can or cannot be used for simultaneous transmission and/or reception in different ways in different examples. In some examples, a default assumption may be that beams on the different arrays may be used for simultaneous transmission and reception. As another example, there may restrictions for multi-array antennas (e.g., the repeater device cannot receive from array X and forward on array Y). As yet another example, the repeater device may conduct measurements to determine which beam groups do not work or are not reliable (e.g., due to interference, a permanent beam blocking obstacle, a transitory obstacle, and so on).

In some examples, (e.g., if the repeater device does not provide the above information), the network access node (e.g., DU) may determine this information based on repeater device configuration information, signal measurements, or feedback from a repeater device. For example, the network access node may determine based on antenna array information for the repeater device that the network access node has obtained that a group of beams are on different arrays. As another example, based on RACH messaging, signal measurements, or measurement reports (e.g., as discussed above), a network access node may determine that a particular beam group is not working or provides poor communication quality (e.g., below a threshold quality). As yet another example, upon receiving a beam configuration from the network access node, the repeater device may send back an acknowledgement indicating whether the configuration is supported (e.g., currently supported) by the repeater device. For example, if the configuration specifies a group of beams for simultaneous transmission and reception that the repeater device has determined is unsuitable for simultaneous transmission and reception, the repeater device may send a negative acknowledgment (NAK) to the network access node. Otherwise, the repeater device may send a positive acknowledgment (ACK) to the network access node. In any of the above cases, upon determining that a group of beams of the repeater device cannot be used for an intended purpose, the network access node may refrain from including that group of beams in a beam configuration for the repeater device.

If bidirectional forwarding (simultaneous UL and DL) is supported, a repeater device may send to a UE, connectivity information of arrays. Connectivity information may include, for example, at least one of: an indication of a quantity of antenna arrays at the repeater device, an indication of how the antenna arrays may be combined for beamforming, an indication of which of the antenna arrays can be combined for beamforming, an indication of which of the antenna arrays can be used for transmission, an indication of which of the antenna arrays can be used for reception, or a combination thereof.

II. Open Loop Configuration of a Radio Frequency (RF) Repeater Device

A network access node may schedule access to a cell to support access by multiple UEs. For example, a network access node may allocate different resources (e.g., time domain and frequency domain resources) for different UEs operating within a cell of the network access node. To extend the coverage of a wireless network, repeater devices may be used to relay communication traffic between two nodes. Current repeater devices appear to populate two ends of the spectrum. At one end are repeater devices that may have fixed and non-configurable antenna patterns, amplification settings, output power settings, and treat uplink and downlink resources in the same way. At the other end of the spectrum are so-called smart repeater devices, which have great capacity for configurability but rely on network access nodes for control. Improvements to repeater device technology, including technology that may allow a repeater device to configure itself with little or no interaction with a network access node, could improve the performance and flexibility of wireless communication networks that employ repeater device technology.

According to aspects described herein, a repeater device may be configured as an open loop repeater device. The open loop repeater device may combine the amplify and forward aspects of a Layer-1 relay with enhancements of at least some of the functionality provided by upper layers (e.g., MAC, RLC, PDCP, RRC, L2 1444, and L3 1446 of FIG. 14) of a protocol stack, such as a 5G protocol stack. The open loop repeater device may obtain side control information, or at least some aspects of side control information, from over-the-air broadcasts of a network access node. The open loop repeater device may not be controlled directly by a network access node and may not (does not) establish an RRC connection with network access node. The open loop aspect reduces processing overhead of the network access node, which may not (does not) need to actively control an open loop repeater device as it would need to control a smart repeater device. The open loop aspect may reduce control signaling overhead of the network access node and the open loop repeater device as the network access node may not (does not) need to direct any control signaling to the open loop repeater device; instead, the open loop repeater device obtains (e.g., collects, harvests) information from master information blocks (MIBs), SystemInformationBlockType 1 (SIB1) blocks (also referred to as RMSI), and may also obtain information from other system information (OSI) in any one or more of SIB2-SIB9 system information blocks. According to some aspects, the open loop repeater device may utilize the first two steps (Msg1 and Msg2) of a 4-step contention based RACH procedure, or the two steps (MsgA and MsgB) of the 2-step contention based RACH procedure, to exchange information with a network access node. Still, the open loop repeater device may not (does not) need to establish an RRC connection with the network access node. The exchanged information may be used, for example, to cause one or more circuits of the open loop repeater device to configure the open loop repeater device. The configuration may, for example, implement beamforming to provide directionality to the receive and transmit hardware and/or functionality of the open loop repeater device. The configuration may, for example, implement transmitter power control to avoid, for example, having transmissions of signal from the open loop repeater device interfere with reception of signals of a nearby UE or a second network access node. The configuration may, for example, implement a feature of turning on or off one or more receivers and/or transmitters when such receivers and/or transmitters are not needed. The decision to turn on or off a receiver and/or transmitter may be based on knowledge of the direction of scheduled resources (e.g., UL, flexible, or DL). These and other features and aspects are described in more detail below.

Figure 29:
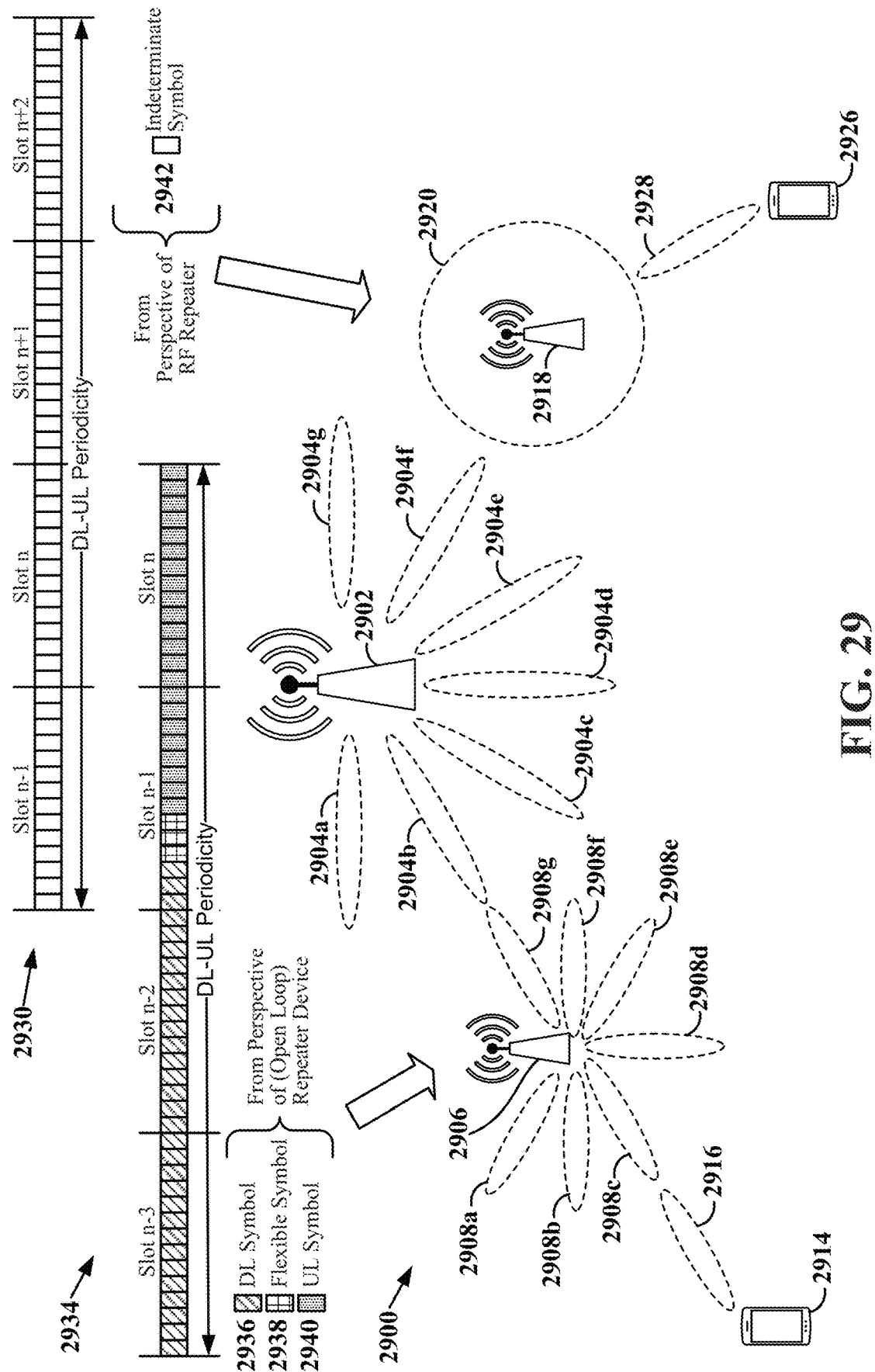
FIG. 29 is diagram illustrating a wireless communication network with communication between a network access node and a first UE via a first repeater device using beamformed signals according to some aspects of the disclosure.

FIG. 29 is a diagram illustrating a wireless communication network 2900 with communication between a network access node 2902 and a first UE 2914 via a first repeater device 2906 using beamformed signals according to some aspects of the disclosure. The network access node 2902 may correspond to any of the network access nodes (e.g., scheduling entities, gNBs, base stations) shown in any of FIGS. 1, 2, 5-12, 14-17, 25, 29, 31, 37, and/or 39-44. The first UE 2914 and a second UE 2926 may correspond to any of the UEs (e.g., scheduled entities, wireless communication devices) shown in any of FIGS. 1, 2, 5-12, 14-17, 29, 31, and/or 44. The first repeater device 2906 and the second repeater device 2918 may correspond to any of the RF repeater devices of FIGS. 7-21, 29, 31, 32, 37, 39, and/or 40.

In the example shown in FIG. 29, the network access node 2902 may be configured to generate a plurality of beams 2904a-2904g, each associated with a different beam direction (e.g., in azimuth). The network access node 2902 may transmit and/or receive on any one or more of the plurality of beams 2904a-2904g. Respective beams of the plurality of beams 2904a-2904g may be steered to various angles (e.g., in azimuth). The first UE 2914 and/or the second UE 2926 may each be at some distance from the network access node 2902. Additionally, or alternatively, a structure or obstacle (not shown) may exist between a direct line of sight between the network access node 2902 and the first UE 2914 and/or between the network access node 2902 and the second UE 2926.

The first repeater device 2906 may be located between the network access node 2902 and the first UE 2914. In some aspects, a repeater device may be referred to as a "smart repeater device" if, for example, it is controlled by another device, such as the network access node 2902. The control may afford the smart repeater device with "side control information," which facilitates the dynamic or semi-static configuration of the smart repeater device with, for example, beamforming information, power control information, and/or transmitter and receiver on/off information in connection with, for example, knowledge of whether a given resource is scheduled for uplink or downlink operation. A smart repeater device may receive the side control information in a closed loop; that is, the network access node 2902 may have direct control over the smart repeater device. As described herein, however, the first repeater device 2906 may receive side control information by capturing the information from over-the-air master information block and system information block parameters, without a need to be directly controlled by the network access node 2902. In this context, the first repeater device 2906 may not be a smart repeater device, but instead the first repeater device 2906 may be an "open loop repeater device" (referred to as the first repeater device 2906 hereinafter).

The first repeater device 2906 may have an antenna array (not shown) that allows the first repeater device 2906 to perform beamforming and to steer one or more of a plurality of beams 2908a-2908g in various directions (e.g., in azimuth). The beam forming may allow the first repeater device 2906 to form narrow directional beams 2908a-2908g in a plurality of directions and/or to form broad directional beams (not shown) in a plurality of directions and/or to form an omnidirectional beam (not shown).

The first UE 2914 may have an antenna array (not shown) that allows the first UE 2914 to perform beamforming and to steer beams in various directions (e.g., in azimuth). The beam forming may allow the first UE 2914 to form narrow directional beams 2916 (one of a plurality shown to avoid cluttering the drawing) in a plurality of directions and/or to form broad directional beams (not shown) in a plurality of directions and/or to form an omnidirectional beam (not shown). In the example of FIG. 29, the narrow directional beam 2916 of the first UE 2914 is aligned or substantially aligned with a directional beam 2908c of the first repeater device 2906.

The first repeater device 2906 may amplify and forward (e.g., convey) RF signals exchanged between the first UE 2914 and the network access node 2902. The amplification and forwarding may be bidirectional. A bidirectional link between the network access node 2902 and the first repeater device 2906 may be referred to herein as a fronthaul-link. The bidirectional link between the first repeater device 2906 and the first UE 2914 may be referred to herein as an access-link.

The second repeater device 2918 (e.g., an RF repeater device) may be located between the network access node 2902 and the second UE 2926. The second repeater device 2918 may be configured with an omnidirectional beam 2920 or may have a fixed directional beam (not shown) (e.g., where the fixed directional beam may be a wide beam pointing in one direction (not shown) without an ability to be steered (mechanically or electrically). The second repeater device 2918 may not be provided with steerable beam configurations and may not be adaptive over time. The second repeater device 2918 may draw no distinction between uplink and downlink resources. The second repeater device 2918 may not have high complexity. The second repeater device 2918 may be implementation based. That is, the second repeater device 2918, and others of its type, may be implemented to suit a particular geographic location, for example.

The second UE 2926 may have an antenna array (not shown) that allows the second UE 2926 to perform beamforming and to steer beams in various directions (e.g., in azimuth). The beam forming may allow the second UE 2926 to form narrow directional beams 2928 (one of a plurality shown to avoid cluttering the drawing) in a plurality of directions and/or to form broad directional beams (not shown) in a plurality of directions and/or to form an omnidirectional beam (not shown). In the example of FIG. 29, the narrow directional beam 2928 of the second UE 2926 is aligned or substantially aligned with the second repeater device 2918 and is therefore aligned or substantially aligned with the omnidirectional beam 2920 of the second repeater device 2918.

The second repeater device 2918 may amplify and forward (e.g., amplify and repeat) RF signals exchanged between the second UE 2926 and the network access node 2902. The amplification and forwarding may be bidirectional. A bidirectional link between the network access node 2902 and the second repeater device 2918 may be referred to as a fronthaul-link. The bidirectional link between the second repeater device 2918 and the second UE 2926 may be referred to as an access-link.

As described, the first repeater device 2906 and the second repeater device 2918 may each amplify and forward RF signals (e.g., analog signals in the physical (PHY) layer). One difference between the first repeater device 2906 and the second repeater device 2918 is an ability of the first repeater device 2906 to use beamforming to improve signal strength and signal plus interference to noise ratio (SINR) of traffic in the over-the-air communication between the first repeater device 2906 and the network access node 2902. Additionally, the first repeater device 2906 may be aware of a direction (e.g., uplink, downlink, and flexible) of the traffic it receives.

By way of illustration, in the context of time domain duplex (TDD) operation and multi-beam operation, FIG. 29 depicts a first four slots 2934 (slots n−3, n−2, n−1, and n) of a resource grid. The first repeater device 2906 may obtain the directionality of each symbol in each of the four slots 2934 by decoding cell-specific information transmitted by the network access node 2902. Therefore, the first repeater device 2906 may know, ahead of time, the location, in time-frequency resources, of each uplink (UL) symbol 2936, flexible symbol 2938, and downlink symbol 2940 of any given slot 2934 in a frame (not shown). Knowledge of the direction (DL, flexible, UL) may allow the first repeater device 2906 to save power, for example, by only receiving in the direction of a UE (e.g., first UE 2914) during resources reserved for uplink communication. In other words, the first repeater device 2906 may save power, and enjoy other benefits, by not transmitting in the direction of a UE (e.g., first UE 2914) during resources reserved for uplink During uplink resources, the first repeater device 2906 may use beamforming techniques to form a first directional beam 2908c in the direction of the first UE 2914 and a second directional beam 2908g in the direction of the network access node. The first repeater device 2906 may configure itself (in an open loop manner), based on information received from the network access node 2902 without having an RRC connection established with the network access node 2902. The first repeater device 2906 may configure itself, for example, by coupling antennas of its antenna array(s) to the input and output, respectively, of an amplifier chain to amplify and forward, in a directionally oriented configuration, the uplink traffic (if any) from the first UE 2914 to the network access node 2902.

Similarly, the first repeater device 2906 may save power, and enjoy other benefits, by not transmitting in the direction of a network access node (e.g., network access node 2902) during resources reserved for downlink During downlink resources, the first repeater device 2906 may use beamforming techniques to form the first directional beam 2908c in the direction of the first UE 2914 and the second directional beam 2908g in the direction of the network access node. The first repeater device 2906 may configure itself (in an open loop manner), based on information received from the network access node 2902 without having an RRC connection established with the network access node 2902. The first repeater device 2906 may configure itself, for example, by coupling antennas of its antenna array(s) to the input and output, respectively, of an amplifier chain to amplify and forward, in a directionally oriented configuration, the downlink traffic (if any) from the network access node 2902 to the first UE 2914. In general, the first repeater device 2906 may be multi-beam adaptive over time and may be fully aware of the DL/UL split; that is, fully aware of which resources are scheduled for DL and which resources are scheduled for UL.

In contrast, the second repeater device 2918 may not decode any cell-specific information. The second repeater device 2918 may receive RF signal traffic via its omnidirectional beam 2920, pass the RF signal traffic through its amplifier chain (not shown) and transmit (e.g., forward) the amplified RF signal traffic via the omnidirectional beam 2920 of the second repeater device 2918. Furthermore, the second repeater device 2918 may not be aware of the direction of the RF signal traffic (e.g., UL, flexible, DL) because the second repeater device 2918 may not have obtained this information from any signaling from the network access node 2902.

By way of illustration, in the context of time domain duplex (TDD) operation and multi-beam operation, FIG. 29 depicts a second four slots 2930 (slots n−1, n, n+1, and n+2) of the resource grid. From the perspective of the second repeater device 2918, every symbol in every one of the second four slots 2930 is an indeterminate symbol 2942 (i.e., the second repeater device 2918 may make no effort to determine whether any given symbol is reserved for a downlink, flexible, or uplink resource). The second repeater device 2918, therefore, may always receive omnidirectionally and transmit omnidirectionally. This has at least one drawback, for example, of wasting transmitted signal energy by directing transmitted signal energy mostly in directions other than the toward the second UE 2926. With respect to the second repeater device 2918, fronthaul-link bidirectional communication with the network access node 2902 and access-link bidirectional communication with the second UE 2926 may be transmitted and/or received, all the time, via the second repeater device 2918 omnidirectional beam 2920.

Figure 30B:
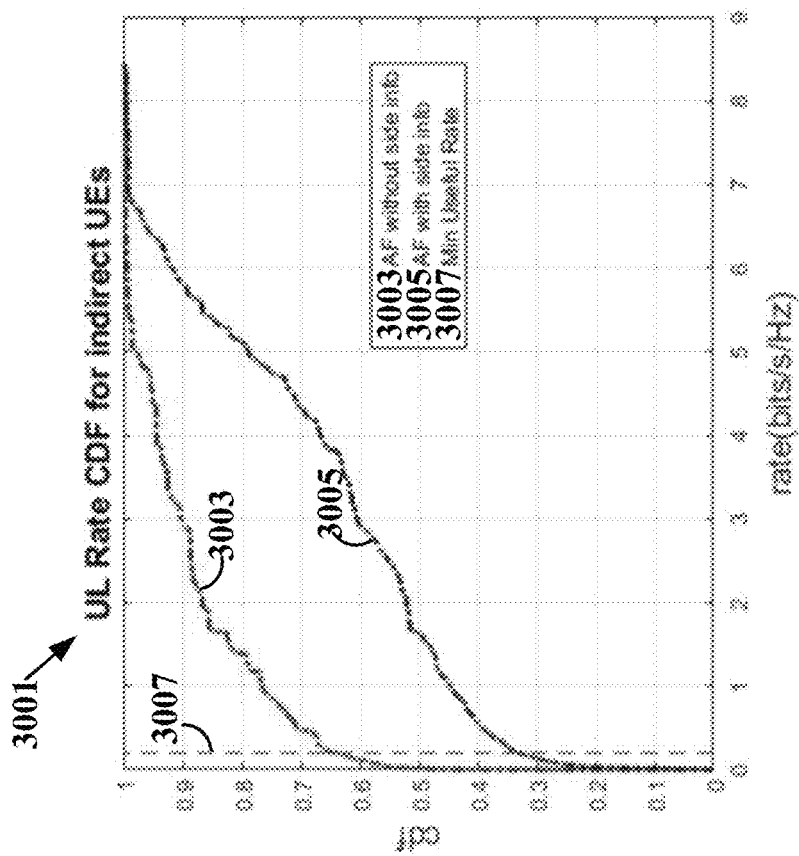
FIGS. 30A and 30B are graphs comparing a cumulative distribution function (CDF) on the vertical axis and data rate (in bits/s/Hz) on the horizontal axis as a function of whether a repeater device is provided with "side control information" according to some aspects of the disclosure.
Figure 30A:
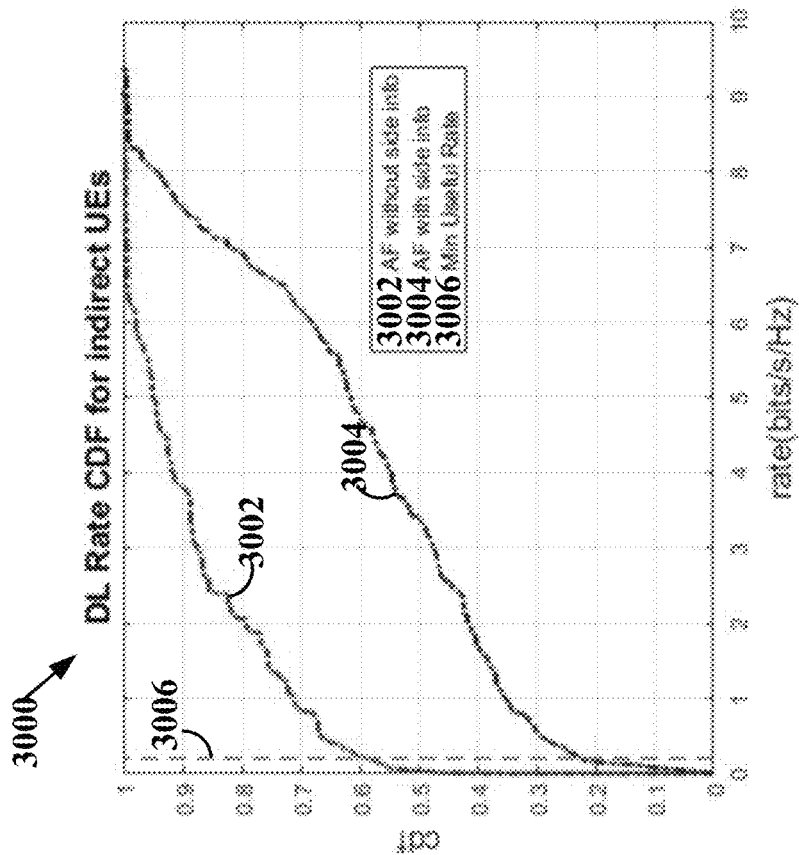

FIGS. 30A and 30B are graphs 3000, 3001 comparing a cumulative distribution function (CDF) on the vertical axis and data rate (in bits/s/Hz) on the horizontal axis as a function of whether a repeater device is provided with "side control information" according to some aspects of the disclosure. As described above, side control information may allow a repeater device to, for example, use directional beams for fronthaul-link and access-link, improve operation by having knowledge of the direction (e.g., UL, flexible, DL) of a resource on a per symbol and/or per slot basis, and adjust repeater device transmitter power.

Some evaluations indicate that substantial performance advantages over repeater devices without side control information can be attained if side control information becomes available. Advantages may be observed, for example, in timing information. Knowledge of a DL/UL split, at both the slot and symbol levels may also provide an advantage. As another example, side control information may provide spatial transmit and/or receive information. The transmit and/or receive information may be used to assure that directional transmit and receive beams are pointing in directions that are commensurate with the locations of each served UE and a network access node, for each scheduled resource.

FIGS. 30A and 30B depict traces (plots) without side control information 3002, 3003 and traces with side control information 3004, 3005. FIGS. 30A and 30B also depict a minimum useful rate 3006, 3007. Both FIGS. 30A and 30B depict results for "indirect UEs," which are UEs served by a repeater device. FIG. 30A depicts a downlink (DL) rate for indirect UEs. FIG. 30B depicts an uplink (UL) rate for indirect UEs.

As used in FIGS. 30A and 30B, the cumulative distribution function (CDF) is the probability (given on the vertical axis) that the UL or DL rate will take a value less than or equal to the rate given on the horizontal axis. For example, in FIG. 30A, for a CDF of 0.7 (i.e., a probability of 70 percent), the graph 3000 indicates that there is a 70 percent probability that the DL rate for indirect UEs without side control information 3002 will be less than 0.9 bits/s/Hz, while for the same 70 percent probability, the DL rate for indirect UEs with side control information 3004 will be less than 6.2 bits/s/Hz. This represents a rate improvement for indirect UEs with side control information 3004 over indirect UEs without side control information 3002. By way of another example, in FIG. 30A, for a CDF of 0.5 (i.e., a probability of 50 percent), the graph 3000 indicates that there is a 50 percent probability that the DL rate for indirect UEs without side control information 3002 will be less than 0 bits/s/Hz (i.e., the rate is less than the minimum useful rate 3006), while for the same 50 percent probability, the DL rate for indirect UEs with side control information 3004 will be less than 3.4 bits/s/Hz. This again represents a rate improvement for indirect UEs with side control information 3004 over indirect UEs without side control information 3002.

With respect to UL rates, for example, in FIG. 30B, for a CDF of 0.7 (i.e., a probability of 70 percent), the graph 3001 indicates that there is a 70 percent probability that the DL rate for indirect UEs without side control information 3003 will be less than 0.5 bits/s/Hz, while for the same 70 percent probability, the UL rate for indirect UEs with side control information 3005 will be less than 4.4 bits/s/Hz. This represents a rate improvement for indirect UEs with side control information 3004 over indirect UEs without side control information 3002. By way of another example, in FIG. 30B, for a CDF of 0.5 (i.e., a probability of 50 percent), the graph 3001 indicates that there is a 50 percent probability that the UL rate for indirect UEs without side control information 3003 will be less than 0 bits/s/Hz (i.e., the rate is less than the minimum useful rate 3007), while for the same 50 percent probability, the UL rate for indirect UEs with side control information 3005 will be less than 1.6 bits/s/Hz. This again represents a rate improvement for indirect UEs with side control information 3005 over indirect UEs without side control information 3003.

Figure 31:
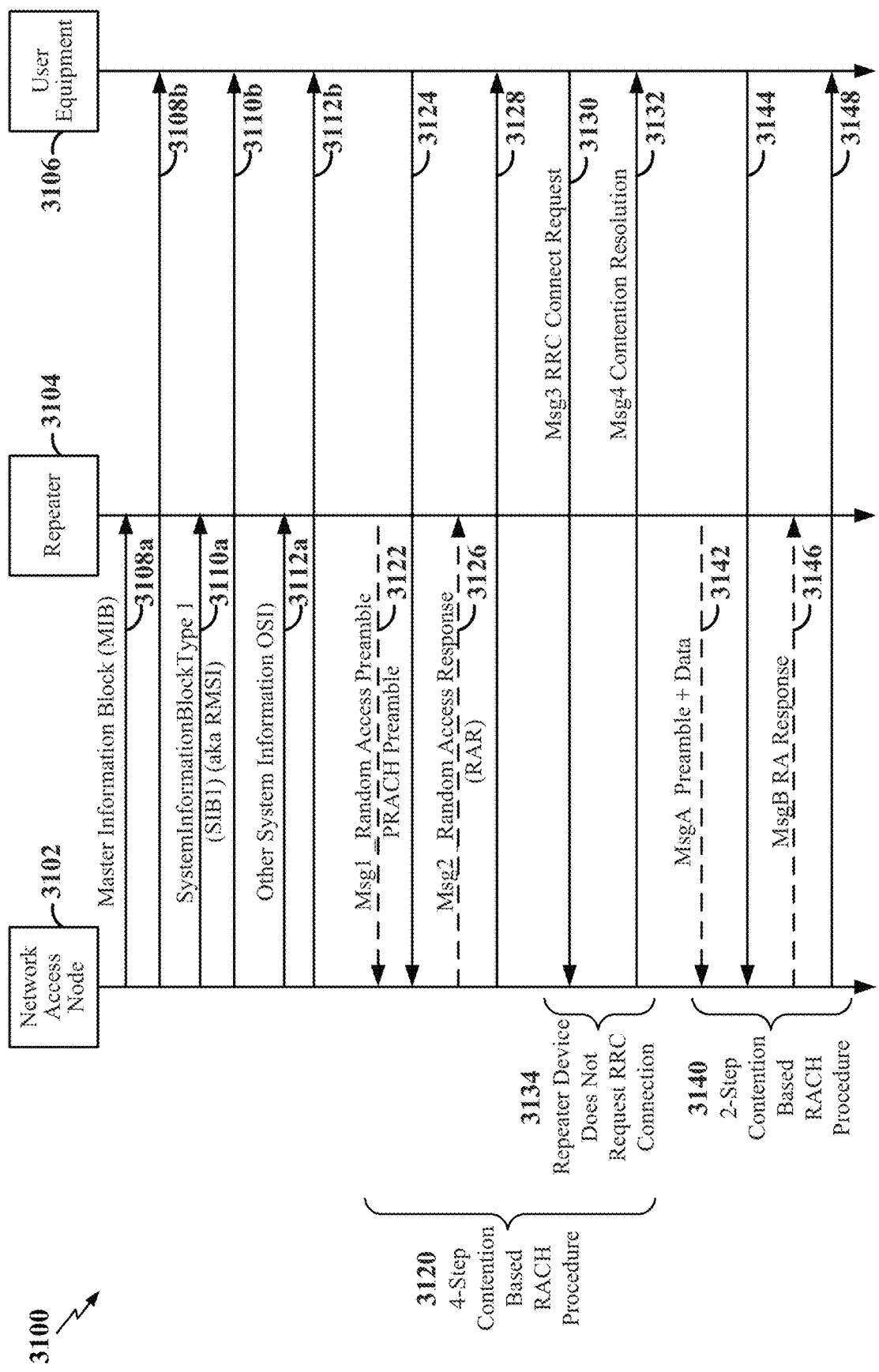
FIG. 31 is a call flow diagram illustrating an example of signaling in a wireless communication network including a network access node, a repeater device, and a UE according to some aspects of the disclosure.

FIG. 31 is a call flow diagram illustrating an example of signaling 3100 in a wireless communication network including a network access node 3102, a repeater device 3104, and a UE 3106 according to some aspects of the disclosure. The network access node 3102 may correspond to any of the network access nodes (e.g., scheduling entities, gNBs, base stations) shown in any of FIGS. 1, 2, 5-12, 14-17, 25, 29, 31, 37, and/or 39-44. The repeater device 3104 may correspond to any of the RF repeater devices of FIGS. 7-21, 29, 31, 32, 37, 39, and/or 40. The UE 1406 may correspond to any of the UEs (e.g., scheduled entities, wireless communication devices) shown in any of FIGS. 1, 2, 5-12, 14-17, 29, 31, and/or 44.

In the example of FIG. 31, the network access node 3102 may first broadcast a master information block (MIB) 3108a, 3108b. The repeater device 3104 and the UE 3106 may each receive the MIB 3108a, 3108b. The MIB 3108a, 3108b may be transmitted over a broadcast channel (BCH) transport channel and a physical broadcast channel (PBCH) physical channel. The MIB 3108a, 3108b may include parameters required to decode the SystemInformationBlock-Type 1 (SIB1) and other information. For example, the MIB 3108a, 3108b may be used to convey information, such as side control information, from the network access node 3102, to the repeater device 3104. Some parameters carried by a MIB, such as MIB 3108a, 3108b may include, for example, the parameter "cellBarred," which may be used to inform a repeater device, like repeater device 3104, that a network access node, like network access node 3102, has barred one or more wireless communication devices (e.g., like UE 3106) from camping on a cell associated with the MIB. The cellBarred parameter may indicate to the repeater device 3104 that one or more circuits of the repeater device 3104 may be configured so as to not convey radio frequency (RF) traffic received at the repeater device 3104 from the one or more wireless communication devices (e.g., from UE 3106) in an uplink resource associated with the cell.

The network access node 3102 may next broadcast other system information (OSI) 3112a, 3112b. The OSI 3112a, 3112b. may include any of SIB2-SIB9. The repeater device 3104 and the UE 3106 may each receive the OSI 3112a, 3112b.

When the repeater device 3104 and the UE 3106 have all relevant information, either or both may enter into a contention-based random access procedure. An existing RACH procedure may be known as a 4-step contention based RACH procedure 3120. To begin, the UE 3106 may transmit a contention-based PRACH preamble, also known as Msg1 3124. After detecting the preamble, the network access node 3102 responds with a random-access response (RAR), also known as Msg2 3128. The RAR may include the detected preamble ID, a time-advance command, a temporary C-RNTI (TC-RNTI), and an uplink grant for scheduling a PUSCH transmission from the UE 3106. The UE transmits Msg3 3130 in response to the Msg 2 3128 RAR including an ID for contention resolution. The Msg3 3130 may also be known as an RRC connection request. Upon receiving Msg3 3130, the network access node 3102 transmits the contention resolution message, also known as Msg4 3132, with the contention resolution ID. The UE 3106 receives Msg4 3132, and if the UE 3106 finds its contention-resolution ID it sends an acknowledgement on a physical uplink control channel (PUCCH), which completes the 4-step random access procedure.

From the perspective of the repeater device 3104, the 4-step contention based RACH procedure 3120 is similar; however, if the repeater device 3104 enters into the RACH procedure 3120, the repeater device 3104 may choose not to establish an RRC connection with the network access node 3102. Accordingly, an open loop repeater device, like repeater device 3104 may not (does not) request an RRC connection 3134 and may not (does not) engage in contention resolution.

Furthermore, entering into the 4-step contention based RACH procedure 3120 is optional for the repeater device 3104 (as denoted by the dashed lines for the repeater device 3104 Msg1 3122 PRACH preamble and the dashed lines for the network access node 3102 Msg2 3126 RAR. The repeater device 3104 may, however, find the first two steps of the 4-step contention based RACH procedure 3120 useful for exchanging information with the network access node 3102. For example, the repeater device 3104 may use the Msg1 3122 PRACH preamble to convey information up to the network access node 3102 and the network access node 3102 may use the Msg2 3126 RAR to convey information down to the repeater device 3104. To begin, the UE 3106 may optionally transmit a Msg1 3124 PRACH preamble to the network access node 3102. After detecting the preamble, the network access node 3102 may respond with a Msg2 3126 RAR. The Msg2 3126 RAR may include the detected preamble ID, a time-advance command, a temporary C-RNTI (TC-RNTI), and an uplink grant for scheduling a PUSCH transmission from the repeater device 3104; however, if provided the repeater device 3104 may not use the uplink grant.

In 5G, an alternative to the 4-step contention based RACH procedure 3120 is available. The alternative may be referred to as a 2-step contention based RACH procedure 3140. The 4-step RACH procedure utilizes two round-trip cycles between, for example, the UE 3106 and the network access node 3102. The 2-step contention based RACH procedure 3140 may reduce latency and control-signaling overhead by its use of only one round trip cycle between the UE 3106 and the network access node 3102 or between the repeater device 3104 and the network access node 3102. The round trip reduction may be achieved by combining the Msg1 and Msg3 of the 4-step contention based RACH procedure 3120 into a single message, referred to as a MsgA.

The repeater device 3104 may optionally transmit a MsgA 3142 up to the network access node 3102. The MsgA 3142 may include the PRACH preamble and other data. Of course, the UE 3106 may also transmit a MsgA 3144 up to the network access node 3102. The network access node 3102 may respond to the repeater device 3104 with a MsgB 3146. The network access node 3102 may respond to the UE 3106 with a MsgB 3148. The MsgB 3146, 3148 may include content previously associated with Msg2 and Msg4.

Figure 32:
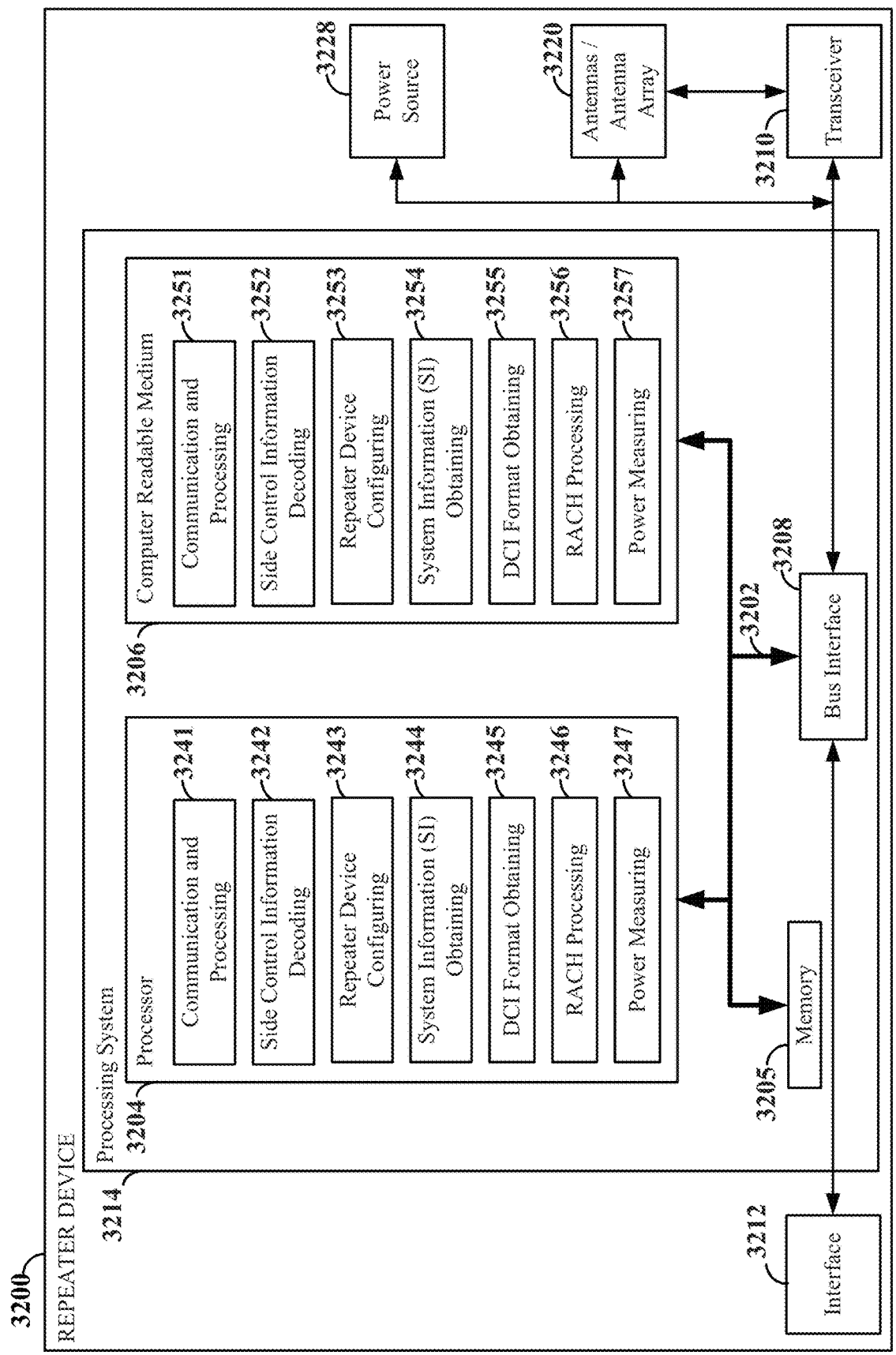
FIG. 32 is a schematic diagram illustrating an example of a hardware implementation of repeater device employing a processing system according to some aspects of the disclosure.

FIG. 32 is a schematic diagram illustrating an example of a hardware implementation of a repeater device 3200 employing a processing system 3214 according to some aspects of the disclosure. For example, the repeater device 3200 may be a device configured to wirelessly communicate with a network access node (e.g., a scheduling entity, a gNB, a base station), a user equipment (e.g., a UE, a scheduled entity, a wireless communication device), and/or a core network node, all as discussed in any one or more of FIGS. 1-55. In some implementations, the processing system 3214 may provide some or all of the functionality of an MT unit. In some implementations, the repeater device 3200 may correspond to any of the RF repeater devices of FIGS. 7-21, 29, 31, 32, 37, 39, and/or 40.

In accordance with various aspects of the disclosure, an element, or any portion of an element, or any combination of elements may be implemented with the processing system 3214. The processing system 3214 may include one or more processors 3204. The processing system 3214 may be substantially similar to the processing system 2114 illustrated in FIG. 21, including a bus interface 3208, a bus 3202, memory 3205, a processor 3204, and a computer-readable medium 3206. Furthermore, the repeater device 3200 may include additional features, such as an interface 3230, a transceiver 3210, antennas/antenna array 3220, and/or a power supply 3228. The interface 3230, transceiver 3210, antennas/antenna array 3220, and power supply 3228 may be coupled to the bus interface 3208. The recited features of the repeater device 3200 may be substantially similar to like-numbered and like-named features of the repeater device 2100 of FIG. 21. Accordingly, to avoid duplication, descriptions of the like-numbered and like-named features, which may nevertheless be present in the repeater device 3200, are not provided in connection with the description of FIG. 32.

Figure 55:
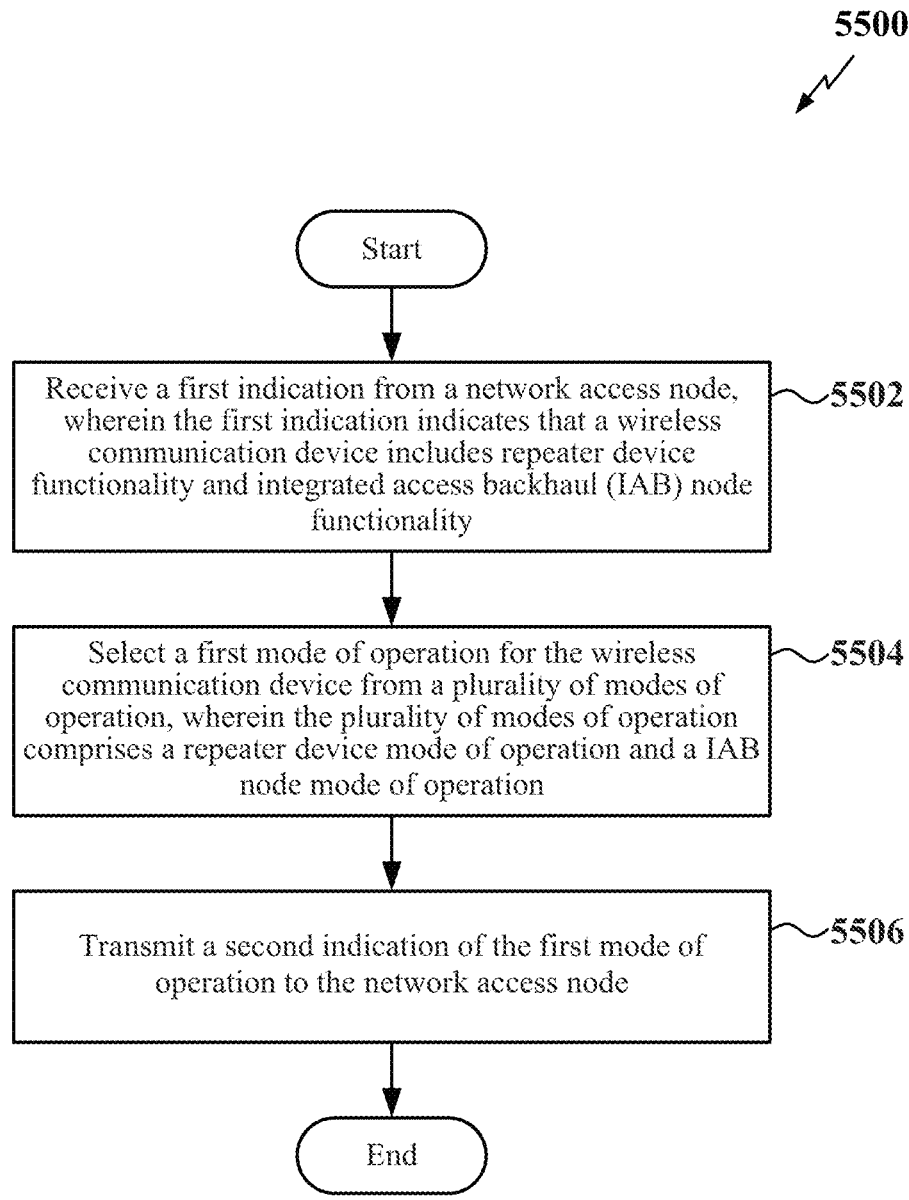
FIG. 55 is a flow chart illustrating an example process at a core network node in a wireless communication network according to some aspects of the disclosure.

In various examples, the repeater device 3200 may be configured to perform any one or more of the functions described herein in FIGS. 1-55. That is, the processor 3204, as utilized in the repeater device 3200, may be used to implement any one or more of the processes and procedures described herein, for example, in FIGS. 22-24, 33-34, and/or 46-47. The processor 3204, as utilized in the repeater device 3200, may include circuitry configured for various functions.

For example, the processor 3204 may include communication and processing circuitry 3241. The communication and processing circuitry 3241 of the repeater device 3200 may be configured for various functions and processes and may include one or more hardware components that provide the physical structure that performs various functions and processes, related to wireless communication (e.g., signal reception and/or signal transmission) as described herein. Some of the various functions, processes, and corresponding one or more hardware components described in connection with FIG. 21 may be similar to various like-named functions, processes, and corresponding one or more hardware components associated with the communication and processing circuitry 3241 of the repeater device 3200 of FIG. 32. Accordingly, to avoid duplication, descriptions of various functions, processes, and corresponding one or more hardware components that may be common (or substantially similar) to both the communication and processing circuitry 3241 of FIG. 32 and the communication and processing circuitry 2141 of FIG. 21, which may nevertheless be present in the communication and processing circuitry 3241, are not provided in connection with the description of the communication and processing circuitry 3241 of FIG. 32. The communication and processing circuitry 3241 may further be configured to execute communication and processing software 3251 stored on the computer-readable medium 3206 to implement one or more functions described herein.

In some aspects of the disclosure, the processor 3204 may include side control information decoding circuitry 3242 configured for various functions, including, for example, decoding cell-specific information received from a network access node. In some examples, the side control information decoding circuitry 3242 may include one or more hardware components that provide the physical structure that performs processes related to decoding cell-specific information received from a network access node. The side control information decoding circuitry 3242 may further be configured to execute side control information decoding software 3252 stored on the computer-readable medium 3206 to implement one or more functions described herein.

In some aspects of the disclosure, the processor 3204 may include repeater device configuring circuitry 3243 configured for various functions, including, for example, configuring the repeater device 3200 using cell-specific information or configuring the repeater device 3200 using cell-specific information without establishing a radio resource control (RRC) connection with a network access node using the cell-specific information. In some examples, the repeater device configuring circuitry 3243 may include one or more hardware components that provide the physical structure that performs processes related to configuring the repeater device using the cell-specific information or configuring the repeater device 3200 using cell-specific information without establishing the radio resource control (RRC) connection with the network access node using the cell-specific information. The repeater device configuring circuitry 3243 may further be configured to execute repeater device configuring software 3253 stored on the computer-readable medium 3206 to implement one or more functions described herein.

In some aspects of the disclosure, the processor 3204 may include system information (SI) obtaining circuitry 3244 configured for various functions, including, for example, obtaining a master information block (MIB), remaining minimum system information (RMSI) identified by the MIB, and/or system information that is transported in a system information block (SIB) including resources identified by at least one of: a MIB, or a remaining minimum system information (RMSI), wherein the RMSI may be different from the SIB. In some examples, the SI obtaining circuitry 3244 may include one or more hardware components that provide the physical structure that performs processes related to obtaining the MIB, RMSI identified by the MIB, and/or system information that is transported in the SIB including resources identified by at least one of: the MIB, or the RMSI, wherein the RMSI may be different from the SIB. The system information (SI) obtaining circuitry 3244 may further be configured to execute system information (SI) obtaining software 3254 stored on the computer-readable medium 3206 to implement one or more functions described herein.

In some aspects of the disclosure, the processor 3204 may include downlink control information (DCI) format circuitry 3245 configured for various functions, including, for example, obtaining cell-specific information that is transported as a payload of a DCI format and receiving a series of DCI formats to dynamically change the configuring of the repeater device. In some examples, the downlink control information (DCI) format circuitry 3245 may include one or more hardware components that provide the physical structure that performs processes related to obtaining cell-specific information that is transported as the payload of the DCI format and receiving the series of DCI formats to dynamically change the configuring of the repeater device. The downlink control information (DCI) format circuitry 3245 may further be configured to execute downlink control information (DCI) format software 3255 stored on the computer-readable medium 3206 to implement one or more functions described herein.

In some aspects of the disclosure, the processor 3204 may include random access channel (RACH) processing circuitry 3246 configured for various functions, including, for example, transmitting a predetermined RACH preamble associated with a synchronization signal block (SSB) that identifies a direction (e.g., UL, flexible, DL) of relayed radio frequency traffic, wherein the network access node may convey information to the repeater device in a RACH response to the predetermined RACH preamble. In some examples, the predetermined RACH preamble may be one of a plurality of predetermined RACH preambles associated with a plurality of respective information preestablished to convey the respective information from the repeater device to the network access node. In still further examples, the repeater device may determine an identity of the respective information to be conveyed to the network access node by selection of one of the plurality of predetermined RACH preambles. In some examples, the RACH processing circuitry 3246 may include one or more hardware components that provide the physical structure that performs processes related to transmitting the predetermined RACH preamble associated with the synchronization signal block (SSB) that identifies the direction (e.g., UL, flexible, DL) of relayed radio frequency traffic, wherein the network access node may convey information to the repeater device in the RACH response to the predetermined RACH preamble. In some examples, the predetermined RACH preamble may be one of a plurality of predetermined RACH preambles associated with a plurality of respective information preestablished to convey the respective information from the repeater device to the network access node. In still further examples, the repeater device may determine an identity of the respective information to be conveyed to the network access node by selection of one of the plurality of predetermined RACH preambles. The RACH processing circuitry 3246 may further be configured to execute RACH processing software 3256 stored on the computer-readable medium 3206 to implement one or more functions described herein.

In some aspects of the disclosure, the processor 3204 may include power measuring circuitry 3247 configured for various functions, including, for example, measuring a power of resources in an access link in at least one of: a measurement window configured by the network access node, or within a set of resources configured by the network access node. In addition, the power measuring circuitry 3247 may be configured for measuring a power level of a broadcast channel carrying cell-specific information from a given network access node, comparing the power level to a predetermined low threshold and a predetermined high threshold, and configuring the repeater device based on the comparing. In addition, the power measuring circuitry 3247 may configure the repeater device to convey the radio frequency traffic when the power level is greater than the predetermined low threshold and less than the predetermined high threshold. In some examples, the power measuring circuitry 3247 may include one or more hardware components that provide the physical structure that performs processes related to measuring the power of resources in the access link in at least one of: a measurement window configured by the network access node, or within the set of resources configured by the network access node. In addition, the power measuring circuitry 3247 may include one or more hardware components that provide the physical structure that performs processes related to measuring the power level of a broadcast channel carrying cell-specific information from a given network access node, comparing the power level to the predetermined low threshold and the predetermined high threshold, and configuring the repeater device based on the comparing. In addition, the power measuring circuitry 3247 may include one or more hardware components that provide the physical structure that performs processes related to configuring the repeater device to convey the radio frequency traffic when the power level is greater than the predetermined low threshold and less than the predetermined high threshold. The power measuring circuitry 3247 may further be configured to execute power measuring software 3257 stored on the computer-readable medium 3206 to implement one or more functions described herein.

Figure 33:
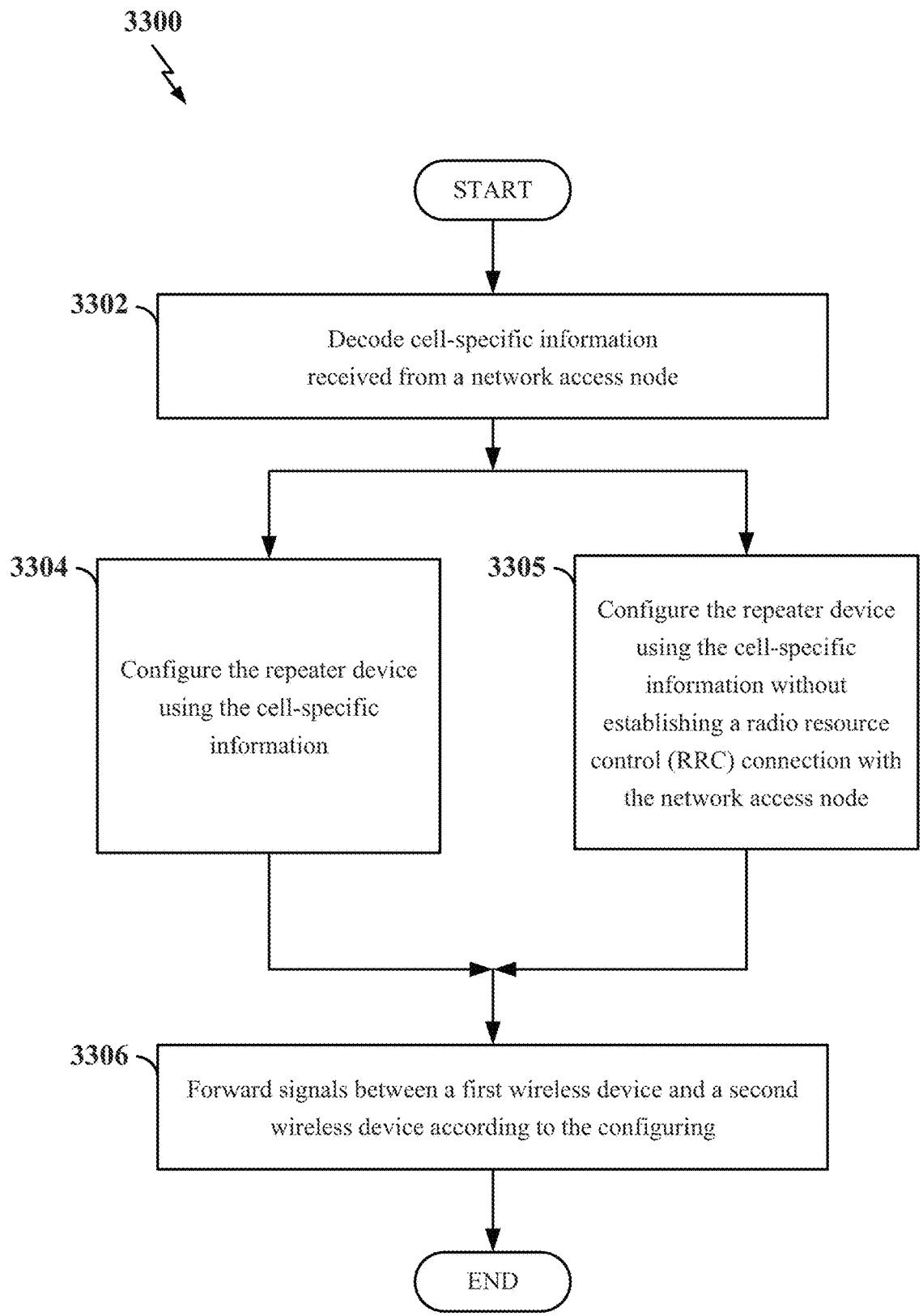
FIG. 33 is a flow chart illustrating an exemplary process at a repeater device in a wireless communication network according to some aspects of the disclosure.

FIG. 33 is a flow chart illustrating an exemplary process 3300 (e.g., a method) at a repeater device in a wireless communication network according to some aspects of the disclosure. As described below, some or all illustrated features may be omitted in a particular implementation within the scope of the present disclosure, and some illustrated features may not be required for implementation of all examples. In some examples, the process 3300 may be carried out by the repeater device 3200 illustrated in FIG. 32. In some examples, the process 3300 may be carried out by any suitable apparatus or means for carrying out the functions or algorithms described herein.

At block 3302, the repeater device may decode cell-specific information received from a network access node. For example, the side control information decoding circuitry 3242, together with the transceiver 3210 and antennas/antenna array 3220, shown and described above in connection with FIG. 32 may provide a means for decoding the cell-specific information received from the network access node.

At block 3304, the repeater device may configure itself (i.e., configure the repeater device) using the cell-specific information. At block 3305, the repeater device may configure itself (i.e., configure the repeater device) using the cell-specific information without establishing a radio resource control (RRC) connection with the network access node. For example, the repeater device configuring circuitry 3243 may provide a means for configuring itself (i.e., configuring the repeater device) using the cell-specific information and/or may provide a means for configuring itself (i.e., configuring the repeater device) using the cell-specific information without establishing a radio resource control (RRC) connection with the network access node. Block 3304 and block 3305 may be alternatives to one another.

At block 3306, the repeater device may forward signals between a first wireless communication device and a second wireless communication device according to the configuring. In one example, the network access node may be one of the first wireless communication device or the second wireless communication device. For example, the communications and processing circuitry 3241 together with the transceiver 3210 and antennas/antenna array 3220, shown and described above in connection with FIG. 32 may provide a means for forwarding the signals between the first wireless communication device and the second wireless communication device according to the configuring.

In some examples, the network access node may be one of the first wireless communication device or the second wireless communication device. The cell-specific information received from the network access node may be beam-specific information. The cell-specific information may be specific for a single repeater device or a group of repeater devices. In some aspects, the cell-specific information may be received on a specific beam directed toward a location of the repeater device. In some aspects, the cell-specific information may be valid for a given period or for a finite set of upcoming resources.

According to some aspects, the exemplary process 3300 at the repeater device in the wireless communication network may also include periodically verifying the cell-specific information by at least one of: acquiring new cell-specific information, re-acquiring previously decoded cell-specific information, or rereading the decoded cell-specific information received from the network access node. The exemplary process 3300 may include setting a timer to trigger the periodically verifying of the cell-specific information.

According to some examples, the cell-specific information may be transmitted from the network access node and used to establish an RRC connection between the network access node and a wireless communication device. However, in some examples cell-specific information may not be used to establish an RRC connection between the repeater device and the network access node. In some examples, the signals forwarded by the repeater device may be beam formed. In some examples, the signals forwarded by the repeater device may be in analog form and have not been processed in a digital form at an intermediate frequency or at baseband in the repeater device. In some examples, the cell-specific information may provide resource and configuration information for receiving repeater device control information. The resource information may include a time division duplex pattern (TDD pattern), repeater device on-off information, frequency information of the network access node, or any combination thereof. The frequency information may be at least one of: center frequency information, or channel bandwidth, for example. In some examples, the cell-specific information may include unwanted emissions limits information.

In some examples, the cell-specific information may be system information that may be transported in a master information block (MIB), in a remaining minimum system information (RMSI) identified by the MIB, and/or in a repeater device-specific system information block (SIB) message. The cell-specific information may be, for example, system information that may be transported in a system information block (SIB) including resources identified by at least one of: a master information block (MIB), or a remaining minimum system information (RMSI), wherein the RMSI is not the SIB. In another example, the cell-specific information may be transported as a payload of a downlink control information (DCI) format or a medium access control-control element (MAC-CE). The DCI may be a group-common DCI and the DCI format may be associated with a synchronization signal block (SSB) or a beamforming configuration. In one example, the repeater device may also receive a series of DCI formats to dynamically change the configuring of the repeater device.

In one example, the repeater device may be one of a plurality of repeater devices arranged in a plurality of different respective directions relative to a network access node, a first of the plurality of repeater devices may receive a first DCI format message that configures the first of the plurality of repeater devices to disable repeater device reception and transmission, and a second of the plurality of repeater devices may receive a second DCI format message that configures the second of the plurality of repeater devices to enable repeater device reception and transmission.

According to some aspects, the cell-specific information may be at least one of: broadcast to a plurality of repeater devices including the repeater device or provided as a group-common configuration to the plurality of repeater devices including the repeater device.

In one example, the cell-specific information may be repeater-device-specific control information (referred to as repeater device control information herein). The repeater device control information may be transported as payload of a downlink control information (DCI) format associated with a common radio network temporary identifier (RNTI) that distinguishes the DCI format from other DCI formats associated with other RNTIs associated with wireless communication devices.

Regulatory rules and/or guidelines regarding unwanted emissions from wireless devices may exist in countries or regions throughout the world. Transmissions from repeater devices, such as those exemplified herein, may be subject to these regulatory rules and/or guidelines. A repeater device may be configured to increase or decrease transmitted power to maintain compliance with local unwanted emissions limits specified in such regulatory rules and/or guidelines. The unwanted emissions limits may be provided as a function of frequency or frequency band, for example. According to one example, a repeater device may receive messaging conveying unwanted emissions limits information. The messaging may be transmitted to the repeater device by a network access node. The messaging may allow network control of unwanted emissions of the repeater device. In one example, where the repeater device receives cell-specific information from a network access node, the cell-specific information may include unwanted emissions limits information. A repeater device receiving such cell-specific information may be configured to increase and/or decrease its transmitted power to maintain the repeater device transmitted power at or below the limits specified in the received unwanted emissions limits information.

In one aspect, the repeater device may be a Layer-1 relay unit. In another aspect, the repeater device may be identified with a predetermined random access channel (RACH) preamble and/or resource that may be distinct from wireless communication device RACH preambles and/or resources. According to such an aspect, the process 3300 may also include transmitting the predetermined RACH preamble and/or the predetermined resource associated with a synchronization signal block (SSB) that identifies a direction (e.g., UL, flexible, DL) of relayed radio frequency traffic. In such an aspect the network access node may convey information to the plurality of repeater devices in a random access channel (RACH) response to a predetermined RACH preamble and/or a predetermined resource. The predetermined RACH preamble and/or the predetermined resource may be one of a plurality of predetermined RACH preambles and/or predetermined resources associated with a plurality of respective information preestablished to convey the respective information from the repeater device to the network access node. In such an aspect, the repeater device may determine an identity of the respective information to be conveyed to the network access node by selection of one of the plurality of predetermined RACH preambles and/or predetermined resources. In one example, the information may correspond to at least one of: a power configuration of the repeater device, or a measured power of resources in an access link. The measured power of resources in the access link may be measured in at least one of: a measurement window configured by the network access node, or within a set of resources configured by the network access node.

In one example, the repeater device may convey information to the network access node by at least one of: selection of a predetermined RACH preamble and/or a predetermined resource, inclusion of the information in a payload of a first RACH message, inclusion of information in a payload of a third RACH message, or setting a transmitter power of the repeater device to one of a plurality of predetermined transmitter power levels, wherein each of the plurality of predetermined transmitter power levels conveys a distinct respective piece of information. In some aspects, the network access node may convey information to the repeater device in one of a RACH response or a fourth RACH message.

According to one aspect, changes to a configuration of the repeater device may be made without establishment of a control interface between the repeater device and the network access node. That is, an RRC connection may not be established between the repeater device and the network access node.

According to another aspect, the repeater device may configure itself (i.e., may configure the repeater device) to convey radio frequency traffic received at the repeater device in accordance with a control signal of the cell-specific information. The control signal may be broadcast from the network access node and exclusively directed to a plurality of repeater devices, including the repeater device, within a broadcast reception range of the network access node. The control signal may configure the plurality of repeater devices to not convey the radio frequency traffic associated with a cell. In one aspect, the control signal may provide a synchronization signal block (SSB)-specific (SSB-specific) indication, wherein the repeater device may determine to convey or to not convey based on a detected SSB from the network access node and the provided SSB-specific indication. In one aspect, the control signal may indicate that a network access node, transmitting the cell-specific information, bars one or more wireless communication devices (e.g., one or more UEs) from camping on a cell associated with the cell-specific information. In such an example the repeater device (e.g., one or more circuits of the repeater device) may configure itself (i.e., the repeater device) to not convey the radio frequency traffic received at the repeater device from the one or more wireless communication devices in an uplink resource associated with the cell. In such an example, the repeater device may determine a synchronization signal block (SSB) index value associated with the control signal and configure an output power of a transmitter of the repeater device according to the SSB index value. According to some aspects, the repeater device may configure the output power of the repeater device by at least one of: configuring a maximum output power of the transmitter, configuring a maximum amplification gain of the transmitter, or configuring a first power assigned to first traffic transmitted in an uplink and a second power assigned to second traffic transmitted in a downlink, wherein the first power is different from the second power. In some examples, the repeater device may configure itself to not convey the radio frequency traffic received at the repeater device that is associated with the SSB index value in the uplink resource associated with the cell. In this example, the repeater device may additionally determine a synchronization signal block (SSB) index value associated with the control signal, map the SSB index value to one of a plurality of beams of the network access node according to a predetermined mapping relationship, and configure the repeater device to not convey the radio frequency traffic received at the repeater device in a resource associated with the one of the plurality of beams.

In one aspect, the repeater device may further measure a power level of a broadcast channel carrying the cell-specific information from a given network access node, compare the power level to a predetermined low threshold and a predetermined high threshold, and configure the repeater device (i.e., configure itself) based on the comparing. In one aspect, the repeater device may configure the repeater device to convey the radio frequency traffic when the power level is greater than the predetermined low threshold and less than the predetermined high threshold. Still further, the repeater device may determine a synchronization signal block (SSB) index value associated with the control signal and configure the repeater device (i.e., configure itself) to convey the radio frequency traffic associated with the SSB index value in an uplink resource.

In some aspects, the repeater device may further determine a synchronization signal block (SSB) index value associated with the cell-specific information and configuring a transmitter of the repeater device based on the SSB index value. In some examples, configuring the transmitter may further include at least one of: configuring the transmitter with a maximum transmitter output power, configuring the transmitter with a maximum amplification gain, or configuring a first power assigned to first traffic transmitted in an uplink and a second power assigned to second traffic transmitted in a downlink, wherein the first power is different from the second power. Configuring the transmitter may further include at least one of: configuring the transmitter with a maximum transmitter output power or configuring the transmitter with a maximum amplification gain.

In one example, the cell-specific information may indicate a resource of at least one symbol in at least one slot and configuring the repeater device using the cell-specific information further includes: configuring the repeater device to convey traffic exclusively in the indicated resource during the at least one symbol in the at least one slot. In another example the resource may at least one of: an uplink resource, a downlink resource, or a flexible resource and the repeater device may further replace the flexible resource with the uplink resource or the downlink resource according to control information or control configuration signaling received by the repeater device.

Figure 34:
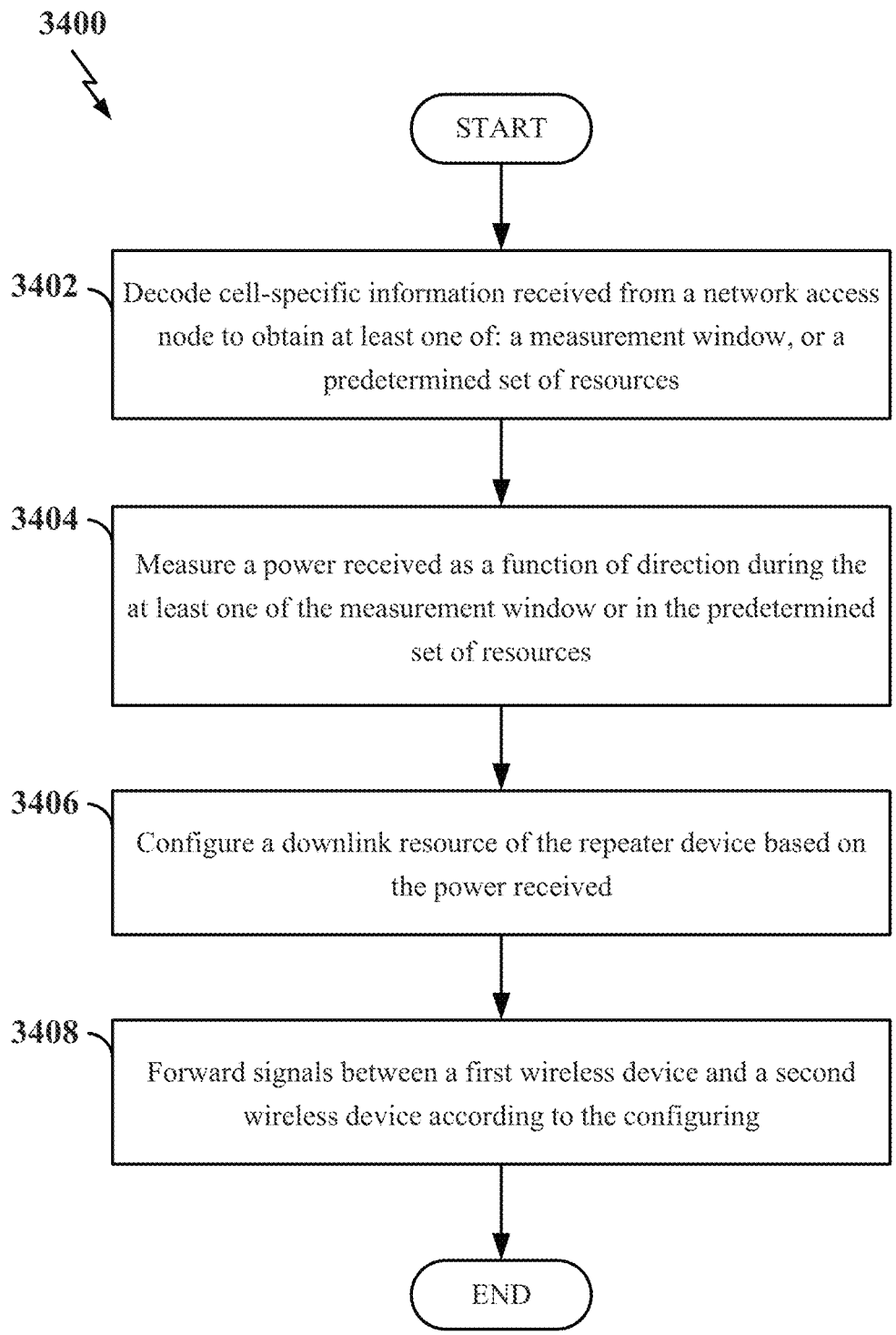
FIG. 34 is a flow chart illustrating an exemplary process at a repeater device in a wireless communication network according to some aspects of the disclosure.

FIG. 34 is a flow chart illustrating an exemplary process 3400 (e.g., a method) at a repeater device in a wireless communication network according to some aspects of the disclosure. As described below, some or all illustrated features may be omitted in a particular implementation within the scope of the present disclosure, and some illustrated features may not be required for implementation of all examples. In some examples, the process 3400 may be carried out by the repeater device 3200 illustrated in FIG. 32. In some examples, the process 3400 may be carried out by any suitable apparatus or means for carrying out the functions or algorithms described herein.

At block 3402, the repeater device may decode cell-specific information received from a network access node to obtain at least one of: a measurement window, or a set of resources. For example, the side control information decoding circuitry 3242, together with the transceiver 3210 and antennas/antenna array 3220, shown and described above in connection with FIG. 32 may provide a means for decoding the cell-specific information received from the network access node.

At block 3404, the repeater device may measure a power received as a function of direction during the at least one of: the measurement window, or the set of resources. For example, the power measuring circuitry 3247, together with the transceiver 3210 and antennas/antenna array 3220, shown and described above in connection with FIG. 32 may provide a means for measuring the power received as the function of direction during the at least one of: the measurement window, or the set of resources.

At block 3406, the repeater device may configure a downlink resource of the repeater device based on the power received. For example, the repeater device configuring circuitry 3243, together with the communication and processing circuitry 3241, shown and described above in connection with FIG. 32 may provide a means for configuring the downlink resource of the repeater device based on the power received.

At block 3408, the repeater device may forward signals between a first wireless communication device and a second wireless communication device according to the configuring. For example, the communication and processing circuitry 3241, together with the transceiver 3210 and the antennas/antenna array 3220 shown and described above in connection with FIG. 32 may provide a means for forwarding signals between the first wireless communication device and the second wireless communication device according to the configuring. In one example, the network access node is one of the first wireless communication device or the second wireless communication device.

According to one aspect, the repeater device may compare the power received as the function of direction to a predetermined threshold. The repeater device may then configure the downlink resource in at least one beam corresponding to at least one direction where the power received was less than the predetermined threshold.

In one example the repeater device may be a Layer-1 relay unit. In another example, changes to a configuration of the repeater device may be made in an absence of an RRC configuration established between the repeater device and any network access node including the network access node. In still another example, the at least one of: the measurement window, or the set of resources is conveyed to the repeater device in control signaling in a repeater-device-specific random access channel (RACH) configuration. The repeater-device-specific RACH configuration may be broadcast from the network access node and exclusively directed to a plurality of repeater devices including the repeater device within a broadcast reception range of the network access node. In some examples, the repeater device may be identified with a predetermined RACH preamble and/or a predetermined resource.

Figure 35:
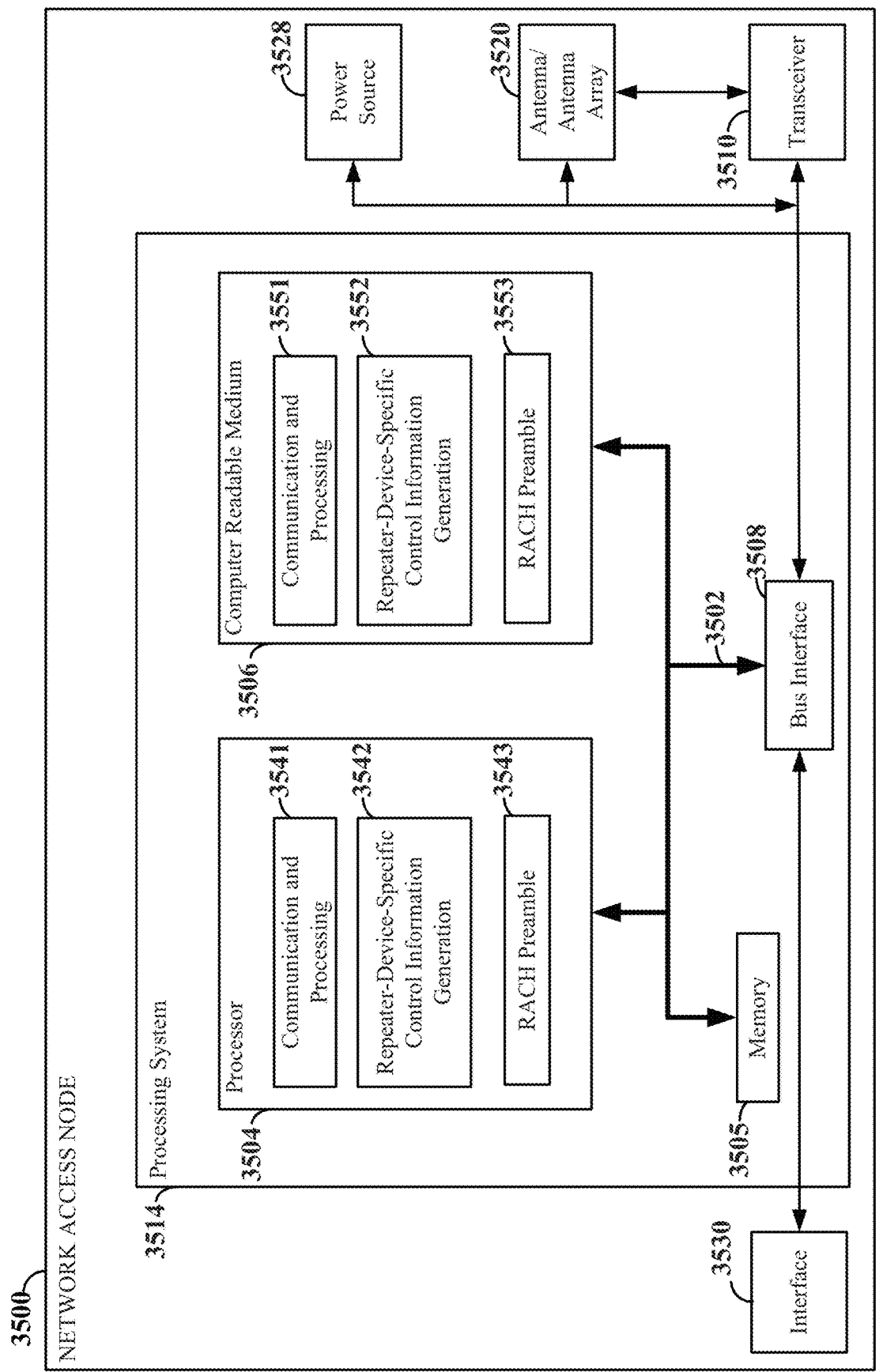
FIG. 35 is a schematic diagram illustrating an example of a hardware implementation of a network access node employing a processing system according to some aspects of the disclosure.

FIG. 35 is a schematic diagram illustrating an example of a hardware implementation of a network access node 3500 (e.g., a scheduling entity, a gNB, a base station) employing a processing system 3514 according to some aspects of the disclosure. For example, the network access node 3500 may be a device configured to wirelessly communicate with scheduled entities, UEs, wireless communication devices, other network access nodes, repeater devices, and/or IAB nodes, as discussed in any one or more of FIGS. 1-55. In some implementations, the network access node 3500 may correspond to any of the network access nodes (e.g., scheduling entities, gNBs, base stations) shown in any of FIGS. 1, 2, 5-12, 14-17, 25, 29, 31, 37, and/or 39-44.

In accordance with various aspects of the disclosure, an element, or any portion of an element, or any combination of elements may be implemented with the processing system 3514. The processing system 3514 may include one or more processors 3504. The processing system 3514 may be substantially the same as the processing system 2514 illustrated in FIG. 25 (or the processing system 2114 illustrated in FIG. 21), including a bus interface 3508, a bus 3502, memory 3505, a processor 3504, and a computer-readable medium 3506. Furthermore, the network access node 3500 may include additional features, such as an interface 3530, a transceiver 3510, antennas/antenna array 3520, and/or a power supply 3528. The interface 3530, transceiver 3510, antennas/antenna array 3520, and power supply 3528 may be coupled to the bus interface 3508. The recited features of the network access node 3500 may be substantially similar to like-numbered and like-named features of the network access node 2500 of FIG. 25 (or those of the repeater device 2100 of FIG. 21). Accordingly, to avoid duplication, descriptions of the like-numbered and like-named features, which may nevertheless be present in the network access node 3500, are not provided in connection with the description of FIG. 35.

The transceiver 3510, in connection with the one or more antennas/antenna array 3520, may provide a means for communicating with various other apparatus over a wireless transmission medium. The interface 3530 may provide a communication interface or means of communicating with various other apparatuses and devices (e.g., other devices housed within the same apparatus as the network access node 3500 or other external apparatuses) over an internal bus or external transmission medium, such as an Ethernet cable. Depending upon the nature of the apparatus, the interface 3530 may include a user interface (e.g., keypad, display, speaker, microphone, joystick, control features, etc.). Of course, such a user interface is optional, and may be omitted in some examples.

The network access node 3500 may be configured to perform any one or more of the operations described herein (e.g., in conjunction with FIGS. 1-55). That is, the processor 3504, as utilized in the network access node 3500, may be used to implement any one or more of the processes and procedures described herein, for example, in conjunction with FIGS. 26-28, 36, 38, and/or 49-52. In some aspects of the disclosure, the processor 3504, as utilized in the network access node 3500, may include circuitry configured for various functions. The processor 3504 is responsible for managing the bus 3502 and general processing, including the execution of software stored on the computer-readable medium 3506. The software, when executed by the processor 3504, causes the processing system 3514 to perform the various functions described below for any particular apparatus. The computer-readable medium 3506 and the memory 3505 may also be used for storing data that is manipulated by the processor 3504 when executing software.

In some aspects of the disclosure, the processor 3504 may include communication and processing circuitry 3541. The communication and processing circuitry 3541 may be configured for various functions, including for example, communicating with a user equipment (UE), a repeater device, or other wireless communication device, a network core (e.g., a 5G core network), other network access nodes or scheduling entities, or any other entity, such as, for example, local infrastructure or an entity communicating with the network access node 3500 via the Internet, such as a network provider. The communication and processing circuitry 3541 may include one or more hardware components that provide the physical structure that performs processes related to wireless communication (e.g., signal reception and/or signal transmission), including, for example, broadcasting DCI to a plurality of repeater devices, all as described herein. The communication and processing circuitry 3541 may further include one or more hardware components that provide the physical structure that performs various processes related to signal processing (e.g., processing a received signal and/or processing a signal for transmission) as described herein. Some of the functions, processes, and/or hardware components of the communication and processing circuitry 3541 of the network access node 3500 may be similar to the various like-named functions described in connection with the communication and processing circuitry 2541 of the network access node 2500 of FIG. 25. Accordingly, to avoid duplication, descriptions of the various like-named functions, which may nevertheless be present in the communication and processing circuitry 3541, are not provided in connection with the description of the communication and processing circuitry 3541 of FIG. 35. The communication and processing circuitry 3541 may be configured to receive and process downlink traffic and downlink control (e.g., similar to downlink traffic 142 and downlink control 144 of FIG. 1) and process and transmit uplink traffic and uplink control (e.g., similar to uplink traffic 146 and uplink control 148). The communication and processing circuitry 3541 may further be configured to execute communication and processing software 3551 stored on the computer-readable medium 3506 to implement one or more functions described herein.

In some aspects of the disclosure, the processor 3504 may include repeater-device-specific control information generation circuitry (referred to herein as repeater device control information generation circuitry 3542) configured for various functions, including, for example, generating repeater-device-specific control information that is included in at least one of: a payload of a downlink control information (DCI) format that is unique to repeater devices, a remaining master system information (RMSI), a master information block (MIB), or a combination of the MIB and a system information block (SIB). In some examples, the repeater device control information generation circuitry 3542 may include one or more hardware components that provide the physical structure that performs processes related to, for example, generating repeater-device-specific control information that is included in at least one of: a payload of a downlink control information (DCI) format that is unique to repeater devices, a remaining master system information (RMSI), a master information block (MIB), or a combination of the MIB and a SIB. The repeater device control information generation circuitry 3542 may further be configured to execute repeater device control information generation software 3552 stored on the computer-readable medium 3506 to implement one or more functions described herein.

In some aspects of the disclosure, the processor 3504 may include RACH preamble circuitry 3543 configured for various functions, including, for example, identifying a plurality of repeater devices with a predetermined random access channel (RACH) preamble that is distinct from wireless communication device RACH preambles. In some examples, the RACH preamble circuitry 3543 may include one or more hardware components that provide the physical structure that performs processes related to identifying a plurality of repeater devices with a predetermined random access channel (RACH) preamble that is distinct from wireless communication device RACH preambles. The RACH preamble circuitry 3543 may further be configured to execute RACH preamble software 3553 stored on the computer-readable medium 3506 to implement one or more functions described herein.

Figure 36:
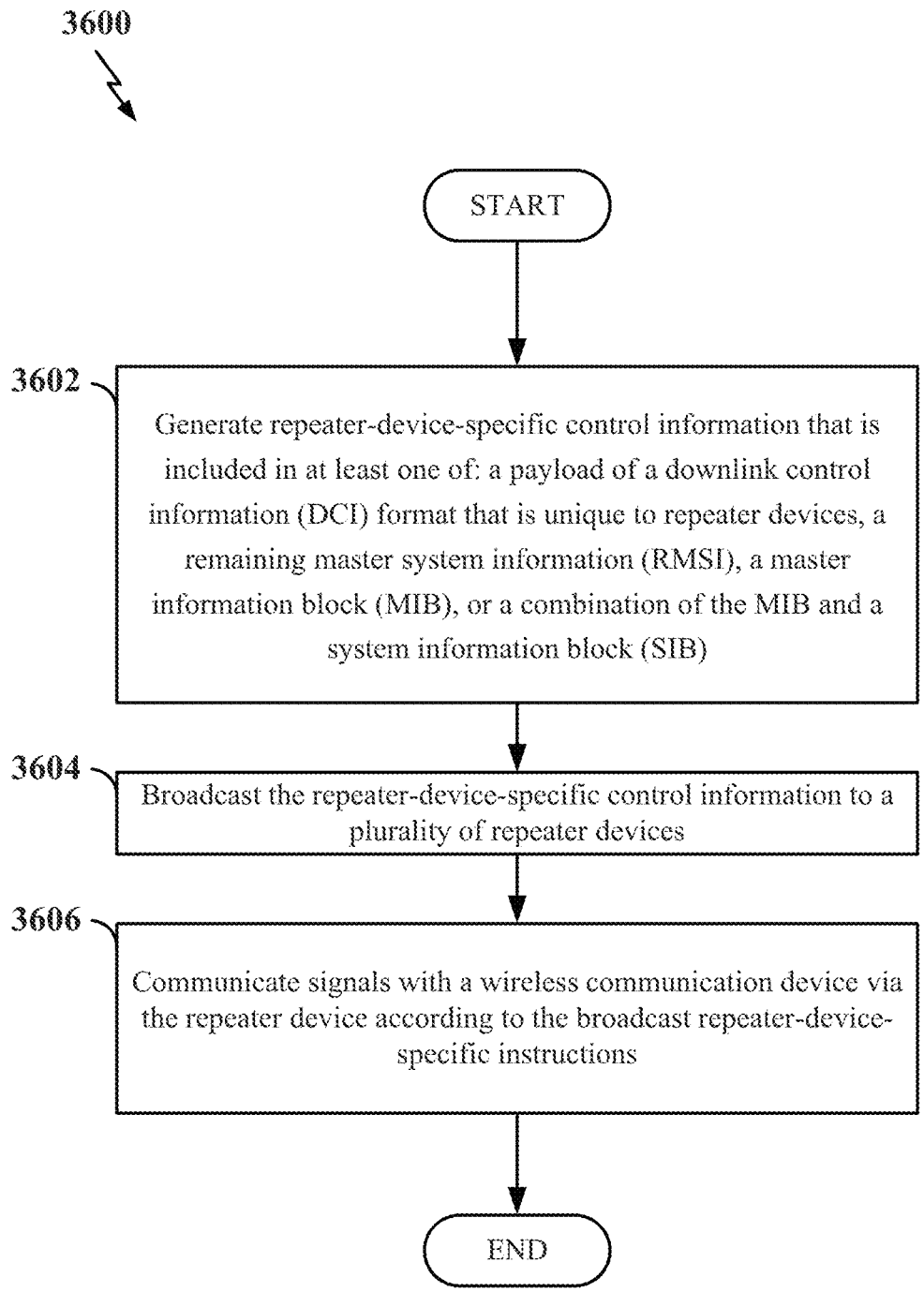
FIG. 36 is a flow chart illustrating an exemplary process for a network access node in a wireless communication network according to some aspects of the disclosure.

FIG. 36 is a flow chart illustrating an exemplary process 3600 (e.g., a method) for a network access node in a wireless communication network according to some aspects of the disclosure. As described below, some or all illustrated features may be omitted in a particular implementation within the scope of the present disclosure, and some illustrated features may not be required for implementation of all examples. In some examples, the process 3600 may be carried out by the network access node 3500 illustrated in FIG. 35. In some examples, the process 3600 may be carried out by any suitable apparatus or means for carrying out the functions or algorithms described herein.

At block 3602, the network access node may generate repeater-device-specific control information (referred to herein as repeater device control information) that may be (e.g., will be) included in at least one of: a payload of a downlink control information (DCI) format that is unique to repeater devices, a remaining master system information (RMSI), a master information block (MIB), or a combination of the MIB and a system information block (SIB). For example, the repeater device control information generation circuitry 3542, shown and described above in connection with FIG. 35 may provide a means for generating the repeater device control information that is (e.g., will be) included in at least one of: the payload of the downlink control information (DCI) format that is unique to repeater devices, the remaining master system information (RMSI), the master information block (MIB), or the combination of the MIB and the system information block (SIB).

At block 3604, the network access node may broadcast the repeater device control information to a plurality of repeater devices. For example, the communication and processing circuitry 3541, together with the transceiver 3510 and antennas/antenna array 3520, shown and described above in connection with FIG. 35, may provide a means for broadcasting the repeater device control information to the plurality of repeater devices.

At block 3606, the network access node may communicate signals with a wireless communication device via the repeater device according to the broadcast repeater device control information. For example, the communication and processing circuitry 3541, together with the transceiver 3510 and antennas/antenna array 3520, shown and described above in connection with FIG. 35, may provide a means for communicating traffic and control with a wireless communication device via the repeater device according to the broadcast repeater device control information.

According to one aspect, the repeater device control information may be associated with a synchronization signal block (SSB) or a beamforming configuration. In one example, the network access node may also generate a plurality of payloads for a respective plurality of the DCI format that is unique to repeater device and broadcast the plurality of DCI in series to dynamically change a configuration of the repeater devices. In another example, the network access node may also generate a plurality of sets of repeater device control information that are unique to repeater devices and broadcast the plurality of sets of repeater device control information in series to dynamically change a configuration of the repeater devices.

According to one aspect, the plurality of DCI may include: a first DCI format, unique to a first plurality of repeater devices, which configures the first plurality of repeater devices to disable repeater device reception and transmission, and a second DCI format, unique to a second plurality of repeater devices, which configures the second plurality of repeater devices to enable repeater device reception and transmission. In one example, the DCI format may be associated with a common radio network temporary identifier (RNTI) that distinguishes the DCI format from other DCI formats associated with other RNTIs associated with wireless communication devices.

In another example, the plurality of repeater devices may be identified with a predetermined random access channel (RACH) preamble and/or a predetermined resource that is distinct from wireless communication device RACH preambles and resources. The network access node may convey information to the plurality of repeater devices in a RACH response to a predetermined RACH preamble and/or a predetermined resource. The predetermined RACH preamble and/or the predetermined resource may be one of a plurality of predetermined RACH preambles and/or plurality of predetermined resources associated with a respective plurality of information that is preestablished to convey information to the network access node. The respective plurality of information may correspond to at least one of: a power configuration of a repeater device, or a measured power of resources in an access link. The measured power of resources in the access link may be measured in at least one of: a measurement window configured by the network access node, or within a set of resources configured by the network access node. In one example, the plurality of repeater devices may convey information to the network access node by at least one of: selection of a predetermined RACH preamble and/or a predetermined resource, inclusion of the information in a payload of a first RACH message, inclusion of the information in a payload of a third RACH message, or setting a transmitter power of the repeater device to one of a plurality of predetermined transmitter power levels, wherein each of the plurality of predetermined transmitter power levels conveys a distinct respective piece of information. According to one aspect, the network access node may convey information to the repeater device in one of a RACH response or a fourth RACH message. Changes to a configuration of each of the plurality of repeater devices may be made without establishment of a control interface between the plurality of repeater devices and the network access node.

In one aspect, the network access node may also configure the plurality of repeater devices to convey radio frequency traffic received at respective repeater devices in accordance with a control signal broadcast by the network access node. The control signal is broadcast from the network access node and exclusively directed to a plurality of repeater devices, including the repeater device, within a broadcast reception range of the network access node. In one example the control signal may configure the plurality of repeater devices to not convey radio frequency traffic associated with a cell. According to one aspect, the control signal may provide a synchronization signal block (SSB)-specific indication where the repeater device determines to convey or to not convey based on the detected SSB from the network node and the provided SSB-specific indication.

Still further, the network access node may also determine a synchronization signal block (SSB) index value associated with the control signal and configure an output power of respective transmitters of the plurality of repeater devices according to the SSB index value. The configuring the output power may include at least one of: configuring a maximum output power of the respective transmitters, configuring a maximum amplification gain of the respective transmitters, or configuring a first power assigned to first traffic transmitted in an uplink and a second power assigned to second traffic transmitted in a downlink, wherein the first power is different from the second power. Still further, the network access node may also configure the plurality of repeater devices based on a power level of a broadcast channel carrying cell-specific information to the plurality of repeater devices, where the configuring is based on a comparison of the power level to a predetermined low threshold and a predetermined high threshold.

III. Identification of a Wireless Communication Repeater Device

Some aspects described herein may relate to identifying a wireless communication repeater device to one or more nodes (e.g., devices). According to some aspects, the repeater device and the network access node may use initial signaling (e.g., Msg1-Msg4 or MsgA-MsgB) to provide a repeater device identification to the network access node. Furthermore, the network access node and a core network node may use signaling to provide the repeater device identification to the core network node.

Figure 37:
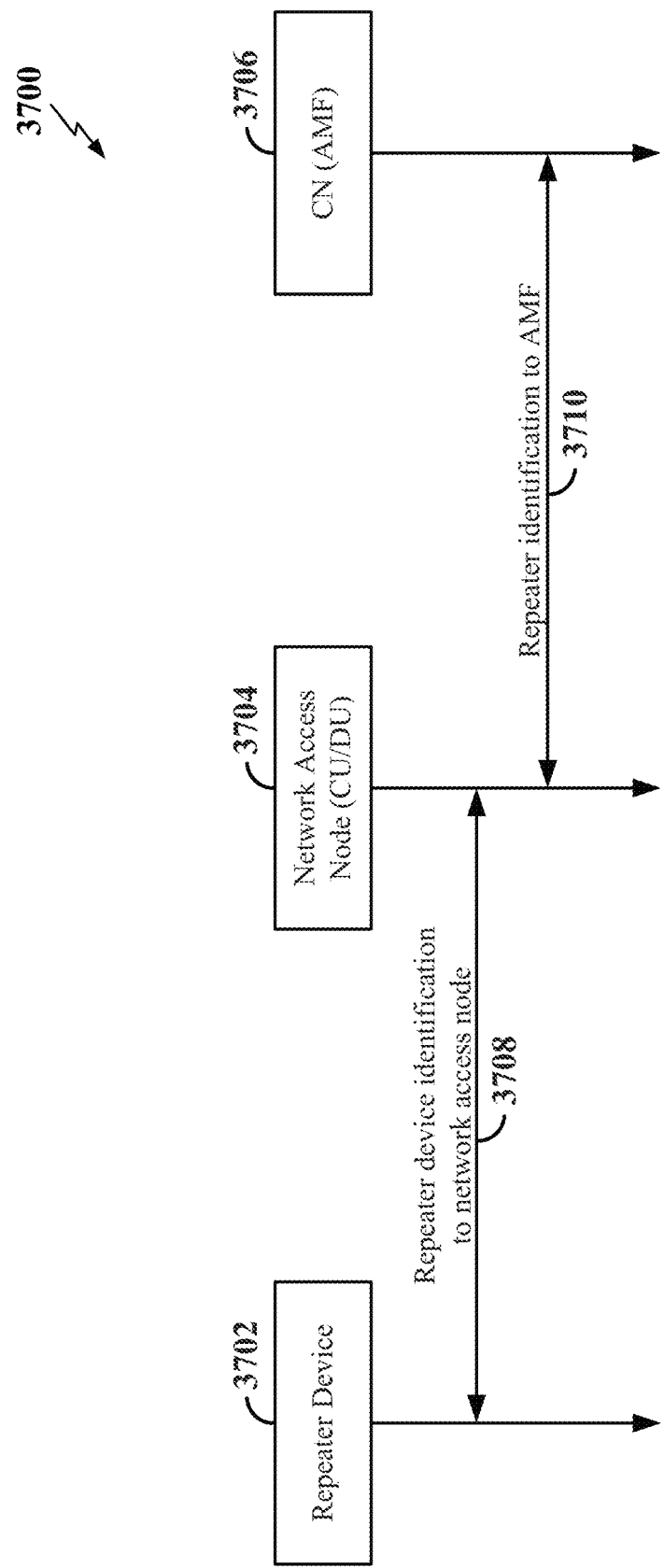
FIG. 37 is a call flow diagram illustrating signaling between a repeater device, a network access node, and a core network node according to some aspects of the disclosure.

FIG. 37 is a call flow diagram 3700 illustrating signaling between a repeater device 3702 (e.g., a scheduled entity, a UE, a wireless communication device), a network access node 3704 (e.g., a scheduling entity, a gNB, a base station), and a core network node (e.g., a core network (CN) Access and Mobility Management Function (AMF) (identified in the figures herein as a CN(AMF) 3706) according to some aspects of the disclosure. The network access node 3704 may correspond to any of the network access nodes (e.g., scheduling entities, gNBs, base stations) shown in any of FIGS. 1, 2, 5-12, 14-17, 25, 29, 31, 37, and/or 39-44. The repeater device 3702 may correspond to any of the RF repeater devices of FIGS. 7-21, 29, 31, 32, 37, 39, and/or 40. The core network node (e.g., CN(AMF) 3706) may correspond to any core network node described herein, such as, for example, any of the core network nodes of any of FIGS. 1-55. As illustrated, the repeater device 3702 and the network access node 3704 may use signaling as discussed herein to provide a repeater device identification 3708 to the network access node 3704. In addition, the network access node 3704 and a node of the core network (e.g., CN(AMF) 3706, an AMF of the core network) may use signaling as discussed herein to provide the repeater device identification 3710 to the CN(AMF) 3706.

Figure 38:
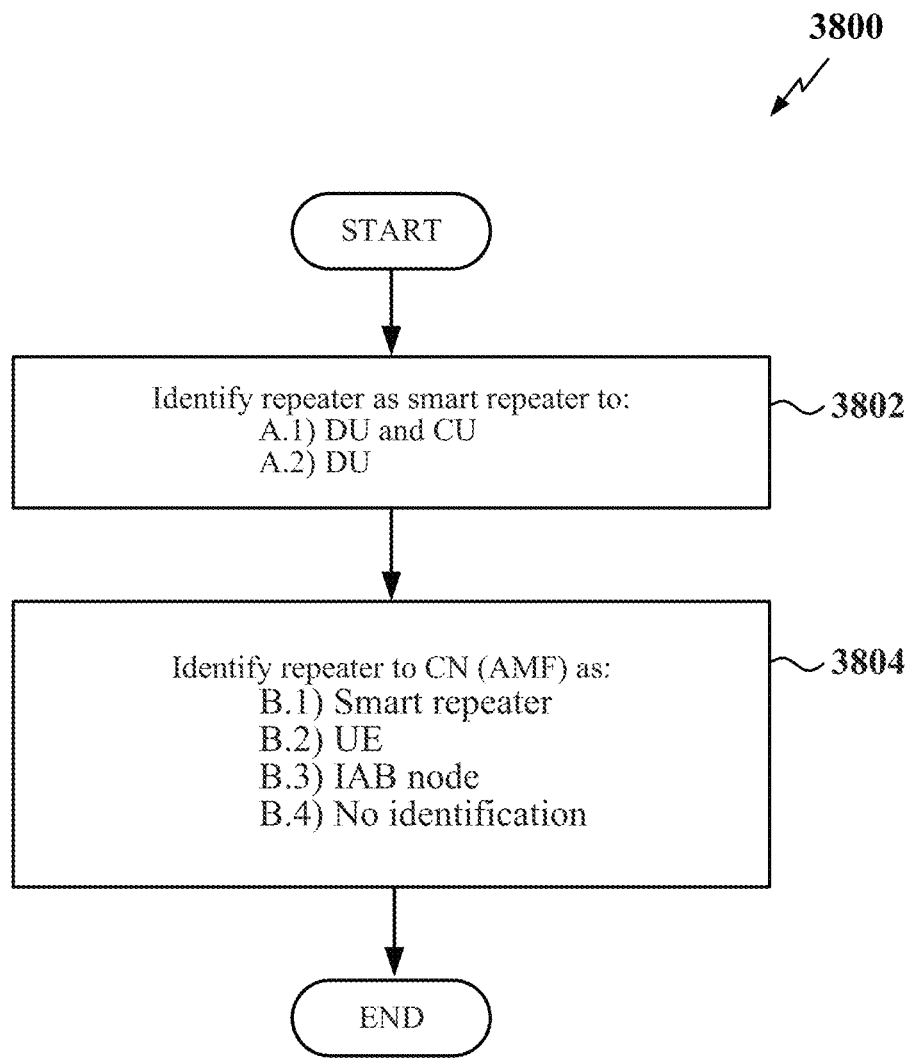
FIG. 38 is a flow chart illustrating an exemplary process at a network access node in a wireless communication network according to some aspects of the disclosure.

FIG. 38 is a flow chart illustrating an exemplary process 3800 (e.g., a method) at a network access node in a wireless communication network according to some aspects of the disclosure. Block 3802 illustrates two Options, A.1 and A.2, associated with identifying a repeater device to a network access node. In Option A.1, a repeater device may be identified as a "smart repeater device" to both a DU and a CU of a network access node. In Option A.2, a repeater device may be identified as a "smart repeater device" only to a DU of a network access node. In this latter case, the identity of the repeater device is transparent to the CU. As discussed herein, a smart repeater device may include configurable beamforming (e.g., a gNB may configure one or more beams used by the smart repeater device).

Block 3804 illustrates four Options, B.1, B.2, B.3, and B.4, associated with identifying a repeater device to a core network (CN). In Option B.1, a repeater device may be identified as a "smart repeater device" to the CN. This option may work well with (e.g., be associated with) Option A.1 because the CU is aware of the identity of the repeater device and can therefore forward this identity to the CN. In Option B.2, a repeater device may be identified as a UE (e.g., a conventional UE) to the CN. This option may work well with (e.g., be associated with) Option A.1 and/or Option A.2 because the CU or DU may cause a UE identity to be forwarded to the CN. In Option B.3, a repeater device may be identified as an IAB node to the CN. This option may work well with (e.g., be associated with) Option A.1 because the CU may include functionality for forwarding the identity of an IAB node to the CN. In Option B.4, the network access node does not identify the repeater device to the CN. In this case, the identity of the repeater device is transparent to the CN. This option may work well with (e.g., be associated with) Option A.1 because the CU may establish an RRC connection with the repeater device and thereby enable repeater device access to the network. However, the repeater device might not be authenticated in Option B.4. Thus, a network access node that uses the repeater device may provide functionality to ensure that the repeater device is operating in an expected manner.

Different types of signaling may be used for Option A.1 in different examples. Six example signaling sub-options will be described. Other signaling options may be using in other examples.

A first sub-option (Alt a.1.1) may involve defining a new "establishmentCause" in an RRCSetupRequest message (Msg3). For example, during an Initial RRC Exchange, the "establishmentCause" in the RRCSetupRequest (RRCConnRequest) may be set to indicate the device is a smart repeater device. This may involve defining a new value for establishmentCause, such as "smartRepeater device-Access." For example, the establishmentCause may be defined as: {emergency, highPriorityAccess, mt-Access, mo-Signalling, no-Data, mo-VoiceCall, mo-VideoCall, mo-SMS, mpsPriorityAccess, mcspPriorityAccess, smartRepeater device-Access, spare5, spare4, spare3, spare2, spare1}.

Figure 39:
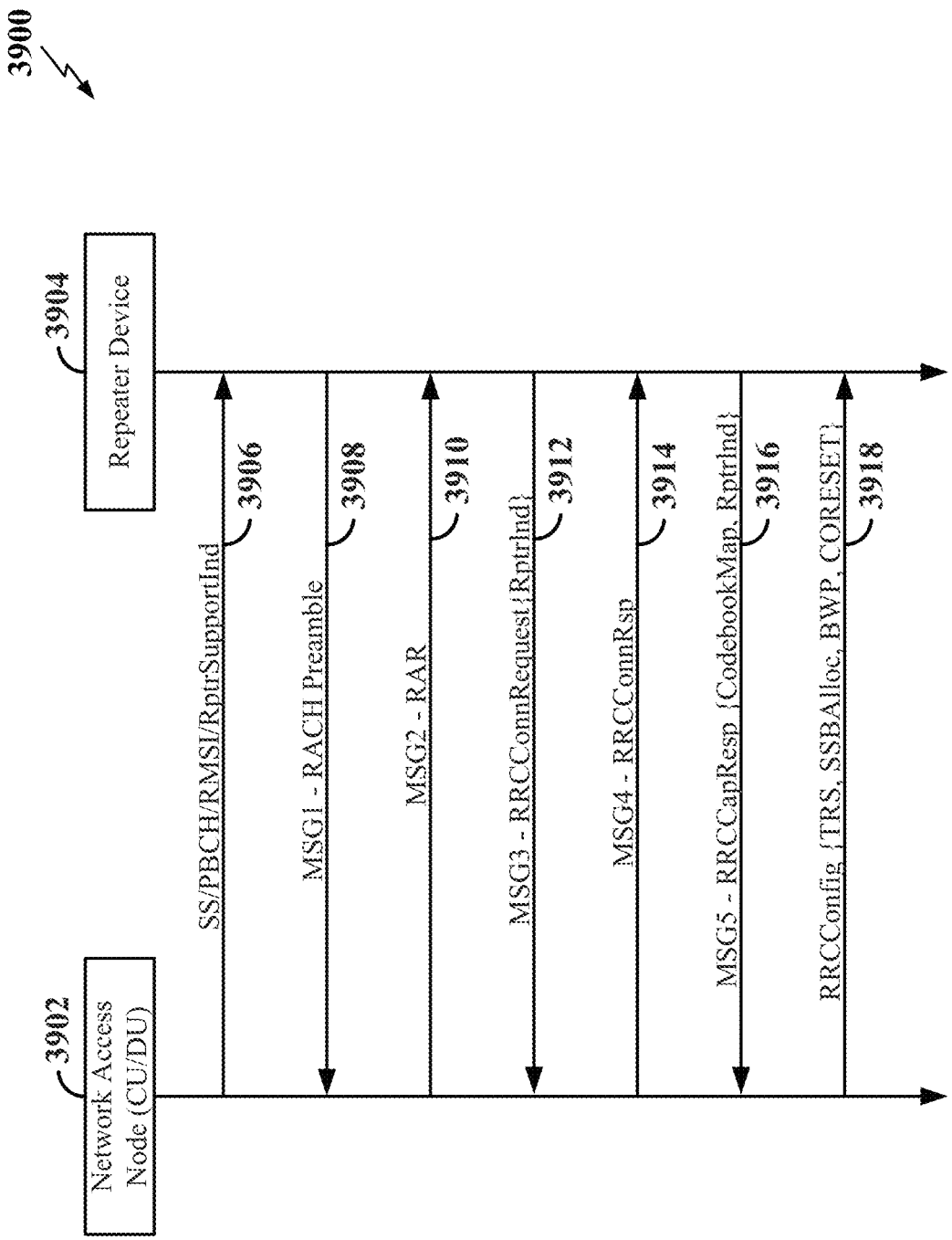
FIG. 39 is a call flow diagram illustrating an example of an initial access procedure between a network access node and a repeater device according to some aspects of the disclosure.

FIG. 39 is a call flow diagram illustrating an example of an initial access procedure 3900 between a network access node 3902 and a repeater device 3904 according to some aspects of the disclosure. The network access node 3902 may correspond to any of the network access nodes (e.g., scheduling entities, gNBs, base stations) shown in any of FIGS. 1, 2, 5-12, 14-17, 25, 29, 31, 37, and/or 39-44. The repeater device 3904 may correspond to any of the RF repeater devices of FIGS. 7-21, 29, 31, 32, 37, 39, and/or 40.

The initial access procedure 3900 may involve the network access node 3902 transmitting synchronization signaling (e.g., SSBs), a PBCH, RMSI, and other information (e.g., an indication that the network access node 3902 supports repeater devices) (e.g., transmitting SS/PBCH/RMSI/RptrSupportInd) to the repeater device 3904 at 3906. This may enable the repeater device 3904 to synchronize to the network access node 3902 and obtain initial access information (e.g., identify the resources to be used for a RACH procedure and determine whether the network access node supports repeater devices). The repeater device 3904 may then transmit a RACH preamble (Msg1) at 3908. In response to the RACH preamble, the network access node 3902 may transmits a random access response (Msg2—RAR) at 3910 to indicate resources for the repeater device 3904 to transmit an RRC connection request (Msg3) (e.g., RRConnRequest {RptrInd}) at 3912. An RRC connection request may be referred to as an RRC setup request. In response to the RRC connection request, the network access node 3902 may transmit an RRC connection (or setup) response (Msg4) (e.g., an RRCConnRsp) at 3914. The RRC connection response may be referred to as an RRC setup. The repeater device 3904 may then transmit an RRC capability response (Msg5) (e.g., RRCCapResp {CodebookMap, Rptrind}) at 3916. An RRC capability response may be referred to as an RRC setup complete. Once the RRC connection is established, the network access node 3902 may, over time, send RRC configuration information (e.g., RRCConfig {TRS, SSBAlloc, BWP, CORESET}) to the repeater device 3904 at 3918.

As indicated at 3912 of FIG. 39, the Msg3 may include a repeater device indication (Rptrind). This repeater device indication may signal that the repeater device 3904 is a smart repeater device. For example, the "establishmentCause" in the RRCSetupRequest (RRCConnRequest) may be set to indicate the device is a smart repeater device as discussed above.

Referring again to the sub-options of Option A.1, a second sub-option (Alt a.1.2) may involve adding a new indication (e.g., "smart-repeater device-node indication") in an RRCSetupComplete message (Msg5). As indicated at 3916 of FIG. 39, the Msg5 may include a repeater device indication (Rptrind).

In a third sub-option (Alt a.1.3), a smart repeater device may be treated as an IAB node with reduced capabilities. As such, the repeater device may establish an RRC connection as a non-repeater device. Later (e.g., when repeater device shares its capabilities after the initial access procedure), it may be implicitly/explicitly indicated that the repeater device is a smart repeater device and not an IAB node.

In some examples, to establish an RRC connection as a non-repeater device, the repeater device may establish an RRC connection as would (e.g., like, in the same manner) an IAB node. For example, the repeater device may use an IAB-specific RACH configuration (if configured) and include an "IAB node indication" in Msg5 (e.g., Msg5 at 3916 of FIG. 39, where IAB node notification may be added to information carried in Msg5).

In a fourth sub-option (Alt a.1.4), a repeater device may send an indication of its identity in a later RRC message to a CU of a network access node. For example, the repeater device may establish an RRC connection as a non-repeater device (e.g., as discussed herein) and then transmit the indication of its identity after the RRC connection is established.

In a fifth sub-option (Alt a.1.5), a repeater device may send an indication of its identity in a lower-layer signal (e.g., a MAC-CE, UCI, etc.) to a DU of a network access node. The DU may then send (e.g., over F1-AP) an indication of the identity of the repeater device to a CU for the DU.

In a sixth sub-option (Alt a.1.5), a repeater device may use a dedicated RACH procedure for repeater devices. This dedicated RACH procedure may indicate to the DU that the device initiating the RACH procedure is a repeater device. The DU may then send (e.g., over F1-AP) an indication of the identity of the repeater device to a CU for the DU.

Figure 40:
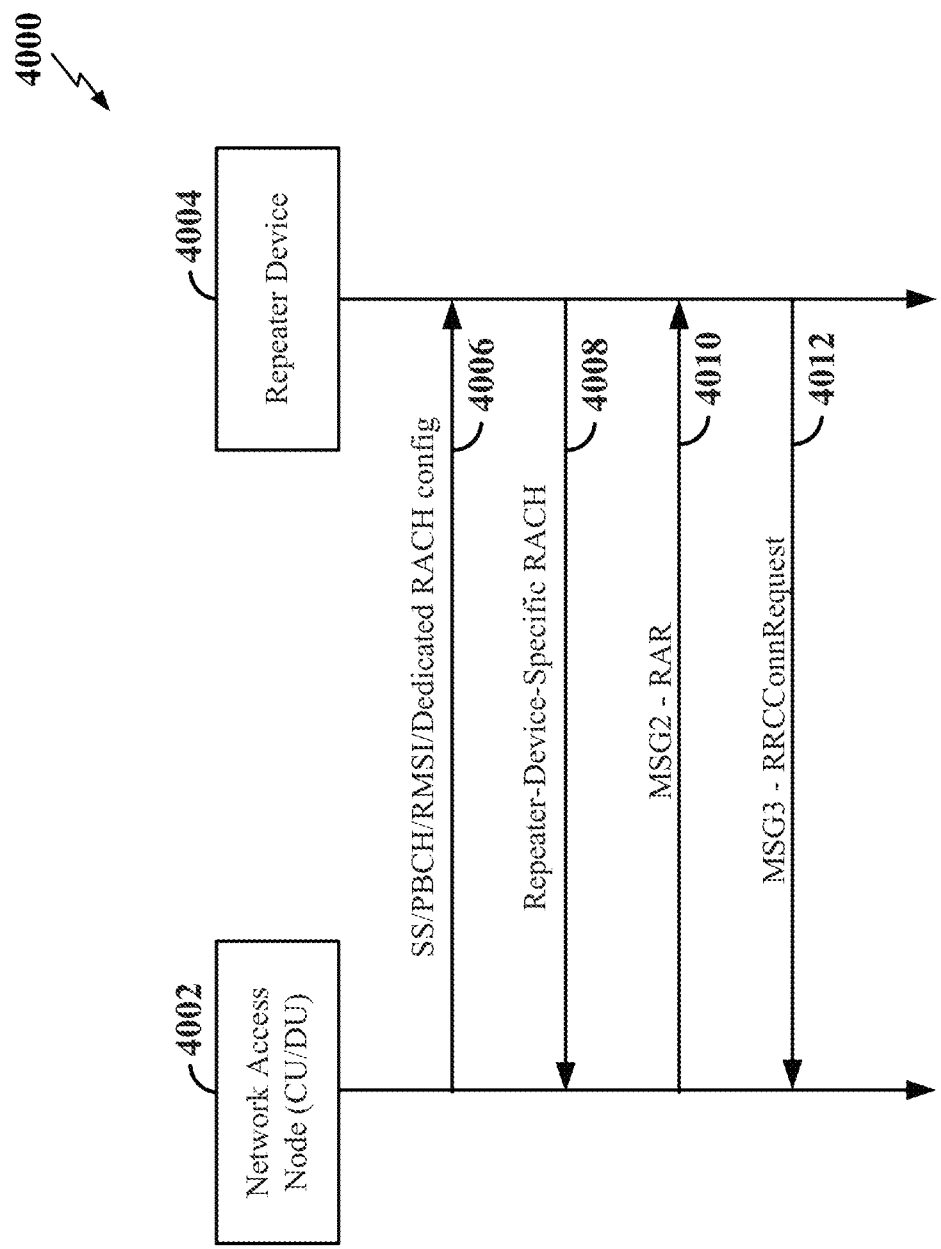
FIG. 40 is a call flow diagram illustrating an example of a dedicated RACH procedure in a wireless communication network including a network access node and a repeater device according to some aspects of the disclosure.

FIG. 40 is a call flow diagram illustrating an example of a dedicated RACH procedure 4000 in a wireless communication network including a network access node 4002 and a repeater device 4004 according to some aspects of the disclosure. The dedicated RACH procedure may be the same or similar to the dedicated RACH procedure recited above. The network access node 4002 may correspond to any of the network access nodes (e.g., scheduling entities, gNBs, base stations) shown in any of FIGS. 1, 2, 5-12, 14-17, 25, 29, 31, 37, and/or 39-44. The repeater device 4004 may correspond to any of the RF repeater devices of FIGS. 7-21, 29, 31, 32, 37, 39, and/or 40.

At 4006 of FIG. 40, the network access node 4002 may broadcast dedicated RACH configuration information (e.g., Dedicated RACH config) that may be used for a dedicated RACH procedure for a repeater device. For example, the dedicated RACH configuration may indicate RACH occasions that are dedicated for repeater devices. Thus, at 4008, the repeater device 4004 may transmit a repeater-device-specific Msg1 to the network access node 4002, thereby informing the network access node 4002 that the repeater device 4004 is a repeater device. The communications at 4010 (e.g., Msg2—RAR) and 4012 (e.g., Msg3—RRCConnRequest) may be similar to corresponding reference numbers 3910 and 3912 in FIG. 39. Their descriptions are not repeated to avoid duplication.

Different types of signaling may be used for Option A.2 in different examples. For example, in a first sub-option (Alt a.2.1), a repeater device may send an indication of its identity in a lower-layer signal (e.g., a MAC-CE, UCI) to a DU of a network access node (e.g., as discussed above). In a second sub-option (Alt a.2.2), a repeater device may use a dedicated RACH configuration for repeater devices (e.g., as discussed above).

Different types of signaling may be used for Option B.1 in different examples. Three example signaling sub-options will be described. Other signaling options may be using in other examples.

A first sub-option (Alt b.1.1) may involve defining a new "RRC establishment cause" in an "initial UE message" sent by a network access node to an AMF of a core network. This option may work well with (e.g., be associated with) Alt a.1.1 discussed above.

Figure 41:
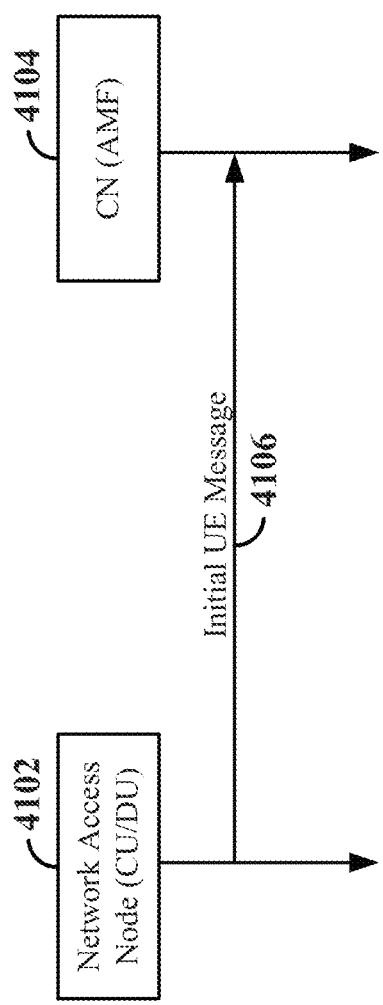
FIG. 41 is a call flow diagram illustrating an example of initial UE message signaling in a wireless communication network including a network access node and a core network (CN) Access and Mobility Management Function (AMF) according to some aspects of the disclosure.

FIG. 41 is a call flow diagram illustrating an example of initial UE message signaling 4100 in a wireless communication network including a network access node 4102 and a core network (CN) Access and Mobility Management Function (AMF), identified herein as CN(AMF) 4104 according to some aspects of the disclosure. The network access node 4102 may correspond to any of the network access nodes (e.g., scheduling entities, gNBs, base stations) shown in any of FIGS. 1, 2, 5-12, 14-17, 25, 29, 31, 37, and/or 39-44. The CN 4104 may correspond to any core network node described herein, such as, for example, any of the core network nodes of any of FIGS. 1-55.

The network access node 4102 may send an initial UE message 4106 to transfer an initial Layer-3 message to the CN (AMF) 4104 via a Next Generation (NG) interface. The initial UE message 4106 may include parameters such as an RRC establishment cause and an IAB node indication. In some examples, the network access node 4102 may copy the RRC establishment cause information received via Msg3 into the RRC establishment cause of the initial UE message 4106. In other examples, the network access node 4102 may copy a repeater device indication received in some other manner (e.g., lower layer signaling) into the RRC establishment cause of the initial UE message 4106.

A second sub-option (Alt b.1.2) may involve adding a new indication (e.g., a "smart-repeater device-node indication") in the "initial UE message" sent by the network access node to the CN (AMF) 4104. For example, the "initial UE message" may be defined to include a repeater device indication similar to the IAB node indication discussed above. This option may work well with (e.g., be associated with) Alt a.1.2 discussed above.

In a third sub-option (Alt b.1.3), a smart repeater device may be introduced initially as an IAB node to the CN (e.g., "IAB node indication" may be included in the "initial UE message"). Later (e.g., when the CN receives the radio capabilities information), it may implicitly/explicitly indicate that the initially introduced IAB node is a smart repeater device and not an IAB node. This option may work well with (e.g., be associated with) Alt a.1.3 discussed above.

Figure 42:
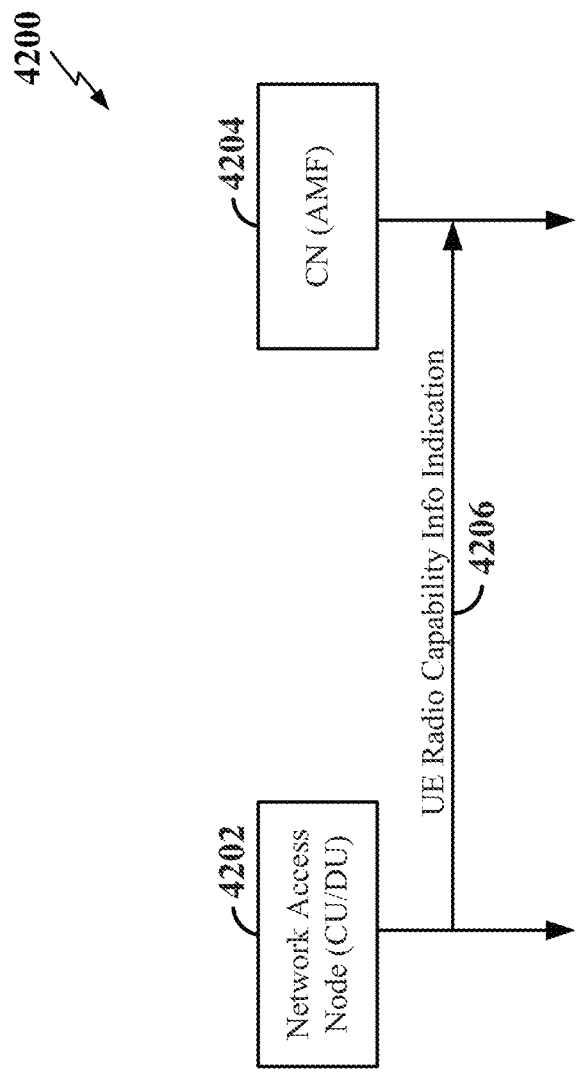
FIG. 42 is a call flow diagram illustrating an example of radio capability signaling in a wireless communication network including a network access node and a CN(AMF) according to some aspects of the disclosure.

FIG. 42 is a call flow diagram illustrating an example of radio capability signaling 4200 in a wireless communication network including a network access node 4202 and a CN(AMF) 4204 according to some aspects of the disclosure. The network access node 4202 may correspond to any of the network access nodes (e.g., scheduling entities, gNBs, base stations) shown in any of FIGS. 1, 2, 5-12, 14-17, 25, 29, 31, 37, and/or 39-44. The CN 4204 may correspond to any core network node described herein, such as, for example, any of the core network nodes of any of FIGS. 1-55.

The network access node 4202 may perform a UE radio capability information indication procedure to enable the network access node 4202 to provide UE radio capability information to the CN(AMF) 4204 via a UE radio capability information indication 4206. This procedure may use UE-associated signaling.

Conventional signaling may be used for Options B2, B3, and B4. In Option B3, the gNB may include an "IAB node indication" in an "initial UE message" sent to the CN(AMF) 4204. In Option B4, upon identifying the repeater device during the initial RRC setup, the network access node 4202 may not initiate any CN signaling (e.g., the network access node 4202 may not send an "initial UE message" for the repeater device to the CN(AMF) 4204 in some examples).

If an AMF supports smart repeater devices, the AMF may indicate as such to a network access node. For example, the AMF may include a repeater device supported information element (IE) in a Next Generation setup response (NG SETUP RESPONSE) message. After performing repeater device authorization, the AMF may include a "repeater device authorized" IE, for an authorized repeater device, in associated Next Generation Application Protocol (NG-AP) signaling (e.g., in "initial context setup request," "handover request," or "UE context modification request"). The NG-AP may provide control plane signaling between an NG-RAN node and an Access and Mobility Management Function (AMF).

In some examples, to reduce defining new IEs, IAB-related IEs may be reused for repeater devices. For example, if an IAB Authorized IE is indicated for a repeater device, this could be an indication that the repeater device is authorized by the CN. As another example, if an IAB Supported IE is indicated by the AMF, this could also mean that CN supports repeater devices as well. Also, the AMF may be configured to avoid sending a repeater device to idle mode.

Figure 43:
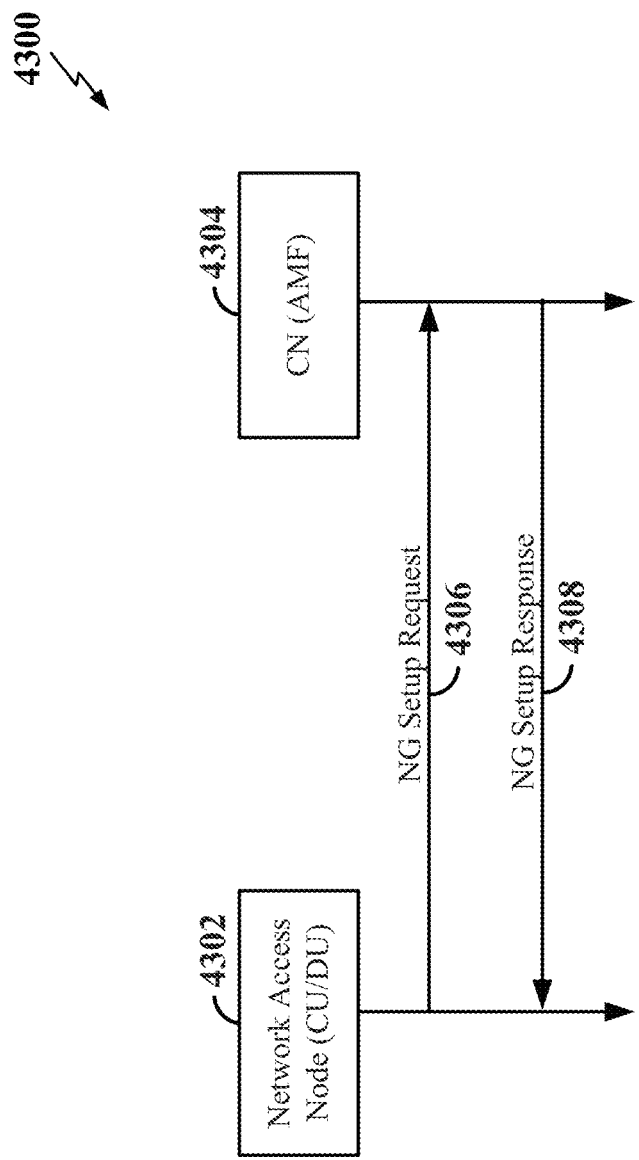
FIG. 43 is a call flow diagram illustrating an example of a Next Generation (NG) setup procedure in a wireless communication network including a network access node and a CN(AMF) according to some aspects of the disclosure.

FIG. 43 is a call flow diagram illustrating an example of a Next Generation (NG) setup procedure 4300 in a wireless communication network including a network access node 4302 and a CN(AMF) 4304 according to some aspects of the disclosure. The network access node 4302 may correspond to any of the network access nodes (e.g., scheduling entities, gNBs, base stations) shown in any of FIGS. 1, 2, 5-12, 14-17, 25, 29, 31, 37, and/or 39-44. The CN 4304 may correspond to any core network node described herein, such as, for example, any of the core network nodes of any of FIGS. 1-55.

After receiving an NG setup request 4306 message from the network access node 4302, if the CN(AMF) 4304 supports IAB nodes, the CN(AMF) 4304 may include an IAB Supported IE in the NG setup response 4308 message. Similarly, if the CN(AMF) 4304 supports repeater devices, the CN(AMF) 4304 may include a Repeater Device Supported IE in the NG setup response 4308 message.

In some examples, a wireless communication device may have both IAB node capability and smart repeater device capability. In some examples, the wireless communication device may decide which mode of operation to use (e.g., based on power saving or some other criterion). In this case, the wireless communication device may send a dynamic indication and/or a capability message upon switching between two modes to inform the network which capability the wireless communication device is currently using. In some examples, the wireless communication device may be integrated/introduced as both an IAB node and a smart repeater device. The wireless communication device may then use a separate dynamic signaling (e.g., lower-layer signaling) to indicates its mode of operation.

In some examples, the network (e.g., a DU, a CU, or a CN) may decide the mode of operation for the wireless communication device. This decision may be based on, for example, traffic load, required QoS (e.g., using smart repeater devices for low-latency traffic), deployment, capabilities of other nodes like parent-node, etc. The selecting node may send a message to indicate the selected mode of operation to the repeater device and/or other nodes in the network. If the DU decides the mode of operation, it may use DCI, MAC-CE, or RRC signaling. In this case, the DU may also notify the CU/CN about the selected mode of operation. If the CU decides the mode of operation, it may use RRC or F1-AP signaling to tell the DU. The DU may then send a corresponding indication to the repeater device via lower-layer signaling. The CU may also send a corresponding indication to the CN. If the CN decides the mode of operation, it may use NG-AP signaling (e.g., to indicate whether the node is IAB authorized and/or repeater device authorized).

Figure 44:
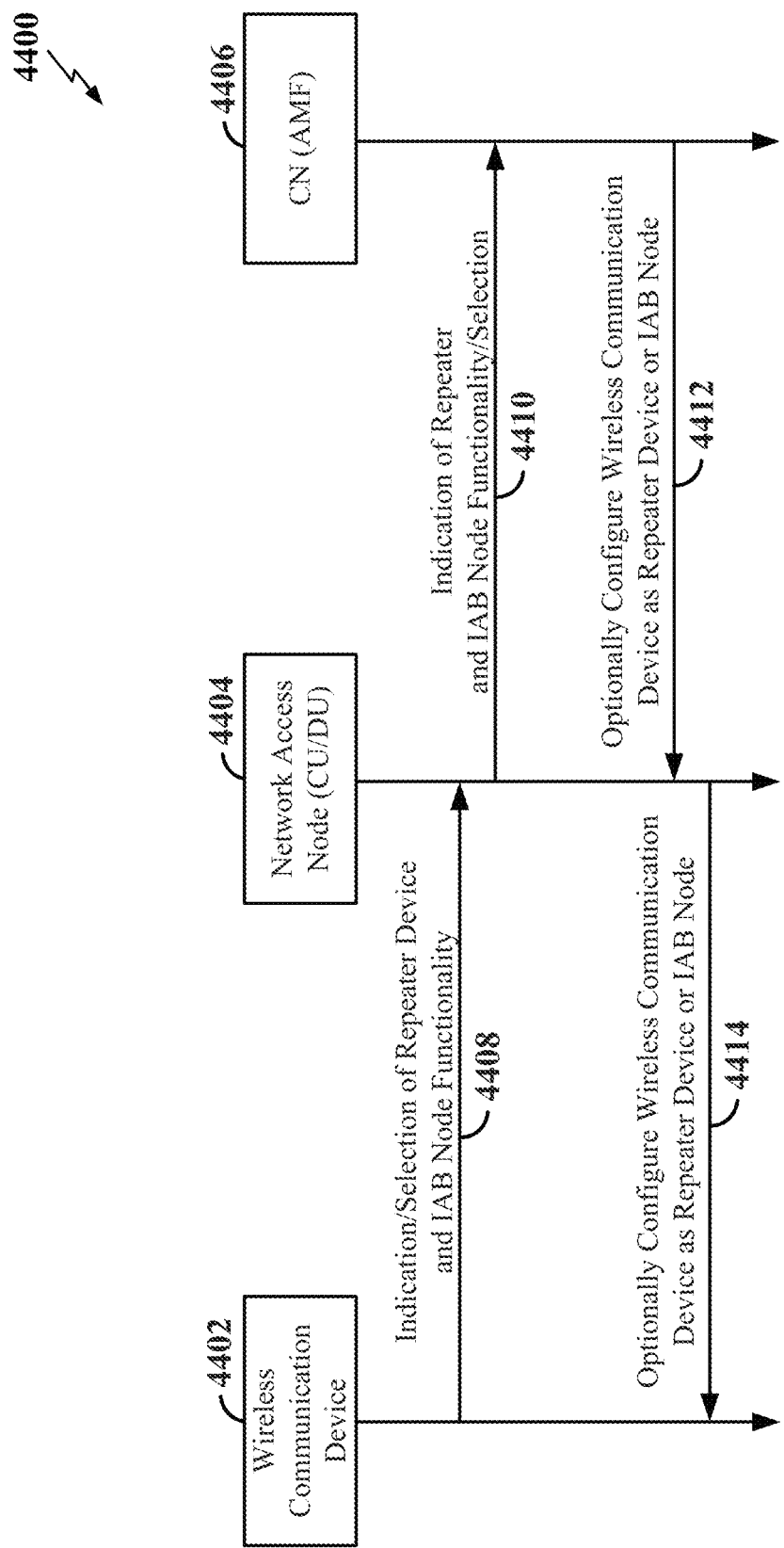
FIG. 44 is a call flow diagram illustrating an example of signaling configuration information in a wireless communication network including a wireless communication device, a network access node, and a CN(AMF) according to some aspects of the disclosure.

FIG. 44 is a call flow diagram illustrating an example of signaling configuration information 4400 in a wireless communication network including a wireless communication device 4402, a network access node 4404, and a CN(AMF) 4406 according to some aspects of the disclosure. The wireless communication device 4402 may correspond to any wireless communication device described herein, such as, for example, any of the repeater devices of any of FIGS. 1-55. The network access node 4404 may correspond to any of the network access nodes or scheduling entities shown in any of FIGS. 1-55. The CN 4406 may correspond to any core network node described herein, such as, for example, any of the core network nodes of any of FIGS. 1-55.

The wireless communication device 4402 may send an indication that it includes repeater device functionality and IAB node functionality and/or an indication of a selection of repeater device functionality or IAB node functionality at 4408 (e.g., identified in FIG. 44 as "indication/selection of repeater device and IAB node functionality"). At 4410, the network access node 4404 may forward the indication/selection of repeater device and IAB node functionality to the CN(AMF) 4406.

In response to an indication that the repeater device includes repeater device functionality and IAB node functionality, the CN(AMF) 4406 may select repeater device functionality or IAB node functionality for the repeater device and send an indication of this first selected configuration at 4412. At 4414, the network access node 4404 may forward the indication of the first selected configuration to the wireless communication device 4402.

Alternatively, in response to the indication that the repeater device includes repeater device functionality and IAB node functionality, the network access node 4404 may select repeater device functionality or IAB node functionality for the repeater device and send an indication of this second selected configuration to the wireless communication device 4402 at 4414.

Figure 45:
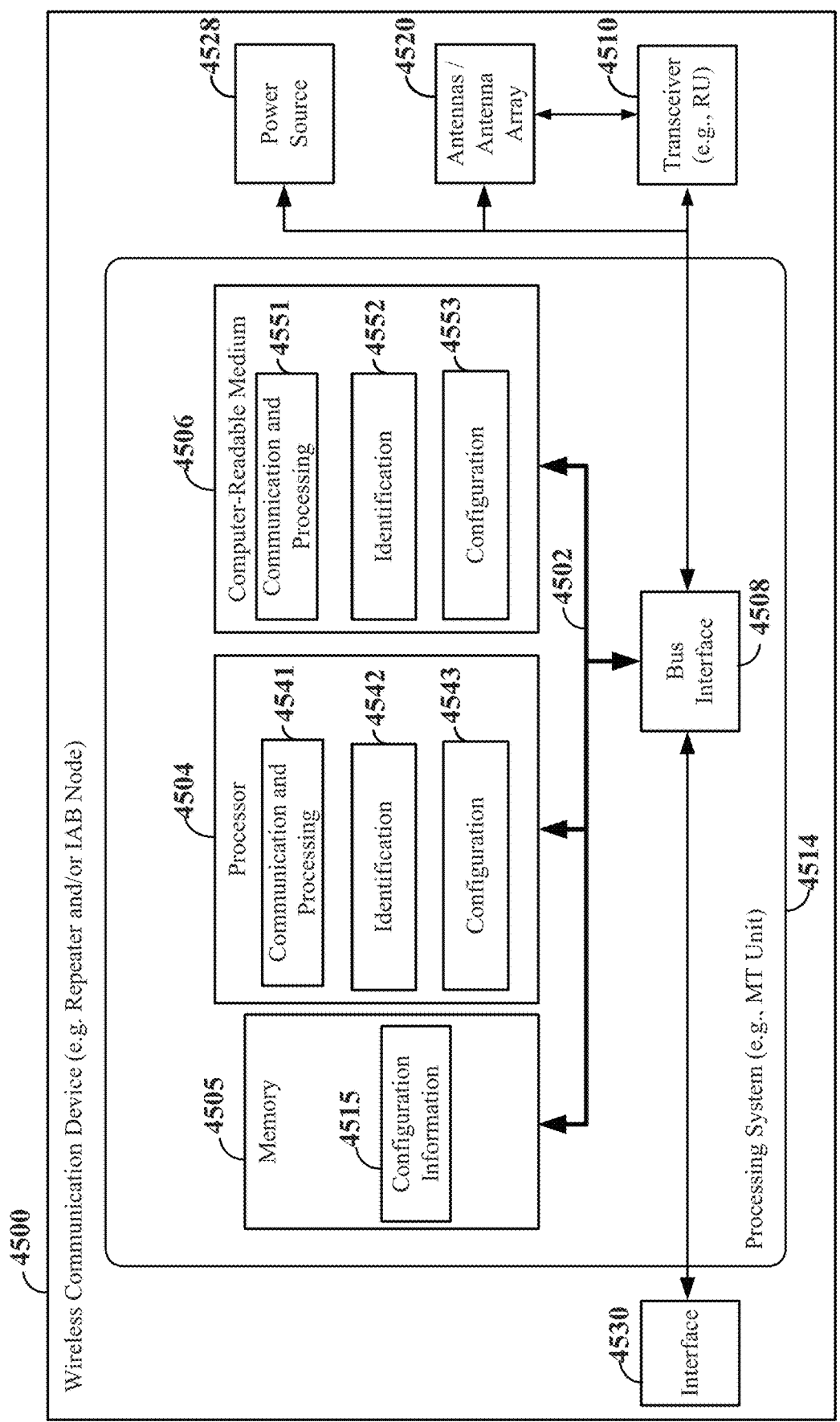
FIG. 45 is a schematic diagram illustrating an example of a hardware implementation of a wireless communication device employing a processing system according to some aspects of the disclosure.

FIG. 45 is a block diagram illustrating an example of a hardware implementation of a wireless communication device 4500 (e.g., a repeater device, an IAB node) employing a processing system 4514 according to some aspects of the disclosure. For example, the wireless communication device 4500 may be a device configured to wirelessly communicate with a network access node (e.g., a scheduling entity, a gNB, a base station), a user equipment (e.g., a UE, a scheduled entity, a wireless communication device), and/or a core network node, all as discussed in any one or more of FIGS. 1-55. In some examples, the wireless communication device 4500 may be a repeater device. In some examples, the wireless communication device 4500 may be an IAB node. In some examples, the wireless communication device 4500 may include repeater device and/or IAB node functionality. In some implementations, the processing system 4514 may provide some or all of the functionality of an MT unit. In some implementations, the wireless communication device 4500 may correspond to any of the repeater devices or IAB nodes shown in any of FIGS. 1-55.

In accordance with various aspects of the disclosure, an element, or any portion of an element, or any combination of elements may be implemented with the processing system 4514. The processing system 4514 may include one or more processors 4504. The processing system 4514 may be substantially similar to the processing system 2114 illustrated in FIG. 21, including a bus interface 4508, a bus 4502, memory 4505, a processor 4504, and a computer-readable medium 4506. Furthermore, the wireless communication device 4500 may include additional features, such as an interface 4530, a transceiver 4510, antennas/antenna array 4520, and/or a power supply 4528. The interface 4530, transceiver 4510, antennas/antenna array 4520, and power supply 4528 may be coupled to the bus interface 4508. The recited features of the wireless communication device 4500 may be substantially similar to like-numbered and like-named features of the repeater device 2100 of FIG. 21. Accordingly, to avoid duplication, descriptions of the like-numbered and like-named features, which may nevertheless be present in the wireless communication device 4500, are not provided in connection with the description of FIG. 45.

In various examples, the wireless communication device 4500 may be configured to perform any one or more of the functions described herein in conjunction with FIGS. 1-55). That is, the processor 4504, as utilized in the wireless communication device 4500, may be used to implement any one or more of the processes and procedures described herein, for example, in FIGS. 1-55. The processor 4504, as utilized in the wireless communication device 4500, may include circuitry configured for various functions.

For example, the processor 4504 may include communication and processing circuitry 4541. The communication and processing circuitry 4541 of the wireless communication device 4500 may be configured for various functions and processes and may include one or more hardware components that provide the physical structure that performs various functions and processes, related to wireless communication (e.g., signal reception and/or signal transmission) as described herein. Some of the various functions, processes, and corresponding one or more hardware components described in connection with FIG. 21 may be similar to various like-named functions, processes, and corresponding one or more hardware components associated with the communication and processing circuitry 4541 of the wireless communication device 4500 of FIG. 45. Accordingly, to avoid duplication, descriptions of various functions, processes, and corresponding one or more hardware components that may be common (or substantially similar) to both the communication and processing circuitry 4541 of FIG. 45 and the communication and processing circuitry 2141 of FIG. 21, which may nevertheless be present in the communication and processing circuitry 4541, are not provided in connection with the description of the communication and processing circuitry 4541 of FIG. 45. The communication and processing circuitry 4541 may further be configured to execute communication and processing circuitry 4551 included on the computer-readable medium 4506 to implement one or more functions described herein.

The processor 4504 may include identification circuitry 4542 configured to perform identification-related operations as discussed herein. The identification circuitry 4542 may further be configured to provide the functionality of a means for generating an indication that a device includes repeater device functionality and or IAB node functionality. The identification circuitry 4542 may further be configured to provide the functionality of a means for transmitting an indication. The identification circuitry 4542 may further be configured to execute identification software 4552 included on the computer-readable medium 4506 to implement one or more functions described herein.

The processor 4504 may include configuration circuitry 4543 configured to perform configuration-related operations as discussed herein. The configuration circuitry 4543 may further be configured to provide the functionality of a means for configuring beamforming. The configuration circuitry 4543 may further be configured to provide the functionality of a means for configuring the wireless communication device 4500 as a repeater device or as an IAB node. The configuration circuitry 4543 may further be configured to execute configuration software 4553 included on the computer-readable medium 4506 to implement one or more functions described herein.

Figure 46:
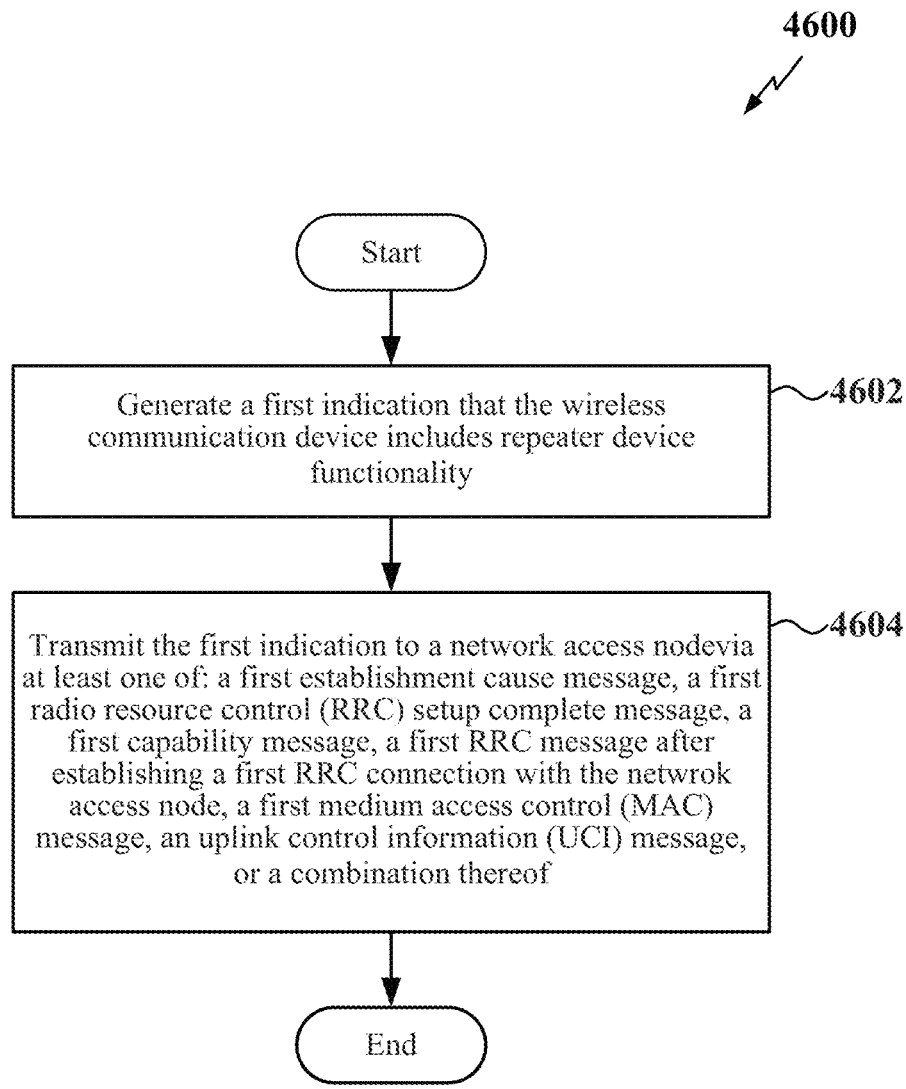
FIG. 46 is a flow chart illustrating an example process at a wireless communication device in a wireless communication network according to some aspects of the present disclosure.

FIG. 46 is a flow chart illustrating an example process 4600 (e.g., a method) at a wireless communication device (e.g., a repeater device, an IAB nod) in a wireless communication network according to some aspects of the present disclosure. As described below, some or all illustrated features may be omitted in a particular implementation within the scope of the present disclosure, and some illustrated features may not be required for implementation of all embodiments. In some examples, the process 4600 may be carried out by the wireless communication device 4500 (e.g., with repeater device and/or an IAB node functionality) illustrated in FIG. 45. In some examples, the process 4600 may be carried out by any suitable apparatus or means for carrying out the functions or algorithm described below.

At block 4602, a wireless communication device may generate a first indication that the wireless communication device includes repeater device functionality. For example, the identification circuitry 4542, shown and described above in connection with FIG. 45, may generate a message including the indication as discussed herein. Furthermore, the identification circuitry 4542, shown and described above in connection with FIG. 45, may provide a means for generating the message including the indication.

At block 4604, the wireless communication device may transmit the first indication to a network access node via at least one of: a first establishment cause message, a first radio resource control (RRC) setup complete message, a first capability message, a first RRC message after establishing a first RRC connection with the network access node, a first medium access control (MAC) message, an uplink control information (UCI) message, or a combination thereof. For example, the identification circuitry 4542 together with the communication and processing circuitry 4541, the transceiver 4510, and the antennas/antenna array 4520, shown and described above in connection with FIG. 45, may transmit the indication to a gNB as discussed herein. Furthermore, the identification circuitry 4542 together with the communication and processing circuitry 4541, the transceiver 4510, and the antennas/antenna array 4520, shown and described above in connection with FIG. 45, may provide a means for transmitting the first indication to the network access node via at least one of: the first establishment cause message, the first radio resource control (RRC) setup complete message, the first capability message, the first RRC message after establishing the first RRC connection with the network access node, the first medium access control (MAC) message, the uplink control information (UCI) message, or a combination thereof.

In some examples, the transmitting the first indication to the network access node may include transmitting the first establishment cause message in an RRC setup request message, wherein the first establishment cause message includes the first indication. In some examples, the first establishment cause message may include a bit field that contains a value indicative of a repeater device. In some examples, the transmitting the first indication to the network access node may include transmitting the first RRC setup complete message with a bit field that contains a value indicative of a repeater device.

In some examples, the transmitting the first indication to the network access node may include transmitting the first capability message with a bit field that contains a value indicative of a repeater device. In some examples, the process 4600 may further include, prior to transmitting the first capability message establishing a second RRC connection with the network access node, wherein the wireless communication device is identified as an integrated access backhaul (IAB) node. In some examples, the establishing the RRC connection with the network access node may include at least one of: using an IAB-specific random access channel (RACH) configuration, transmitting an IAB node indication in a second RRC setup complete message to the network access node, or a combination thereof.

In some examples, the transmitting the first indication to the network access node may include transmitting the first RRC message to a central unit of the network access node, wherein the first RRC message includes the first indication. In some examples, the establishing the first RRC connection with the network access node may include establishing the first RRC connection with the network access node, wherein the wireless communication device is identified as an integrated access backhaul (IAB) node. In some examples, the establishing the first RRC connection with the network access node may include establishing the first RRC connection with the network access node, wherein the wireless communication device is identified as a user equipment.

In some examples, the transmitting the first indication to the network access node may include transmitting the first MAC message to a distributed unit of the network access node or transmitting the UCI message to the distributed unit of the network access node. In some examples, the transmitting the first MAC message to the network access node may include transmitting a MAC-control element (MAC-CE) to the distributed unit (DU) of the network access node, wherein the MAC-CE includes the first indication.

In some examples, the first indication may indicate that the wireless communication device supports configurable beamforming. In some examples, the first indication may indicate that the wireless communication device may include a mobile termination (MT) unit and a repeating unit (RU).

Figure 47:
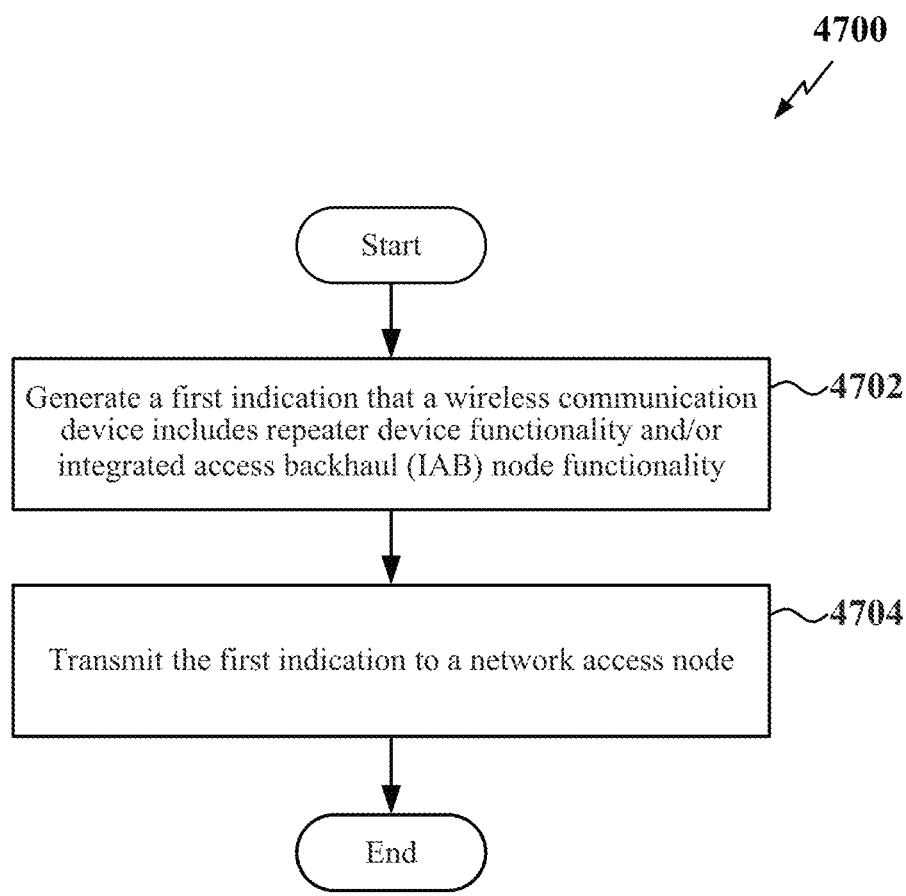
FIG. 47 is a flow chart illustrating an example process at a wireless communication device in a wireless communication network according to some aspects of the present disclosure.

FIG. 47 is a flow chart illustrating an example process 4700 (e.g., a method) at a wireless communication device in a wireless communication network according to some aspects of the present disclosure. As described below, some or all illustrated features may be omitted in a particular implementation within the scope of the present disclosure, and some illustrated features may not be required for implementation of all embodiments. In some examples, the process 4700 may be carried out by the wireless communication device 4500 (e.g., with repeater device and/or an IAB node functionality) illustrated in FIG. 45. In some examples, the process 4700 may be carried out by any suitable apparatus or means for carrying out the functions or algorithm described below.

At block 4702, a wireless communication device may generate a first indication that the wireless communication device includes repeater device functionality and/or integrated access backhaul (IAB) node functionality. For example, the identification circuitry 4542, shown and described above in connection with FIG. 45, may generate a message including the indication as discussed herein. Furthermore, the identification circuitry 4542, shown and described above in connection with FIG. 45, may provide a means for generating the first indication that the wireless communication device includes repeater device functionality and/or integrated access backhaul (IAB) node functionality.

At block 4704, the wireless communication device may transmit the first indication to a network access node. For example, the identification circuitry 4542 together with the communication and processing circuitry 4541, the transceiver 4510, and the antennas/antenna array 4520, shown and described above in connection with FIG. 45, may transmit the indication to a gNB as discussed herein. Furthermore, the identification circuitry 4542 together with the communication and processing circuitry 4541, the transceiver 4510, and the antennas/antenna array 4520, shown and described above in connection with FIG. 45, may provide a means for transmitting the first indication to the network access node.

In some examples, the process 4600 may further include selecting a first mode of operation for the wireless communication device from a plurality of modes of operation, wherein the plurality of modes of operation may include a repeater device mode of operation and a IAB node mode of operation and transmitting a second indication of the first mode of operation to the network access node.

In some examples, the transmitting the second indication may include transmitting a capability message that includes the second indication, transmitting an uplink control information (UCI) that includes the second indication, transmitting a medium access control-control element (MAC-CE) that includes the second indication, or transmitting an RRC message that includes the second indication. In some examples, the selecting the first mode of operation may include selecting the repeater device mode of operation to reduce power consumption or to enhance coverage. In some examples, the selecting the first mode of operation may include selecting the IAB node mode of operation to provide enhanced service for user equipment.

In some examples, the process 4600 may further include receiving a second indication from the network access node, wherein the second indication indicates a selection of a first mode of operation from a repeater device mode of operation or a IAB node mode of operation and switching to the first mode of operation as indicated by the second indication. In some examples, the receiving the second indication may include receiving a downlink control information (DCI) that includes the second indication, receiving a medium access control-control element (MAC-CE) that includes the second indication, or receiving an RRC message that includes the second indication.

In some examples, the transmitting the first indication may include transmitting a capability message that includes the first indication, transmitting an uplink control information (UCI) that includes the first indication, or transmitting a medium access control-control element (MAC-CE) that includes the first indication.

Figure 48:
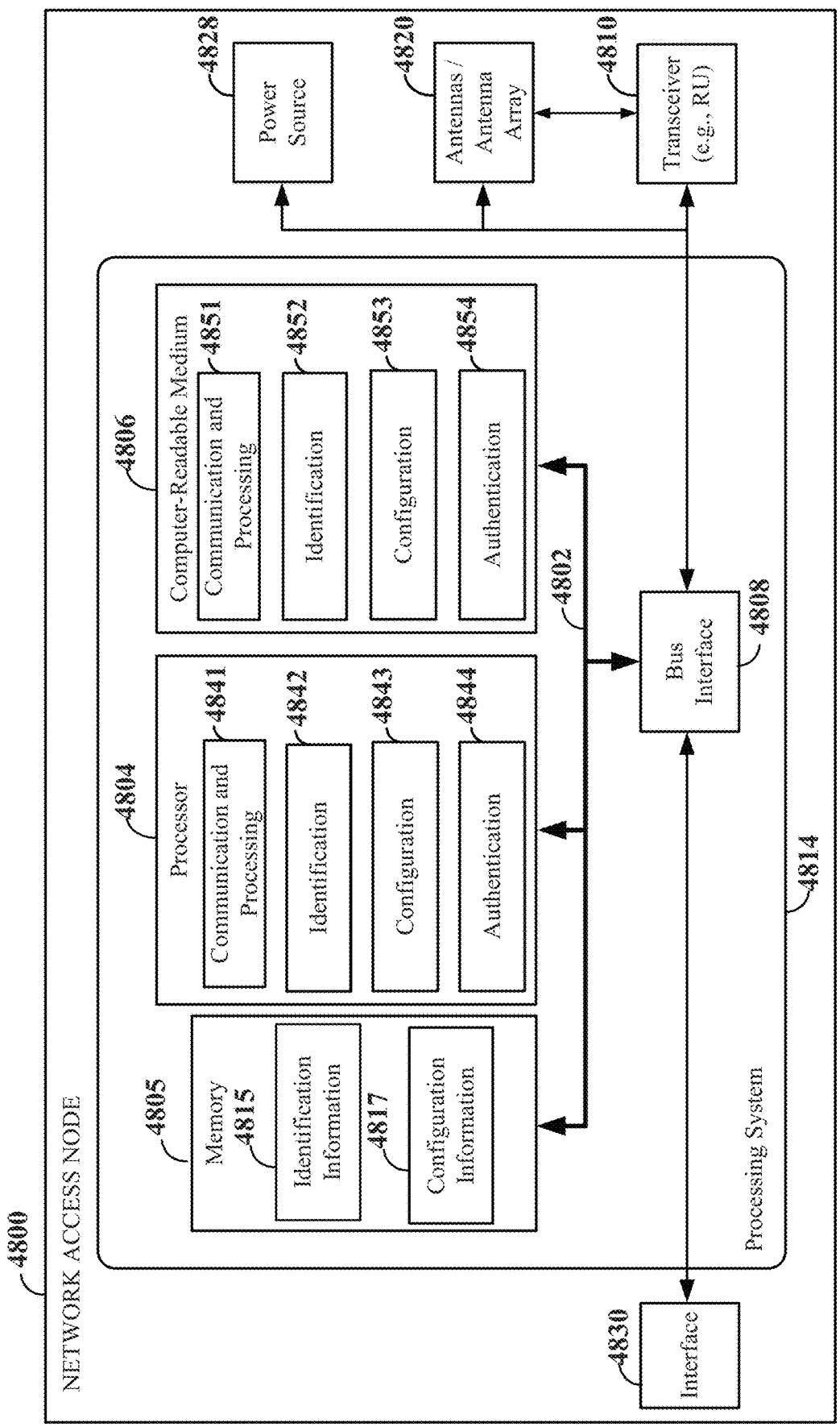
FIG. 48 is a schematic diagram illustrating an example of a hardware implementation of a network access node employing a processing system according to some aspects of the disclosure.

FIG. 48 is a schematic diagram illustrating an example of a hardware implementation of a network access node 4800 (e.g., a scheduling entity, a gNB, a base station) employing a processing system 4814 according to some aspects of the disclosure. For example, the network access node 4800 may be a device configured to wirelessly communicate with scheduled entities, UEs, wireless communication devices, other network access nodes, repeater devices, and/or IAB nodes, as discussed in any one or more of FIGS. 1-55. In some implementations, the network access node 4800 may correspond to any of the network access nodes (e.g., scheduling entities, gNBs, base stations) shown in any of FIGS. 1, 2, 5-12, 14-17, 25, 29, 31, 37, and/or 39-44.

In accordance with various aspects of the disclosure, an element, or any portion of an element, or any combination of elements may be implemented with the processing system 4814. The processing system 4814 may include one or more processors 4804. The processing system 4814 may be substantially the same as the processing system 2514 illustrated in FIG. 25 (or the processing system 2114 illustrated in FIG. 21), including a bus interface 4808, a bus 4802, memory 4805, a processor 4804, and a computer-readable medium 4806. Furthermore, the network access node 4800 may include additional features, such as an interface 4830, a transceiver 4810, antennas/antenna array 4820, and/or a power supply 4828. The interface 4830, transceiver 4810, antennas/antenna array 4820, and power supply 4828 may be coupled to the bus interface 4808. The recited features of the network access node 4800 may be substantially similar to like-numbered and like-named features of the network access node 2500 of FIG. 25 (or those of the repeater device 2100 of FIG. 21). Accordingly, to avoid duplication, descriptions of the like-numbered and like-named features, which may nevertheless be present in the network access node 4800, are not provided in connection with the description of FIG. 48.

The transceiver 4810, in connection with the one or more antennas/antenna array 4820, may provide a means for communicating with various other apparatus over a wireless transmission medium. The interface 4830 may provide a communication interface or means of communicating with various other apparatuses and devices (e.g., other devices housed within the same apparatus as the network access node 4800 or other external apparatuses) over an internal bus or external transmission medium, such as an Ethernet cable. Depending upon the nature of the apparatus, the interface 4830 may include a user interface (e.g., keypad, display, speaker, microphone, joystick, control features, etc.). Of course, such a user interface 4812 is optional, and may be omitted in some examples.

The network access node 4800 may be configured to perform any one or more of the operations described herein (e.g., in conjunction with FIGS. 1-55). That is, the processor 4804, as utilized in the network access node 4800, may be used to implement any one or more of the processes and procedures described herein, for example, in FIG. 33, FIG. 34, and/or FIG. 36. In some aspects of the disclosure, the processor 4804, as utilized in the network access node 4800, may include circuitry configured for various functions. The processor 4804 is responsible for managing the bus 4802 and general processing, including the execution of software stored on the computer-readable medium 4806. The software, when executed by the processor 4804, causes the processing system 4814 to perform the various functions described below for any particular apparatus. The computer-readable medium 4806 and the memory 4805 may also be used for storing data that is manipulated by the processor 4804 when executing software.

The processor 4804 may be configured to generate, schedule, and modify a resource assignment or grant of time-frequency resources (e.g., a set of one or more resource elements). For example, the processor 4804 may schedule time-frequency resources within a plurality of time division duplex (TDD) and/or frequency division duplex (FDD) subframes, slots, and/or mini-slots to carry user data traffic and/or control information to and/or from multiple repeater devices.

In some aspects of the disclosure, the processor 4804 may include communication and processing circuitry 4841. The communication and processing circuitry 4841 may be configured for various functions, including, for example, communicating with a user equipment (UE), a repeater device, or other wireless communication device, a network core (e.g., a 5G core network), other network access nodes or scheduling entities, or any other entity, such as, for example, local infrastructure or an entity communicating with the network access node 4800 via the Internet, such as a network provider. The communication and processing circuitry 4841 may include one or more hardware components that provide the physical structure that performs processes related to wireless communication (e.g., signal reception and/or signal transmission) as described herein. The communication and processing circuitry 4841 may further include one or more hardware components that provide the physical structure that performs various processes related to signal processing (e.g., processing a received signal and/or processing a signal for transmission) as described herein. Some of the functions, processes, and/or hardware components of the communication and processing circuitry 4841 of the network access node 4800 may be similar to the various like-named functions described in connection with the communication and processing circuitry 2541 of the network access node 2500 of FIG. 25. Accordingly, to avoid duplication, descriptions of the various like-named functions, which may nevertheless be present in the communication and processing circuitry 4841, are not provided in connection with the description of the communication and processing circuitry 4841 of FIG. 48. The communication and processing circuitry 4841 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 4841 may further be configured to execute communication and processing software 4851 included on the computer-readable medium 4806 to implement one or more functions described herein.

In some examples, the communication and processing circuitry 4841 may be configured Some of the functions, processes, and/or hardware components of the communication and processing circuitry 4841 of the network access node 4800 may be similar to the various like-named functions described in connection with the communication and processing circuitry 2541 of the network access node 2500 of FIG. 25. Accordingly, to avoid duplication, descriptions of the various like-named functions, which may nevertheless be present in the communication and processing circuitry 4841, are not provided in connection with the description of the communication and processing circuitry 4841 of FIG. 48.

According to some aspects, the communication and processing circuitry 4841 may obtain information from a component of the network access node 4800 (e.g., from the transceiver 4810 that receives the information via radio frequency signaling or some other type of signaling suitable for the applicable communication medium), process (e.g., decode) the information, and output the processed information. For example, the communication and processing circuitry 4841 may output the information to another component of the processor 4804, to the memory 4805, or to the bus interface 4808. The information may include identification information 4815 that may be stored in the memory 4805, for example. The information may include configuration information 4817 that may be stored in the memory 4805, for example. In some examples, the communication and processing circuitry 4841 may receive one or more of signals, messages, other information, or any combination thereof. In some examples, the communication and processing circuitry 4841 may receive information via one or more channels. In some examples, the communication and processing circuitry 4841 may include functionality for a means for receiving.

In some implementations where the communication involves sending (e.g., transmitting) information, the communication and processing circuitry 4841 may obtain information (e.g., from another component of the processor 4804, the memory 4805, or the bus interface 4808), process (e.g., encode) the information, and output the processed information. For example, the communication and processing circuitry 4841 may output the information to the transceiver 4810 (e.g., that transmits the information via radio frequency signaling or some other type of signaling suitable for the applicable communication medium). In some examples, the communication and processing circuitry 4841 may send one or more of signals, messages, other information, or any combination thereof. In some examples, the communication and processing circuitry 4841 may send information via one or more channels. In some examples, the communication and processing circuitry 4841 may include functionality for a means for sending (e.g., means for transmitting).

The processor 4804 may include identification circuitry 4842 configured to perform identification-related operations as discussed herein. The identification circuitry 4842 may further be configured to provide the functionality of a means for determining that a device includes repeater device functionality. The identification circuitry 4842 may further be configured to provide the functionality of a means for receiving an indication. The identification circuitry 4842 may further be configured to provide the functionality of a means for transmitting an indication. The identification circuitry 4842 may further be configured to provide the functionality of a means for identifying a device. The identification circuitry 4842 may further be configured to execute identification software 4852 included on the computer-readable medium 4806 to implement one or more functions described herein.

The processor 4804 may include configuration circuitry 4843 configured to perform configuration-related operations as discussed herein. The configuration circuitry 4843 may further be configured to provide the functionality of a means for configuring beamforming at another device. The configuration circuitry 4843 may further be configured to provide the functionality of a means for transmitting a beam configuration. The configuration circuitry 4843 may further be configured to execute configuration software 4853 included on the computer-readable medium 4806 to implement one or more functions described herein.

Figure 49:
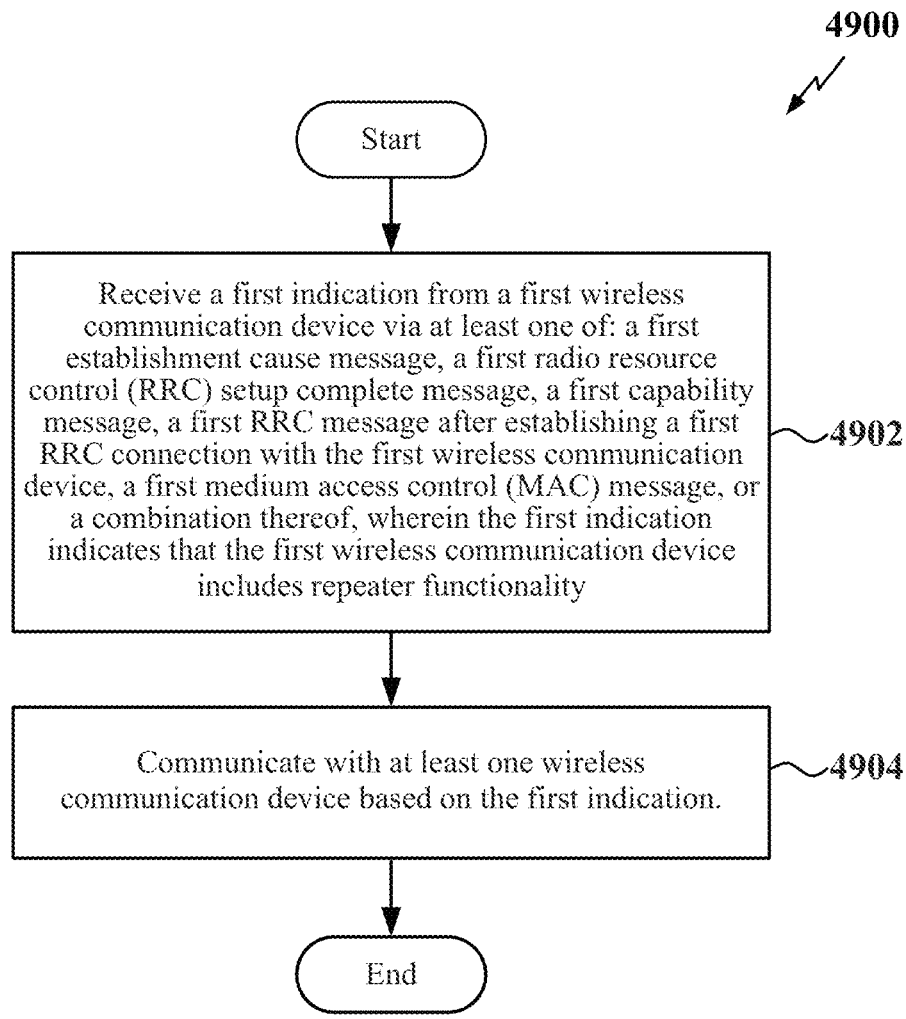
FIG. 49 is a flow chart illustrating an example process at a network access node in a wireless communication network according to some aspects of the disclosure.

FIG. 49 is a flow chart illustrating an example process 4900 (e.g., a method) at a network access node in a wireless communication network according to some aspects of the disclosure. As described below, some or all illustrated features may be omitted in a particular implementation within the scope of the present disclosure, and some illustrated features may not be required for implementation of all embodiments. In some examples, the process 4900 may be carried out by the network access node 4800 illustrated in FIG. 48. In some examples, the process 4900 may be carried out by any suitable apparatus or means for carrying out the functions or algorithm described below.

At block 4902, a network access node may receive a first indication from a first wireless communication device via at least one of: a first establishment cause message, a first radio resource control (RRC) setup complete message, a first capability message, a first RRC message after establishing a first RRC connection with the first wireless communication device, a first medium access control (MAC) message, or a combination thereof, wherein the first indication indicates that the first wireless communication device includes repeater device functionality. For example, the identification circuitry 4842 together with the communication and processing circuitry 4841, the transceiver 4810, and the antennas/antenna array 4820, shown and described above in connection with FIG. 48, may receive the first indication from the first wireless communication device via at least one of: the first establishment cause message, the first radio resource control (RRC) setup complete message, the first capability message, the first RRC message after establishing the first RRC connection with the first wireless communication device, the first medium access control (MAC) message, or the combination thereof, wherein the first indication indicates that the first wireless communication device includes repeater device functionality. Furthermore, the identification circuitry 4842 together with the communication and processing circuitry 4841, the transceiver 4810, and the antennas/antenna array 4820, shown and described above in connection with FIG. 48, may provide a means for receiving the first indication from the first wireless communication device via at least one of: the first establishment cause message, the first radio resource control (RRC) setup complete message, the first capability message, the first RRC message after establishing the first RRC connection with the first wireless communication device, the first medium access control (MAC) message, or the combination thereof, wherein the first indication indicates that the first wireless communication device includes repeater device functionality.

At block 4904, the network access node may communicate with at least one wireless communication device based on the first indication. For example, the identification circuitry 4842 together with the communication and processing circuitry 4541, the transceiver 4810, and the antennas/antenna array 4820, shown and described above in connection with FIG. 48, may communicate with at least one wireless communication device based on the first indication. Furthermore, the identification circuitry 4842 together with the communication and processing circuitry 4541, the transceiver 4810, and the antennas/antenna array 4820, shown and described above in connection with FIG. 48, may provide a means for communicating with at least one wireless communication device based on the first indication.

In some examples, the receiving the first indication from the first wireless communication device may include receiving the first establishment cause message in an RRC setup request message, wherein the first establishment cause message includes the first indication. In some examples, the first establishment cause message may include a bit field that contains a value indicative of a repeater device. In some examples, the receiving the first indication from the first wireless communication device may include receiving the first RRC setup complete message with a bit field that contains a value indicative of a repeater device.

In some examples, the receiving the first indication from the first wireless communication device may include receiving the first capability message with a bit field that contains a value indicative of a repeater device. In some examples, the process 4900 may further include, prior to receiving the first capability message, establishing a second RRC connection with the first wireless communication device identified as an integrated access backhaul (IAB) node. In some examples, the establishing the second RRC connection with the first wireless communication device may include receiving an IAB node indication in a second RRC setup complete message from the first wireless communication device.

In some examples, the receiving the first indication from the first wireless communication device may include receiving the first RRC message at a central unit of the network access node, wherein the first RRC message includes the first indication. In some examples, the process 4900 may further include transmitting a second indication to a distributed unit of the network access node after receiving the first RRC message, wherein the second indication indicates that the first wireless communication device includes the repeater device functionality. In some examples, the establishing the first RRC connection with the first wireless communication device may include establishing the first RRC connection with the first wireless communication device identified as an integrated access backhaul (IAB) node. In some examples, the establishing the first RRC connection with the first wireless communication device may include establishing the first RRC connection with the first wireless communication device identified as a user equipment.

In some examples, the receiving the first indication from the first wireless communication device may include receiving the first MAC message at a distributed unit of the network access node. In some examples, the process 4900 may further include transmitting a second indication to a central unit of the network access node after receiving the first MAC message, wherein the second indication indicates that the first wireless communication device includes the repeater device functionality. In some examples, the receiving the first MAC message may include receiving a MAC-control element (MAC-CE) at the distributed unit of the network access node, wherein the MAC-CE includes the first indication.

In some examples, the process 4900 may further include receiving a random access channel (RACH) message associated with a repeater-device-specific RACH configuration at a distributed unit of the network access node and transmitting a second indication from the distributed unit to a central unit of the network access node after receiving the RACH message, wherein the second indication indicates that the first wireless communication device includes the repeater device functionality.

In some examples, the repeater device functionality may include configurable beamforming. In some examples, the repeater device functionality may include a mobile termination unit functionality and a repeating unit functionality.

In some examples, the communicating with the at least one wireless communication device based on the first indication may include generating a configuration of at least one beam for the first wireless communication device after receiving the first indication and transmitting the configuration to the first wireless communication device. In some examples, the communicating with the at least one wireless communication device based on the first indication may include communicating with a second wireless communication device via the first wireless communication device. In some examples, the communicating with the at least one wireless communication device based on the first indication may include transmitting information to a second wireless communication device, and the information schedules or configures the second wireless communication device to communicate with at least one third wireless communication device via the first wireless communication device.

Figure 50:
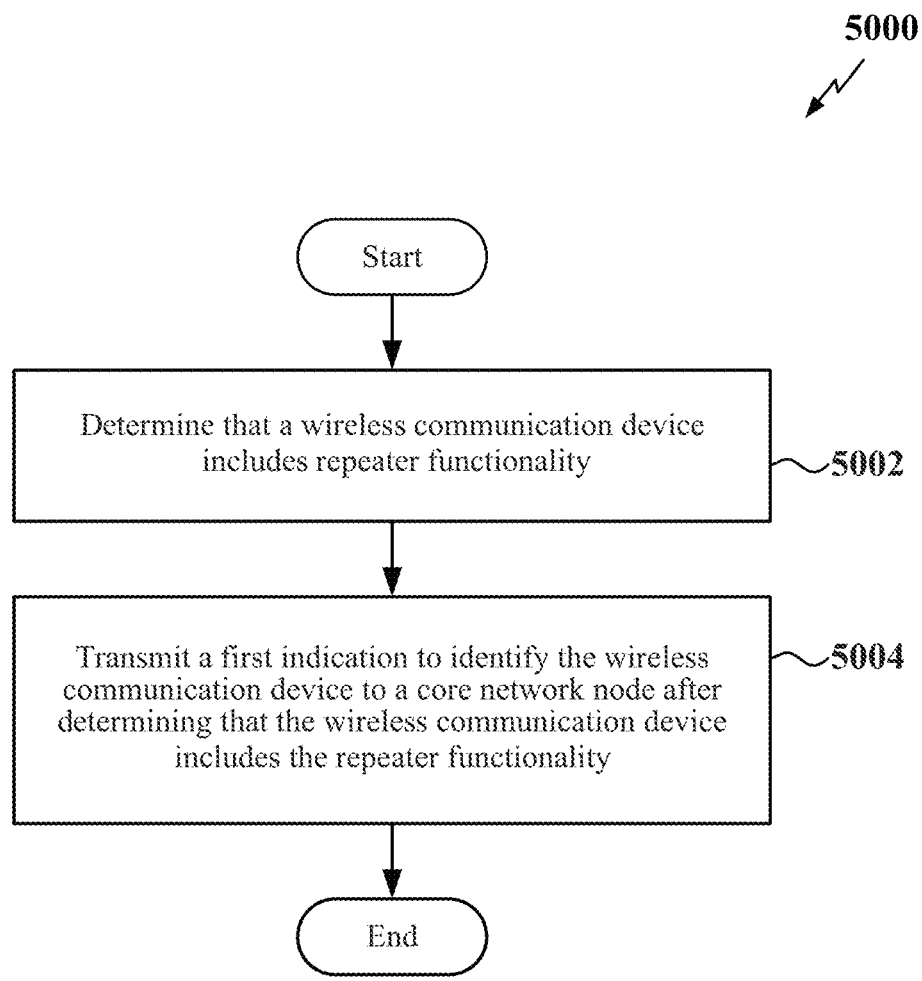
FIG. 50 is a flow chart illustrating an example process at a network access node in a wireless communication network according to some aspects of the disclosure.

FIG. 50 is a flow chart illustrating an example process 5000 (e.g., a method) at a network access node in a wireless communication network according to some aspects of the disclosure. As described below, some or all illustrated features may be omitted in a particular implementation within the scope of the present disclosure, and some illustrated features may not be required for implementation of all embodiments. In some examples, the process 5000 may be carried out by the network access node 4800 illustrated in FIG. 48. In some examples, the process 5000 may be carried out by any suitable apparatus or means for carrying out the functions or algorithm described below.

At block 5002, a network access node may determine that a wireless communication device includes repeater device functionality. For example, the identification circuitry 4842 together with the communication and processing circuitry 4841, the transceiver 4810, and the antennas/antenna array 4820 shown and described above in connection with FIG. 48, may receive a message from the wireless communication device that indicates that the wireless communication device includes repeater device functionality, thereby, according to the example, causing (e.g., resulting in) the network access node to determine that the wireless communication device includes repeater device functionality. Furthermore, the identification circuitry 4842 together with the communication and processing circuitry 4841, the transceiver 4810, and the antennas/antenna array 4820 shown and described above in connection with FIG. 48, may provide a means for determining that the wireless communication device includes repeater device functionality.

At block 5004, the network access node may transmit a first indication to identify the wireless communication device to a core network node after determining that the wireless communication device includes the repeater device functionality. For example, the identification circuitry 4842 together with the communication and processing circuitry 4841, the transceiver 4810, and the antennas/antenna array 4820 shown and described above in connection with FIG. 48, may transmit the first indication to identify the wireless communication device to the core network node after determining that the wireless communication device includes the repeater device functionality. According to some aspects, the network access node may transmit the first indication to an AMF of the core network node as discussed herein. Furthermore, the identification circuitry 4842 together with the communication and processing circuitry 4841, the transceiver 4810, and the antennas/antenna array 4820 shown and described above in connection with FIG. 48, may provide a means for transmitting the first indication to identify the wireless communication device to the core network node after determining that the wireless communication device includes the repeater device functionality.

In some examples, the first indication identifies the wireless communication device as a repeater device. In some examples, the first indication may include a first radio resource control (RRC) establishment cause message, and the transmitting the first indication may include transmitting an initial user equipment (UE) message that includes the first RRC establishment cause message. In some examples, the determining that the wireless communication device includes the repeater device functionality may include receiving a second RRC establishment cause message from the wireless communication device via an RRC setup request message, and the process 5000 may further include generating the first RRC establishment cause message from the second RRC establishment cause message.

In some examples, the determining that the wireless communication device includes the repeater device functionality may include receiving a second indication that the wireless communication device includes the repeater device functionality via at least one of: a first radio resource control (RRC) setup complete message, a first capability message, a first RRC message after establishing an RRC connection with the wireless communication device, a first medium access control (MAC) message, or a combination thereof, and the process 5000 further may include generating the first RRC establishment cause message from the second indication.

In some examples, the first indication may include a repeater-device-specific indication, and the transmitting the first indication may include transmitting an initial user equipment (UE) message that includes the first indication. In some examples, the determining that the wireless communication device includes the repeater device functionality may include receiving a second indication that the wireless communication device includes the repeater device functionality via a radio resource control (RRC) setup complete message, and the process 5000 may further include generating the first indication from the second indication. In some examples, the determining that the wireless communication device includes the repeater device functionality may include receiving a second indication that the wireless communication device includes the repeater device functionality via at least one of: a first establishment cause message, a first capability message, a first RRC message after establishing an RRC connection with the wireless communication device, a first medium access control (MAC) message, or a combination thereof, and the process 5000 may further include generating the first indication from the second indication.

In some examples, the transmitting the first indication may include transmitting a radio capability message that includes the first indication. In some examples, the process 5000 may further include, prior to transmitting the radio capability message, transmitting an initial user equipment (UE) message identifying the wireless communication device as an IAB node to the core network node.

In some examples, the first indication may identify the wireless communication device as a user equipment (UE). In some examples, transmitting the first indication may include transmitting an initial UE message including the first indication.

In some examples, the first indication may identify the wireless communication device as an integrated access backhaul (IAB) node. In some examples, transmitting the first indication may include transmitting an initial user equipment (UE) message including the first indication.

In some examples, the process 5000 may further include receiving a second indication that the core network node supports repeater devices and generating the first indication identifying the wireless communication device as a repeater device after receiving the second indication. In some examples, the second indication may include a repeater device supported information element (IE), and the receiving the second indication may include receiving an NG setup response message that includes the repeater device supported IE. In some examples, the process 5000 may further include receiving a repeater device authorized information element (IE) via an NG-AP message from the core network node after transmitting the first indication. In some examples, the NG-AP message may include an initial context setup request, a handover request, or a user equipment (UE) context modification request. In some examples, the second indication may include an integrated access backhaul (IAB) node supported information element (IE). In some examples, the process 5000 may further include determining that the core network node supports repeater devices based on the IAB node supported IE.

In some examples, the repeater device functionality may include configurable beamforming. In some examples, the repeater device functionality may include a mobile termination unit and a repeating unit.

Figure 51:
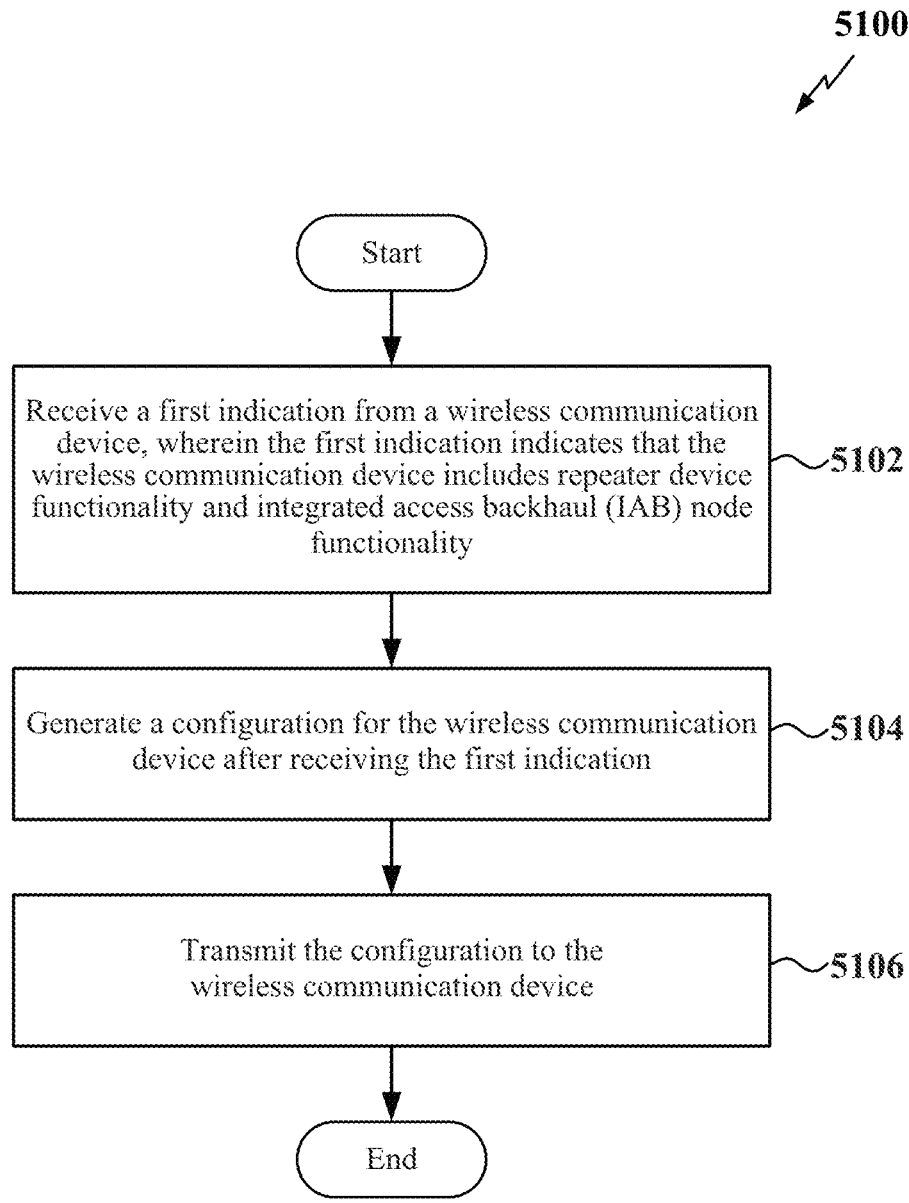
FIG. 51 is a flow chart illustrating an example process at a network access node in a wireless communication network according to some aspects of the disclosure.

FIG. 51 is a flow chart illustrating an example process 5100 (e.g., a method) at a network access node in a wireless communication network according to some aspects of the disclosure. As described below, some or all illustrated features may be omitted in a particular implementation within the scope of the present disclosure, and some illustrated features may not be required for implementation of all embodiments. In some examples, the process 5100 may be carried out by the network access node 4800 illustrated in FIG. 48. In some examples, the process 5100 may be carried out by any suitable apparatus or means for carrying out the functions or algorithm described below.

At block 5102, the network access node may receive a first indication from a wireless communication device, wherein the first indication indicates that the wireless communication device includes repeater device functionality and integrated access backhaul (IAB) node functionality. For example, the identification circuitry 4842 together with the communication and processing circuitry 4841, the transceiver 4810, and the antennas/antenna array 4820, shown and described above in connection with FIG. 45, may receive the first indication from the wireless communication device, wherein the first indication indicates that the wireless communication device includes repeater device functionality and integrated access backhaul (IAB) node functionality. Furthermore, the identification circuitry 4842 together with the communication and processing circuitry 4841, the transceiver 4810, and the antennas/antenna array 4820, shown and described above in connection with FIG. 45, may provide a means for receiving the first indication from the wireless communication device, wherein the first indication indicates that the wireless communication device includes repeater device functionality and integrated access backhaul (IAB) node functionality.

At block 5104, the network access node may generate a configuration for the wireless communication device after receiving the first indication. For example, the configuration circuitry 4843, shown and described above in connection with FIG. 45, may generate the configuration for the wireless communication device after receiving the first indication. The network access node may generate the configuration and provide an indication of a selected mode of operation (e.g., repeater device mode of operation or IAB node mode of operation) to the wireless communication device. Furthermore, the configuration circuitry 4843, shown and described above in connection with FIG. 45, may provide a means for generating the configuration for the wireless communication device after receiving the first indication.

At block 5106, the network access node may transmit the configuration to the wireless communication device. For example, the configuration circuitry 4843 together with the communication and processing circuitry 4841, the transceiver 4810, and the antennas/antenna array 4820, shown and described above in connection with FIG. 48, may transmit an indication of a selected mode of operation to the wireless communication device as discussed herein. Furthermore, the configuration circuitry 4843 together with the communication and processing circuitry 4841, the transceiver 4810, and the antennas/antenna array 4820, shown and described above in connection with FIG. 48, may provide a means for transmitting the configuration to the wireless communication device.

In some examples, the process 5100 may further include receiving a second indication from the wireless communication device, wherein the second indication indicates a selection of a repeater device mode of operation or a IAB node mode of operation, and wherein the generating the configuration is based the second indication. In some examples, the receiving the second indication may include receiving an uplink control information (UCI) that includes the second indication, receiving a medium access control-control element (MAC-CE) that includes the second indication, or receiving an RRC message that includes the second indication.

In some examples, the process 5100 may further include selecting a first mode of operation for the wireless communication device from a plurality of modes of operation, wherein the plurality of modes of operation may include a repeater device mode of operation and a IAB node mode of operation and transmitting a second indication of the first mode of operation. In some examples, the selecting the first mode of operation is based on at least one of: a traffic load, a quality of service, a deployment configuration, a capability of a wireless communication node, or a combination thereof.

In some examples, the selecting the first mode of operation may be performed by a distributed unit of the network access node, and the transmitting the second indication of the first mode of operation may include transmitting a downlink control information (DCI) that includes the second indication, transmitting a medium access control-control element (MAC-CE) that includes the second indication, or transmitting an RRC message that includes the second indication. In some examples, the process 5100 may further include transmitting a third indication of the first mode of operation to a central unit of the network access node.

In some examples, the selecting the first mode of operation may be performed by a central unit of the network access node, and the transmitting the second indication of the first mode of operation may include transmitting the second indication to a distributed unit of the network access node. In some examples, the process 5100 may further include transmitting a third indication of the first mode of operation to a core network node.

In some examples, the process 5100 may further include transmitting a second indication to a core network node, wherein the second indication indicates that that the wireless communication device includes the repeater device functionality and integrated access backhaul (IAB) node functionality. In some examples, the process 5100 may further include receiving a third indication from the core network node, wherein the third indication indicates a selection of a repeater device mode of operation or a IAB node mode of operation and transmitting a fourth indication of the selection of the repeater device mode of operation or the IAB node mode of operation to the wireless communication device, wherein the generating the configuration is based the third indication. In some examples, the third indication may indicate that a repeater device is authorized for accessing a network or an IAB node is authorized for accessing a network.

In some examples, the receiving the first indication may include receiving a capability message that includes the first indication, receiving an uplink control information (UCI) that includes the first indication, or receiving a medium access control-control element (MAC-CE) that includes the first indication.

Figure 52:
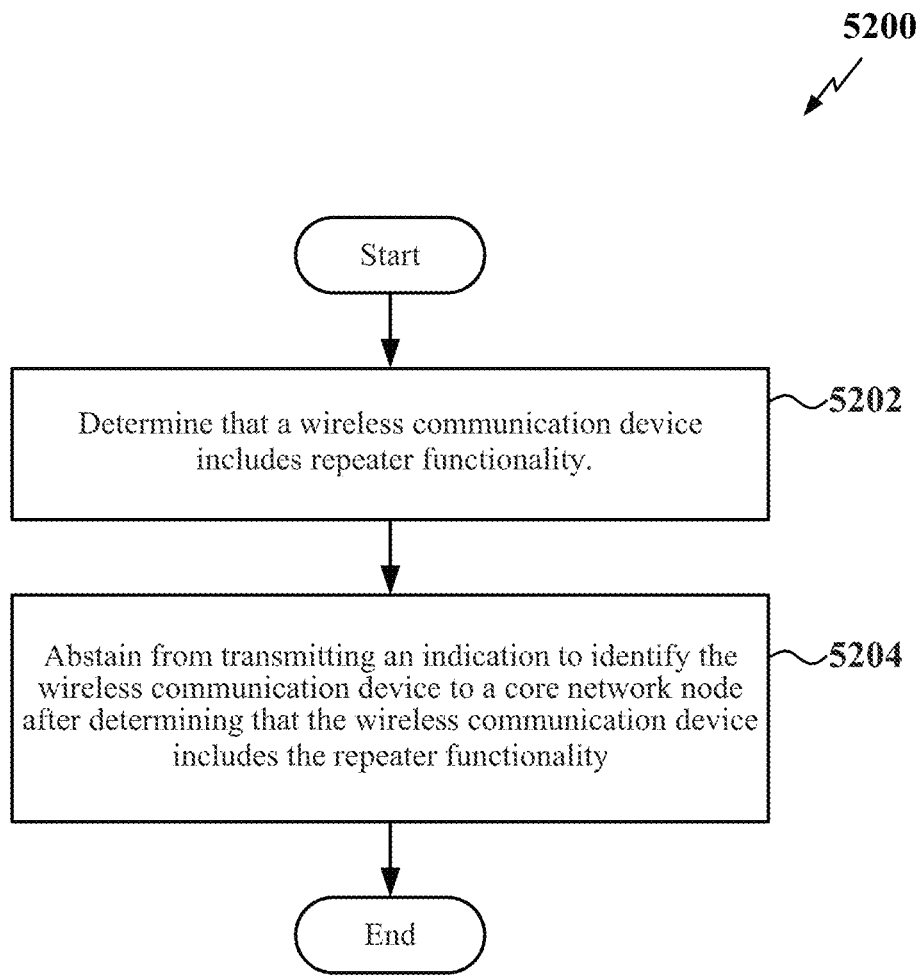
FIG. 52 is a flow chart illustrating an example process at a network access node in a wireless communication network according to some aspects of the disclosure.

FIG. 52 is a flow chart illustrating an example process 5200 (e.g., a method) at a network access node in a wireless communication network according to some aspects of the disclosure. As described below, some or all illustrated features may be omitted in a particular implementation within the scope of the present disclosure, and some illustrated features may not be required for implementation of all embodiments. In some examples, the process 5200 may be carried out by the network access node 4800 illustrated in FIG. 48. In some examples, the process 5200 may be carried out by any suitable apparatus or means for carrying out the functions or algorithm described below.

At block 5202, a network access node may determine that a wireless communication device includes repeater device functionality. For example, the identification circuitry 4842 together with the communication and processing circuitry 4841, the transceiver 4810, and the antennas/antenna array 4820, shown and described above in connection with FIG. 48, may receive a message from the wireless communication device that indicates that the wireless communication device includes repeater device functionality. Furthermore, the identification circuitry 4842 together with the communication and processing circuitry 4841, the transceiver 4810, and the antennas/antenna array 4820, shown and described above in connection with FIG. 48, may provide a means for determining that the wireless communication device includes repeater device functionality.

In some examples, the repeater device functionality may include configurable beamforming. In some examples, the repeater device functionality may include a mobile termination unit functionality and a repeating unit functionality.

At block 5204, the network access node may abstain from transmitting an indication to identify the wireless communication device to a core network node after determining that the wireless communication device includes the repeater device functionality. For example, the identification circuitry 4842, shown and described above in connection with FIG. 48, may abstain from transmitting an indication to identify the wireless communication device to a core network node after determining that the wireless communication device includes the repeater device functionality. According to some aspects, the network access node may abstain by not forwarding or sending the indication to an AMF of the core network node. Furthermore, the identification circuitry 4842, shown and described above in connection with FIG. 48, may provide a means for abstaining from transmitting the indication to identify the wireless communication device to the core network node after determining that the wireless communication device includes the repeater device functionality.

Figure 53:
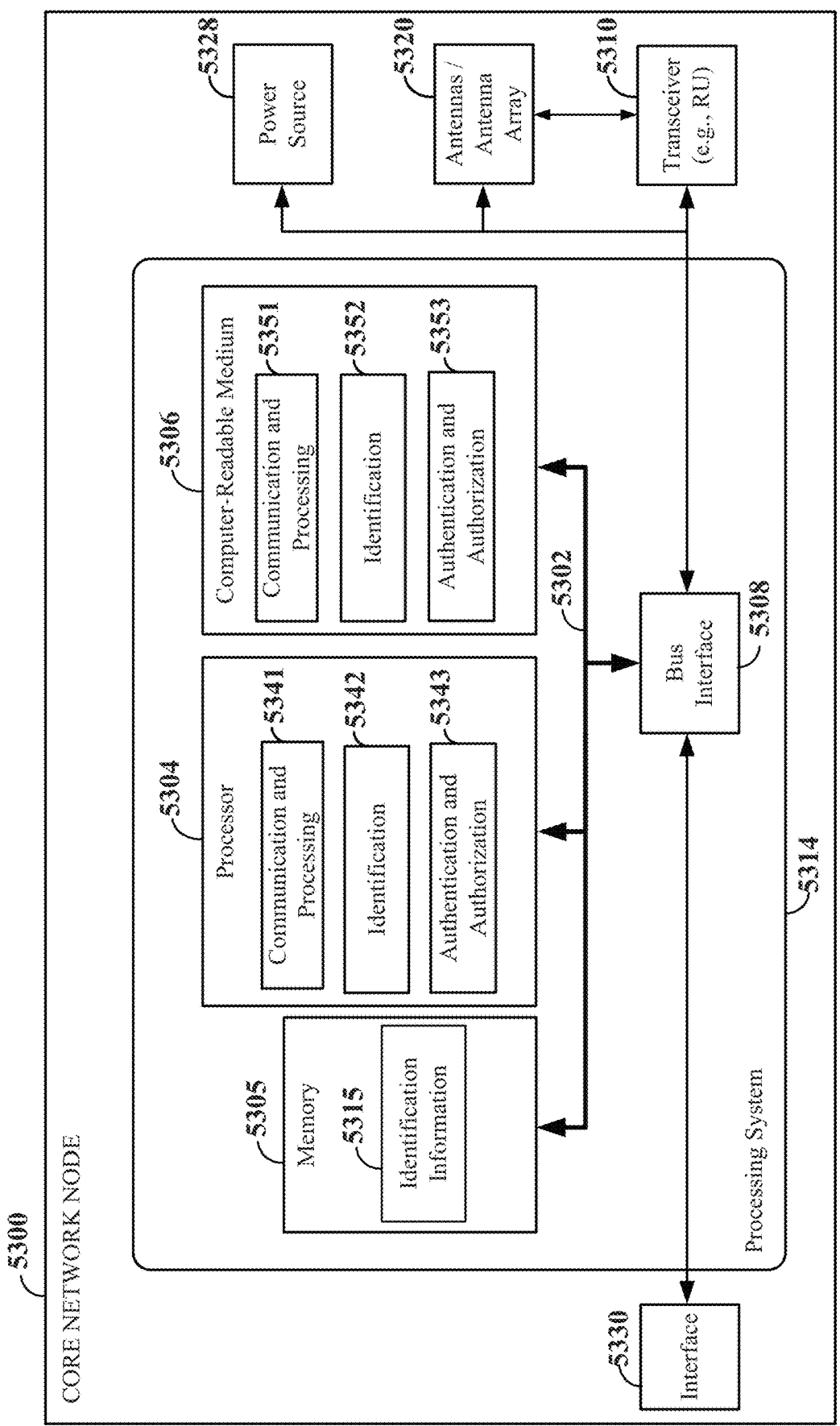
FIG. 53 is a schematic diagram illustrating an example of a hardware implementation of a core network node employing a processing system according to some aspects of the disclosure.

FIG. 53 is a schematic diagram illustrating an example of a hardware implementation of a core network node 5300 (e.g., a 5GC network node) employing a processing system 5314 according to some aspects of the disclosure. For example, the core network node 5300 may be a device configured to communicate with scheduling entities (e.g., network access nodes of a RAN), as discussed in any one or more of FIGS. 1-55. In some implementations, the core network node 5300 may correspond to any of the core network nodes shown in any of FIGS. 1-55.

In accordance with various aspects of the disclosure, an element, or any portion of an element, or any combination of elements may be implemented with the processing system 5314. The processing system 5314 may include one or more processors 5304. The processing system 5314 may be substantially similar to the processing system 2114 illustrated in FIG. 21 and/or the processing system 2514 illustrated in FIG. 25, including a bus interface 5308, a bus 5302, memory 5305, a processor 5304, and a computer-readable medium 5306. Furthermore, the core network node 5300 may include additional features, such as an interface 5330, a transceiver 5310, antennas/antenna array 5320, and/or a power supply 5328. The interface 5330, transceiver 5310, antennas/antenna array 5320, and power supply 5328 may be coupled to the bus interface 5308. The recited features of the core network node 5300 may be substantially similar to like-numbered and like-named features of the repeater device 2100 of FIG. 21 and/or the network access node 2500 of FIG. 25. Accordingly, to avoid duplication, descriptions of the like-numbered and like-named features, which may nevertheless be present in the core network node 5300, are not provided in connection with the description of FIG. 53.

In various examples, the core network node 5300 may be configured to perform any one or more of the functions described herein in conjunction with FIGS. 1-55). That is, the processor 5304, as utilized in the core network node 5300, may be used to implement any one or more of the processes and procedures described herein, for example, in FIGS. 1-55. The processor 5304, as utilized in the core network node 5300, may include circuitry configured for various functions.

For example, the processor 5304 may include communication and processing circuitry 5341. The communication and processing circuitry 5341 of the core network node 5300 may be configured for various functions and processes and may include one or more hardware components that provide the physical structure that performs various functions and processes, related to wireless communication (e.g., signal reception and/or signal transmission) as described herein. Some of the various functions, processes, and corresponding one or more hardware components described in connection with FIG. 21 and/or FIG. 25 may be similar to various like-named functions, processes, and corresponding one or more hardware components associated with the communication and processing circuitry 5341 of the core network node 5300 of FIG. 53. Accordingly, to avoid duplication, descriptions of various functions, processes, and corresponding one or more hardware components that may be common (or substantially similar) to both the communication and processing circuitry 5341 of FIG. 53 and/or the communication and processing circuitry 2141 of FIG. 21 and/or the communication and processing circuitry 2541 of FIG. 25, which may nevertheless be present in the communication and processing circuitry 5341, are not provided in connection with the description of the communication and processing circuitry 5341 of FIG. 53. The communication and processing circuitry 5341 of the core network node 5300 may also be configured for communicating with radio access networks and network access nodes of radio access networks, and may further be configured for communicating with functions, such as an AMF, of a network core (e.g., a 5G core network). The communication and processing circuitry 5341 may further be configured to execute communication and processing circuitry 5351 stored on the computer-readable medium 5306 to implement one or more functions described herein.

In some implementations, the communication and processing circuitry 5341 may obtain information from a component of a network access node, such as the network access node 4800 of FIG. 48. The information may include identification information 5315 that may be related to identification of the network access node and wireless communications devices (e.g., UEs, repeater devices, IAB nodes) that may be served by the network access nodes. The identification information 5315 may be stored in the memory 5305 of the processing system 5314, for example. In some examples, the communication and processing circuitry 5341 may receive and/or transmit one or more signals, data, control, messages, other information, or any combination thereof. In some examples, the communication and processing circuitry 5341 may receive and/or transmit information via one or more channels. In some examples, the communication and processing circuitry 5341 may include functionality for a means for receiving and a means for transmitting (e.g., a means for sending).

The processor 5304 may include identification circuitry 5342 configured to perform identification-related operations as discussed herein. The identification circuitry 4842 may further be configured to provide the functionality of a means for identifying a wireless communication device as a repeater device (or as a device with repeater device functionality), as an IAB node device (or as a device with IAB node functionality), or both. The identification circuitry 5342 may further be configured to provide the functionality of a means for receiving a first indication regarding a wireless communication device. The identification circuitry 5342 may further be configured to provide the functionality of a means for transmitting a second indication regarding the wireless communication device. The identification circuitry 5342 may further be configured to execute identification software 5352 included on the computer-readable medium 5306 to implement one or more functions described herein.

The processor 5304 may include authentication and authorization circuitry 5343 configured to perform authorization and/or authentication related operations as discussed herein. The authentication and authorization circuitry 5343 may further be configured to provide the functionality of a means for authenticating and/or authorizing a wireless communication device. The authentication and authorization circuitry 5343 may further be configured to execute authentication and authorization software 5353 included on the computer-readable medium 5306 to implement one or more functions described herein.

Figure 54:
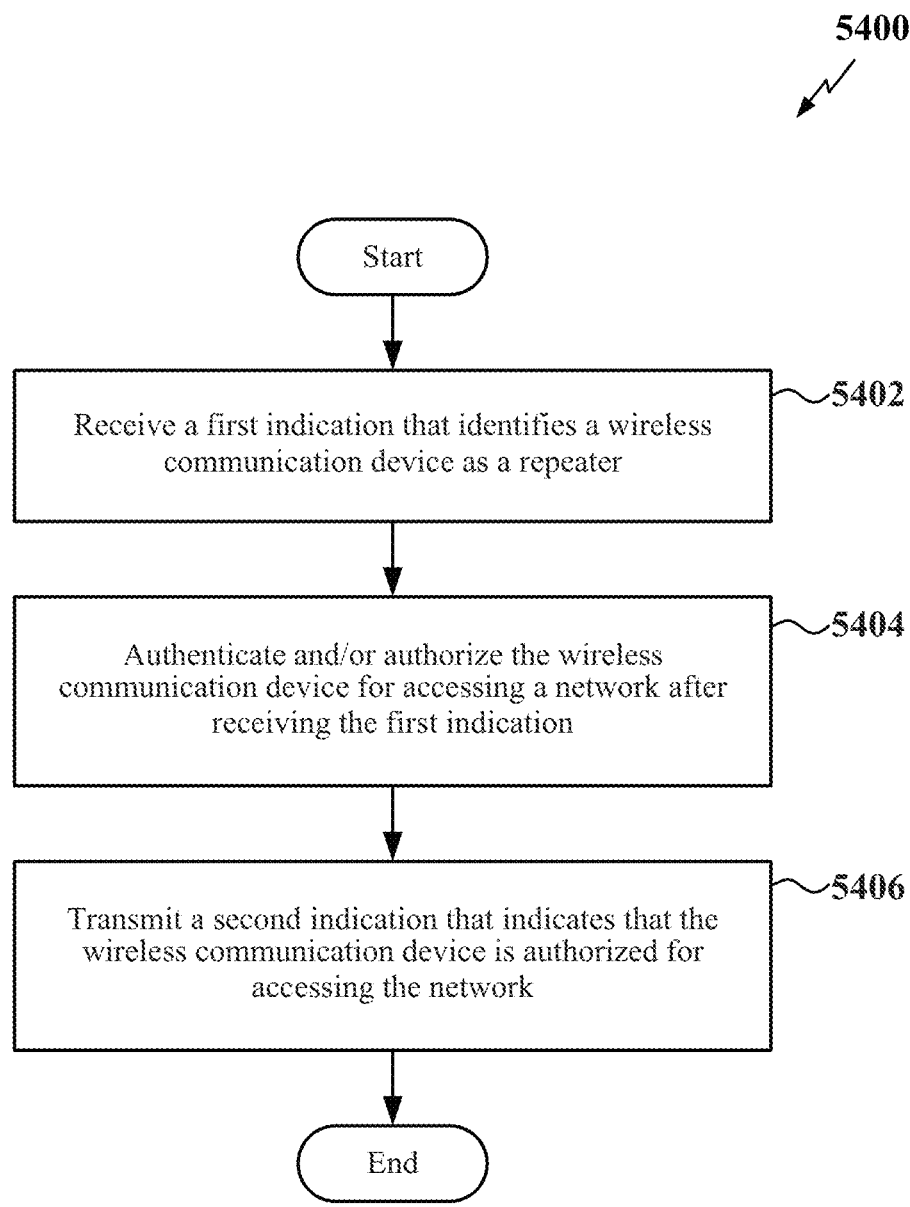
FIG. 54 is a flow chart illustrating an example process at a core network node in a wireless communication network according to some aspects of the disclosure.

FIG. 54 is a flow chart illustrating an example process 5400 (e.g., a method) at a core network node in a wireless communication system according to some aspects of the disclosure. As described below, some or all illustrated features may be omitted in a particular implementation within the scope of the present disclosure, and some illustrated features may not be required for implementation of all embodiments. In some examples, the process 5400 may be carried out by the core network node 5300 illustrated in FIG. 53. In some examples, the process 5400 may be carried out by any suitable apparatus or means for carrying out the functions or algorithm described below.

At block 5402, a core network node may receive a first indication that identifies a wireless communication device as a repeater device. For example, the identification circuitry 5442 together with the communication and processing circuitry 5441 and the interface 5330 (and/or the transceiver 5310), shown and described above in connection with FIG. 54, may receive the first indication that identifies the wireless communication device as the repeater device. Furthermore, the identification circuitry 5442 together with the communication and processing circuitry 5441 and the interface 5330 (and/or the transceiver 5310), shown and described above in connection with FIG. 54, may provide a means for receiving the first indication that identifies the wireless communication device as the repeater device.

At block 5404, the core network node may authenticate and/or authorize the wireless communication device for accessing a network after receiving the first indication. For example, the authentication and authorization circuitry 5343, together with the communication and processing circuitry 5341 and the interface 5330 (and/or the transceiver 5310), shown and described above in connection with FIG. 53, may authenticate and/or authorize the wireless communication device for accessing the network after receiving the first indication. Furthermore, the authentication and authorization circuitry 5343, together with the communication and processing circuitry 5341 and the interface 5330 (and/or the transceiver 5310), shown and described above in connection with FIG. 53, may provide a means for authenticating and/or authorizing the wireless communication device for accessing the network after receiving the first indication.

At block 5406, the core network node may transmit a second indication that indicates that the wireless communication device is authorized for accessing the network. For example, the authentication and authorization circuitry 5343 together with the communication and processing circuitry 5341, and the interface 5330 (and/or the transceiver 5410), shown and described above in connection with FIG. 53, may transmit the second indication that indicates that the wireless communication device is authorized for accessing the network. Furthermore, the authentication and authorization circuitry 5343 together with the communication and processing circuitry 5341, and the interface 5330 (and/or the transceiver 5410), shown and described above in connection with FIG. 53, may provide a means for transmitting the second indication that indicates that the wireless communication device is authorized for accessing the network.

In some examples, the first indication may include a first radio resource control (RRC) establishment cause message and receiving the first indication may include receiving an initial user equipment (UE) message that includes the first RRC establishment cause message from a network access node. In some examples, the first indication may include a repeater-device-specific indication and receiving the first indication may include receiving an initial user equipment (UE) message that includes the first indication from a network access node.

In some examples, the receiving the first indication may include receiving radio capability information including the first indication from a network access node. In some examples, the process 5400 may further include prior to receiving the radio capability information: receiving an initial user equipment (UE) message identifying the wireless communication device as an integrated access backhaul (IAB) node from the network access node.

In some examples, the process 5400 may further include transmitting a third indication that the core network node supports repeater devices. In some examples, the third indication may include a repeater device supported information element (IE), and the transmitting the third indication may include transmitting an NG setup response message that includes the repeater device supported IE.

In some examples, the second indication may include a repeater device authorized information element (IE), and the transmitting the second indication may include transmitting an NG-AP message that includes the repeater device authorized IE. In some examples, the NG-AP message may include an initial context setup request, a handover request, or a user equipment (UE) context modification request.

In some examples, the second indication may include an integrated access backhaul (IAB) node authorized information element (IE), and the transmitting the second indication may include transmitting an NG-AP message that includes the IAB node authorized IE. In some examples, the process 5400 may further include determining that the core network node supports repeater devices, and transmitting an integrated access backhaul (IAB) node supported information element (IE) as a result of the determining that the core network node supports repeater devices.

FIG. 55 is a flow chart illustrating an example process 5500 (e.g., a method) at a core network node in a wireless communication system according to some aspects of the disclosure. As described below, some or all illustrated features may be omitted in a particular implementation within the scope of the present disclosure, and some illustrated features may not be required for implementation of all embodiments. In some examples, the process 5500 may be carried out by the core network node 5300 illustrated in FIG. 53. In some examples, the process 5500 may be carried out by any suitable apparatus or means for carrying out the functions or algorithm described below.

At block 5502, the core network node may receive a first indication from a network access node, wherein the first indication indicates that a wireless communication device includes repeater device functionality and integrated access backhaul (IAB) node functionality. For example, the identification circuitry 5342 together with the communication and processing circuitry 5341, and the interface 5330 (and/or the transceiver 5310), shown and described above in connection with FIG. 53, may receive the first indication from the network access node, wherein the first indication indicates that the wireless communication device includes repeater device functionality and integrated access backhaul (IAB) node functionality. Furthermore, the identification circuitry 5342 together with the communication and processing circuitry 5341, and the interface 5330 (and/or the transceiver 5310), shown and described above in connection with FIG. 53, may provide a means for receiving the first indication from the network access node, wherein the first indication indicates that the wireless communication device includes repeater device functionality and integrated access backhaul (IAB) node functionality.

At block 5504, the core network node may select a first mode of operation for the wireless communication device from a plurality of modes of operation, wherein the plurality of modes of operation may include a repeater device mode of operation and a IAB node mode of operation. For example, the identification circuitry 5342, shown and described above in connection with FIG. 53, may select the first mode of operation for the wireless communication device from the plurality of modes of operation, wherein the plurality of modes of operation may include the repeater device mode of operation and the IAB node mode of operation. Furthermore, the identification circuitry 5342, shown and described above in connection with FIG. 53, may provide a means for select the first mode of operation for the wireless communication device from the plurality of modes of operation, wherein the plurality of modes of operation may include the repeater device mode of operation and the IAB node mode of operation.

In some examples, the selecting the first mode of operation may be based on at least one of: a traffic load, a quality of service, a deployment configuration, a capability of a wireless communication node, or a combination thereof.

At block 5506, the core network node may transmit a second indication of the first mode of operation to the network access node. For example, the identification circuitry 5342 together with the communication and processing circuitry 5341, the interface 5330 (and/or the transceiver 5310), shown and described above in connection with FIG. 53, may transmit the second indication of the first mode of operations (e.g., the selected mode of operation) to the network access node. Furthermore, the identification circuitry 5342 together with the communication and processing circuitry 5341, the interface 5330 (and/or the transceiver 5310), shown and described above in connection with FIG. 53, may provide a means for transmitting the second indication of the first mode of operations to the network access node.

In some examples, the process 5500 may further include authorizing the wireless communication device for accessing the network and transmitting a third indication after authorizing the wireless communication device for accessing the network, wherein the third indication indicates that a repeater device is authorized for accessing the network or an IAB node is authorized for accessing the network.

Of course, in the above examples, the circuitry included in the processors 2104, 2504, 3204, 3504, 4504, 4804, and/or 5304 is merely provided as an example, and other means for carrying out the described functions may be included within various aspects of the present disclosure, including but not limited to the instructions stored in the computer-readable medium 2106, 2506, 3206, 3506, 4506, 4806, and/or 5306, or any other suitable apparatus or means described in any one of the FIGS. 1-55, and utilizing, for example, the processes and/or algorithms described herein in relation to FIGS. 1-55.

The following provides an overview of aspects of the present disclosure:

Aspect 1: A method of wireless communication at a repeater device in a wireless communication network, the method including: receiving a first configuration specifying a first quantity of synchronization signal blocks (SSBs) to be transmitted by the repeater device, electing to use a second quantity of beams to transmit SSBs, wherein the second quantity of beams is less than or equal to the first quantity of SSBs, receiving at least one SSB transmission, and transmitting the at least one SSB transmission via the second quantity of beams.

Aspect 2: The method of aspect 1, wherein the electing to use the second quantity of beams to transmit SSBs includes: determining the second quantity of beams based on how many beams the repeater device can generate.

Aspect 3: The method of aspect 1 or 2, wherein the electing to use the second quantity of beams to transmit SSBs includes: identifying beams that can be used by the repeater device to relay SSBs, and determining the second quantity of beams based on the beams that can be used by the repeater device to relay SSBs.

Aspect 4: The method of any of aspects 1 through 3, wherein the electing to use the second quantity of beams to transmit SSBs includes: identifying beams that have been successfully used by the repeater device to communicate with at least one user equipment, and determining the second quantity of beams based on the beams that have been successfully used by the repeater device to communicate with the at least one user equipment.

Aspect 5: The method of any of aspects 1 through 4, wherein the second quantity of beams is less than the first quantity of SSBs, the method further including: generating an indication that the repeater device will use the second quantity of beams to transmit SSBs, and transmitting the indication to a network access node.

Aspect 6: The method of aspect 5, further including: receiving a second configuration after transmitting the indication, wherein the second configuration specifies a second quantity of SSBs to be used by the repeater device.

Aspect 7: The method of any of aspects 1 through 6, wherein the at least one SSB transmission includes a plurality of SSB transmissions, and transmitting the at least one SSB transmission further includes: sequentially relaying the plurality of SSB transmissions via the second quantity of beams.

Aspect 8: The method of any of aspects 1 through 7, wherein at least one SSB transmission includes SSB information, and transmitting the at least one SSB transmission further includes: generating a plurality of SSB transmissions from the SSB information, and transmitting the plurality of SSB transmissions via the second quantity of beams.

Aspect 9: A repeater device, including: a relay unit, a memory, and a processor communicatively coupled to the relay unit and the memory, wherein the processor and the memory are configured to: receive a first configuration specifying a first quantity of synchronization signal blocks (SSBs) to be transmitted by the relay unit of the repeater device, elect to use a second quantity of beams to transmit SSBs, wherein the second quantity of beams is less than or equal to the first quantity of SSBs, receive at least one SSB transmission, and transmit the at least one SSB transmission via the second quantity of beams.

Aspect 10: The repeater device of aspect 9, wherein the processor and the memory are further configured to: determine the second quantity of beams based on how many beams the repeater device can generate.

Aspect 11: The repeater device of aspect 9 or 10, wherein the processor and the memory are further configured to: identify beams that can be used by the repeater device to relay SSBs, and determine the second quantity of beams based on the beams that can be used by the repeater device to relay SSBs.

Aspect 12: The repeater device of any of aspects 9 through 11, wherein the processor and the memory are further configured to: identify beams that have been successfully used by the repeater device to communicate with at least one user equipment, and determine the second quantity of beams based on the beams that have been successfully used by the repeater device to communicate with the at least one user equipment.

Aspect 13: The repeater device of any of aspects 9 through 12, wherein the second quantity of beams is less than the first quantity of SSBs, and the processor and the memory are further configured to: generate an indication that the repeater device will use the second quantity of beams to transmit SSBs, and transmit the indication to a network access node.

Aspect 14: The repeater device of aspect 13, wherein the processor and the memory are further configured to: receive a second configuration after transmitting the indication, wherein the second configuration specifies a second quantity of SSBs to be used by the repeater device.

Aspect 15: The repeater device of any of aspects 9 through 14, wherein the at least one SSB transmission includes a plurality of SSB transmissions, and the processor and the memory transmit the at least one SSB transmission by being further configured to: sequentially relay the plurality of SSB transmissions via the second quantity of beams.

Aspect 16: The repeater device of any of aspects 9 through 15, wherein the at least one SSB transmission includes SSB information, and the processor and the memory transmit the at least one SSB transmission by being further configured to: generate a plurality of SSB transmissions from the SSB information, and transmit the plurality of SSB transmissions via the second quantity of beams.

Aspect 17: A method of wireless communication at a network access node in a wireless communication network, the method including: generating a first configuration indicating a first quantity of synchronization signal blocks (SSBs) to be transmitted by a repeater device, transmitting the first configuration to the repeater device, determining that the repeater device is transmitting less than all of the first quantity of SSBs, generating a second configuration after determining that the repeater device is transmitting less than all of the first quantity of SSBs, the second configuration indicating a second quantity of SSBs to be transmitted by the repeater device, and transmitting the second configuration to the repeater device.

Aspect 18: The method of aspect 17, further including: transmitting at least one SSB transmission to the repeater device after transmitting the first configuration.

Aspect 19: The method of aspect 17 or 18, wherein the determining that the repeater device is transmitting less than all of the first quantity of SSBs further includes: receiving an indication that the repeater device is using a second quantity of beams to transmit SSBs.

Aspect 20: The method of any of aspects 17 through 19, wherein the determining that the repeater device is transmitting less than all of the first quantity of SSBs includes: determining that there is no communication with a user equipment on at least one beam associated with the first quantity of SSBs.

Aspect 21: The method of any of aspects 17 through 20, wherein the determining that the repeater device is transmitting less than all of the first quantity of SSBs includes: determining that random access messages are not being received on at least one random access channel (RACH) occasion with the first quantity of SSBs.

Aspect 22: The method of any of aspects 17 through 21, further including: receiving capability information from the repeater device, estimating a quantity of beams supported by the repeater device based on the capability information, and determining the first quantity of SSBs based on the quantity of beams supported by the repeater device.

Aspect 23: The method of aspect 22, wherein the capability information includes at least one of: a maximum number of configured transmission configuration indicator (TCI) states per component carrier, a maximum number of configured spatial relations, a maximum number of sounding reference signal (SRS) resource sets, a maximum number of SRS resources per set, or a combination thereof.

Aspect 24: A network access node, including: a transceiver, a memory, and a processor communicatively coupled to the transceiver and the memory, wherein the processor and the memory are configured to: generate a first configuration indicating a first quantity of synchronization signal blocks (SSBs) to be transmitted by a repeater device, transmit the first configuration to the repeater device via the transceiver, determine that the repeater device is transmitting less than all of the first quantity of SSBs, generate a second configuration after determining that the repeater device is transmitting less than all of the first quantity of SSBs, the second configuration indicating a second quantity of SSBs to be transmitted by the repeater device, and transmit the second configuration to the repeater device via the transceiver.

Aspect 25: The network access node of aspect 24, wherein the processor and the memory are further configured to: transmit at least one SSB transmission to the repeater device after transmitting the first configuration.

Aspect 26: The network access node of aspect 24 or 25, wherein the processor and the memory determine that the repeater device is transmitting less than all of the first quantity of SSBs by being further configured to: receive an indication that the repeater device is using a second quantity of beams to transmit SSBs.

Aspect 27: The network access node of any of aspects 24 through 26, wherein the processor and the memory determine that the repeater device is transmitting less than all of the first quantity of SSBs by being further configured to: determine that there is no communication with a user equipment on at least one beam associated with the first quantity of SSBs.

Aspect 28: The network access node of any of aspects 24 through 27, wherein the processor and the memory determine that the repeater device is transmitting less than all of the first quantity of SSBs by being further configured to: determine that random access messages are not being received on at least one random access channel (RACH) occasion with the first quantity of SSBs.

Aspect 29: The network access node of any of aspects 24 through 28, wherein the processor and the memory are further configured to: receive capability information from the repeater device, estimate a quantity of beams supported by the repeater device based on the capability information, and determine the first quantity of SSBs based on the quantity of beams supported by the repeater device.

Aspect 30: The network access node of aspect 29, wherein the capability information includes at least one of: a maximum number of configured transmission configuration indicator (TCI) states per component carrier, a maximum number of configured spatial relations, a maximum number of sounding reference signal (SRS) resource sets, a maximum number of SRS resources per set, or a combination thereof.

Aspect 31: The method of any of aspects 24 through 30, wherein the first configuration includes SSB indices.

Aspect 32: The method of aspect 31, wherein the SSB indices map to resources to be used by the repeater device for SSB transmissions.

Aspect 33: The method of aspect 31, wherein the SSB indices map to beam information to be used by the repeater device for subsequent transmissions.

Aspect 34: The method of aspect 33, wherein the beam information includes spatial quasi co-location information for the first quantity of SSBs.

Aspect 35: The repeater device of aspect 17, wherein the first configuration includes SSB indices.

Aspect 36: The repeater device of aspect 35, wherein the SSB indices map to resources to be used by the repeater device for SSB transmissions.

Aspect 37: The repeater device of aspect 35, wherein the SSB indices map to beam information to be used by the repeater device for subsequent transmissions.

Aspect 38: The repeater device of aspect 37, wherein the beam information includes spatial quasi co-location information for the first quantity of SSBs.

Aspect 39: The method of aspect 17, wherein the first configuration includes SSB indices.

Aspect 40: The method of aspect 39, wherein the SSB indices map to beam information to be used by the repeater device for subsequent transmissions.

Aspect 41: The method of aspect 40, wherein the beam information includes spatial quasi co-location information for the first quantity of SSBs.

Aspect 42: The network access node of aspect 37, wherein the first configuration includes SSB indices.

Aspect 43: The network access node of aspect 24, wherein the SSB indices map to beam information to be used by the repeater device for subsequent transmissions.

Aspect 44: The network access node of aspect 43, wherein the beam information includes spatial quasi co-location information for the first quantity of SSBs.

Aspect 45: A repeater device configured for wireless communication including at least one means for performing a method of any one of aspects 1 through 8 or 31 through 34.

Aspect 46: A non-transitory computer-readable medium storing computer-executable code, including code for causing an apparatus to perform a method of any one of aspects 1 through 8 or 31 through 34.

Aspect 47: A network access node configured for wireless communication including at least one means for performing a method of any one of aspects 17 through 23 or 35 through 38.

Aspect 48: A non-transitory computer-readable medium storing computer-executable code, including code for causing an apparatus to perform a method of any one of aspects 17 through 23 or 35 through 38.

Aspect 49: A method of wireless communication at a repeater device, the method including: determining a quantity of antenna arrays of the repeater device, determining a mapping of beam indices to array indices for the antenna arrays, and transmitting an indication of the quantity of antenna arrays and the mapping of beam indices to array indices to a network access node.

Aspect 50: The method of aspect 49, further including: identifying at least one pair of beams that cannot be used for relaying a transmission between the network access node and a user equipment, and transmitting an indication of the at least one pair of beams to the network access node.

Aspect 51: The method of aspect 50, wherein the relaying the transmission between the network access node and the user equipment includes: concurrently receiving a first transmission from the network access node and transmitting the first transmission to the user equipment; or concurrently receiving a second transmission from the user equipment and transmitting the second transmission to the network access node.

Aspect 52: The method of aspect 50, wherein the identifying the at least one pair of beams includes: identifying beams from a common antenna array of the antenna arrays.

Aspect 53: The method of aspect 50, wherein the identifying the at least one pair of beams includes: determining that the repeater device cannot transmit from a first antenna array of the antenna arrays while concurrently receiving from a second antenna array of the antenna arrays.

Aspect 54: The method of aspect 53, further including: conducting signal measurements while concurrently transmitting from the first antenna array and receiving from the second antenna array, wherein the determining that the repeater device cannot transmit from the first antenna array of the antenna arrays while concurrently receiving from the second antenna array of the antenna arrays is based on the signal measurements.

Aspect 55: The method of aspect 49, further including: receiving a beam configuration from the network access node, determining whether all beam pairs from the beam configuration can be used for relaying a transmission between the network access node and a user equipment, generating an acknowledgement based on the determining whether all beam pairs from the beam configuration can be used for relaying the transmission, the acknowledgement indicating whether the beam configuration is supported by the repeater device, and transmitting the acknowledgment to the network access node.

Aspect 56: The method of aspect 49, further including: receiving a first beam configuration from the network access node, determining that at least one pair of beams from the first beam configuration cannot be used for relaying a transmission between the network access node and a user equipment, and transmitting a negative acknowledgment to the network access node indicating that the first beam configuration is not supported by the repeater device.

Aspect 57: The method of aspect 56, further including: receiving a second beam configuration from the network access node after transmitting the negative acknowledgment.

Aspect 58: A repeater device, including: a relay unit, a memory, and a processor communicatively coupled to the relay unit and the memory, wherein the processor and the memory are configured to: determine a quantity of antenna arrays of the repeater device, determine a mapping of beam indices to array indices for the antenna arrays, and transmit an indication of the quantity of antenna arrays and the mapping of beam indices to array indices to a network access node via the relay unit.

Aspect 59: The repeater device of aspect 58, wherein the processor and the memory are further configured to: identify at least one pair of beams that cannot be used for relaying a transmission between the network access node and a user equipment, and transmit an indication of the at least one pair of beams to the network access node.

Aspect 60: The repeater device of aspect 59, wherein the relay unit is configured to: concurrently receive a first transmission from the network access node and transmit the first transmission to the user equipment; or concurrently receive a second transmission from the user equipment and transmit the second transmission to the network access node.

Aspect 61: The repeater device of aspect 59, wherein the identifying the at least one pair of beams includes: identifying beams from a common antenna array of the antenna arrays.

Aspect 62: The repeater device of aspect 59, wherein the identifying the at least one pair of beams includes: determining that the repeater device cannot transmit from a first antenna array of the antenna arrays while concurrently receiving from a second antenna array of the antenna arrays.

Aspect 63: The repeater device of aspect 62, wherein the processor and the memory are further configured to: conduct signal measurements while concurrently transmitting from the first antenna array and receiving from the second antenna array, wherein the determining that the repeater device cannot transmit from the first antenna array of the antenna arrays while concurrently receiving from the second antenna array of the antenna arrays is based on the signal measurements.

Aspect 64: The repeater device of aspect 58, wherein the processor and the memory are further configured to: receive a beam configuration from the network access node, determine whether all beam pairs from the beam configuration can be used for relaying a transmission between the network access node and a user equipment, generate an acknowledgement based on the determining whether all beam pairs from the beam configuration can be used for relaying the transmission, the acknowledgement indicating whether the beam configuration is supported by the repeater device, and transmit the acknowledgment to the network access node.

Aspect 65: The repeater device of aspect 58, wherein the processor and the memory are further configured to: receive a first beam configuration from the network access node, determining that at least one pair of beams from the first beam configuration cannot be used for relaying a transmission between the network access node and a user equipment, and transmit a negative acknowledgment to the network access node indicating that the first beam configuration is not supported by the repeater device.

Aspect 66: The repeater device of aspect 65, wherein the processor and the memory are further configured to: receive a second beam configuration from the network access node after transmitting the negative acknowledgment.

Aspect 67: A repeater device configured for wireless communication including at least one means for performing a method of any one of aspects 49-57.

Aspect 68: A non-transitory computer-readable medium storing computer-executable code, including code for causing an apparatus to perform a method of any one of aspects 49-57.

Aspect 69: A method of wireless communication at a network access node, the method including: receiving an indication of a quantity of antenna arrays of a repeater device and a mapping of beam indices to array indices of the antenna arrays, selecting a first beam configuration for the repeater device based on the indication, and transmitting the first beam configuration to the repeater device.

Aspect 70: The method of aspect 69, further including: identifying at least one pair of beams that cannot be used by the repeater device for relaying a transmission between the network access node and a user equipment based on the indication; and wherein selecting the first beam configuration further includes: abstaining from including the at least one pair of beams in the first beam configuration.

Aspect 71: The method of aspect 70, wherein the identifying the at least one pair of beams includes: identifying beams from a common antenna array of the antenna arrays based on the indication.

Aspect 72: The method of aspect 70, wherein the identifying the at least one pair of beams includes: determining that the repeater device cannot transmit from a first antenna array of the antenna arrays while concurrently receiving from a second antenna array of the antenna arrays.

Aspect 73: The method of aspect 72, further including: conducting a signal measurement while the repeater device is concurrently transmitting from the first antenna array and receiving from the second antenna array, wherein the determining that the repeater device cannot transmit from the first antenna array of the antenna arrays while concurrently receiving from the second antenna array of the antenna arrays is based on the signal measurement.

Aspect 74: The method of aspect 72, further including: receiving a measurement report from the user equipment based on a signal measurement by the user equipment while the repeater device is concurrently transmitting from the first antenna array and receiving from the second antenna array, wherein the determining that the repeater device cannot transmit from the first antenna array of the antenna arrays while concurrently receiving from the second antenna array of the antenna arrays is based on the measurement report.

Aspect 75: The method of aspect 69, further including: receiving an acknowledgment from the repeater device indicating whether the first beam configuration is supported by the repeater device.

Aspect 76: The method of aspect 69, further including: receiving a negative acknowledgment from the repeater device indicating that the first beam configuration is not supported by the repeater device.

Aspect 77: The method of aspect 69, further including: selecting a second beam configuration for the repeater device after receiving the negative acknowledgment, and transmitting the second beam configuration to the repeater device.

Aspect 78: A network access node, including: a transceiver, a memory, and a processor communicatively coupled to the transceiver and the memory, wherein the processor and the memory are configured to: receive an indication of a quantity of antenna arrays of a repeater device and a mapping of beam indices to array indices of the antenna arrays, select a first beam configuration for the repeater device based on the indication, and transmit the first beam configuration to the repeater device via the transceiver.

Aspect 79: The network access node of aspect 78, wherein the processor and the memory are further configured to: identify at least one pair of beams that cannot be used by the repeater device for relaying a transmission between the network access node and a user equipment based on the indication; and wherein the processor and the memory select the first beam configuration by being further configured to: abstain from including the at least one pair of beams in the first beam configuration.

Aspect 80: The network access node of aspect 79, wherein the processor and the memory are further configured to: identify beams from a common antenna array of the antenna arrays based on the indication.

Aspect 81: The network access node of aspect 79, wherein the processor and the memory identify the at least one pair of beams by being further configured to: determine that the repeater device cannot transmit from a first antenna array of the antenna arrays while concurrently receiving from a second antenna array of the antenna arrays.

Aspect 82: The network access node of aspect 81, wherein the processor and the memory are further configured to: conduct a signal measurement while the repeater device is concurrently transmitting from the first antenna array and receiving from the second antenna array, wherein the determining that the repeater device cannot transmit from the first antenna array of the antenna arrays while concurrently receiving from the second antenna array of the antenna arrays is based on the signal measurement.

Aspect 83: The network access node of aspect 81, wherein the processor and the memory are further configured to: receive a measurement report from the user equipment based on a signal measurement by the user equipment while the repeater device is concurrently transmitting from the first antenna array and receiving from the second antenna array, wherein the determining that the repeater device cannot transmit from the first antenna array of the antenna arrays while concurrently receiving from the second antenna array of the antenna arrays is based on the measurement report.

Aspect 84: The network access node of aspect 78, wherein the processor and the memory are further configured to: receive an acknowledgment from the repeater device indicating whether the first beam configuration is supported by the repeater device.

Aspect 85: The network access node of aspect 78, wherein the processor and the memory are further configured to: receive a negative acknowledgment from the repeater device indicating that the first beam configuration is not supported by the repeater device.

Aspect 86: The network access node of aspect 85, wherein the processor and the memory are further configured to: select a second beam configuration for the repeater device after receiving the negative acknowledgment, and transmit the second beam configuration to the repeater device.

Aspect 87: A network access node configured for wireless communication including at least one means for performing a method of any one of aspects 69-77.

Aspect 88: A non-transitory computer-readable medium storing computer-executable code, including code for causing an apparatus to perform a method of any one of aspects 69-77.

Aspect 89: A method of wireless communication at a repeater device, the method including: generating an indication of at least one beam group of the repeater device that can be used for concurrent transmission or reception, and transmitting the indication to a network access node.

Aspect 90: The method of aspect 89, wherein the indication specifies that a first beam group of the at least one beam group can be used for concurrent transmission and reception.

Aspect 91: The method of aspect 89, further including: identifying the at least one beam group by identifying beams from different antenna arrays.

Aspect 92: The method of aspect 91, further including: conducting signal measurements while concurrently transmitting and receiving via the at least one beam group, and identifying the at least one beam group based on the signal measurements.

Aspect 93: The method of aspect 89, further including: receiving a beam configuration from the network access node, determining whether all beam groups from the beam configuration can be used for concurrently transmitting and receiving, generating an acknowledgement based on the determining whether all beam groups from the beam configuration can be used for concurrently transmitting and receiving, the acknowledgement indicating whether the beam configuration is supported by the repeater device, and transmitting the acknowledgment to the network access node.

Aspect 94: The method of aspect 89, further including: receiving a first beam configuration from the network access node, determining that at least one beam group from the first beam configuration cannot be used for concurrently transmitting and receiving, and transmitting a negative acknowledgment to the network access node indicating that the first beam configuration is not supported by the repeater device.

Aspect 95: The method of aspect 94, further including: receiving a second beam configuration from the network access node after transmitting the negative acknowledgment.

Aspect 96: The method of aspect 89, further including: transmitting connectivity information of at least one antenna array that supports the concurrent transmission and reception.

Aspect 97: The method of aspect 96, wherein the connectivity information includes a multiple-input multiple-output (MIMO) repeater device configuration, a bi-directional MIMO repeater device configuration, or a single-input single-output (SISO) repeater device configuration.

Aspect 98: The method of aspect 96, wherein the connectivity information includes at least one of: an indication of a quantity of antenna arrays at the repeater device, an indication of how the antenna arrays may be combined for beamforming, an indication of which of the antenna arrays can be combined for beamforming, an indication of which of the antenna arrays can be used for transmission, an indication of which of the antenna arrays can be used for reception, or a combination thereof.

Aspect 99: A repeater device, including: a relay unit, a memory, and a processor communicatively coupled to the relay unit and the memory, wherein the processor and the memory are configured to: generate an indication of at least one beam group of the repeater device that can be used for concurrent transmission or reception, and transmit the indication to a network access node via the relay unit.

Aspect 100: The repeater device of aspect 99, wherein the indication specifies that a first beam group of the at least one beam group can be used for concurrent transmission and reception.

Aspect 101: The repeater device of aspect 99, wherein the processor and the memory are further configured to: identify the at least one beam group by identifying beams from different antenna arrays.

Aspect 102: The repeater device of aspect 101, wherein the processor and the memory are further configured to: conduct signal measurements while concurrently transmitting and receiving via the at least one beam group, and identify the at least one beam group based on the signal measurements.

Aspect 103: The repeater device of aspect 99, wherein the processor and the memory are further configured to: receive a beam configuration from the network access node, determine whether all beam groups from the beam configuration can be used for concurrently transmitting and receiving, generate an acknowledgement based on the determining whether all beam groups from the beam configuration can be used for concurrently transmitting and receiving, the acknowledgement indicating whether the beam configuration is supported by the repeater device, and transmit the acknowledgment to the network access node.

Aspect 104: The repeater device of aspect 99, wherein the processor and the memory are further configured to: receive a first beam configuration from the network access node, determine that at least one beam group from the first beam configuration cannot be used for concurrently transmitting and receiving, and transmit a negative acknowledgment to the network access node indicating that the first beam configuration is not supported by the repeater device.

Aspect 105: The repeater device of aspect 104, wherein the processor and the memory are further configured to: receive a second beam configuration from the network access node after transmitting the negative acknowledgment.

Aspect 106: The repeater device of aspect 99, wherein the processor and the memory are further configured to: transmit connectivity information of at least one antenna array that supports the concurrent transmission and reception.

Aspect 107: The repeater device of aspect 106, wherein the connectivity information includes a multiple-input multiple-output (MIMO) repeater device configuration, a bi-directional MIMO repeater device configuration, or a single-input single-output (SISO) repeater device configuration.

Aspect 108: The repeater device of aspect 106, wherein the connectivity information includes at least one of: an indication of a quantity of antenna arrays at the repeater device, an indication of how the antenna arrays may be combined for beamforming, an indication of which of the antenna arrays can be combined for beamforming, an indication of which of the antenna arrays can be used for transmission, an indication of which of the antenna arrays can be used for reception, or a combination thereof.

Aspect 109: A repeater device configured for wireless communication including at least one means for performing a method of any one of aspects 89-98.

Aspect 110: A non-transitory computer-readable medium storing computer-executable code, including code for causing an apparatus to perform a method of any one of aspects 89-98.

Aspect 111: A method of wireless communication at a network access node, the method including: identifying at least one beam group of a repeater device that can be used for concurrent transmission or reception, selecting a first beam configuration for the repeater device that specifies the at least one beam group, and transmitting the first beam configuration to the repeater device.

Aspect 112: The method of aspect 111, wherein the identifying the at least one beam group includes: receiving an indication of the at least one beam group from the repeater device.

Aspect 113: The method of aspect 112, wherein the indication specifies that a first beam group of the at least one beam group can be used for concurrent transmission and reception.

Aspect 114: The method of aspect 111, wherein the identifying the at least one beam group includes: identifying beams from different antenna arrays of the repeater device.

Aspect 115: The method of aspect 111, further including: conducting signal measurements while the repeater device is concurrently transmitting and receiving via the at least one beam group, wherein the identifying the at least one beam group is based on the signal measurements.

Aspect 116: The method of aspect 111, further including: receiving an acknowledgment from the repeater device indicating whether the first beam configuration is supported by the repeater device.

Aspect 117: The method of aspect 111, further including: receiving a negative acknowledgment from the repeater device indicating that the first beam configuration is not supported by the repeater device.

Aspect 118: The method of aspect 117, further including: selecting a second beam configuration for the repeater device after receiving the negative acknowledgment, and transmitting the second beam configuration to the repeater device.

Aspect 119: The method of aspect 111, further including: receiving connectivity information of at least one antenna array that supports the concurrent transmission and reception, wherein the selecting the first beam configuration for the repeater device is based on the connectivity information.

Aspect 120: The method of aspect 119, wherein the connectivity information includes a multiple-input multiple-output (MIMO) repeater device configuration, a bi-directional MIMO repeater device configuration, or a single-input single-output (SISO) repeater device configuration.

Aspect 121: The method of aspect 119, wherein the connectivity information includes at least one of: an indication of a quantity of antenna arrays at the repeater device, an indication of how the antenna arrays may be combined for beamforming, an indication of which of the antenna arrays can be combined for beamforming, an indication of which of the antenna arrays can be used for transmission, an indication of which of the antenna arrays can be used for reception, or a combination thereof.

Aspect 122: A network access node, including: a transceiver, a memory, and a processor communicatively coupled to the transceiver and the memory, wherein the processor and the memory are configured to: identify at least one beam group of a repeater device that can be used for concurrent transmission or reception, select a first beam configuration for the repeater device that specifies the at least one beam group, and transmit the first beam configuration to the repeater device via the transceiver.

Aspect 123: The network access node of aspect 122, wherein the processor and the memory are configured to: receive an indication of the at least one beam group from the repeater device.

Aspect 124: The network access node of aspect 123, wherein the indication specifies that a first beam group of the at least one beam group can be used for concurrent transmission and reception.

Aspect 125: The network access node of aspect 122, wherein the processor and the memory are configured to: identify beams from different antenna arrays of the repeater device.

Aspect 126: The network access node of aspect 122, wherein the processor and the memory are configured to: conduct signal measurements while the repeater device is concurrently transmitting and receiving via the at least one beam group, wherein the identifying the at least one beam group is based on the signal measurements.

Aspect 127: The network access node of aspect 122, wherein the processor and the memory are configured to: receive an acknowledgment from the repeater device indicating whether the first beam configuration is supported by the repeater device.

Aspect 128: The network access node of aspect 122, wherein the processor and the memory are configured to: receive a negative acknowledgment from the repeater device indicating that the first beam configuration is not supported by the repeater device.

Aspect 129: The network access node of aspect 128, wherein the processor and the memory are configured to: select a second beam configuration for the repeater device after receiving the negative acknowledgment, and transmit the second beam configuration to the repeater device.

Aspect 130: The network access node of aspect 122, wherein the processor and the memory are further configured to: receive connectivity information of at least one antenna array that supports the concurrent transmission and reception, wherein the selecting the first beam configuration for the repeater device is based on the connectivity information.

Aspect 131: The network access node of aspect 130, wherein the connectivity information includes a multiple-input multiple-output (MIMO) repeater device configuration, a bi-directional MIMO repeater device configuration, or a single-input single-output (SISO) repeater device configuration.

Aspect 132: The network access node of aspect 130, wherein the connectivity information includes at least one of: an indication of a quantity of antenna arrays at the repeater device, an indication of how the antenna arrays may be combined for beamforming, an indication of which of the antenna arrays can be combined for beamforming, an indication of which of the antenna arrays can be used for transmission, an indication of which of the antenna arrays can be used for reception, or a combination thereof.

Aspect 133: A network access node configured for wireless communication including at least one means for performing a method of any one of aspects 111-121.

Aspect 134: A non-transitory computer-readable medium storing computer-executable code, including code for causing an apparatus to perform a method of any one of aspects 111-121.

Aspect 135: A method of wireless communication at a wireless repeater device in a wireless communication network, including: decoding cell-specific information received from a network access node, configuring the repeater device using the cell-specific information, and forwarding signals between a first wireless communication device and a second wireless communication device according to the configuring.

Aspect 136: The method of aspect 135, further including: configuring the repeater device using the cell-specific information without establishing a radio resource control (RRC) connection with the network access node using the cell-specific information.

Aspect 137: The method of aspect 135, wherein cell-specific information received from the network access node is beam-specific information.

Aspect 138: The method of aspect 135, wherein the cell-specific information is specific for a single repeater or a group of repeaters.

Aspect 139: The method of aspect 135, further including: periodically verifying the cell-specific information by at least one of acquiring new cell-specific information, re-acquiring previously decoded cell-specific information, or rereading the decoded cell-specific information received from the network access node.

Aspect 140: The method of aspect 139, further including: setting a timer to trigger the periodically verifying of the cell-specific information.

Aspect 141: The method of aspect 135, wherein the network access node is one of the first wireless communication device or the second wireless communication device.

Aspect 142: The method of aspect 135, wherein the cell-specific information is transmitted from the network access node and used to establish an RRC connection between the network access node and a wireless communication device.

Aspect 143: The method of aspect 135, wherein the signals forwarded by the repeater device are beam formed.

Aspect 144: The method of aspect 135, wherein the signals forwarded by the repeater device are in analog form and have not been processed in a digital form at an intermediate frequency or at baseband in the repeater device.

Aspect 145: The method of aspect 135, wherein the cell-specific information provides resource and configuration information for receiving repeater device-specific control information.

Aspect 146: The method of aspect 135, wherein the cell-specific information includes unwanted emissions limits information.

Aspect 147: The method of aspect 135, wherein the resource information includes at least one of: time division duplex pattern (TDD pattern), wireless repeater device on-off information, or frequency information of the network access node.

Aspect 148: The method of aspect 147, wherein the frequency information is at least one of: center frequency information, or channel bandwidth.

Aspect 149: The method of aspect 135, wherein the cell-specific information is system information that is transported in a master information block (MIB), in a remaining minimum system information (RMSI) identified by the MIB, or in a repeater device-specific system information block (SIB) message.

Aspect 150: The method of aspect 135, wherein the cell-specific information is valid for a given period or for a finite set of upcoming resources.

Aspect 151: The method of aspect 135, wherein the cell-specific information is beam-specific information.

Aspect 152: The method of aspect 135, wherein the cell-specific information is received on a specific beam directed toward a location of the repeater device.

Aspect 153: The method of aspect 135, wherein the cell-specific information is system information that is transported in a system information block (SIB) that includes resources identified by at least one of: a master information block (MIB), or a remaining minimum system information (RMSI), wherein the RMSI is not the SIB.

Aspect 154: The method of aspect 135, wherein the cell-specific information is transported as payload of a downlink control information (DCI) format or a medium access control-control element (MAC-CE).

Aspect 155: The method of aspect 154, wherein the DCI is a group-common DCI.

Aspect 156: The method of aspect 154, wherein the DCI format is associated with a synchronization signal block (SSB) or a beamforming configuration.

Aspect 157: The method of aspect 154, further including: receiving a series of the DCI format to dynamically change the configuring of the repeater device.

Aspect 158: The method of aspect 154, wherein: the repeater device is one of a plurality of repeater devices arranged in a plurality of different respective directions relative to the network access node, a first of the plurality of repeater devices receives a first DCI format message that configures the first of the plurality of repeater devices to disable repeater reception and transmission, and a second of the plurality of repeater devices receives a second DCI format message that configures the second of the plurality of repeater devices to enable repeater reception and transmission.

Aspect 159: The method of aspect 135, wherein the cell-specific information is at least one of: broadcast to a plurality of repeater devices including the repeater device, or provided as a group-common configuration to the plurality of repeater devices including the repeater device.

Aspect 160: The method of aspect 135, wherein the cell-specific information is repeater device-specific control information.

Aspect 161: The method of aspect 160, wherein the repeater device-specific control information is transported as payload of a downlink control information (DCI) format associated with a common radio network temporary identifier (RNTI) that distinguishes the DCI format from other DCI formats associated with other RNTIs associated with wireless communication devices.

Aspect 162: The method of aspect 135, wherein the repeater device is a Layer-1 relay unit.

Aspect 163: The method of aspect 135, wherein the repeater device is identified with a predetermined random access channel (RACH) preamble and/or a predetermined resource that is distinct from wireless communication device RACH preambles and/or resources.

Aspect 164: The method of aspect 163, further including: transmitting the predetermined RACH preamble and/or on the predetermined resource, associated with a synchronization signal block (SSB) that identifies a direction, relative to the repeater device, of relayed radio frequency traffic.

Aspect 165: The method of aspect 163, wherein the network access node conveys information to the repeater device in a RACH response to the predetermined RACH preamble and/or the predetermined resource.

Aspect 166: The method of aspect 163, wherein the predetermined RACH preamble and/or the predetermined resource is one of a plurality of predetermined RACH preambles and/or the predetermined resources associated with a plurality of respective information preestablished to convey the respective information from the repeater device to the network access node.

Aspect 167: The method of aspect 166, wherein the repeater device determines an identity of the respective information to be conveyed to the network access node by selection of one of the plurality of predetermined RACH preambles and/or the predetermined resources.

Aspect 168: The method of aspect 166, wherein the information corresponds to at least one of: a power configuration of the repeater device, or a measured power of resources in an access link.

Aspect 169: The method of aspect 168, wherein the measured power of resources in the access link is measured in at least one of: a measurement window configured by the network access node, or within a set of resources configured by the network access node.

Aspect 170: The method of aspect 135, wherein the repeater device conveys information to the network access node by at least one of: selection of a predetermined random access channel (RACH) preamble and/or a predetermined resource, inclusion of the information in a payload of a first RACH message, inclusion of the information in a payload of a third RACH message, or setting a transmitter power of the repeater device to one of a plurality of predetermined transmitter power levels, wherein each of the plurality of predetermined transmitter power levels conveys a distinct respective piece of information.

Aspect 171: The method of aspect 135, wherein the network access node conveys information to the repeater device in one of a RACH response or a fourth RACH message.

Aspect 172: The method of aspect 135, wherein changes to a configuration of the repeater device are made without establishment of a control interface between the repeater device and the network access node.

Aspect 173: The method of aspect 135, further including: configuring the repeater device to convey radio frequency traffic received at the repeater device in accordance with a control signal of the cell-specific information.

Aspect 174: The method of aspect 173, wherein the control signal is broadcast from the network access node and exclusively directed to a plurality of repeater devices, including the repeater device, within a broadcast reception range of the network access node.

Aspect 175: The method of aspect 174, wherein: the control signal configures the plurality of repeater devices to not convey the radio frequency traffic associated with a cell.

Aspect 176: The method of aspect 173, further including: the control signal provides a synchronization signal block (SSB)-specific indication wherein the repeater device determines to convey or to not convey based on a detected SSB from the network access node and the provided SSB-specific indication.

Aspect 177: The method of aspect 173 further including: determining a synchronization signal block (SSB) index value associated with the control signal, and configuring an output power of a transmitter of the repeater device according to the SSB index value.

Aspect 178: The method of aspect 177, wherein the configuring the output power includes at least one of: configuring a maximum output power of the transmitter, configuring a maximum amplification gain of the transmitter, or configuring a first power assigned to first traffic transmitted in an uplink and a second power assigned to second traffic transmitted in a downlink, wherein the first power is different from the second power.

Aspect 179: The method of aspect 135, further including: measuring a power level of a broadcast channel carrying the cell-specific information from a given network access node, comparing the power level to a predetermined low threshold and a predetermined high threshold, and configuring the repeater device based on the comparing.

Aspect 180: The method of aspect 179, further including: configuring the repeater device to convey radio frequency traffic when the power level is greater than the predetermined low threshold and less than the predetermined high threshold.

Aspect 181: The method of aspect 179, further including: determining a synchronization signal block (SSB) index value associated with a control signal, and configuring the repeater device to convey radio frequency traffic associated with the SSB index value in an uplink resource.

Aspect 182: The method of aspect 135, further including: determining a synchronization signal block (SSB) index value associated with the cell-specific information, and configuring a transmitter of the repeater device based on the SSB index value.

Aspect 183: The method of aspect 182, wherein configuring the transmitter further includes at least one of: configuring the transmitter with a maximum transmitter output power, configuring the transmitter with a maximum amplification gain, or configuring a first power assigned to first traffic transmitted in an uplink and a second power assigned to second traffic transmitted in a downlink, wherein the first power is different from the second power.

Aspect 184: The method of aspect 182, wherein configuring the transmitter further includes at least one of: configuring the transmitter with a maximum transmitter output power, or configuring the transmitter with a maximum amplification gain.

Aspect 185: The method of aspect 135, wherein: the cell-specific information indicates a resource of at least one symbol in at least one slot, and configuring the repeater device using the cell-specific information further includes: configuring the repeater device to convey radio frequency traffic exclusively in the indicated resource during the at least one symbol in the at least one slot.

Aspect 186: The method of aspect 184, wherein the resource is at least one of: an uplink resource, a downlink resource, or a flexible resource and the method further includes: replacing the flexible resource with the uplink resource or the downlink resource according to control information or control configuration signaling received by the repeater device.

Aspect 187: A wireless repeater device in a wireless communication network, including: a wireless transceiver, a memory, and a processor communicatively coupled to the wireless transceiver and the memory, wherein the processor and the memory are configured to: decode cell-specific information received from a network access node, configure the repeater device using the cell-specific information, and forward signals between a first wireless communication device and a second wireless communication device according to the configuration.

Aspect 188: The wireless repeater device of aspect 187, wherein the processor and the memory are further configured to configure the repeater device using the cell-specific information without establishing a radio resource control (RRC) connection with the network access node using the cell-specific information.

Aspect 189: A wireless repeater device in a wireless communication network, including: means for decoding cell-specific information received from a network access node, means for configuring the repeater device using the cell-specific information, and means for forwarding signals between a first wireless communication device and a second wireless communication device according to the means for configuring.

Aspect 190: The wireless repeater device of aspect 189, wherein the means for configuring the repeater device includes means for configuring the repeater device using the cell-specific information without establishing a radio resource control (RRC) connection with the network access node using the cell-specific information.

Aspect 191: An article of manufacture for use by a wireless repeater device in a wireless communication network, the article including: a non-transitory computer-readable medium having stored therein instructions executable by one or more processors of the repeater device to: decode cell-specific information received from a network access node, configure the repeater device using the cell-specific, and forward signals between a first wireless communication device and a second wireless communication device according to the configuration.

Aspect 192: The article of manufacture of aspect 191, wherein the instructions include instructions to configure the repeater device using the cell-specific information without establishing a radio resource control (RRC) connection with the network access node using the cell-specific information.

Aspect 193: A method of wireless communication at a wireless repeater device in a wireless communication network, including: decoding cell-specific information received from a network access node to obtain at least one of: a measurement window, or a set of resources, measuring, at the repeater device, a power received as a function of direction during the at least one of: the measurement window, or the set of resources, configuring a downlink resource of the repeater device based on the power received, and forwarding signals between a first wireless communication device and a second wireless communication device according to the configuring.

Aspect 194: The method of aspect 193, wherein the network access node is one of the first wireless communication device or the second wireless communication device.

Aspect 195: The method of aspect 193, further including: comparing the power received as the function of direction to a predetermined threshold, and configuring the downlink resource in at least one beam corresponding to at least one direction where the power received was less than the predetermined threshold.

Aspect 196: The method of aspect 193, wherein the repeater device is a Layer-1 relay unit.

Aspect 197: The method of aspect 193, wherein changes to a configuration of the repeater device are made in an absence of an RRC configuration established between the repeater device and any network access node including the network access node.

Aspect 198: The method of aspect 193, wherein the at least one of: the measurement window, or the set of resources is conveyed to the repeater device in control signaling in a repeater-device specific random access channel (RACH) configuration.

Aspect 199: The method of aspect 198, wherein the repeater-device specific RACH configuration is broadcast from the network access node and exclusively directed to a plurality of repeater devices including the repeater device within a broadcast reception range of the network access node.

Aspect 200: The method of aspect 198, wherein the repeater device is identified with a predetermined RACH preamble and/or a predetermined resource.

Aspect 201: A wireless repeater device in a wireless communication network, including: a wireless transceiver, a memory, and a processor communicatively coupled to the wireless transceiver and the memory, wherein the processor and the memory are configured to: decode cell-specific information received from a network access node to obtain at least one of: a measurement window, or a set of resources, measure, at the repeater device, a power received as a function of direction during the at least one of: the measurement window, or the set of resources, configure a downlink resource of the repeater device based on the power received, and forward signals between the repeater device and the network access node according to the configuring.

Aspect 202: A wireless repeater device in a wireless communication network, including: means for decoding cell-specific information received from a network access node to obtain at least one of: a measurement window, or a set of resources, means for measuring, at the repeater device, a power received as a function of direction during the at least one of: the measurement window, or the set of resources, means for configuring a downlink resource of the repeater device based on the power received, and means for forwarding signals between the repeater device and the network access node according to the configuring.

Aspect 203: An article of manufacture for use by a wireless repeater device in a wireless communication network, the article including: a non-transitory computer-readable medium having stored therein instructions executable by one or more processors of the repeater device to: decode cell-specific information received from a network access node to obtain at least one of: a measurement window, or a set of resources, measure, at the repeater device, a power received as a function of direction during the at least one of: the measurement window, or the set of resources, configure a downlink resource of the repeater device based on the power received, and forward signals between the repeater device and the network access node according to the configuring.

Aspect 204: A method of wireless communication at a network access node in a wireless communication network, including: generating repeater device-specific control information that is included in at least one of: a payload of a downlink control information (DCI) format that is unique to repeater devices, a remaining master system information (RMSI), a master information block (MIB), or a combination of the MIB and a system information block (SIB), broadcasting the repeater device-specific control information to a plurality of repeater devices, and communicating signals with a wireless communication device via the repeater device according to the broadcast repeater device-specific control information.

Aspect 205: The method of aspect 204, further including: broadcasting different respective sets of repeater device-specific control information in two or more different respective directions relative to the network access node.

Aspect 206: The method of aspect 204, wherein the repeater device-specific control information is associated with a synchronization signal block (SSB) or a beamforming configuration.

Aspect 207: The method of aspect 204, further including: generating a plurality of payloads for a respective plurality of the DCI format that is unique to repeater devices, broadcasting the plurality of DCI in series to dynamically change a configuration of the repeater devices.

Aspect 208: The method of aspect 207, wherein the plurality of DCI includes: a first DCI format, unique to a first plurality of repeater devices that configures the first plurality of repeater devices to disable repeater reception and transmission, and a second DCI format, unique to a second plurality of repeater devices that configures the second plurality of repeater devices to enable repeater reception and transmission.

Aspect 209: The method of aspect 204, wherein the DCI format is associated with a common radio network temporary identifier (RNTI) that distinguishes the DCI format from other DCI formats associated with other RNTIs associated with wireless communication devices.

Aspect 210: The method of aspect 204, wherein the plurality of repeater devices is identified with a predetermined random access channel (RACH) preamble and/or a predetermined resource that is distinct from wireless communication device RACH preambles and or resources.

Aspect 211: The method of aspect 204, wherein the network access node conveys information to the plurality of repeater devices in a random access channel (RACH) response to a predetermined RACH preamble and/or a predetermined resource.

Aspect 212: The method of aspect 211, wherein the predetermined RACH preamble and/or the predetermined resource is one of a plurality of predetermined RACH preambles and/or predetermined resources associated with a respective plurality of information that is preestablished to convey information to the network access node.

Aspect 213: The method of aspect 212, wherein the respective plurality of information corresponds to at least one of: a power configuration of a repeater device, or a measured power of resources in an access link.

Aspect 214: The method of aspect 213, wherein the measured power of resources in the access link is measured in at least one of: a measurement window configured by the network access node, or within a set of resources configured by the network access node.

Aspect 215: The method of aspect 204, wherein the plurality of repeater devices convey information to the network access node by at least one of: selection of a predetermined random access channel (RACH) preamble, inclusion of the information in a payload of a first or a third RACH message, or setting a transmitter power of the repeater device to one of a plurality of predetermined transmitter power levels, wherein each of the plurality of predetermined transmitter power levels conveys a distinct respective piece of information.

Aspect 216: The method of aspect 204, wherein the network access node conveys information to the plurality of repeater devices in one of a RACH response or a fourth RACH message.

Aspect 217: The method of aspect 204, wherein changes to a configuration of each of the plurality of repeater devices are made without establishment of a control interface between the plurality of repeater devices and the network access node.

Aspect 218: The method of aspect 204, further including: configuring the plurality of repeater devices to convey radio frequency traffic received at respective repeater devices in accordance with a control signal broadcast by the network access node.

Aspect 219: The method of aspect 218, wherein the control signal is broadcast from the network access node and exclusively directed to the plurality of repeater devices within a broadcast reception range of the network access node.

Aspect 220: The method of aspect 218, wherein: the control signal indicates that the network access node bars one or more wireless communication devices from camping on a cell associated with the control signal and configures the plurality of repeater devices to not convey the radio frequency traffic received from the one or more wireless communication devices in an uplink resource associated with the cell.

Aspect 221: The method of aspect 220, further including: determining a synchronization signal block (SSB) index value associated with the control signal, and configuring the plurality of repeater devices to not convey the radio frequency traffic that is associated with the SSB index value in the uplink resource associated with the cell.

Aspect 222: The method of aspect 220 further including: determining a synchronization signal block (SSB) index value associated with the control signal, and configuring an output power of respective transmitters of the plurality of repeater devices according to the SSB index value.

Aspect 223: The method of aspect 222, wherein the configuring the output power includes at least one of: configuring a maximum output power of the respective transmitters, configuring a maximum amplification gain of the respective transmitters, or configuring a first power assigned to first traffic transmitted in an uplink and a second power assigned to second traffic transmitted in a downlink, wherein the first power is different from the second power.

Aspect 224: The method of aspect 204, further including: configuring the plurality of repeater devices based on a power level of a broadcast channel carrying cell-specific information to the plurality of repeater devices, and wherein the configuring is based on a comparison of the power level to a predetermined low threshold and a predetermined high threshold.

Aspect 225: A network access node in a wireless communication network, including: a wireless transceiver, a memory, and a processor communicatively coupled to the wireless transceiver and the memory, wherein the processor and the memory are configured to: generate repeater device-specific control information that is included in at least one of: a payload of a downlink control information (DCI) format that is unique to repeater devices, a remaining master system information (RMSI), a master information block (MIB), or a combination of the MIB and a system information block (SIB), broadcast the repeater device-specific control information to a plurality of repeater devices, and communicate signals with a wireless communication device via the repeater device according to the broadcast repeater device-specific control information.

Aspect 226: A network access node in a wireless communication network, including: means for generating repeater device-specific control information that is included in at least one of: a payload of a downlink control information (DCI) format that is unique to repeater devices, a remaining master system information (RMSI), a master information block (MIB), or a combination of the MIB and a system information block (SIB), means for broadcasting the repeater device-specific control information to a plurality of repeater devices, and means for communicating signals with a wireless communication device via the repeater device according to the broadcast repeater device-specific control information.

Aspect 227: An article of manufacture for use by a network access node in a wireless communication network, the article including: a non-transitory computer-readable medium having stored therein instructions executable by one or more processors of the network access node to: generate repeater device-specific control information that is included in at least one of: a payload of a downlink control information (DCI) format that is unique to repeater devices, a remaining master system information (RMSI), a master information block (MIB), or a combination of the MIB and a system information block (SIB), broadcast the repeater device-specific control information to a plurality of repeater devices, and communicate signals with a wireless communication device via the repeater device according to the broadcast repeater device-specific control information.

Aspect 228: A method of wireless communication at a wireless repeater device in a wireless communication network, including: decoding cell-specific information received from a network access node, configuring the repeater device using the cell-specific information, and forwarding signals between a first wireless communication device and a second wireless communication device according to the configuring.

Aspect 229: The method of aspect 228, further including: configuring the repeater device using the cell-specific information without establishing a radio resource control (RRC) connection with the network access node using the cell-specific information.

Aspect 230: The method of aspect 228 or 229, wherein cell-specific information received from the network access node is beam-specific information.

Aspect 231: The method of any of aspects 228 through 230, wherein the cell-specific information is specific for a single repeater or a group of repeaters.

Aspect 232: The method of any of aspects 228 through 231, further including: periodically verifying the cell-specific information by at least one of acquiring new cell-specific information, re-acquiring previously decoded cell-specific information, or rereading the decoded cell-specific information received from the network access node.

Aspect 233: The method of any of aspects 228 through 232, further including: setting a timer to trigger the periodically verifying of the cell-specific information.

Aspect 234: The method of any of aspects 228 through 233, wherein the network access node is one of the first wireless communication device or the second wireless communication device.

Aspect 235: The method of any of aspects 228 through 234, wherein the cell-specific information is transmitted from the network access node and used to establish an RRC connection between the network access node and a wireless communication device.

Aspect 236: The method of any of aspects 228 through 235, wherein the signals forwarded by the repeater device are beam formed.

Aspect 237: The method of any of aspects 228 through 236, wherein the signals forwarded by the repeater device are in analog form and have not been processed in a digital form at an intermediate frequency or at baseband in the repeater device.

Aspect 238: The method of any of aspects 228 through 237, wherein the cell-specific information provides resource and configuration information for receiving repeater device-specific control information.

Aspect 239: The method of any of aspects 228 through 238, wherein the cell-specific information includes unwanted emissions limits information.

Aspect 240: The method of any of aspects 228 through 239, wherein the resource information includes at least one of: time division duplex pattern (TDD pattern), wireless repeater device on-off information, or frequency information of the network access node.

Aspect 241: The method of any of aspects 228 through 240, wherein the frequency information is at least one of: center frequency information, or channel bandwidth.

Aspect 242: The method of any of aspects 228 through 241, wherein the cell-specific information is system information that is transported in a master information block (MIB), in a remaining minimum system information (RMSI) identified by the MIB, or in a repeater device-specific system information block (SIB) message.

Aspect 243: The method of any of aspects 228 through 242, wherein the cell-specific information is valid for a given period or for a finite set of upcoming resources.

Aspect 244: The method of any of aspects 228 through 243, wherein the cell-specific information is beam-specific information.

Aspect 245: The method of any of aspects 228 through 244, wherein the cell-specific information is received on a specific beam directed toward a location of the repeater device.

Aspect 246: The method of any of aspects 228 through 245, wherein the cell-specific information is system information that is transported in a system information block (SIB) that includes resources identified by at least one of: a master information block (MIB), or a remaining minimum system information (RMSI), wherein the RMSI is not the SIB.

Aspect 247: The method of any of aspects 228 through 246, wherein the cell-specific information is transported as payload of a downlink control information (DCI) format or a medium access control-control element (MAC-CE).

Aspect 248: The method of any of aspects 228 through 247, wherein the DCI is a group-common DCI.

Aspect 249: The method of any of aspects 228 through 248, wherein the DCI format is associated with a synchronization signal block (SSB) or a beamforming configuration.

Aspect 250: The method of any of aspects 228 through 249, further including: receiving a series of the DCI format to dynamically change the configuring of the repeater device.

Aspect 251: The method of any of aspects 228 through 250, wherein: the repeater device is one of a plurality of repeater devices arranged in a plurality of different respective directions relative to the network access node, a first of the plurality of repeater devices receives a first DCI format message that configures the first of the plurality of repeater devices to disable repeater reception and transmission, and a second of the plurality of repeater devices receives a second DCI format message that configures the second of the plurality of repeater devices to enable repeater reception and transmission.

Aspect 252: The method of any of aspects 228 through 251, wherein the cell-specific information is at least one of: broadcast to a plurality of repeater devices including the repeater device, or provided as a group-common configuration to the plurality of repeater devices including the repeater device.

Aspect 253: The method of any of aspects 228 through 252, wherein the cell-specific information is repeater device-specific control information.

Aspect 254: The method of any of aspects 228 through 253, wherein the repeater device-specific control information is transported as payload of a downlink control information (DCI) format associated with a common radio network temporary identifier (RNTI) that distinguishes the DCI format from other DCI formats associated with other RNTIs associated with wireless communication devices.

Aspect 255: The method of any of aspects 228 through 254, wherein the repeater device is a Layer-1 relay unit.

Aspect 256: The method of any of aspects 94 through 28255, wherein the repeater device is identified with a predetermined random access channel (RACH) preamble and/or a predetermined resource that is distinct from wireless communication device RACH preambles and/or resources.

Aspect 257: The method of any of aspects 228 through 256, further including: transmitting the predetermined RACH preamble and/or on the predetermined resource, associated with a synchronization signal block (SSB) that identifies a direction, relative to the repeater device, of relayed radio frequency traffic.

Aspect 258: The method of any of aspects 228 through 257, wherein the network access node conveys information to the repeater device in a RACH response to the predetermined RACH preamble and/or the predetermined resource.

Aspect 259: The method of any of aspects 228 through 258, wherein the predetermined RACH preamble and/or the predetermined resource is one of a plurality of predetermined RACH preambles and/or the predetermined resources associated with a plurality of respective information preestablished to convey the respective information from the repeater device to the network access node.

Aspect 260: The method of any of aspects 228 through 259, wherein the repeater device determines an identity of the respective information to be conveyed to the network access node by selection of one of the plurality of predetermined RACH preambles and/or the predetermined resources.

Aspect 261: The method of any of aspects 228 through 260, wherein the information corresponds to at least one of: a power configuration of the repeater device, or a measured power of resources in an access link.

Aspect 262: The method of any of aspects 228 through 261, wherein the measured power of resources in the access link is measured in at least one of: a measurement window configured by the network access node, or within a set of resources configured by the network access node.

Aspect 263: The method of any of aspects 228 through 262, wherein the repeater device conveys information to the network access node by at least one of: selection of a predetermined random access channel (RACH) preamble and/or a predetermined resource, inclusion of the information in a payload of a first RACH message, inclusion of the information in a payload of a third RACH message, or setting a transmitter power of the repeater device to one of a plurality of predetermined transmitter power levels, wherein each of the plurality of predetermined transmitter power levels conveys a distinct respective piece of information.

Aspect 264: The method of any of aspects 228 through 263, wherein the network access node conveys information to the repeater device in one of a RACH response or a fourth RACH message.

Aspect 265: The method of any of aspects 228 through 264, wherein changes to a configuration of the repeater device are made without establishment of a control interface between the repeater device and the network access node.

Aspect 266: The method of any of aspects 228 through 265, further including: configuring the repeater device to convey radio frequency traffic received at the repeater device in accordance with a control signal of the cell-specific information.

Aspect 267: The method of any of aspects 228 through 266, wherein the control signal is broadcast from the network access node and exclusively directed to a plurality of repeater devices, including the repeater device, within a broadcast reception range of the network access node.

Aspect 268: The method of any of aspects 228 through 265 or 267, wherein: the control signal configures the plurality of repeater devices to not convey the radio frequency traffic associated with a cell.

Aspect 269: The method of any of aspects 228 through 267, further including: the control signal provides a synchronization signal block (SSB)-specific indication wherein the repeater device determines to convey or to not convey based on a detected SSB from the network access node and the provided SSB-specific indication.

Aspect 270: The method of any of aspects 228 through 267 or 269 further including: determining a synchronization signal block (SSB) index value associated with the control signal, and configuring an output power of a transmitter of the repeater device according to the SSB index value.

Aspect 271: The method of any of aspects 228 through 267, 269, or 270, wherein the configuring the output power includes at least one of: configuring a maximum output power of the transmitter, configuring a maximum amplification gain of the transmitter, or configuring a first power assigned to first traffic transmitted in an uplink and a second power assigned to second traffic transmitted in a downlink, wherein the first power is different from the second power.

Aspect 272: The method of any of aspects 228 through 267 or 269 through 270, further including: measuring a power level of a broadcast channel carrying the cell-specific information from a given network access node, comparing the power level to a predetermined low threshold and a predetermined high threshold, and configuring the repeater device based on the comparing.

Aspect 273: The method of any of aspects 228 through 267 or 269 through 272, further including: configuring the repeater device to convey radio frequency traffic when the power level is greater than the predetermined low threshold and less than the predetermined high threshold.

Aspect 274: The method of any of aspects 228 through 267 or 269 through 273, further including: determining a synchronization signal block (SSB) index value associated with a control signal, and configuring the repeater device to convey radio frequency traffic associated with the SSB index value in an uplink resource.

Aspect 275: The method of any of aspects 228 through 267 or 269 through 274, further including: determining a synchronization signal block (SSB) index value associated with the cell-specific information, and configuring a transmitter of the repeater device based on the SSB index value.

Aspect 276: The method of any of aspects 228 through 267 or 269 through 275, wherein configuring the transmitter further includes at least one of: configuring the transmitter with a maximum transmitter output power, configuring the transmitter with a maximum amplification gain, or configuring a first power assigned to first traffic transmitted in an uplink and a second power assigned to second traffic transmitted in a downlink, wherein the first power is different from the second power.

Aspect 277: The method of any of aspects 228 through 267 or 269 through 276, wherein configuring the transmitter further includes at least one of: configuring the transmitter with a maximum transmitter output power, or configuring the transmitter with a maximum amplification gain.

Aspect 278: The method of any of aspects 228 through 267 or 269 through 277, wherein: the cell-specific information indicates a resource of at least one symbol in at least one slot, and configuring the repeater device using the cell-specific information further includes: configuring the repeater device to convey radio frequency traffic exclusively in the indicated resource during the at least one symbol in the at least one slot.

Aspect 279: The method of any of aspects 228 through 267 or 269 through 278, wherein the resource is at least one of: an uplink resource, a downlink resource, or a flexible resource and the method further includes: replacing the flexible resource with the uplink resource or the downlink resource according to control information or control configuration signaling received by the repeater device.

Aspect 280: A wireless repeater device in a wireless communication network, including: a wireless transceiver, a memory, and a processor communicatively coupled to the wireless transceiver and the memory, wherein the processor and the memory are configured to perform a method of any one of aspects 228 through 279.

Aspect 281: A wireless repeater device in a wireless communication network including at least one means for performing a method of any one of aspects 228 through 279.

Aspect 282: A non-transitory computer-readable medium storing computer-executable code, including code for causing a wireless repeater device in a wireless communication network to perform a method of any one of aspects 228 through 279.

Aspect 283: A method of wireless communication at a wireless repeater device in a wireless communication network, including: decoding cell-specific information received from a network access node to obtain at least one of: a measurement window, or a set of resources, measuring, at the repeater device, a power received as a function of direction during the at least one of: the measurement window, or the set of resources, configuring a downlink resource of the repeater device based on the power received, and forwarding signals between a first wireless communication device and a second wireless communication device according to the configuring.

Aspect 284: The method of aspect 283, wherein the network access node is one of the first wireless communication device or the second wireless communication device.

Aspect 285: The method of aspect 283 or 284, further including: comparing the power received as the function of direction to a predetermined threshold, and configuring the downlink resource in at least one beam corresponding to at least one direction where the power received was less than the predetermined threshold.

Aspect 286: The method of any of aspects 283 through 285, wherein the repeater device is a Layer-1 relay unit.

Aspect 287: The method of any of aspects 283 through 286, wherein changes to a configuration of the repeater device are made in an absence of an RRC configuration established between the repeater device and any network access node including the network access node.

Aspect 288: The method of any of aspects 283 through 287, wherein the at least one of: the measurement window, or the set of resources is conveyed to the repeater device in control signaling in a repeater-device specific random access channel (RACH) configuration.

Aspect 289: The method of any of aspects 283 through 288, wherein the repeater-device specific RACH configuration is broadcast from the network access node and exclusively directed to a plurality of repeater devices including the repeater device within a broadcast reception range of the network access node.

Aspect 290: The method of any of aspects 283 through 289, wherein the repeater device is identified with a predetermined RACH preamble and/or a predetermined resource.

Aspect 291: A wireless repeater device in a wireless communication network, including: a wireless transceiver, a memory, and a processor communicatively coupled to the wireless transceiver and the memory, wherein the processor and the memory are configured to perform a method of any one of aspects 283 through 290.

Aspect 292: A wireless repeater device in a wireless communication network including at least one means for performing a method of any one of aspects 283 through 290.

Aspect 293: A non-transitory computer-readable medium storing computer-executable code, including code for causing a wireless repeater device in a wireless communication network to perform a method of any one of aspects 283 through 290.

Aspect 294: A method of wireless communication at a network access node in a wireless communication network, including: generating repeater device-specific control information that is included in at least one of: a payload of a downlink control information (DCI) format that is unique to repeater devices, a remaining master system information (RMSI), a master information block (MIB), or a combination of the MIB and a system information block (SIB), broadcasting the repeater device-specific control information to a plurality of repeater devices, and communicating signals with a wireless communication device via the repeater device according to the broadcast repeater device-specific control information.

Aspect 295: The method of aspect 294, further including: broadcasting different respective sets of repeater device-specific control information in two or more different respective directions relative to the network access node.

Aspect 296: The method of aspect 294 or 295, wherein the repeater device-specific control information is associated with a synchronization signal block (SSB) or a beamforming configuration.

Aspect 297: The method of any of aspects 294 through 296, further including: generating a plurality of payloads for a respective plurality of the DCI format that is unique to repeater devices, broadcasting the plurality of DCI in series to dynamically change a configuration of the repeater devices.

Aspect 298: The method of any of aspects 294 through 297, wherein the plurality of DCI includes: a first DCI format, unique to a first plurality of repeater devices that configures the first plurality of repeater devices to disable repeater reception and transmission, and a second DCI format, unique to a second plurality of repeater devices that configures the second plurality of repeater devices to enable repeater reception and transmission.

Aspect 299: The method of any of aspects 294 through 298, wherein the DCI format is associated with a common radio network temporary identifier (RNTI) that distinguishes the DCI format from other DCI formats associated with other RNTIs associated with wireless communication devices.

Aspect 300: The method of any of aspects 294 through 299, wherein the plurality of repeater devices is identified with a predetermined random access channel (RACH) preamble and/or a predetermined resource that is distinct from wireless communication device RACH preambles and or resources.

Aspect 301: The method of any of aspects 294 through 300, wherein the network access node conveys information to the plurality of repeater devices in a random access channel (RACH) response to a predetermined RACH preamble and/or a predetermined resource.

Aspect 302: The method of any of aspects 294 through 301, wherein the predetermined RACH preamble and/or the predetermined resource is one of a plurality of predetermined RACH preambles and/or predetermined resources associated with a respective plurality of information that is preestablished to convey information to the network access node.

Aspect 303: The method of any of aspects 294 through 302, wherein the respective plurality of information corresponds to at least one of: a power configuration of a repeater device, or a measured power of resources in an access link.

Aspect 304: The method of any of aspects 294 through 303, wherein the measured power of resources in the access link is measured in at least one of: a measurement window configured by the network access node, or within a set of resources configured by the network access node.

Aspect 305: The method of any of aspects 294 through 304, wherein the plurality of repeater devices convey information to the network access node by at least one of: selection of a predetermined random access channel (RACH) preamble, inclusion of the information in a payload of a first or a third RACH message, or setting a transmitter power of the repeater device to one of a plurality of predetermined transmitter power levels, wherein each of the plurality of predetermined transmitter power levels conveys a distinct respective piece of information.

Aspect 306: The method of any of aspects 294 through 305, wherein the network access node conveys information to the plurality of repeater devices in one of a RACH response or a fourth RACH message.

Aspect 307: The method of any of aspects 294 through 306, wherein changes to a configuration of each of the plurality of repeater devices are made without establishment of a control interface between the plurality of repeater devices and the network access node.

Aspect 308: The method of any of aspects 294 through 307, further including: configuring the plurality of repeater devices to convey radio frequency traffic received at respective repeater devices in accordance with a control signal broadcast by the network access node.

Aspect 309: The method of any of aspects 294 through 308, wherein the control signal is broadcast from the network access node and exclusively directed to the plurality of repeater devices within a broadcast reception range of the network access node.

Aspect 310: The method of any of aspects 294 through 309, wherein: the control signal indicates that the network access node bars one or more wireless communication devices from camping on a cell associated with the control signal and configures the plurality of repeater devices to not convey the radio frequency traffic received from the one or more wireless communication devices in an uplink resource associated with the cell.

Aspect 311: The method of any of aspects 294 through 310, further including: determining a synchronization signal block (SSB) index value associated with the control signal, and configuring the plurality of repeater devices to not convey the radio frequency traffic that is associated with the SSB index value in the uplink resource associated with the cell.

Aspect 312: The method of any of aspects 294 through 310 further including: determining a synchronization signal block (SSB) index value associated with the control signal, and configuring an output power of respective transmitters of the plurality of repeater devices according to the SSB index value.

Aspect 313: The method of any of aspects 294 through 310 or 312, wherein the configuring the output power includes at least one of: configuring a maximum output power of the respective transmitters, configuring a maximum amplification gain of the respective transmitters, or configuring a first power assigned to first traffic transmitted in an uplink and a second power assigned to second traffic transmitted in a downlink, wherein the first power is different from the second power.

Aspect 314: The method of any of aspects 294 through 310 or 312 through 313, further including: configuring the plurality of repeater devices based on a power level of a broadcast channel carrying cell-specific information to the plurality of repeater devices, and wherein the configuring is based on a comparison of the power level to a predetermined low threshold and a predetermined high threshold.

Aspect 315: A wireless repeater device in a wireless communication network, including: a wireless transceiver, a memory, and a processor communicatively coupled to the wireless transceiver and the memory, wherein the processor and the memory are configured to perform a method of any one of aspects 294 through 314.

Aspect 316: A wireless repeater device in a wireless communication network including at least one means for performing a method of any one of aspects 294 through 314.

Aspect 317: A non-transitory computer-readable medium storing computer-executable code, including code for causing a wireless repeater device in a wireless communication network to perform a method of any one of aspects 294 through 314.

Aspect 318: A method of wireless communication at a wireless communication device, the method including: generating a first indication that the wireless communication device includes repeater functionality, and transmitting the first indication to a base station via at least one of: a first establishment cause message, a first radio resource control (RRC) setup complete message, a first capability message, a first RRC message after establishing a first RRC connection with the base station, a first medium access control (MAC) message, an uplink control information (UCI) message, or a combination thereof.

Aspect 319: The method of aspect 318, wherein the transmitting the first indication to the base station includes: transmitting the first establishment cause message in an RRC setup request message, wherein the first establishment cause message includes the first indication.

Aspect 320: The method of aspect 318, wherein the first establishment cause message includes a bit field that contains a value indicative of a repeater.

Aspect 321: The method of aspect 318, wherein the transmitting the first indication to the base station includes: transmitting the first RRC setup complete message with a bit field that contains a value indicative of a repeater.

Aspect 322: The method of aspect 318, wherein the transmitting the first indication to the base station includes: transmitting the first capability message with a bit field that contains a value indicative of a repeater.

Aspect 323: The method of aspect 322, further including, prior to transmitting the first capability message: establishing a second RRC connection with the base station, wherein the wireless communication device is identified as an integrated access backhaul (IAB) node.

Aspect 324: The method of aspect 323, wherein the establishing the RRC connection with the base station includes at least one of: using an IAB-specific random access channel (RACH) configuration, transmitting an IAB node indication in a second RRC setup complete message to the base station, or a combination thereof.

Aspect 325: The method of aspect 318, wherein the transmitting the first indication to the base station includes: transmitting the first RRC message to a central unit of the base station, wherein the first RRC message includes the first indication.

Aspect 326: The method of aspect 325, wherein the establishing the first RRC connection with the base station includes: establishing the first RRC connection with the base station, wherein the wireless communication device is identified as an integrated access backhaul (IAB) node.

Aspect 327: The method of aspect 325, wherein the establishing the first RRC connection with the base station includes: establishing the first RRC connection with the base station, wherein the wireless communication device is identified as a user equipment.

Aspect 328: The method of aspect 318, wherein the transmitting the first indication to the base station includes: transmitting the first MAC message to a distributed unit of the base station; or transmitting the UCI message to the distributed unit of the base station.

Aspect 329: The method of aspect 328, wherein the transmitting the first MAC message to the base station includes: transmitting a MAC-control element (MAC-CE) to the distributed unit of the base station, wherein the MAC-CE includes the first indication.

Aspect 330: The method of aspect 318, wherein the first indication indicates that the wireless communication device supports configurable beamforming.

Aspect 331: The method of aspect 318, wherein the first indication indicates that the wireless communication device includes a mobile termination unit and a repeating unit.

Aspect 332: A wireless communication device, including: a transceiver, a memory, and a processor communicatively coupled to the transceiver and the memory, wherein the processor and the memory are configured to: generate a first indication that the wireless communication device includes repeater functionality, and transmit the first indication to a base station via at least one of: a first establishment cause message, a first radio resource control (RRC) setup complete message, a first capability message, a first RRC message after establishing a first RRC connection with the base station, a first medium access control (MAC) message, an uplink control information (UCI) message, or a combination thereof.

Aspect 333: The wireless communication device of aspect 332, wherein: the processor and the memory are further configured to transmit the first establishment cause message in an RRC setup request message, and the first establishment cause message includes the first indication.

Aspect 334: The wireless communication device of aspect 332, wherein the first establishment cause message includes a bit field that contains a value indicative of a repeater.

Aspect 335: The wireless communication device of aspect 332, wherein the processor and the memory are further configured to: transmit the first RRC setup complete message with a bit field that contains a value indicative of a repeater.

Aspect 336: The wireless communication device of aspect 332, wherein the processor and the memory are further configured to: transmit the first capability message with a bit field that contains a value indicative of a repeater.

Aspect 337: The wireless communication device of aspect 336, wherein the processor and the memory are further configured to: establish a second RRC connection with the base station, wherein the wireless communication device is identified as an integrated access backhaul (IAB) node.

Aspect 338: The wireless communication device of aspect 337, wherein the processor and the memory are further configured to: use an IAB-specific random access channel (RACH) configuration, transmit an IAB node indication in a second RRC setup complete message to the base station, or a combination thereof.

Aspect 339: The wireless communication device of aspect 332, wherein: the processor and the memory are further configured to transmit the first RRC message to a central unit of the base station, and the first RRC message includes the first indication.

Aspect 340: The wireless communication device of aspect 339, wherein the processor and the memory are further configured to: Establish the first RRC connection with the base station, wherein the wireless communication device is identified as an integrated access backhaul (IAB) node.

Aspect 341: The wireless communication device of aspect 339, wherein the processor and the memory are further configured to: establish the first RRC connection with the base station, wherein the wireless communication device is identified as a user equipment.

Aspect 342: The wireless communication device of aspect 332, wherein the processor and the memory are further configured to: transmit the first MAC message to a distributed unit of the base station; or transmit the UCI message to the distributed unit of the base station.

Aspect 343: The wireless communication device of aspect 342, wherein: the processor and the memory are further configured to transmit a MAC-control element (MAC-CE) to the distributed unit of the base station, and the MAC-CE includes the first indication.

Aspect 344: The wireless communication device of aspect 332, wherein the first indication indicates that the wireless communication device supports configurable beamforming.

Aspect 345: The wireless communication device of aspect 332, wherein the first indication indicates that the wireless communication device includes a mobile termination unit and a repeating unit.

Aspect 346: A wireless communication device, including: means for generating a first indication that the wireless communication device includes repeater functionality, and means for transmitting the first indication to a base station via at least one of: a first establishment cause message, a first radio resource control (RRC) setup complete message, a first capability message, a first RRC message after establishing a first RRC connection with the base station, a first medium access control (MAC) message, an uplink control information (UCI) message, or a combination thereof.

Aspect 347: An article of manufacture for use by a wireless communication device in a wireless communication network, the article including: a computer-readable medium having stored therein instructions executable by one or more processors of the wireless communication device to: generate a first indication that the wireless communication device includes repeater functionality, and transmit the first indication to a base station via at least one of: a first establishment cause message, a first radio resource control (RRC) setup complete message, a first capability message, a first RRC message after establishing a first RRC connection with the base station, a first medium access control (MAC) message, an uplink control information (UCI) message, or a combination thereof.

Aspect 348: A method of wireless communication at a base station, the method including: receiving a first indication from a first wireless communication device via at least one of: a first establishment cause message, a first radio resource control (RRC) setup complete message, a first capability message, a first RRC message after establishing a first RRC connection with the first wireless communication device, a first medium access control (MAC) message, or a combination thereof, wherein the first indication indicates that the first wireless communication device includes repeater functionality, and communicating with at least one wireless communication device based on the first indication.

Aspect 349: The method of aspect 348, wherein the receiving the first indication from the first wireless communication device includes: receiving the first establishment cause message in an RRC setup request message, wherein the first establishment cause message includes the first indication.

Aspect 350: The method of aspect 348, wherein the first establishment cause message includes a bit field that contains a value indicative of a repeater.

Aspect 351: The method of aspect 348, wherein the receiving the first indication from the first wireless communication device includes: receiving the first RRC setup complete message with a bit field that contains a value indicative of a repeater.

Aspect 352: The method of aspect 348, wherein the receiving the first indication from the first wireless communication device includes: receiving the first capability message with a bit field that contains a value indicative of a repeater.

Aspect 353: The method of aspect 352, further including, prior to receiving the first capability message: establishing a second RRC connection with the first wireless communication device identified as an integrated access backhaul (IAB) node.

Aspect 354: The method of aspect 353, wherein the establishing the second RRC connection with the first wireless communication device includes: receiving an IAB node indication in a second RRC setup complete message from the first wireless communication device.

Aspect 355: The method of aspect 348, wherein the receiving the first indication from the first wireless communication device includes: receiving the first RRC message at a central unit of the base station, wherein the first RRC message includes the first indication.

Aspect 356: The method of aspect 355, further including: transmitting a second indication to a distributed unit of the base station after receiving the first RRC message, wherein the second indication indicates that the first wireless communication device includes the repeater functionality.

Aspect 357: The method of aspect 355, wherein the establishing the first RRC connection with the first wireless communication device includes: establishing the first RRC connection with the first wireless communication device identified as an integrated access backhaul (IAB) node.

Aspect 358: The method of aspect 355, wherein the establishing the first RRC connection with the first wireless communication device includes: establishing the first RRC connection with the first wireless communication device identified as a user equipment.

Aspect 359: The method of aspect 348, wherein the receiving the first indication from the first wireless communication device includes: receiving the first MAC message at a distributed unit of the base station.

Aspect 360: The method of aspect 42359 further including: transmitting a second indication to a central unit of the base station after receiving the first MAC message, wherein the second indication indicates that the first wireless communication device includes the repeater functionality.

Aspect 361: The method of aspect 359, wherein the receiving the first MAC message includes: receiving a MAC-control element (MAC-CE) at the distributed unit of the base station, wherein the MAC-CE includes the first indication.

Aspect 362: The method of aspect 348, further including: receiving a random access channel (RACH) message associated with a repeater-specific RACH configuration at a distributed unit of the base station, and transmitting a second indication from the distributed unit to a central unit of the base station after receiving the RACH message, wherein the second indication indicates that the first wireless communication device includes the repeater functionality.

Aspect 363: The method of aspect 348, wherein the repeater functionality includes configurable beamforming.

Aspect 364: The method of aspect 348, wherein the repeater functionality includes a mobile termination unit and a repeating unit.

Aspect 365: The method of aspect 348, wherein the communicating with the at least one wireless communication device based on the first indication includes: generating a configuration of at least one beam for the first wireless communication device after receiving the first indication, and transmitting the configuration to the first wireless communication device.

Aspect 366: The method of aspect 348, wherein the communicating with the at least one wireless communication device based on the first indication includes: communicating with a second wireless communication device via the first wireless communication device.

Aspect 367: The method of aspect 348, wherein: the communicating with the at least one wireless communication device based on the first indication includes transmitting information to a second wireless communication device, and the information schedules or configures the second wireless communication device to communicate with at least one third wireless communication device via the first wireless communication device.

Aspect 368: A base station, including: a transceiver, a memory, and a processor communicatively coupled to the transceiver and the memory, wherein the processor and the memory are configured to: receive a first indication from a first wireless communication device via at least one of: a first establishment cause message, a first radio resource control (RRC) setup complete message, a first capability message, a first RRC message after establishing a first RRC connection with the first wireless communication device, a first medium access control (MAC) message, or a combination thereof, wherein the first indication indicates that the first wireless communication device includes repeater functionality, and communicate with at least one wireless communication device via the transceiver based on the first indication.

Aspect 369: The base station of aspect 368, wherein: the processor and the memory are further configured to receive the first establishment cause message in an RRC setup request message, and the first establishment cause message includes the first indication.

Aspect 370: The base station of aspect 368, wherein the first establishment cause message includes a bit field that contains a value indicative of a repeater.

Aspect 371: The base station of aspect 368, wherein the processor and the memory are further configured to: receive the first RRC setup complete message with a bit field that contains a value indicative of a repeater.

Aspect 372: The base station of aspect 368, wherein the processor and the memory are further configured to: receive the first capability message with a bit field that contains a value indicative of a repeater.

Aspect 373: The base station of aspect 372, wherein the processor and the memory are further configured to: establish a second RRC connection with the first wireless communication device identified as an integrated access backhaul (IAB) node.

Aspect 374: The base station of aspect 56373 wherein the processor and the memory are further configured to: receive an IAB node indication in a second RRC setup complete message from the first wireless communication device.

Aspect 375: The base station of aspect 368, wherein: the processor and the memory are further configured to receive the first RRC message at a central unit of the base station, and the first RRC message includes the first indication.

Aspect 376: The base station of aspect 375, wherein the processor and the memory are further configured to: transmit a second indication to a distributed unit of the base station after receiving the first RRC message, wherein the second indication indicates that the first wireless communication device includes the repeater functionality.

Aspect 377: The base station of aspect 375, wherein the processor and the memory are further configured to: establish the first RRC connection with the first wireless communication device identified as an integrated access backhaul (IAB) node.

Aspect 378: The base station of aspect 375, wherein the processor and the memory are further configured to: establish the first RRC connection with the first wireless communication device identified as a user equipment.

Aspect 379: The base station of aspect 368, wherein the processor and the memory are further configured to: receive the first MAC message at a distributed unit of the base station.

Aspect 380: The base station of aspect 379, wherein the processor and the memory are further configured to: transmit a second indication to a central unit of the base station after receiving the first MAC message, wherein the second indication indicates that the first wireless communication device includes the repeater functionality.

Aspect 381: The base station of aspect 379, wherein: the processor and the memory are further configured to receive a MAC-control element (MAC-CE) at the distributed unit of the base station, and the MAC-CE includes the first indication.

Aspect 382: The base station of aspect 368, wherein the processor and the memory are further configured to: receive a random access channel (RACH) message associated with a repeater-specific RACH configuration at a distributed unit of the base station, and transmit a second indication from the distributed unit to a central unit of the base station after receiving the RACH message, wherein the second indication indicates that the first wireless communication device includes the repeater functionality.

Aspect 383: The base station of aspect 368, wherein the repeater functionality includes configurable beamforming.

Aspect 384: The base station of aspect 368, wherein the repeater functionality includes a mobile termination unit and a repeating unit.

Aspect 385: The base station of aspect 368, wherein the processor and the memory are further configured to: generate a configuration of at least one beam for the first wireless communication device after receiving the first indication, and transmit the configuration to the first wireless communication device.

Aspect 386: The base station of aspect 368, wherein the processor and the memory are further configured to: communicate with a second wireless communication device via the first wireless communication device.

Aspect 387: The base station of aspect 368, wherein: the processor and the memory are further configured to transmit information to a second wireless communication device, and the information schedules or configures the second wireless communication device to communicate with at least one third wireless communication device via the first wireless communication device.

Aspect 388: A base station, including: means for receiving a first indication from a first wireless communication device via at least one of: a first establishment cause message, a first radio resource control (RRC) setup complete message, a first capability message, a first RRC message after establishing a first RRC connection with the first wireless communication device, a first medium access control (MAC) message, or a combination thereof, wherein the first indication indicates that the first wireless communication device includes repeater functionality, and means for communicating with at least one wireless communication device based on the first indication.

Aspect 389: An article of manufacture for use by a base station in a wireless communication network, the article including: a computer-readable medium having stored therein instructions executable by one or more processors of the base station to: receive a first indication from a first wireless communication device via at least one of: a first establishment cause message, a first radio resource control (RRC) setup complete message, a first capability message, a first RRC message after establishing a first RRC connection with the first wireless communication device, a first medium access control (MAC) message, or a combination thereof, wherein the first indication indicates that the first wireless communication device includes repeater functionality, and communicate with at least one wireless communication device based on the first indication.

Aspect 390: A method of wireless communication at a base station, the method including: determining that a wireless communication device includes repeater functionality, and transmitting a first indication to identify the wireless communication device to a core network node after determining that the wireless communication device includes the repeater functionality.

Aspect 391: The method of aspect 390, wherein the first indication identifies the wireless communication device as a repeater.

Aspect 392: The method of aspect 391, wherein: the first indication includes a first radio resource control (RRC) establishment cause message, and the transmitting the first indication includes transmitting an initial user equipment (UE) message that includes the first RRC establishment cause message.

Aspect 393: The method of aspect 392, wherein: the determining that the wireless communication device includes the repeater functionality includes receiving a second RRC establishment cause message from the wireless communication device via an RRC setup request message, and the method further includes generating the first RRC establishment cause message from the second RRC establishment cause message.

Aspect 394: The method of aspect 392, wherein: the determining that the wireless communication device includes the repeater functionality includes receiving a second indication that the wireless communication device includes the repeater functionality via at least one of: a first radio resource control (RRC) setup complete message, a first capability message, a first RRC message after establishing an RRC connection with the wireless communication device, a first medium access control (MAC) message, or a combination thereof, and the method further includes generating the first RRC establishment cause message from the second indication.

Aspect 395: The method of aspect 391, wherein: the first indication includes a repeater-specific indication, and the transmitting the first indication includes transmitting an initial user equipment (UE) message that includes the first indication.

Aspect 396: The method of aspect 395, wherein: the determining that the wireless communication device includes the repeater functionality includes receiving a second indication that the wireless communication device includes the repeater functionality via a radio resource control (RRC) setup complete message, and the method further includes generating the first indication from the second indication.

Aspect 397: The method of aspect 395, wherein: the determining that the wireless communication device includes the repeater functionality includes receiving a second indication that the wireless communication device includes the repeater functionality via at least one of: a first establishment cause message, a first capability message, a first RRC message after establishing an RRC connection with the wireless communication device, a first medium access control (MAC) message, or a combination thereof, and the method further includes generating the first indication from the second indication.

Aspect 398: The method of aspect 391, wherein: the transmitting the first indication includes transmitting a radio capability message that includes the first indication.

Aspect 399: The method of aspect 398, further including, prior to transmitting the radio capability message: transmitting an initial user equipment (UE) message identifying the wireless communication device as an IAB node to the core network node.

Aspect 400: The method of aspect 390, wherein the first indication identifies the wireless communication device as a user equipment (UE).

Aspect 401: The method of aspect 400, wherein transmitting the first indication includes: transmitting an initial UE message including the first indication.

Aspect 402: The method of aspect 390, wherein the first indication identifies the wireless communication device as an integrated access backhaul (IAB) node.

Aspect 403: The method of aspect 402, wherein transmitting the first indication includes: transmitting an initial user equipment (UE) message including the first indication.

Aspect 404: The method of aspect 390, further including: receiving a second indication that the core network node supports repeaters, and generating the first indication identifying the wireless communication device as a repeater after receiving the second indication.

Aspect 405: The method of aspect 87, wherein: the second indication includes a repeater supported information element (IE), and the receiving the second indication includes receiving an NG setup response message that includes the repeater supported IE.

Aspect 406: The method of aspect 404, further including: receiving a repeater authorized information element (IE) via an NG-AP message from the core network node after transmitting the first indication.

Aspect 407: The method of aspect 406, wherein the NG-AP message includes an initial context setup request, a handover request, or a user equipment (UE) context modification request.

Aspect 408: The method of aspect 44, wherein: the second indication includes an integrated access backhaul (IAB) node supported information element (IE).

Aspect 409: The method of aspect 408, further including: determining that the core network node supports repeaters based on the IAB node supported IE.

Aspect 410: The method of aspect 390, wherein the repeater functionality includes configurable beamforming.

Aspect 411: The method of aspect 390, wherein the repeater functionality includes a mobile termination unit and a repeating unit.

Aspect 412: A base station, including: a transceiver, a memory, and a processor communicatively coupled to the transceiver and the memory, wherein the processor and the memory are configured to: determine that a wireless communication device includes repeater functionality, and transmit a first indication via the transceiver to identify the wireless communication device to a core network node after determining that the wireless communication device includes the repeater functionality.

Aspect 413: The base station of aspect 412, wherein the first indication identifies the wireless communication device as a repeater.

Aspect 414: The base station of aspect 413, wherein: the first indication includes a first radio resource control (RRC) establishment cause message, and the processor and the memory are further configured to transmit an initial user equipment (UE) message that includes the first RRC establishment cause message.

Aspect 415: The base station of aspect 414, wherein the processor and the memory are further configured to: receive a second RRC establishment cause message from the wireless communication device via an RRC setup request message, and generate the first RRC establishment cause message from the second RRC establishment cause message.

Aspect 416: The base station of aspect 414, wherein the processor and the memory are further configured to: receive a second indication that the wireless communication device includes the repeater functionality via at least one of: a first radio resource control (RRC) setup complete message, a first capability message, a first RRC message after establishing an RRC connection with the wireless communication device, a first medium access control (MAC) message, or a combination thereof, and generate the first RRC establishment cause message from the second indication.

Aspect 417: The base station of aspect 413, wherein the first indication includes a repeater-specific indication, and the processor and the memory are further configured to transmit an initial user equipment (UE) message that includes the first indication.

Aspect 418: The base station of aspect 417, wherein the processor and the memory are further configured to: receive a second indication that the wireless communication device includes the repeater functionality via a radio resource control (RRC) setup complete message, and generate the first indication from the second indication.

Aspect 419: The base station of aspect 417, wherein the processor and the memory are further configured to: receive a second indication that the wireless communication device includes the repeater functionality via at least one of: a first establishment cause message, a first capability message, a first RRC message after establishing an RRC connection with the wireless communication device, a first medium access control (MAC) message, or a combination thereof, and generate the first indication from the second indication.

Aspect 420: The base station of aspect 413, wherein the processor and the memory are further configured to: transmit a radio capability message that includes the first indication.

Aspect 421: The base station of aspect 420, wherein the processor and the memory are further configured to: transmit an initial user equipment (UE) message identifying the wireless communication device as an IAB node to the core network node.

Aspect 422: The base station of aspect 412, wherein the first indication identifies the wireless communication device as a user equipment (UE).

Aspect 423: The base station of aspect 422, wherein the processor and the memory are further configured to: transmit an initial UE message including the first indication.

Aspect 424: The base station of aspect 412, wherein the first indication identifies the wireless communication device as an integrated access backhaul (IAB) node.

Aspect 425: The base station of aspect 424, wherein the processor and the memory are further configured to: transmit an initial user equipment (UE) message including the first indication.

Aspect 426: The base station of aspect 412, wherein the processor and the memory are further configured to: receive a second indication that the core network node supports repeaters, and generate the first indication identifying the wireless communication device as a repeater after receiving the second indication.

Aspect 427: The base station of aspect 426, wherein: the second indication includes a repeater supported information element (IE), and the processor and the memory are further configured to receive an NG setup response message that includes the repeater supported IE.

Aspect 428: The base station of aspect 426, wherein the processor and the memory are further configured to: receive a repeater authorized information element (IE) via an NG-AP message from the core network node after transmitting the first indication.

Aspect 429: The base station of aspect 428, wherein the NG-AP message includes an initial context setup request, a handover request, or a user equipment (UE) context modification request.

Aspect 450: The base station of aspect 426, wherein: the second indication includes an integrated access backhaul (IAB) node supported information element (IE).

Aspect 451: The base station of aspect 450, wherein the processor and the memory are further configured to: determine that the core network node supports repeaters based on the IAB node supported IE.

Aspect 452: The base station of aspect 412, wherein the repeater functionality includes configurable beamforming.

Aspect 453: The base station of aspect 412, wherein the repeater functionality includes a mobile termination unit and a repeating unit.

Aspect 454: A base station, including: means for determining that a wireless communication device includes repeater functionality, and means for transmitting a first indication to identify the wireless communication device to a core network node after determining that the wireless communication device includes the repeater functionality.

Aspect 455: An article of manufacture for use by a base station in a wireless communication network, the article including: a computer-readable medium having stored therein instructions executable by one or more processors of the base station to: determine that a wireless communication device includes repeater functionality, and transmit a first indication to identify the wireless communication device to a core network node after determining that the wireless communication device includes the repeater functionality.

Aspect 456: A method of wireless communication at a core network node, the method including: receiving a first indication that identifies a wireless communication device as a repeater, authorizing the wireless communication device for accessing a network after receiving the first indication, and transmitting a second indication that indicates that the wireless communication device is authorized for accessing the network.

Aspect 457: The method of aspect 456, wherein: the first indication includes a first radio resource control (RRC) establishment cause message, and receiving the first indication includes receiving an initial user equipment (UE) message that includes the first RRC establishment cause message from a base station.

Aspect 458: The method of aspect 456, wherein: the first indication includes a repeater-specific indication, and receiving the first indication includes receiving an initial user equipment (UE) message that includes the first indication from a base station.

Aspect 459: The method of aspect 456, wherein the receiving the first indication includes: receiving radio capability information including the first indication from a base station.

Aspect 460: The method of aspect 459, further including, prior to receiving the radio capability information: receiving an initial user equipment (UE) message identifying the wireless communication device as an integrated access backhaul (IAB) node from the base station.

Aspect 461: The method of aspect 456, further including: transmitting a third indication that the core network node supports repeaters.

Aspect 462: The method of aspect 461, wherein: the third indication includes a repeater supported information element (IE), and the transmitting the third indication includes transmitting an NG setup response message that includes the repeater supported IE.

Aspect 463: The method of aspect 456, wherein: the second indication includes a repeater authorized information element (IE), and the transmitting the second indication includes transmitting an NG-AP message that includes the repeater authorized IE.

Aspect 464: The method of aspect 463, wherein the NG-AP message includes an initial context setup request, a handover request, or a user equipment (UE) context modification request.

Aspect 465: The method of aspect 456, wherein: the second indication includes an integrated access backhaul (IAB) node authorized information element (IE), and the transmitting the second indication includes transmitting an NG-AP message that includes the IAB node authorized IE.

Aspect 466: The method of aspect 456, further including: determining that the core network node supports repeaters, and transmitting an integrated access backhaul (IAB) node supported information element (IE) as a result of the determining that the core network node supports repeaters.

Aspect 467: A core network node, including: a transceiver, a memory, and a processor communicatively coupled to the transceiver and the memory, wherein the processor and the memory are configured to: receive a first indication via the transceiver that identifies a wireless communication device as a repeater, authorize the wireless communication device for accessing a network after receiving the first indication, and transmit a second indication via the transceiver that indicates that the wireless communication device is authorized for accessing the network.

Aspect 468: The core network node of aspect 467, wherein: the first indication includes a first radio resource control (RRC) establishment cause message, and the processor and the memory are further configured to receive an initial user equipment (UE) message that includes the first RRC establishment cause message from a base station.

Aspect 469: The core network node of aspect 467, wherein: the first indication includes a repeater-specific indication, and the processor and the memory are further configured to receive an initial user equipment (UE) message that includes the first indication from a base station.

Aspect 470: The core network node of aspect 467, wherein the processor and the memory are further configured to: receive radio capability information including the first indication from a base station.

Aspect 471: The core network node of aspect 470, wherein the processor and the memory are further configured to: receive an initial user equipment (UE) message identifying the wireless communication device as an integrated access backhaul (IAB) node from the base station.

Aspect 472: The core network node of aspect 467, wherein the processor and the memory are further configured to: transmit a third indication that the core network node supports repeaters.

Aspect 473: The core network node of aspect 472, wherein: the third indication includes a repeater supported information element (IE), and the processor and the memory are further configured to transmit an NG setup response message that includes the repeater supported IE.

Aspect 474: The core network node of aspect 467, wherein: the second indication includes a repeater authorized information element (IE), and the processor and the memory are further configured to transmit an NG-AP message that includes the repeater authorized IE.

Aspect 475: The core network node of aspect 474, wherein the NG-AP message includes an initial context setup request, a handover request, or a user equipment (UE) context modification request.

Aspect 476: The core network node of aspect 467, wherein: the second indication includes an integrated access backhaul (IAB) node authorized information element (IE), and the processor and the memory are further configured to transmit an NG-AP message that includes the IAB node authorized IE.

Aspect 477: The core network node of aspect 467, wherein the processor and the memory are further configured to: determine that the core network node supports repeaters, and transmit an integrated access backhaul (IAB)

node supported information element (IE) as a result of the determining that the core network node supports repeaters.

Aspect 478: A core network node, including: means for receiving a first indication that identifies a wireless communication device as a repeater, means for authorizing the wireless communication device for accessing a network after receiving the first indication, and means for transmitting a second indication that indicates that the wireless communication device is authorized for accessing the network.

Aspect 479: An article of manufacture for use by a core network node in a wireless communication network, the article including: a computer-readable medium having stored therein instructions executable by one or more processors of the core network node to: receive a first indication that identifies a wireless communication device as a repeater, authorize the wireless communication device for accessing a network after receiving the first indication, and transmit a second indication that indicates that the wireless communication device is authorized for accessing the network.

Aspect 480: A method of wireless communication at a wireless communication device, the method including: generating a first indication that the wireless communication device includes repeater functionality and integrated access backhaul (IAB) node functionality, and transmitting the first indication to a base station.

Aspect 481: The method of aspect 480, further including: selecting a first mode of operation for the wireless communication device from a plurality of modes of operation, wherein the plurality of modes of operation includes a repeater mode of operation and a IAB node mode of operation, and transmitting a second indication of the first mode of operation to the base station.

Aspect 482: The method of aspect 481, wherein the transmitting the second indication includes: transmitting a capability message that includes the second indication, transmitting an uplink control information (UCI) that includes the second indication, transmitting a medium access control-control element (MAC-CE) that includes the second indication, or transmitting an RRC message that includes the second indication.

Aspect 483: The method of aspect 481, wherein the selecting the first mode of operation includes: selecting the repeater mode of operation to reduce power consumption or to enhance coverage.

Aspect 484: The method of aspect 483, wherein the selecting the first mode of operation includes: selecting the IAB node mode of operation to provide enhanced service for user equipment.

Aspect 485: The method of aspect 480, further including: receiving a second indication from the base station, wherein the second indication indicates a selection of a first mode of operation from a repeater mode of operation or a IAB node mode of operation, and switching to the first mode of operation as indicated by the second indication.

Aspect 486: The method of aspect 485, wherein the receiving the second indication includes: receiving a downlink control information (DCI) that includes the second indication, receiving a medium access control-control element (MAC-CE) that includes the second indication, or receiving an RRC message that includes the second indication.

Aspect 487: The method of aspect 480, wherein the transmitting the first indication includes: transmitting a capability message that includes the first indication, transmitting an uplink control information (UCI) that includes the first indication, or transmitting a medium access control-control element (MAC-CE) that includes the first indication.

Aspect 488: A wireless communication device, including: a transceiver, a memory, and a processor communicatively coupled to the transceiver and the memory, wherein the processor and the memory are configured to: generate a first indication that the wireless communication device includes repeater functionality and integrated access backhaul (IAB) node functionality, and transmit the first indication to a base station via the transceiver.

Aspect 489: The wireless communication device of aspect 488, wherein the processor and the memory are further configured to: Select a first mode of operation for the wireless communication device from a plurality of modes of operation, wherein the plurality of modes of operation includes a repeater mode of operation and a IAB node mode of operation, and transmit a second indication of the first mode of operation to the base station.

Aspect 490: The wireless communication device of aspect 489, wherein the processor and the memory are further configured to: transmit a capability message that includes the second indication, transmit an uplink control information (UCI) that includes the second indication, transmit a medium access control-control element (MAC-CE) that includes the second indication, or transmit an RRC message that includes the second indication.

Aspect 491: The wireless communication device of aspect 489, wherein the processor and the memory are further configured to: select the repeater mode of operation to reduce power consumption or to enhance coverage.

Aspect 492: The wireless communication device of aspect 491, wherein the processor and the memory are further configured to: select the IAB node mode of operation to provide enhanced service for user equipment.

Aspect 493: The wireless communication device of aspect 488, wherein the processor and the memory are further configured to: receive a second indication from the base station, wherein the second indication indicates a selection of a first mode of operation from a repeater mode of operation or a IAB node mode of operation, and switch to the first mode of operation as indicated by the second indication.

Aspect 494: The wireless communication device of aspect 493, wherein the processor and the memory are further configured to: receive a downlink control information (DCI) that includes the second indication, receiving a medium access control-control element (MAC-CE) that includes the second indication, or receiving an RRC message that includes the second indication.

Aspect 495: The wireless communication device of aspect 488, wherein the processor and the memory are further configured to: transmit a capability message that includes the first indication, transmitting an uplink control information (UCI) that includes the first indication, or transmitting a medium access control-control element (MAC-CE) that includes the first indication.

Aspect 496: A wireless communication device, including: means for generating a first indication that the wireless communication device includes repeater functionality and integrated access backhaul (IAB) node functionality, and means for transmitting the first indication to a base station.

Aspect 497: An article of manufacture for use by a wireless communication device in a wireless communication network, the article including: a computer-readable medium having stored therein instructions executable by one or more processors of the wireless communication device to: generate a first indication that the wireless communication device includes repeater functionality and integrated access backhaul (IAB) node functionality, and transmit the first indication to a base station.

Aspect 498: A method of wireless communication at a base station, the method including: receiving a first indication from a wireless communication device, wherein the first indication indicates that the wireless communication device includes repeater functionality and integrated access backhaul (IAB) node functionality, generating a configuration for the wireless communication device after receiving the first indication, and transmitting the configuration to the wireless communication device.

Aspect 499: The method of aspect 498, further including: receiving a second indication from the wireless communication device, wherein the second indication indicates a selection of a repeater mode of operation or a IAB node mode of operation, and wherein the generating the configuration is based the second indication.

Aspect 500: The method of aspect 499, wherein the receiving the second indication includes: receiving an uplink control information (UCI) that includes the second indication, receiving a medium access control-control element (MAC-CE) that includes the second indication, or receiving an RRC message that includes the second indication.

Aspect 501: The method of aspect 498, further including: selecting a first mode of operation for the wireless communication device from a plurality of modes of operation, wherein the plurality of modes of operation includes a repeater mode of operation and a IAB node mode of operation, and transmitting a second indication of the first mode of operation.

Aspect 502: The method of aspect 501, wherein the selecting the first mode of operation is based on at least one of: a traffic load, a quality of service, a deployment configuration, a capability of a wireless communication node, or a combination thereof.

Aspect 503: The method of aspect 501, wherein: the selecting the first mode of operation is performed by a distributed unit of the base station, and the transmitting the second indication of the first mode of operation includes transmitting a downlink control information (DCI) that includes the second indication, transmitting a medium access control-control element (MAC-CE) that includes the second indication, or transmitting an RRC message that includes the second indication.

Aspect 504: The method of aspect 503, further including: transmitting a third indication of the first mode of operation to a central unit of the base station.

Aspect 506: The method of aspect 501, wherein: the selecting the first mode of operation is performed by a central unit of the base station, and the transmitting the second indication of the first mode of operation includes transmitting the second indication to a distributed unit of the base station.

Aspect 507: The method of aspect 506, further including: transmitting a third indication of the first mode of operation to a core network node.

Aspect 508/: The method of aspect 498, further including: transmitting a second indication to a core network node, wherein the second indication indicates that that the wireless communication device includes the repeater functionality and the IAB node functionality.

Aspect 509: The method of aspect 508, further including: receiving a third indication from the core network node, wherein the third indication indicates a selection of a repeater mode of operation or a IAB node mode of operation, and transmitting a fourth indication of the selection of the repeater mode of operation or the IAB node mode of operation to the wireless communication device, wherein the generating the configuration is based the third indication.

Aspect 510: The method of aspect 509, wherein the third indication indicates that a repeater is authorized for accessing a network or an IAB node is authorized for accessing the network.

Aspect 511: The method of aspect 498, wherein the receiving the first indication includes: receiving a capability message that includes the first indication, receiving an uplink control information (UCI) that includes the first indication, or receiving a medium access control-control element (MAC-CE) that includes the first indication.

Aspect 512: A base station, including: a transceiver, a memory, and a processor communicatively coupled to the transceiver and the memory, wherein the processor and the memory are configured to: receive a first indication from a wireless communication device via the transceiver, wherein the first indication indicates that the wireless communication device includes repeater functionality and integrated access backhaul (IAB) node functionality, generate a configuration for the wireless communication device after receiving the first indication, and transmit the configuration to the wireless communication device via the transceiver.

Aspect 513: The base station of aspect 512, wherein: the processor and the memory are further configured to receive a second indication from the wireless communication device, the second indication indicates a selection of a repeater mode of operation or a IAB node mode of operation, and the processor and the memory are further configured to generate the configuration based the second indication.

Aspect 514: The base station of aspect 513, wherein the processor and the memory are further configured to: receive an uplink control information (UCI) that includes the second indication, receiving a medium access control-control element (MAC-CE) that includes the second indication, or receiving an RRC message that includes the second indication.

Aspect 515: The base station of aspect 512, wherein the processor and the memory are further configured to: select a first mode of operation for the wireless communication device from a plurality of modes of operation, wherein the plurality of modes of operation includes a repeater mode of operation and a IAB node mode of operation, and transmit a second indication of the first mode of operation.

Aspect 516: The base station of aspect 515, wherein the processor and the memory are further configured to select the first mode of operation based on at least one of: a traffic load, a quality of service, a deployment configuration, a capability of a wireless communication node, or a combination thereof.

Aspect 517: The base station of aspect 515, wherein: the selection of the first mode of operation is performed by a distributed unit of the base station, and the processor and the memory are further configured to transmit a downlink control information (DCI) that includes the second indication, transmit a medium access control-control element (MAC-CE) that includes the second indication, or transmit an RRC message that includes the second indication.

Aspect 518: The base station of aspect 517, wherein the processor and the memory are further configured to: transmit a third indication of the first mode of operation to a central unit of the base station.

Aspect 519: The base station of aspect 515, wherein: the selection of the first mode of operation is performed by a central unit of the base station, and the processor and the memory are further configured to transmit the second indication to a distributed unit of the base station.

Aspect 520: The base station of aspect 519, wherein the processor and the memory are further configured to: transmit a third indication of the first mode of operation to a core network node.

Aspect 521: The base station of aspect 512, wherein: the processor and the memory are further configured to transmitting a second indication to a core network node, and the second indication indicates that that the wireless communication device includes the repeater functionality and the IAB node functionality.

Aspect 522: The base station of aspect 521, wherein the processor and the memory are further configured to: receive a third indication from the core network node, wherein the third indication indicates a selection of a repeater mode of operation or a IAB node mode of operation, transmit a fourth indication of the selection of the repeater mode of operation or the IAB node mode of operation to the wireless communication device, and generating the configuration is the third indication.

Aspect 523: The base station of aspect 522, wherein the third indication indicates that a repeater is authorized for accessing a network or an IAB node is authorized for accessing the network.

Aspect 524: The base station of aspect 512, wherein the processor and the memory are further configured to: receive a capability message that includes the first indication, receiving an uplink control information (UCI) that includes the first indication, or receiving a medium access control-control element (MAC-CE) that includes the first indication.

Aspect 525: A base station, including: means for receiving a first indication from a wireless communication device, wherein the first indication indicates that the wireless communication device includes repeater functionality and integrated access backhaul (IAB) node functionality, means for generating a configuration for the wireless communication device after receiving the first indication, and means for transmitting the configuration to the wireless communication device.

Aspect 526: An article of manufacture for use by a base station in a wireless communication network, the article including: a computer-readable medium having stored therein instructions executable by one or more processors of the base station to: receive a first indication from a wireless communication device, wherein the first indication indicates that the wireless communication device includes repeater functionality and integrated access backhaul (IAB) node functionality, generate a configuration for the wireless communication device after receiving the first indication, and transmit the configuration to the wireless communication device.

Aspect 527: A method of wireless communication at a core network node, the method including: receiving a first indication from a base station, wherein the first indication indicates that a wireless communication device includes repeater functionality and integrated access backhaul (IAB) node functionality, selecting a first mode of operation for the wireless communication device from a plurality of modes of operation, wherein the plurality of modes of operation includes a repeater mode of operation and a IAB node mode of operation, and transmitting a second indication of the first mode of operation to the base station.

Aspect 528: The method of aspect 527, wherein the selecting the first mode of operation is based on at least one of: a traffic load, a quality of service, a deployment configuration, a capability of a wireless communication node, or a combination thereof.

Aspect 529: The method of aspect 527, further including: authorizing the wireless communication device for accessing a network, and transmitting a third indication after authorizing the wireless communication device for accessing the network, wherein the third indication indicates that a repeater is authorized for accessing the network or an IAB node is authorized for accessing the network.

Aspect 530: A core network node, including: a transceiver, a memory, and a processor communicatively coupled to the transceiver and the memory, wherein the processor and the memory are configured to: receive a first indication from a base station via the transceiver, wherein the first indication indicates that a wireless communication device includes repeater functionality and integrated access backhaul (IAB) node functionality, select a first mode of operation for the wireless communication device from a plurality of modes of operation, wherein the plurality of modes of operation includes a repeater mode of operation and a IAB node mode of operation, and transmit a second indication of the first mode of operation to the base station via the transceiver.

Aspect 531: The core network node of aspect 530, wherein the processor and the memory are further configured to select the first mode of operation based on at least one of: a traffic load, a quality of service, a deployment configuration, a capability of a wireless communication node, or a combination thereof.

Aspect 532: The core network node of aspect 530, wherein the processor and the memory are further configured to: authorize the wireless communication device for accessing a network, and transmit a third indication after authorizing the wireless communication device for accessing the network, wherein the third indication indicates that a repeater is authorized for accessing the network or an IAB node is authorized for accessing the network.

Aspect 533: A core network node, including: means for receiving a first indication from a base station, wherein the first indication indicates that a wireless communication device includes repeater functionality and integrated access backhaul (IAB) node functionality, means for selecting a first mode of operation for the wireless communication device from a plurality of modes of operation, wherein the plurality of modes of operation includes a repeater mode of operation and a IAB node mode of operation, and means for transmitting a second indication of the first mode of operation to the base station.

Aspect 534: An article of manufacture for use by a core network node in a wireless communication network, the article including: a computer-readable medium having stored therein instructions executable by one or more processors of the core network node to: receive a first indication from a base station, wherein the first indication indicates that a wireless communication device includes repeater functionality and integrated access backhaul (IAB) node functionality, select a first mode of operation for the wireless communication device from a plurality of modes of operation, wherein the plurality of modes of operation includes a repeater mode of operation and a IAB node mode of operation, and transmit a second indication of the first mode of operation to the base station.

Aspect 535: A method of wireless communication at a base station, the method including: determining that a wireless communication device includes repeater functionality, and abstaining from transmitting an indication to identify the wireless communication device to a core network node after determining that the wireless communication device includes the repeater functionality.

Aspect 536: The method of aspect 535, wherein the repeater functionality includes configurable beamforming.

Aspect 537: The method of aspect 535, wherein the repeater functionality includes a mobile termination unit and a repeating unit.

Aspect 538: A base station, including: a transceiver, a memory, and a processor communicatively coupled to the transceiver and the memory, wherein the processor and the memory are configured to: determine that a wireless communication device includes repeater functionality, and abstain from transmitting an indication to identify the wireless communication device to a core network node after determining that the wireless communication device includes the repeater functionality.

Aspect 539: The base station of aspect 538, wherein the repeater functionality includes configurable beamforming.

Aspect 540: The base station of aspect 538, wherein the repeater functionality includes a mobile termination unit and a repeating unit.

Aspect 541: A base station, including: means for determining that a wireless communication device includes repeater functionality, and means for abstaining from transmitting an indication to identify the wireless communication device to a core network node after determining that the wireless communication device includes the repeater functionality.

Aspect 542: An article of manufacture for use by a base station in a wireless communication network, the article including: a computer-readable medium having stored therein instructions executable by one or more processors of the base station to: determine that a wireless communication device includes repeater functionality, and abstain from transmitting an indication to identify the wireless communication device to a core network node after determining that the wireless communication device includes the repeater functionality.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database, or another data structure), and the like. Also, "determining" may include receiving (e.g., receiving information), accessing (e.g., accessing data in a memory), and the like.

One or more of the components, steps, features and/or functions illustrated in FIGS. 1-55 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-55. may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a repeater device in a wireless communication network, the method comprising:
   receiving a first configuration message that specifies K synchronization signal blocks (SSBs) to be transmitted by the repeater device;
   electing to use K' beams to transmit SSBs, wherein K and K' are whole numbers and K' is less than or equal to K;
   receiving at least one SSB transmission; and
   transmitting the at least one SSB transmission up to K' times via the K' beams.

2. The method of claim 1, wherein the electing to use the K' beams to transmit SSBs comprises:
   determining K' based on how many beams the repeater device can generate.

3. The method of claim 1, wherein the electing to use the K' beams to transmit SSBs comprises:
   identifying beams that can be used by the repeater device to relay SSBs; and
   determining K' based on the beams that can be used by the repeater device to relay SSBs.

4. The method of claim 1, wherein the electing to use the K' beams to transmit SSBs comprises:
   identifying beams that have been successfully used by the repeater device to communicate with at least one user equipment; and
   determining K' based on the beams that have been successfully used by the repeater device to communicate with the at least one user equipment.

5. The method of claim 1, wherein K' is less than K, the method further comprising:
   generating an indication that the repeater device will use the K' beams to transmit SSBs; and
   transmitting the indication to a network access node.

6. The method of claim 5, further comprising:
   receiving a second configuration message after transmitting the indication, wherein the second configuration message specifies K' SSBs to be used by the repeater device.

7. The method of claim 1, wherein the at least one SSB transmission comprises a plurality of SSB transmissions, and transmitting the at least one SSB transmission further comprises:
   sequentially relaying the plurality of SSB transmissions via the K' beams.

8. The method of claim 1, wherein the at least one SSB transmission comprises SSB information, and transmitting the at least one SSB transmission further comprises:
   generating a plurality of SSB transmissions from the SSB information; and
   transmitting the plurality of SSB transmissions via the K' beams.

9. A repeater device, comprising:
   a relay unit;
   a memory; and
   a processor communicatively coupled to the relay unit and the memory, wherein the processor and the memory are configured to:
      receive a first configuration message that specifies K synchronization signal blocks (SSBs) to be transmitted by the relay unit of the repeater device;
      elect to use K' beams to transmit SSBs, wherein K and K' are whole numbers and K' is less than or equal to K;
      receive at least one SSB transmission; and
      transmit the at least one SSB transmission up to K' times via the K' beams.

10. The repeater device of claim 9, wherein to elect to use the K' beams, the processor and the memory are further configured to:
    determine K' based on how many beams the repeater device can generate.

11. The repeater device of claim 9, wherein to elect to use the K' beams, the processor and the memory are further configured to:
    identify beams that can be used by the repeater device to relay SSBs; and
    determine K' based on the beams that can be used by the repeater device to relay SSBs.

12. The repeater device of claim 9, wherein to elect to use the K' beams, the processor and the memory are further configured to:
    identify beams that have been successfully used by the repeater device to communicate with at least one user equipment; and
    determine K' based on the beams that have been successfully used by the repeater device to communicate with the at least one user equipment.

13. The repeater device of claim 9, wherein K' is less than K, and the processor and the memory are further configured to:
    generate an indication that the repeater device will use the K' beams to transmit SSBs; and
    transmit the indication to a network access node.

14. The repeater device of claim 13, wherein the processor and the memory are further configured to:
    receive a second configuration message after transmitting the indication, wherein the second configuration message specifies K' SSBs to be used by the repeater device.

15. The repeater device of claim 9, wherein the at least one SSB transmission comprises a plurality of SSB transmissions, and the processor and the memory transmit the at least one SSB transmission by being further configured to:
    sequentially relay the plurality of SSB transmissions via the K' beams.

16. The repeater device of claim 9, wherein the at least one SSB transmission comprises SSB information, and the processor and the memory transmit the at least one SSB transmission by being further configured to:
    generate a plurality of SSB transmissions from the SSB information; and
    transmit the plurality of SSB transmissions via the K' beams.

17. A method of wireless communication at a network access node in a wireless communication network, the method comprising:
    generating a first configuration message that specifies K synchronization signal blocks (SSBs) to be transmitted by a repeater device;
    transmitting the first configuration message to the repeater device;
    determining that the repeater device is transmitting less than the K SSBs;
    generating a second configuration message after determining that the repeater device is transmitting less than the K SSBs, the second configuration message indicating K' SSBs to be transmitted by the repeater device; and
    transmitting the second configuration message to the repeater device, wherein K and K' are whole numbers and K' is less than or equal to K.

18. The method of claim 17, further comprising:
transmitting at least one SSB transmission to the repeater device after transmitting the first configuration message.

19. The method of claim 17, wherein the determining that the repeater device is transmitting less than the K SSBs further comprises:
receiving an indication that the repeater device is using K' beams to transmit SSBs.

20. The method of claim 17, wherein the determining that the repeater device is transmitting less than the K SSBs comprises:
determining that there is no communication with a user equipment on at least one beam associated with the K SSBs.

21. The method of claim 17, wherein the determining that the repeater device is transmitting less than the K SSBs comprises:
determining that random access messages are not being received on at least one random access channel (RACH) occasion with the K SSBs.

22. The method of claim 17, further comprising:
receiving capability information from the repeater device;
estimating a quantity of beams supported by the repeater device based on the capability information; and
determining K based on the quantity of beams supported by the repeater device.

23. The method of claim 22, wherein the capability information comprises at least one of: a maximum number of configured transmission configuration indicator (TCI) states per component carrier, a maximum number of configured spatial relations, a maximum number of sounding reference signal (SRS) resource sets, a maximum number of SRS resources per set, or a combination thereof.

24. A network access node, comprising:
a transceiver;
a memory; and
a processor communicatively coupled to the transceiver and the memory, wherein the processor and the memory are configured to:
generate a first configuration message that specifies K synchronization signal blocks (SSBs) to be transmitted by a repeater device;
transmit the first configuration message to the repeater device via the transceiver;
determine that the repeater device is transmitting less than the K SSBs;
generate a second configuration message after determining that the repeater device is transmitting less than the K SSBs, the second configuration message specifying K' SSBs to be transmitted by the repeater device; and
transmit the second configuration message to the repeater device via the transceiver,
wherein K and K' are whole numbers and K' is less than or equal to K.

25. The network access node of claim 24, wherein the processor and the memory are further configured to:
transmit at least one SSB transmission to the repeater device after transmitting the first configuration message.

26. The network access node of claim 24, wherein the processor and the memory determine that the repeater device is transmitting less than the K SSBs by being further configured to:
receive an indication that the repeater device is using K' beams to transmit SSBs.

27. The network access node of claim 24, wherein the processor and the memory determine that the repeater device is transmitting less the K SSBs by being further configured to:
determine that there is no communication with a user equipment on at least one beam associated with the K SSBs.

28. The network access node of claim 24, wherein the processor and the memory determine that the repeater device is transmitting less than the K SSBs by being further configured to:
determine that random access messages are not being received on at least one random access channel (RACH) occasion with the K SSBs.

29. The network access node of claim 24, wherein the processor and the memory are further configured to:
receive capability information from the repeater device;
estimate a quantity of beams supported by the repeater device based on the capability information; and
determine K based on the quantity of beams supported by the repeater device.

30. The network access node of claim 29, wherein the capability information comprises at least one of: a maximum number of configured transmission configuration indicator (TCI) states per component carrier, a maximum number of configured spatial relations, a maximum number of sounding reference signal (SRS) resource sets, a maximum number of SRS resources per set, or a combination thereof.

* * * * *